(12) United States Patent
Wilberding et al.

(10) Patent No.: US 11,188,294 B2
(45) Date of Patent: Nov. 30, 2021

(54) DETECTING THE NEAREST PLAYBACK DEVICE

(71) Applicant: Sonos, Inc., Santa Barbara, CA (US)

(72) Inventors: Dayn Wilberding, Portland, OR (US); Youjin Nam, Santa Barbara, CA (US); Tadeo T. Toulis, Santa Barbara, CA (US); Jonathan Cole Harris, Santa Barbara, CA (US); Patrick Devine, Andover, MA (US); Nicholas A. J. Millington, Santa Barbara, CA (US); Jodi Vautrin, Boston, MA (US); Maria-Jose Ramos, Seattle, WA (US); Richard Bannon, Seattle, WA (US); Michael Sheldon, San Francisco, CA (US); Ted Lin, Cambridge, MA (US); Ron Kuper, Arlington, MA (US); Kirsten Lewis, Boston, MA (US); Jake Harwood, Seattle, WA (US); Jonathan Herbst, Seattle, WA (US); Daniel Jones, London (GB); Henry Sia, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/008,372

(22) Filed: Aug. 31, 2020

(65) Prior Publication Data

US 2020/0401365 A1 Dec. 24, 2020

Related U.S. Application Data

(63) Continuation-in-part of application No. 16/805,130, filed on Feb. 28, 2020.

(Continued)

(51) Int. Cl.
*G06F 17/00* (2019.01)
*G06F 3/16* (2006.01)
(Continued)

(52) U.S. Cl.
CPC .............. *G06F 3/165* (2013.01); *G01S 11/14* (2013.01); *G06F 3/162* (2013.01); *G10L 25/51* (2013.01);
(Continued)

(58) Field of Classification Search
CPC .......... G06F 3/165; G06F 3/162; G01S 11/14; G10L 25/51; H04R 3/12; H04R 27/00;
(Continued)

(56) References Cited

U.S. PATENT DOCUMENTS 5,440,644 A   8/1995 Farinelli et al.
5,761,320 A   6/1998 Farinelli et al.
(Continued)

FOREIGN PATENT DOCUMENTS

EP   1389853 A1   2/2004
WO   200153994    7/2001
(Continued)

OTHER PUBLICATIONS

AudioTron Quick Start Guide, Version 1.0, Mar. 2001, 24 pages.
(Continued)

*Primary Examiner* — Joseph Saunders, Jr.
(74) *Attorney, Agent, or Firm* — Akerman LLP

(57) ABSTRACT

Examples described herein relate to transitioning a playback session between portable playback devices such as "smart" headphones, earbuds, and handheld speakers with playback devices of a zone-based media playback system. Exemplary techniques facilitate continuity of playback when transitioning between locations (e.g., from at home to on-the-go or vice versa) or between listening paradigms (e.g., personal or (Continued)

out-loud playback of audio content). An example implementation includes detecting a swap trigger, determining the source playback device(s) and target playback device(s), and performing a playback session swap between the source playback device(s) and target playback device(s).

20 Claims, 71 Drawing Sheets

Related U.S. Application Data

(60) Provisional application No. 62/811,962, filed on Feb. 28, 2019.

(51) Int. Cl.
  *G01S 11/14* (2006.01)
  *G10L 25/51* (2013.01)
  *H04R 27/00* (2006.01)
  *H04R 3/12* (2006.01)

(52) U.S. Cl.
  CPC .............. *H04R 3/12* (2013.01); *H04R 27/00* (2013.01); *H04R 2227/003* (2013.01); *H04R 2227/005* (2013.01); *H04R 2420/05* (2013.01); *H04R 2420/07* (2013.01)

(58) Field of Classification Search
  CPC ........ H04R 2227/003; H04R 2227/005; H04R 2420/05; H04R 2420/07
  See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,930,005 | B2 | 1/2015 | Reimann |
| 8,942,252 | B2 | 1/2015 | Balassanian et al. |
| 9,699,579 | B2 * | 7/2017 | Carlsson ................ H04S 7/303 |
| 9,927,512 | B2 * | 3/2018 | Rowe ..................... G01S 1/753 |
| 10,001,965 | B1 | 6/2018 | Lang et al. |
| 10,055,108 | B2 | 8/2018 | Bates |
| 10,209,947 | B2 | 2/2019 | Morganstern et al. |
| 10,275,138 | B2 | 4/2019 | Vega et al. |
| 10,412,434 | B1 | 9/2019 | Matthews |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0136488 | A1 | 6/2007 | Cho et al. |
| 2007/0142944 | A1 | 6/2007 | Goldberg et al. |
| 2008/0081558 | A1 | 4/2008 | Dunko et al. |
| 2008/0108301 | A1 | 5/2008 | Dorenbosch |
| 2010/0082567 | A1 | 4/2010 | Rosenblatt et al. |
| 2010/0146573 | A1 | 6/2010 | Richardson et al. |
| 2011/0163939 | A1 | 7/2011 | Tam et al. |
| 2012/0072944 | A1 | 3/2012 | Felt et al. |
| 2013/0169546 | A1 | 7/2013 | Thomas et al. |
| 2013/0294358 | A1 | 11/2013 | Kim et al. |
| 2013/0311912 | A1 | 11/2013 | Aso et al. |
| 2013/0347044 | A1 | 12/2013 | Lee et al. |
| 2014/0105561 | A1 | 4/2014 | Chen et al. |
| 2014/0115114 | A1 | 4/2014 | Garmark et al. |
| 2014/0325371 | A1 | 10/2014 | Wilson et al. |
| 2015/0032812 | A1 | 1/2015 | Dudley |
| 2015/0193069 | A1 | 7/2015 | Di Censo et al. |
| 2015/0371529 | A1 | 12/2015 | Dolecki |
| 2016/0285938 | A1 | 9/2016 | Rider et al. |
| 2016/0286313 | A1 | 9/2016 | Kofman et al. |
| 2017/0055032 | A1 | 2/2017 | Oshima et al. |
| 2018/0041797 | A1 | 2/2018 | Shaw |
| 2018/0101356 | A1 | 4/2018 | Toksoz et al. |
| 2018/0115844 | A1 | 4/2018 | Lu et al. |
| 2018/0192144 | A1 | 7/2018 | McElroy |
| 2018/0288466 | A1 | 10/2018 | Monnerat et al. |
| 2018/0300420 | A1 | 10/2018 | Bergel et al. |
| 2018/0335903 | A1 | 11/2018 | Coffman et al. |
| 2018/0338177 | A1 | 11/2018 | Graham et al. |
| 2018/0352506 | A1 | 12/2018 | Young |
| 2019/0237091 | A1 | 8/2019 | Jones et al. |
| 2019/0318069 | A1 | 10/2019 | Mitic et al. |
| 2020/0037159 | A1 | 1/2020 | Jones et al. |
| 2021/0021923 | A1 | 1/2021 | Degraye et al. |

FOREIGN PATENT DOCUMENTS

| | | | | |
|---|---|---|---|---|
| WO | | 2003093950 A2 | 11/2003 | |
| WO | WO-2017197187 | A1 * | 11/2017 | ........... G06F 16/243 |
| WO | | 2018051144 A1 | 3/2018 | |
| WO | WO-2018041801 | A1 * | 3/2018 | ........... H04R 1/1041 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion dated Jun. 8, 2020, issued in connection with International Application No. PCT/US2020/020511, filed on Feb. 28, 2020, 18 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 29, 2020, issued in connection with U.S. Appl. No. 16/805,182, filed Feb. 28, 2020, 16 pages.

(56) References Cited

OTHER PUBLICATIONS

Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Office Action dated May 17, 2021 in U.S. Appl. No. 16/805,182, 19 pages.

\* cited by examiner

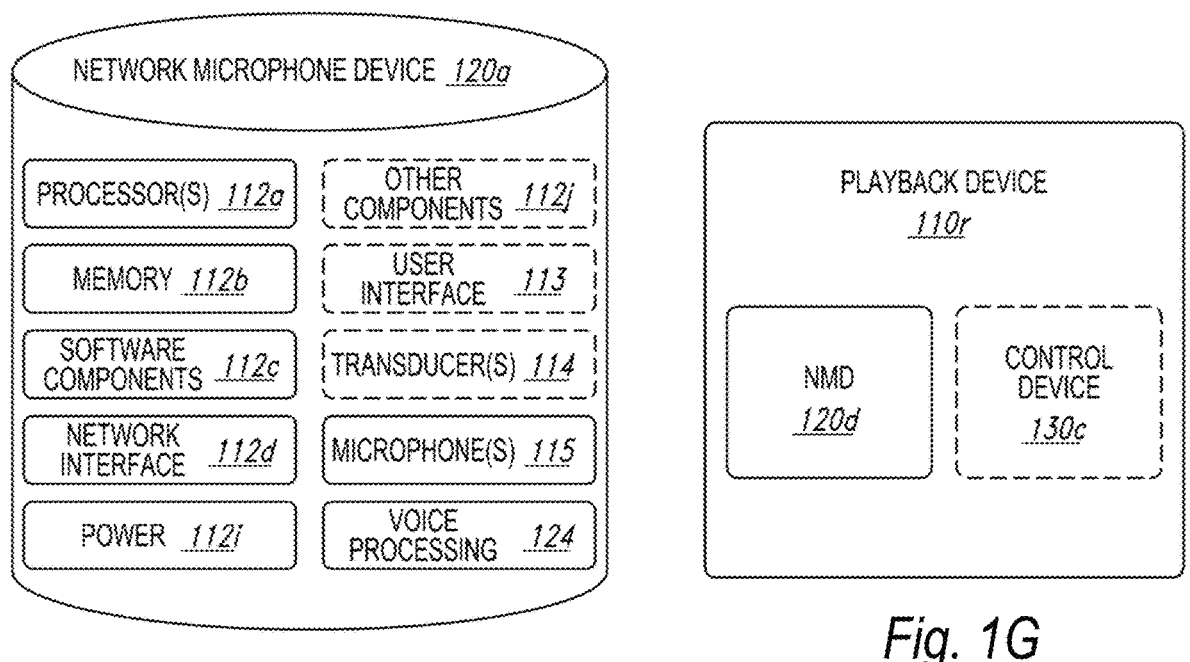
Fig. 1F
Fig. 1G
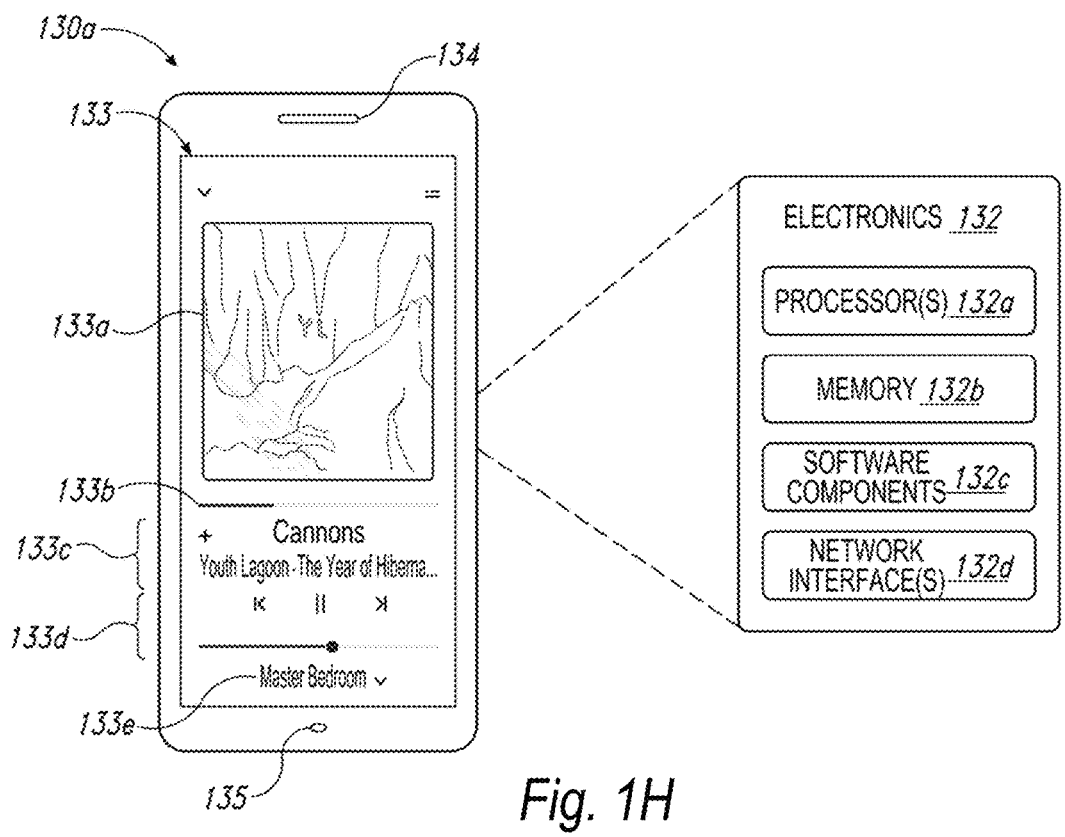
Fig. 1H

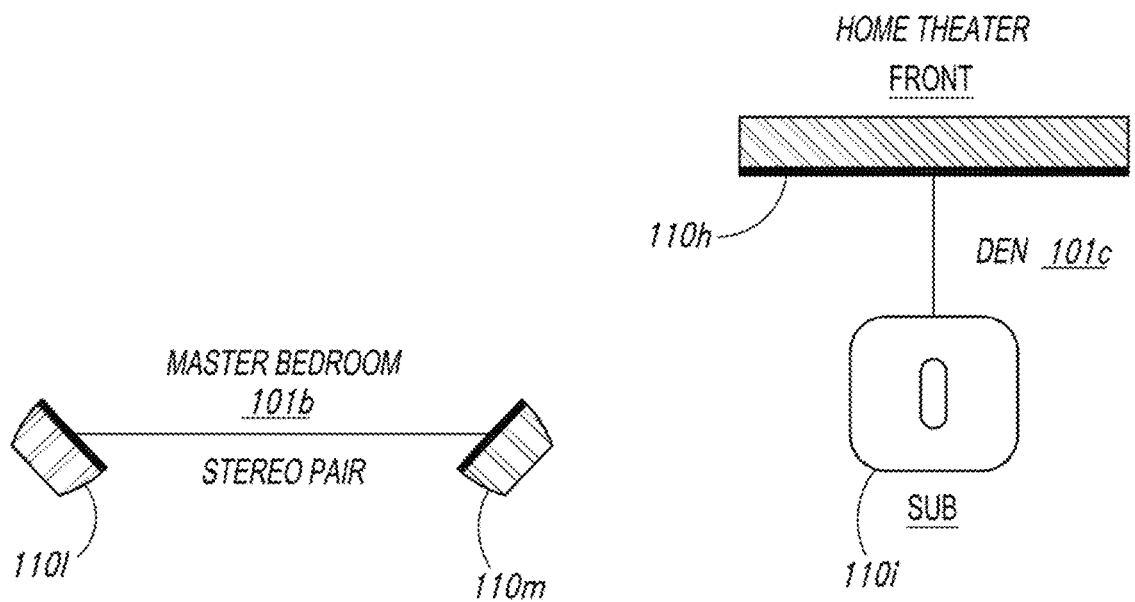
Fig. 1I
Fig. 1J
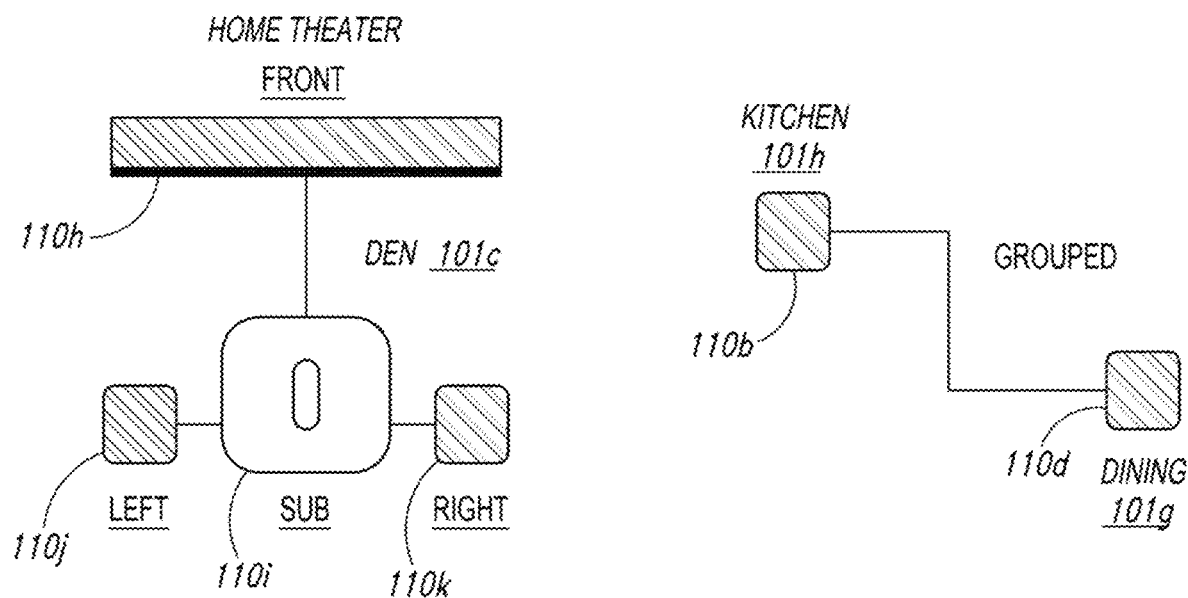
Fig. 1K
Fig. 1L

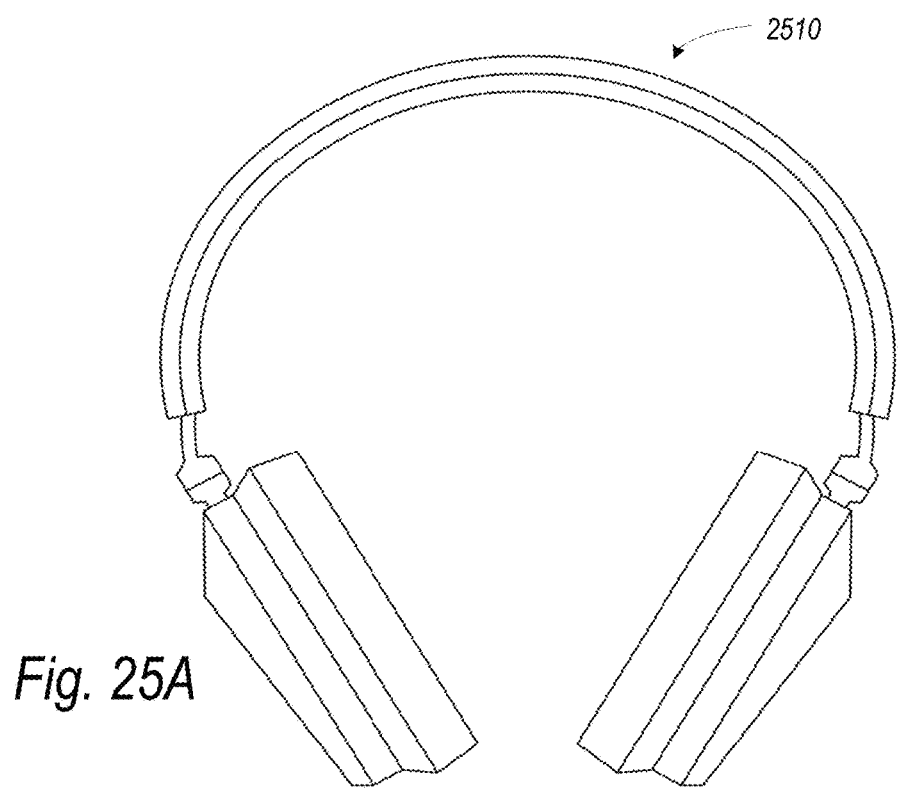
*Fig. 25A*
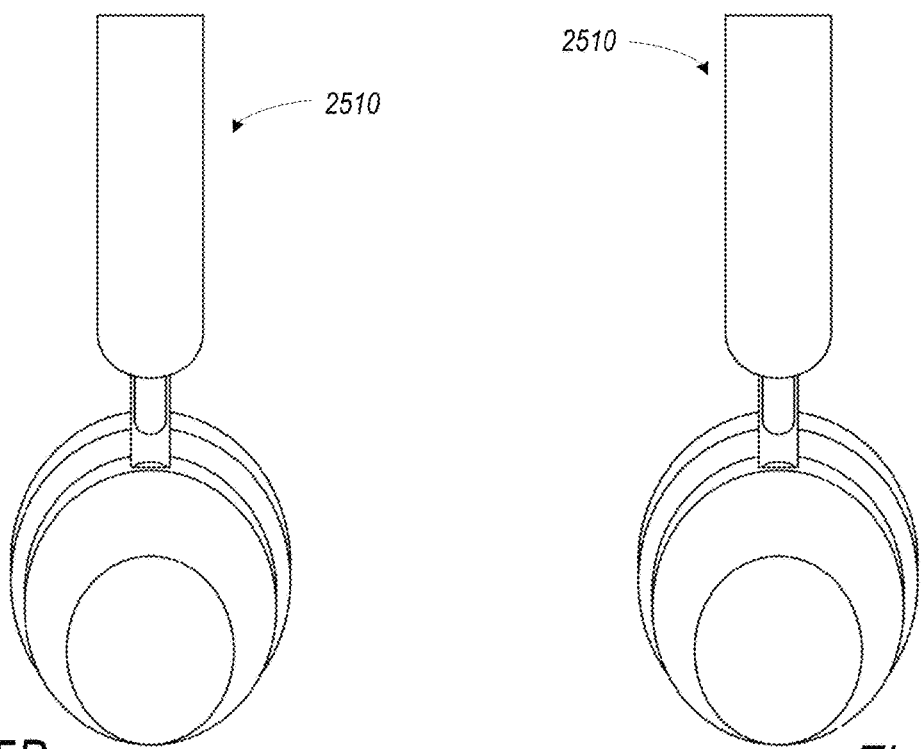
*Fig. 25B*  *Fig. 25C*

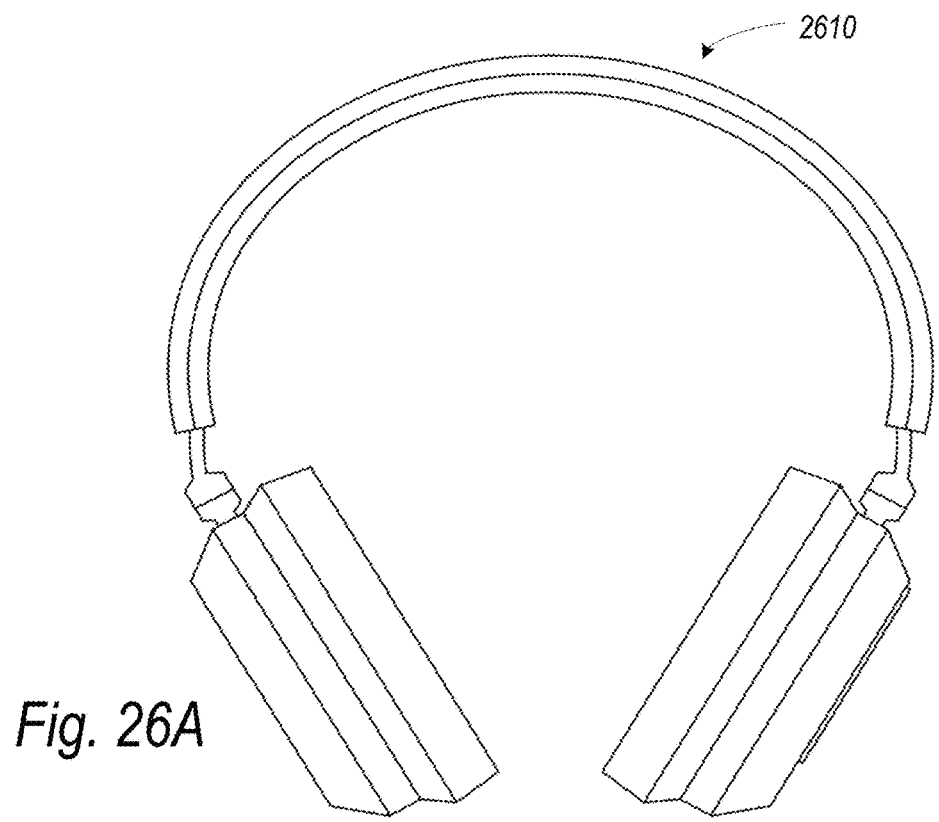
Fig. 26A
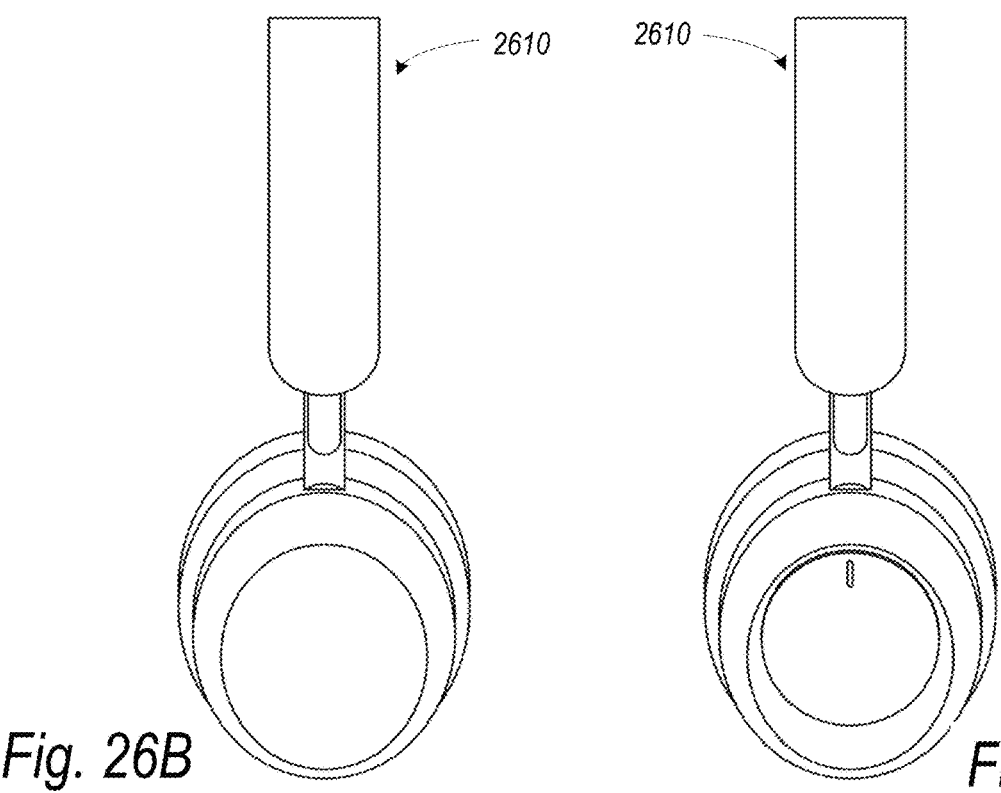
Fig. 26B
Fig. 26C

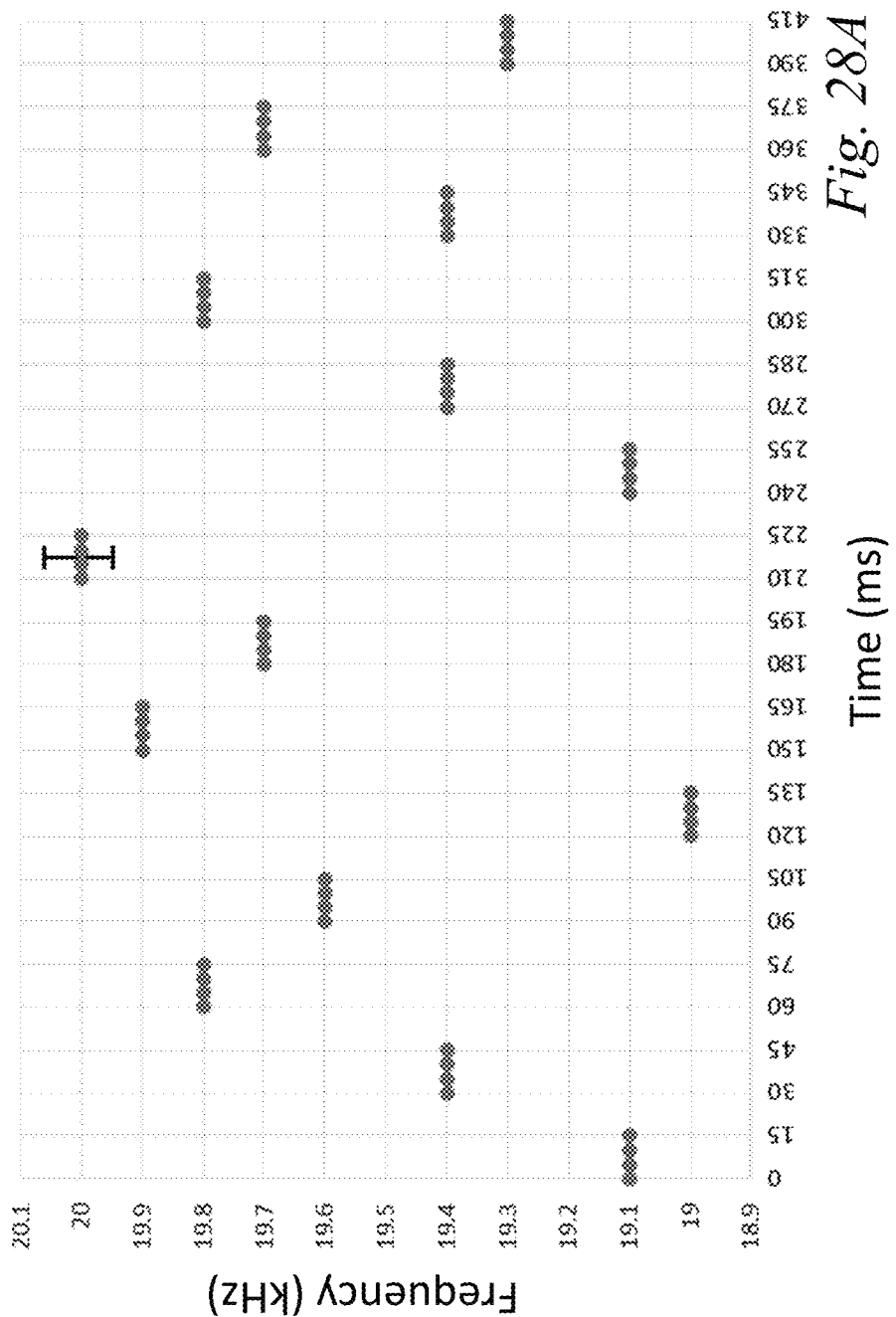

DETECTING THE NEAREST PLAYBACK DEVICE

CROSS-REFERENCE TO RELATED APPLICATIONS

This application claims priority under 35 U.S.C. § 120 to, and is a continuation-in-part of, U.S. non-provisional application Ser. No. 16/805,130 filed on Feb. 28, 2020, entitled "Playback Transitions," which is incorporated herein by reference in its entirety.

U.S. non-provisional application Ser. No. 16/805,130 claims the benefit under 35 U.S.C. § 120 of U.S. provisional App. No. 62/811,962 filed on Feb. 28, 2019, entitled "Playback Transitions," which is incorporated herein by reference in its entirety.

This application is related to U.S. non-provisional application Ser. No. 16/805,182 filed on Feb. 28, 2020, entitled "Playback Transitions," which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1-I, 1J, 1K, and 1L are schematic diagrams of corresponding media playback system zones.

FIG. 25A is a front view of headphones configured in accordance with aspects of the disclosed technology.

FIG. 25B is a first side view of the headphones.

FIG. 25C is a second side view of the headphones.

FIG. 26A is a front view of headphones configured in accordance with aspects of the disclosed technology.

FIG. 26B is a first side view of the headphones.

FIG. 26C is a second side view of the headphones.

FIG. 28A is an example time-frequency representation of a first reference audio signal in accordance with aspects of the disclosed technology.

Figure 1A:
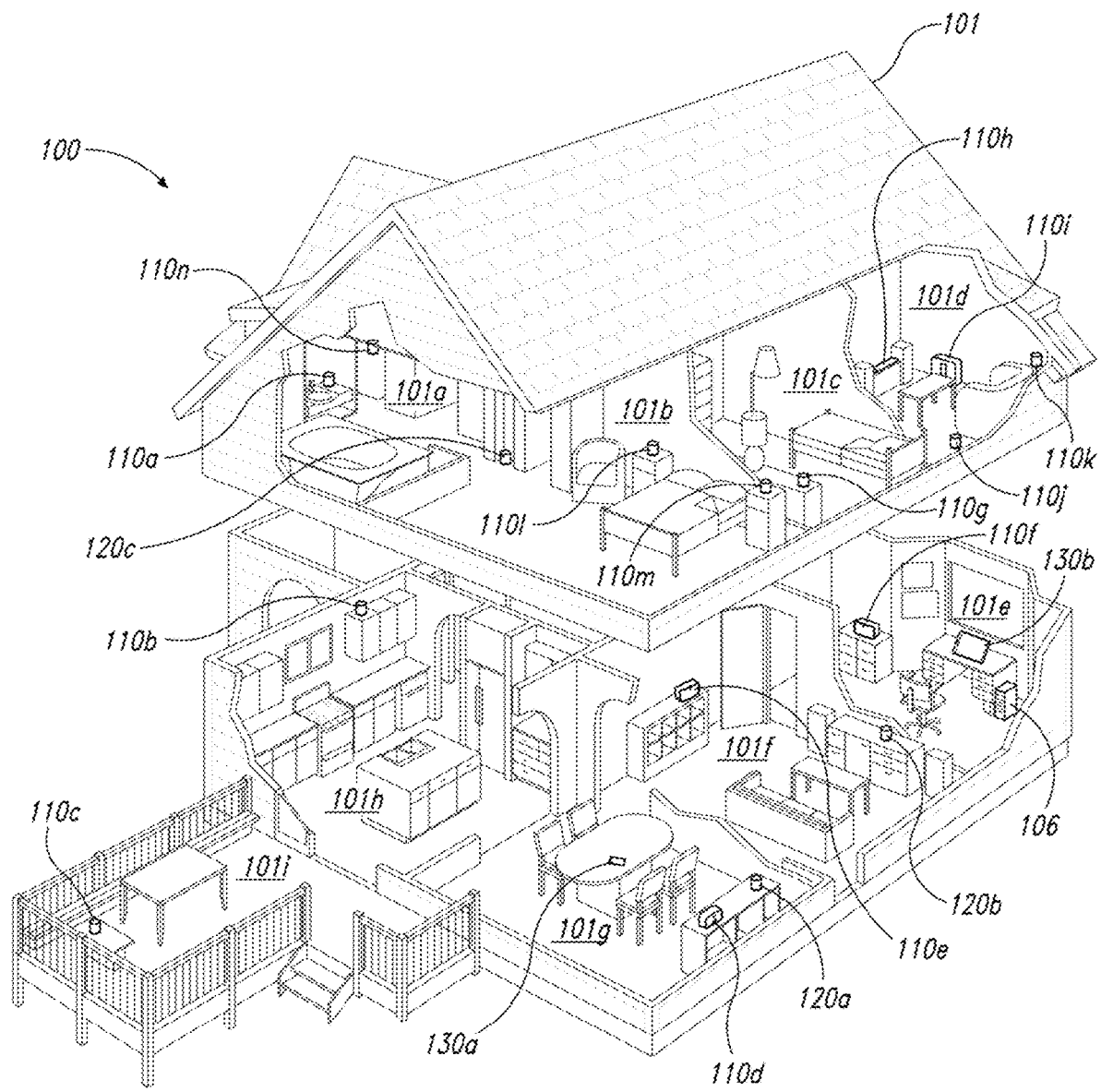
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Example techniques described herein relate to transitioning a playback session between wearable playback devices, such as "smart" headphones and earbuds, and playback devices of a zone-based media playback system. Further example techniques relate to transitioning a playback session between portable (e.g., battery-operated, carryable) playback devices and playback devices of a zone-based media playback system. Such transitions are referred to herein as "swaps" or "playback session swaps." Such exemplary swap techniques facilitate continuity of playback when transitioning between locations (e.g., from at home to on-the-go or vice versa) or between listening paradigms (e.g., personal or out-loud). Further, some exemplary techniques may reduce the extent of user input (or other user involvement) involved with transitioning playback as compared with some other techniques.

In an illustrative example, a user begins a playback session on exemplary headphones while on-the-go. For instance, a user begins listening to KEXP Seattle using earbuds paired with a mobile device (e.g., a smartphone) over a wireless connection such as 802.15 (Bluetooth®) or 802.11, among other examples. In this example, KEXP radio is streamed via the Internet to the mobile device.

Upon arriving home, the user may desire to continue listening to KEXP radio out-loud. To initiate a playback session swap from the earbuds to a playback device within the kitchen, the user may provide an input to the earbuds. Since the earbuds have a playback session on-going, this input designates the earbuds as the source of the playback session swap. The target of the swap (i.e., the kitchen zone) may have been previously designated in a pre-defined swap pair with the earbuds or may be determined after the input using a proximity detection technique, such as audio chirps, as described in further detail herein. The earbuds and/or mobile device perform the playback session swap with the kitchen zone, and playback of KEXP radio continues uninterrupted out-loud on the playback device within the kitchen.

In another illustrative example, the user may begin a playback session on an exemplary portable speaker. For instance, a user begins listening to WBEZ Chicago using the handheld speaker in a dining room. In this example, WBEZ Chicago is streamed via the Internet to the handheld speaker over a home local area network. Desiring to meditate, the user carries the handheld speaker to the living room and asks a voice assistant service to play meditation music. The handheld speaker plays an acknowledgement from the voice assistant service and begins playing back a curated meditation playlist from a streaming audio service.

While playing the curated meditation playlist, the user's friend enters the living room and suggests that the user check out the new Childish Gambino track, which is playing via a control application on her smartphone. To initiate a playback session swap from the smartphone to the handheld speaker, the friend holds the smartphone close to the handheld speaker to initiate a Near-Field Communication (NFC) exchange between the smartphone and handheld speaker. This exchange designates the smartphone as the source of the playback session swap and the handheld speaker as the target. The smartphone performs the playback session swap with the handheld speaker, and playback of the Childish Gambino track continues uninterrupted out-loud on the handheld speaker.

To enjoy the Childish Gambino track with more powerful amplifier(s) and/or larger transducer(s), the user initiates a playback session swap from the handheld speaker to a playback device in the living room by providing an input to the handheld speaker. This input designates the handheld speaker as the source of the playback session swap. The handheld speaker automatically designates the living room zone as the swap target based on detected proximity of the handheld speaker to the living room zone. The handheld speaker performs the playback session swap with the living room zone, and playback of the Childish Gambino track continues uninterrupted out-loud on the playback device within the living room.

In a third illustrative example, in the evening, the user may begin a playback session in the bedroom on a soundbar device that plays back audio content from a television. Desiring to keep the volume down so as not to disturb her partner trying to put their baby to bed in an adjacent room, the user initiates a playback session swap from the soundbar device to the handheld speaker, which she has placed on her nightstand. Since the handheld speaker is physically closer to the user, she can comfortably hear the audio from the television at a lower volume level.

After putting the baby to sleep, the partner comes into the bedroom to find the user asleep. To initiate a playback session swap from the handheld speaker to a pair of headphones, the partner may provide an input to the headphones. This input designates the headphones as the target of the playback session swap. The source of the swap (i.e., the handheld speaker) is determined based on context (i.e., based on an active playback session). The handheld speaker performs the playback session swap with the headphones, and playback of the television audio continues uninterrupted out-loud on the headphones.

As noted above, example techniques described herein involve playback session swaps. An example implementation includes detecting a swap trigger, determining the source playback device(s) and target playback device(s), and performing a playback session swap between the source playback device(s) and target playback device(s).

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 includes one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 includes a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

Figure 14:
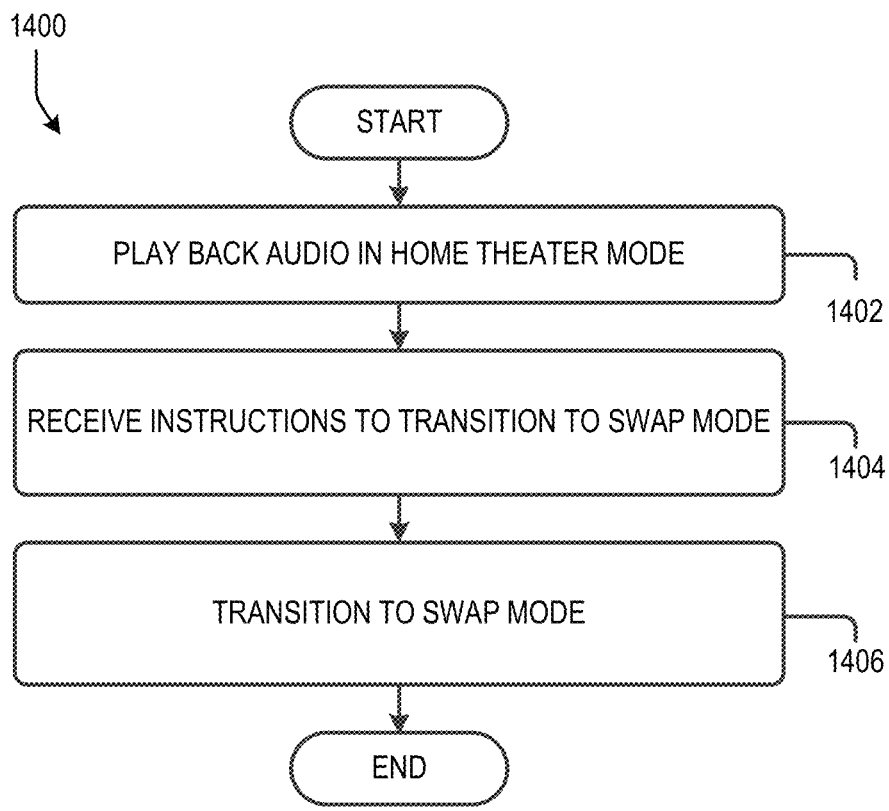
FIG. 14 is a method flow diagram illustrating an example home theater swap technique in accordance with aspects of the disclosed technology.
Figure 15:
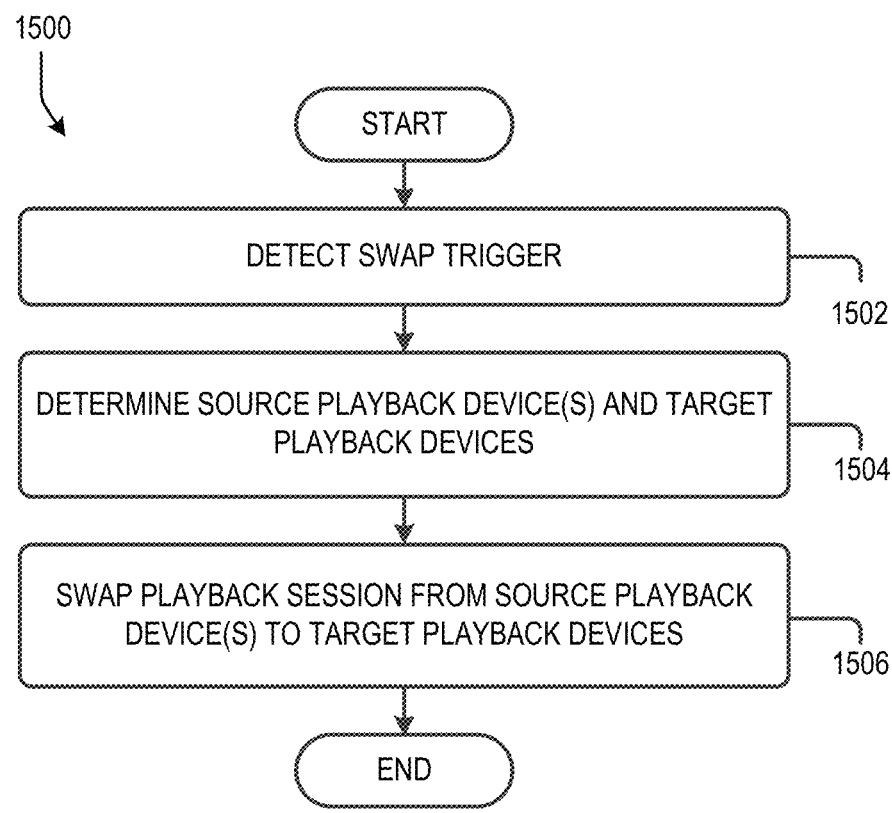
FIG. 15 is a method flow diagram illustrating a technique to facilitate a playback session swap in accordance with aspects of the disclosed technology.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E, as well as FIGS. 14-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones.

a. Suitable Media Playback System

Figure 1B:
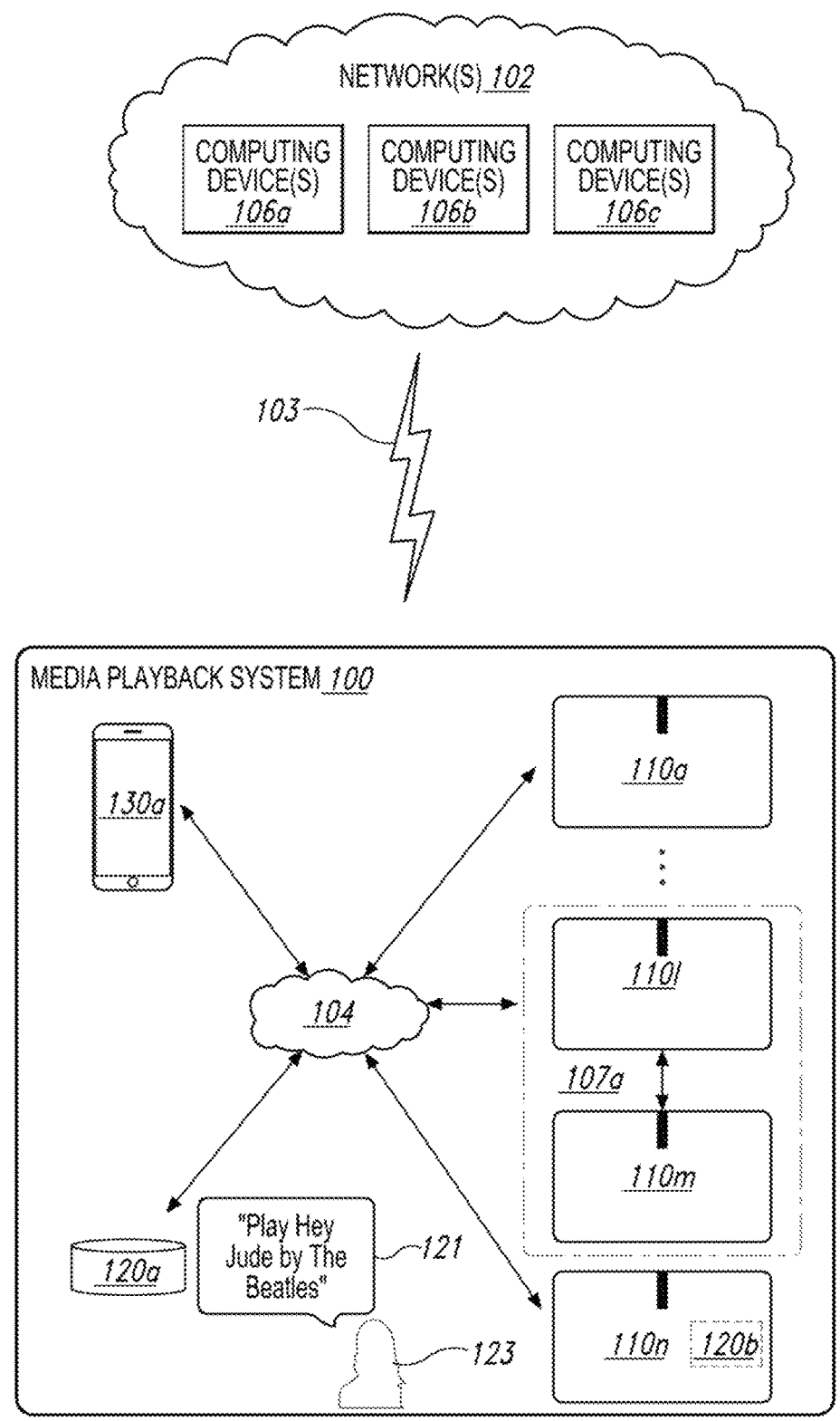
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 includes computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 includes a plurality of cloud networks comprising communicatively coupled computing devices. Furthermore, while the cloud network 102 is shown in FIG. 1B as having three of the computing devices 106, in some embodiments, the cloud network 102 includes fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 includes a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In some examples, the dedicated communication network is implemented as a mesh network where the devices in the media playback system form the nodes in the mesh network. One or more root nodes of the mesh network then connect the mesh network to a household WiFi network, which functions in parallel to the mesh network.

In other embodiments, however, the network 104 includes an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a includes a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c includes one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
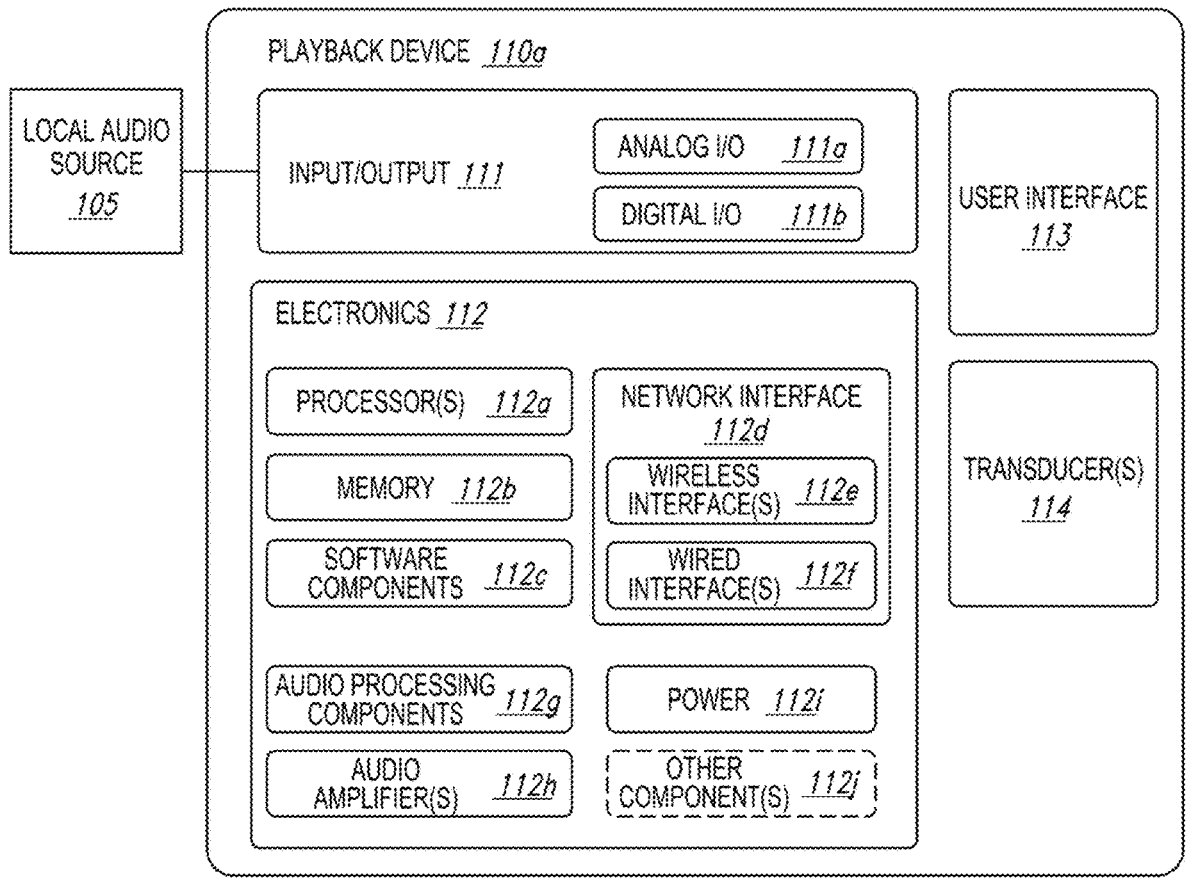
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b includes a Sony/Philips Digital Interface Format (S/PDIF) communication interface and/or cable and/or a Toshiba Link (TOSLINK) cable. In some embodiments, the digital I/O 111b includes an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further includes electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d includes one or more wireless interfaces 112e (referred to hereinafter as "the wireless interface 112e"). The wireless interface 112e (e.g., a suitable interface comprising one or more antennas) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
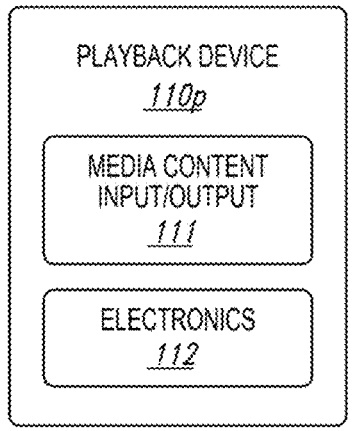
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 includes wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
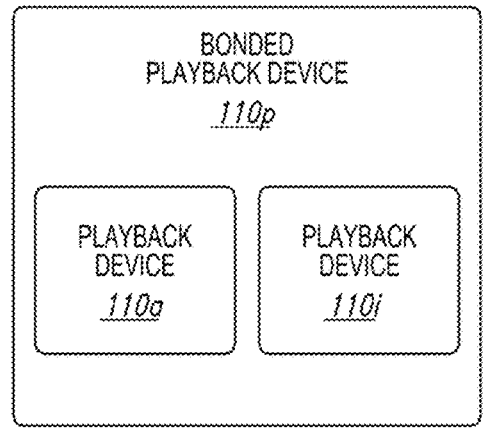
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q includes a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally includes other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a includes an Internet of Things (IoT) device such as, for example, a thermostat, alarm panel, fire and/or smoke detector, etc. In some embodiments, the NMD 120a includes the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a includes a smartphone (e.g., an iPhone™, an Android phone) on which media playback system controller application software is installed. In some embodiments, the control device 130a includes, for example, a tablet (e.g., an iPad™), a computer (e.g., a laptop computer, a desktop computer), and/or another suitable device (e.g., a television, an automobile audio head unit, an IoT device). In certain embodiments, the control device 130a includes a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 includes a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
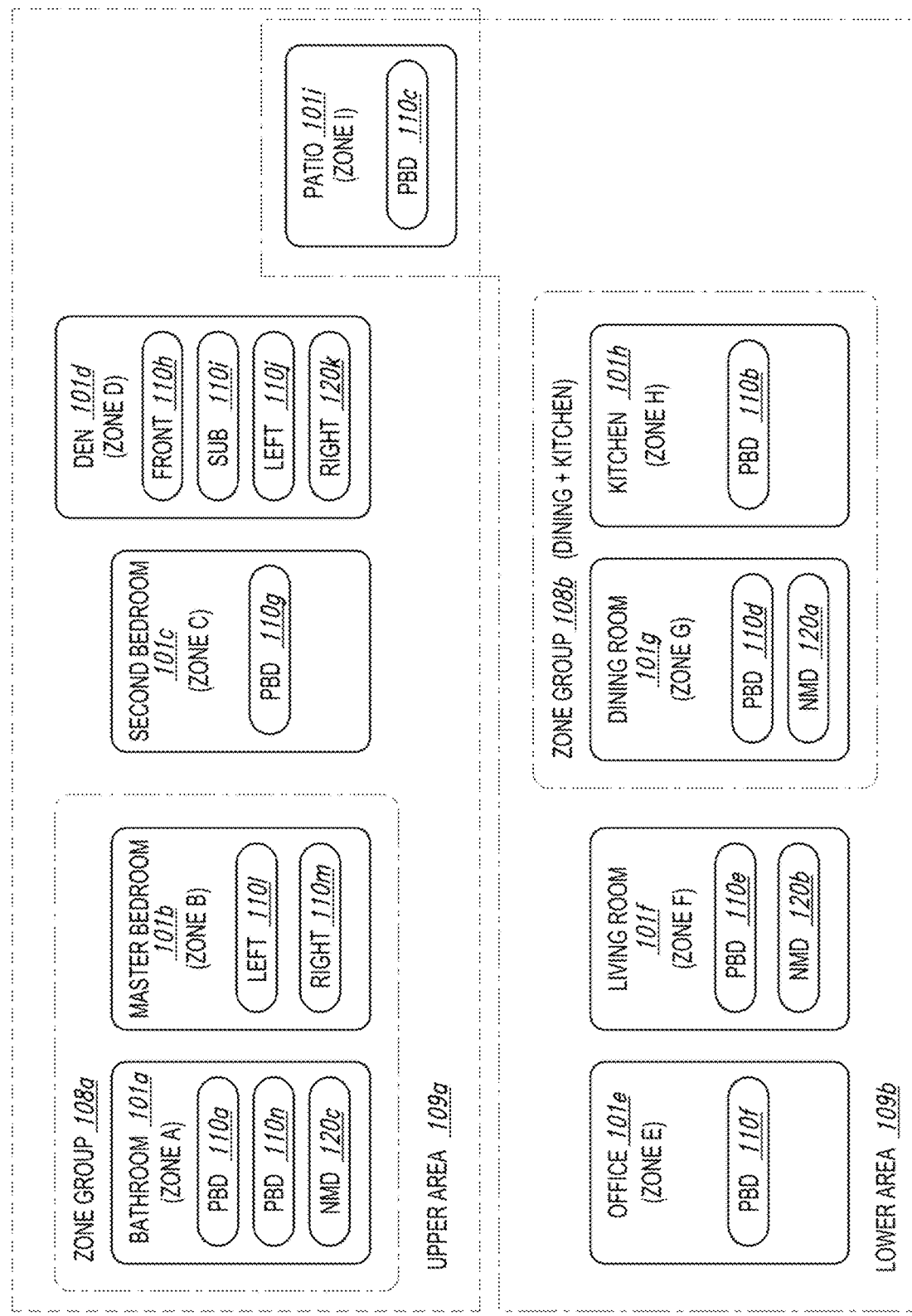
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*c* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 might not implement Areas, in which case the system may not store variables associated with Areas.

In further examples, the playback devices 110 of the media playback system 100 are named and arranged according to a control hierarchy referred to as home graph. Under the home graph hierarchy, the base unit of the home graph hierarchy is a "Set." A "Set" refers to an individual device or multiple devices that operate together in performing a given function, such as an individual playback device 110 or a bonded zone of playback devices. After Sets, the next level of the hierarchy is a "Room." Under the home graph hierarchy, a "Room" can be considered a container for Sets in a given room of a home. For example, an example Room might correspond to the kitchen of a home, and be assigned the name "Kitchen" and include one or more Sets (e.g. "Kitchen Island"). The next level of the example home graph hierarchy is "Area," which includes two or more Rooms (e.g., "Upstairs" or "Downstairs"). The highest level of the home graph hierarchy is "Home." A Home refers to the entire home, and all of the Sets within. Each level of the home graph hierarchy is assigned a human-readable name, which facilities control via GUI and VUI. Additional details regarding the home graph control hierarchy can be found, for example, in U.S. patent application Ser. No. 16/216,357 entitled, "Home Graph," which is incorporated herein by reference in its entirety.

III. Example Systems and Devices

Figure 2A:
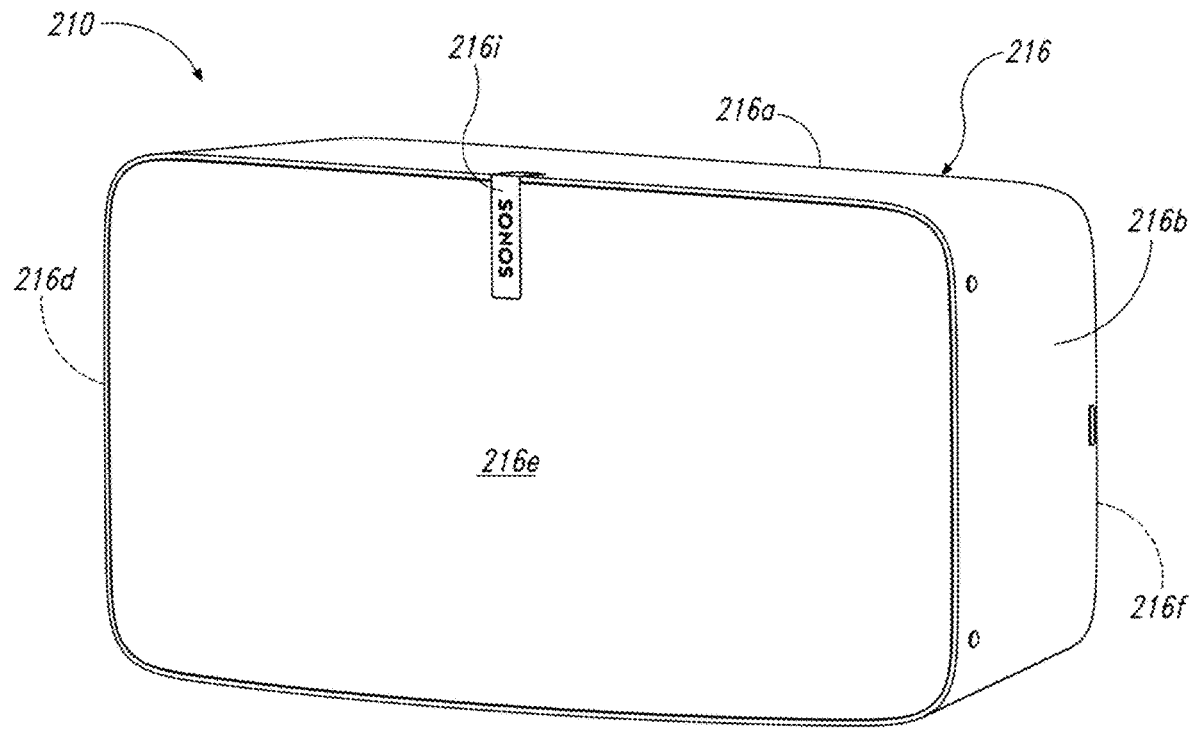
FIG. 2A is a front isometric view of a playback device configured in accordance with aspects of the disclosed technology.
Figure 2B:
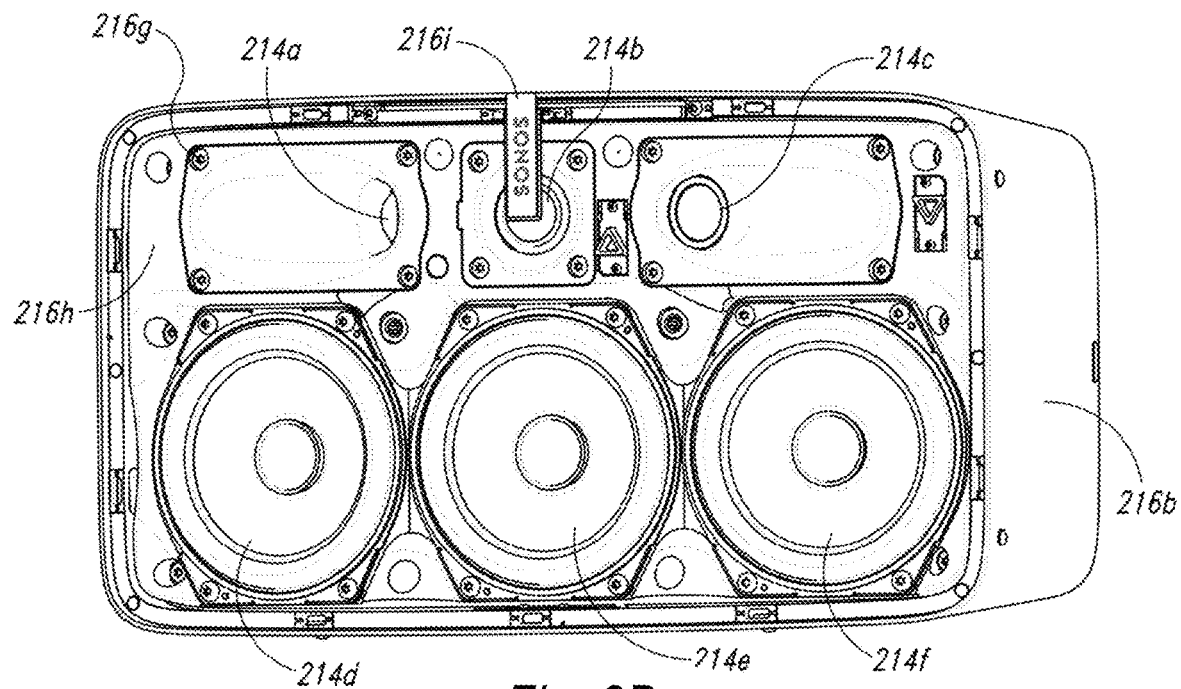
FIG. 2B is a front isometric view of the playback device of FIG. 3A without a grille.
Figure 2C:
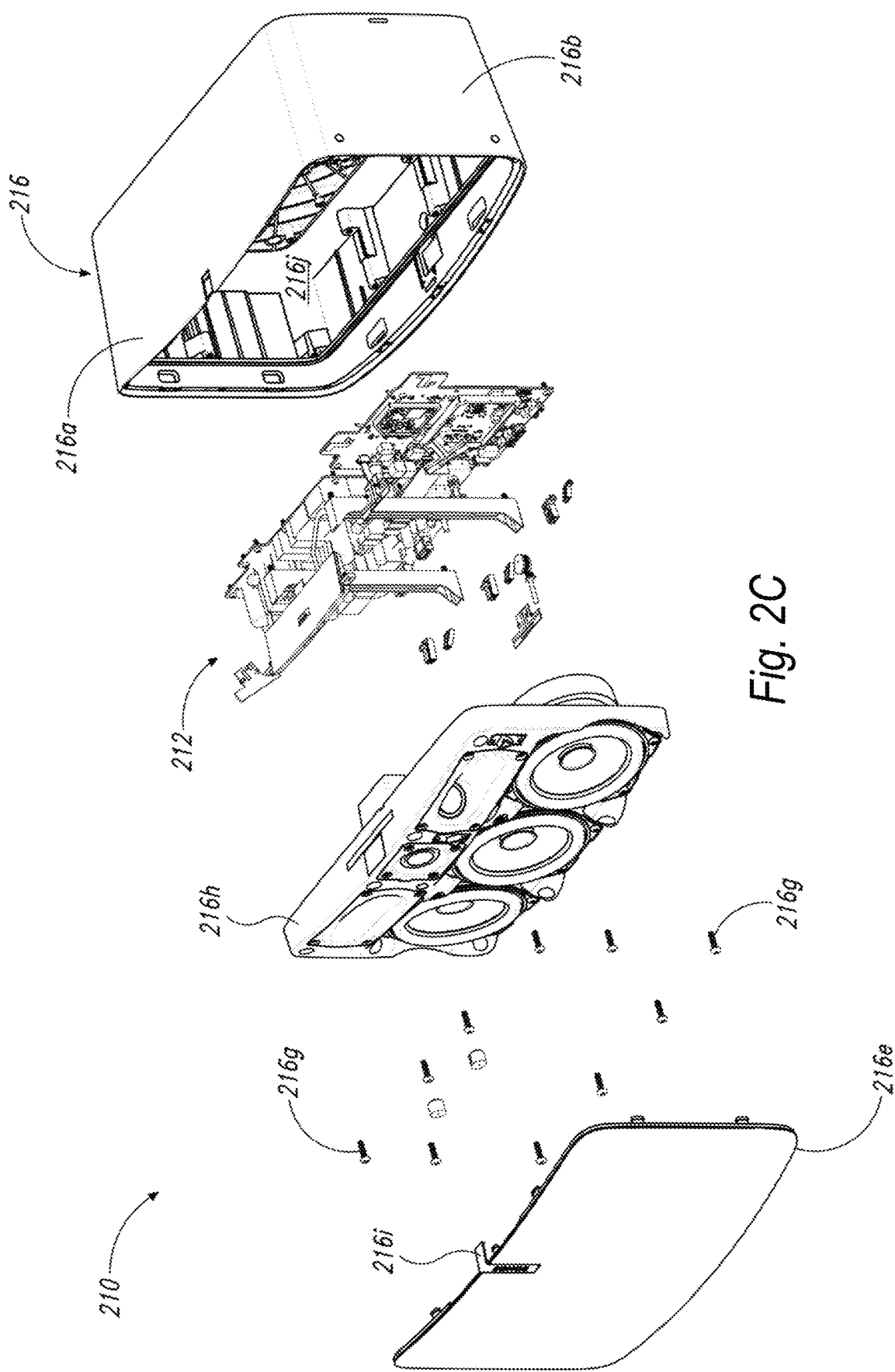
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 includes a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
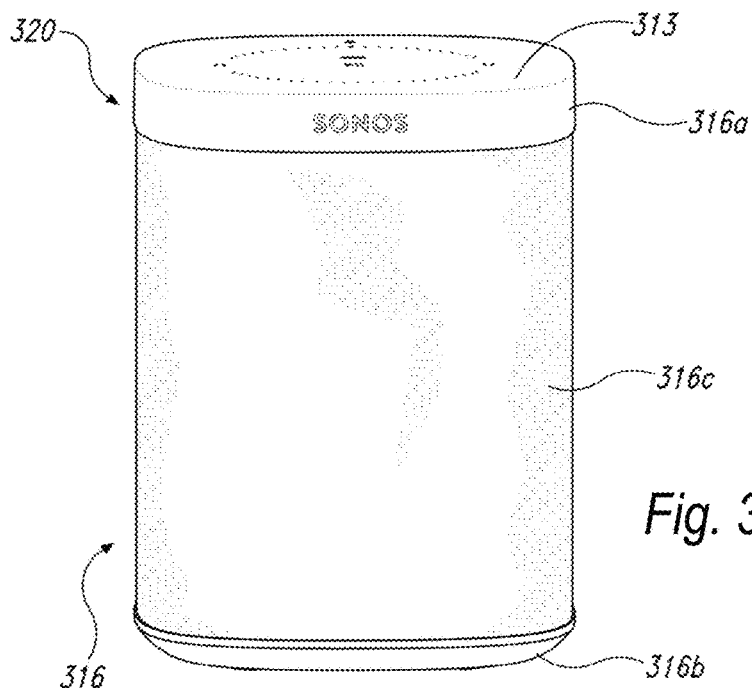
FIG. 3A is a front view of a network microphone device configured in accordance with aspects of the disclosed technology.
Figure 3B:
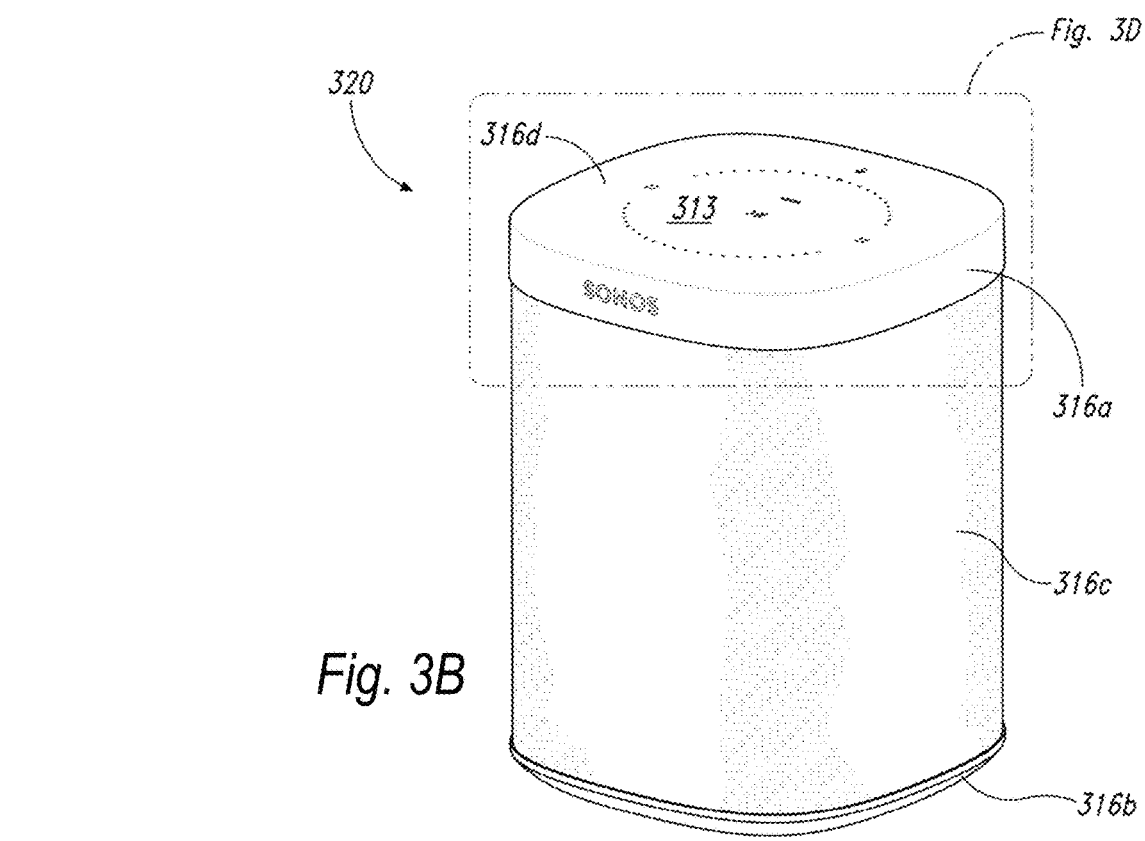
FIG. 3B is a side isometric view of the network microphone device of FIG. 3A.
Figure 3C:
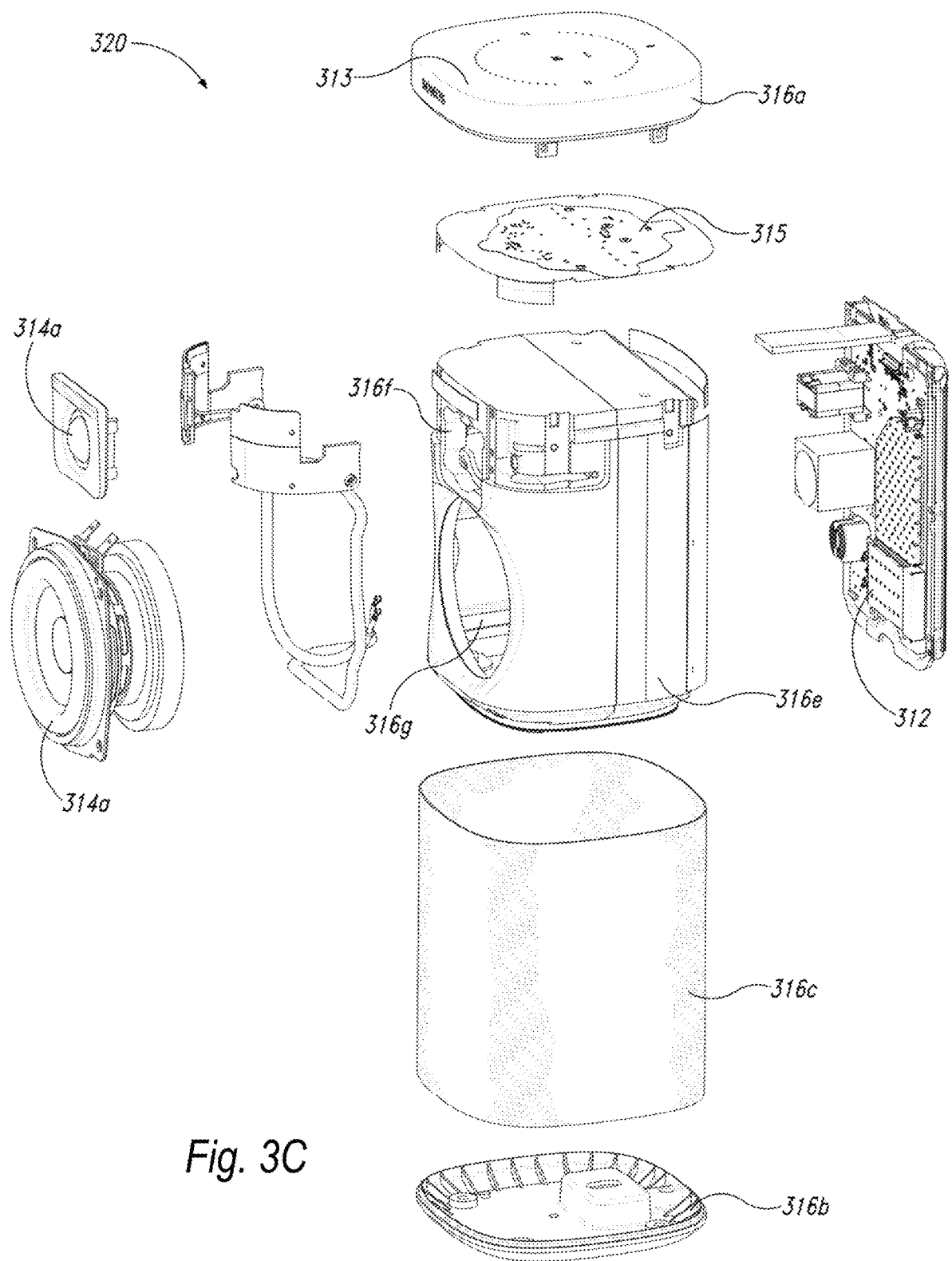
FIG. 3C is an exploded view of the network microphone device of FIGS. 3A and 3B.
Figure 3D:
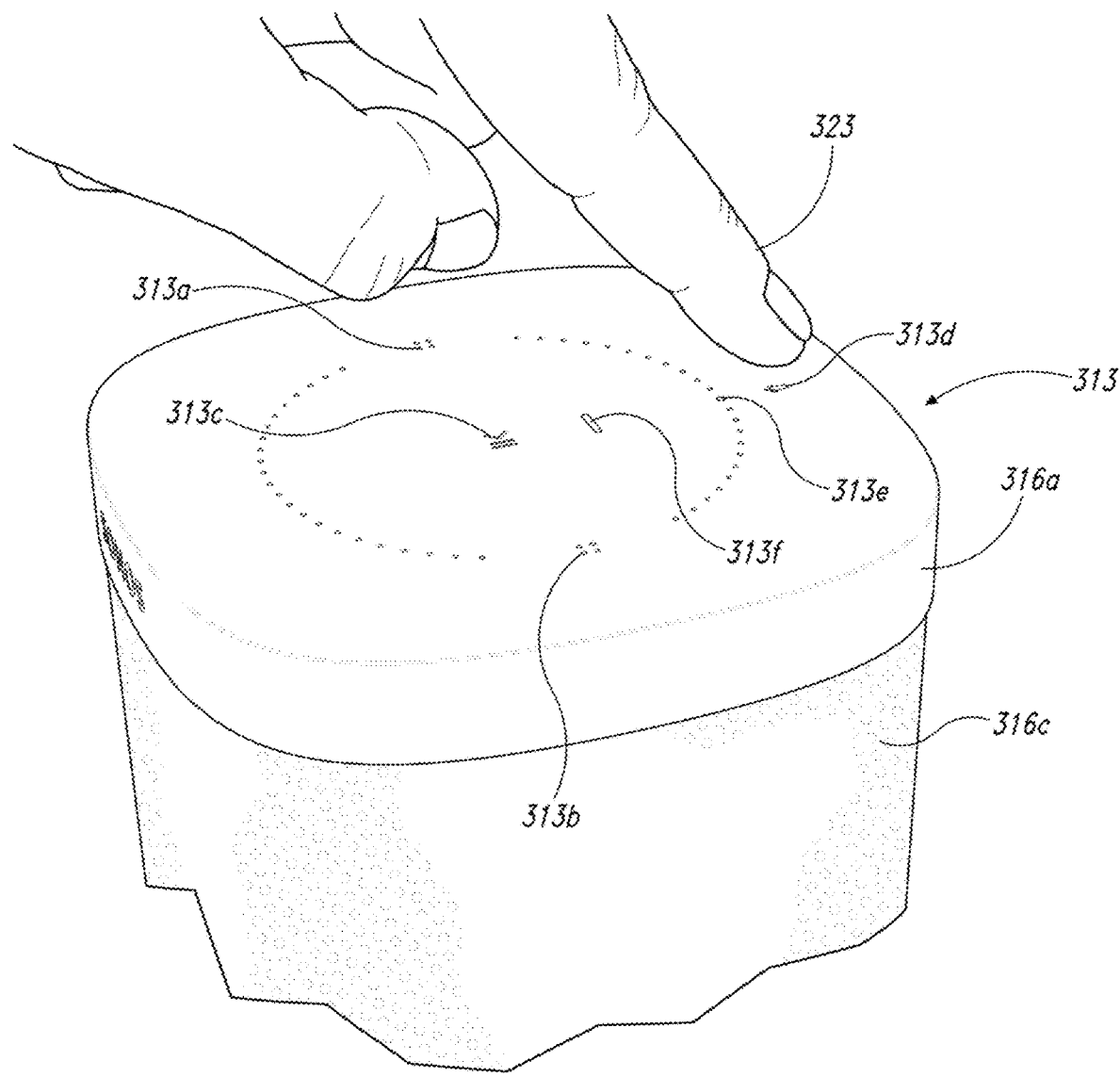
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 4A:
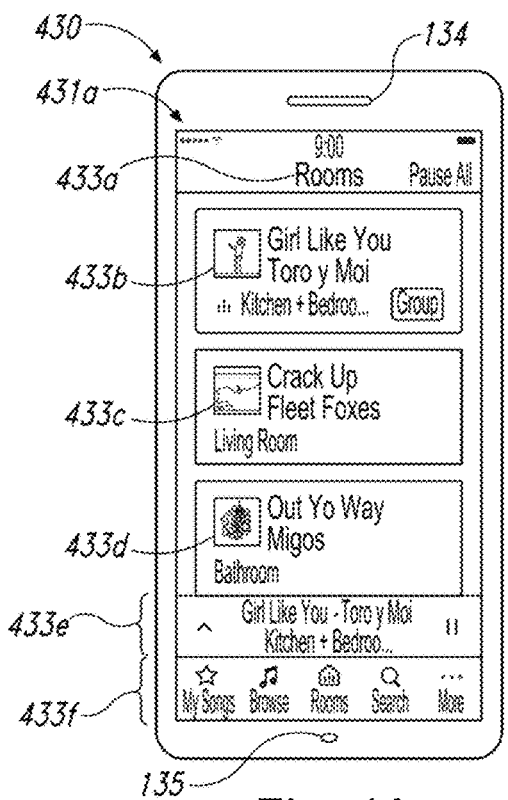
FIGS. 4A, 4B, 4C, and 4D are schematic diagrams of a control device in various stages of operation in accordance with aspects of the disclosed technology.
Figure 4B:
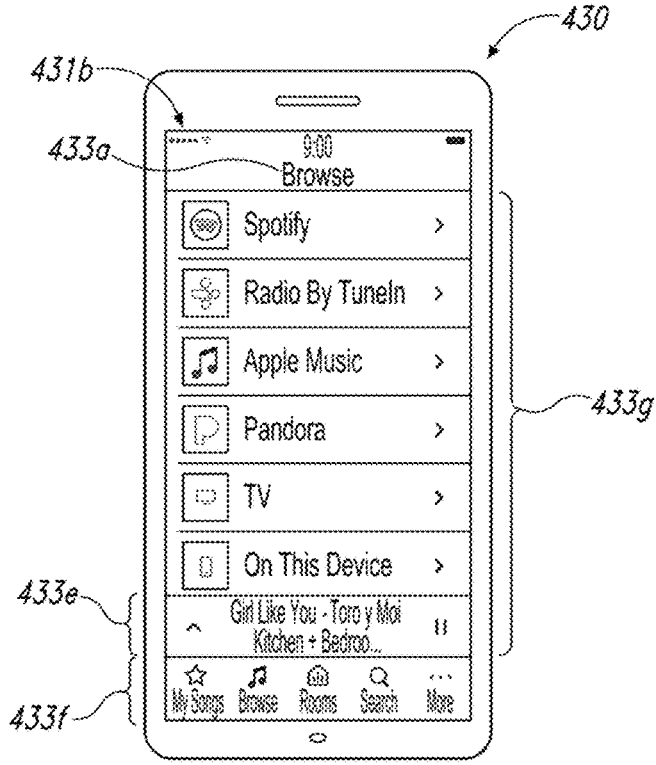
Figure 4C:
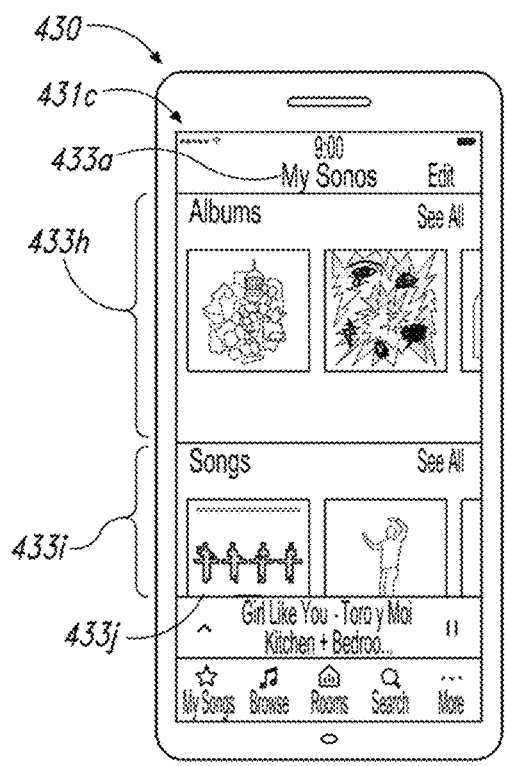
Figure 4D:
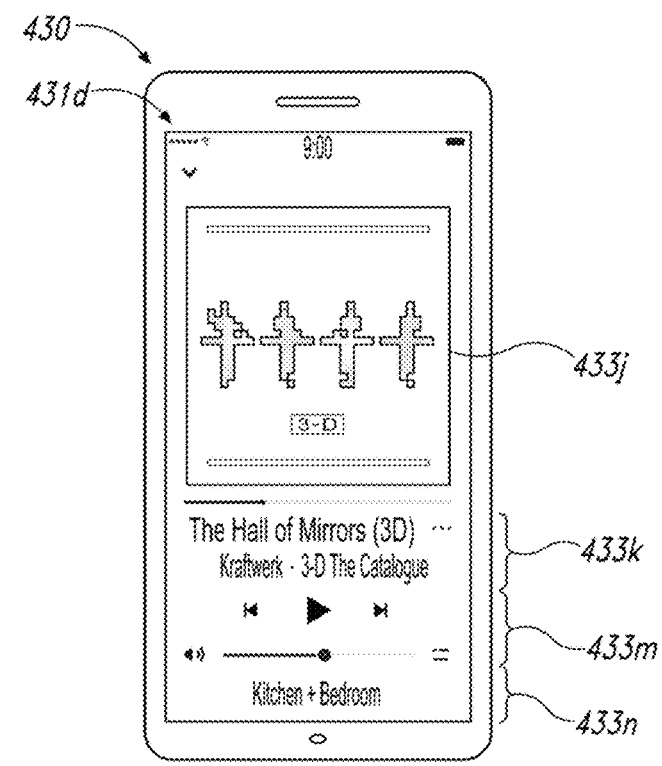

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
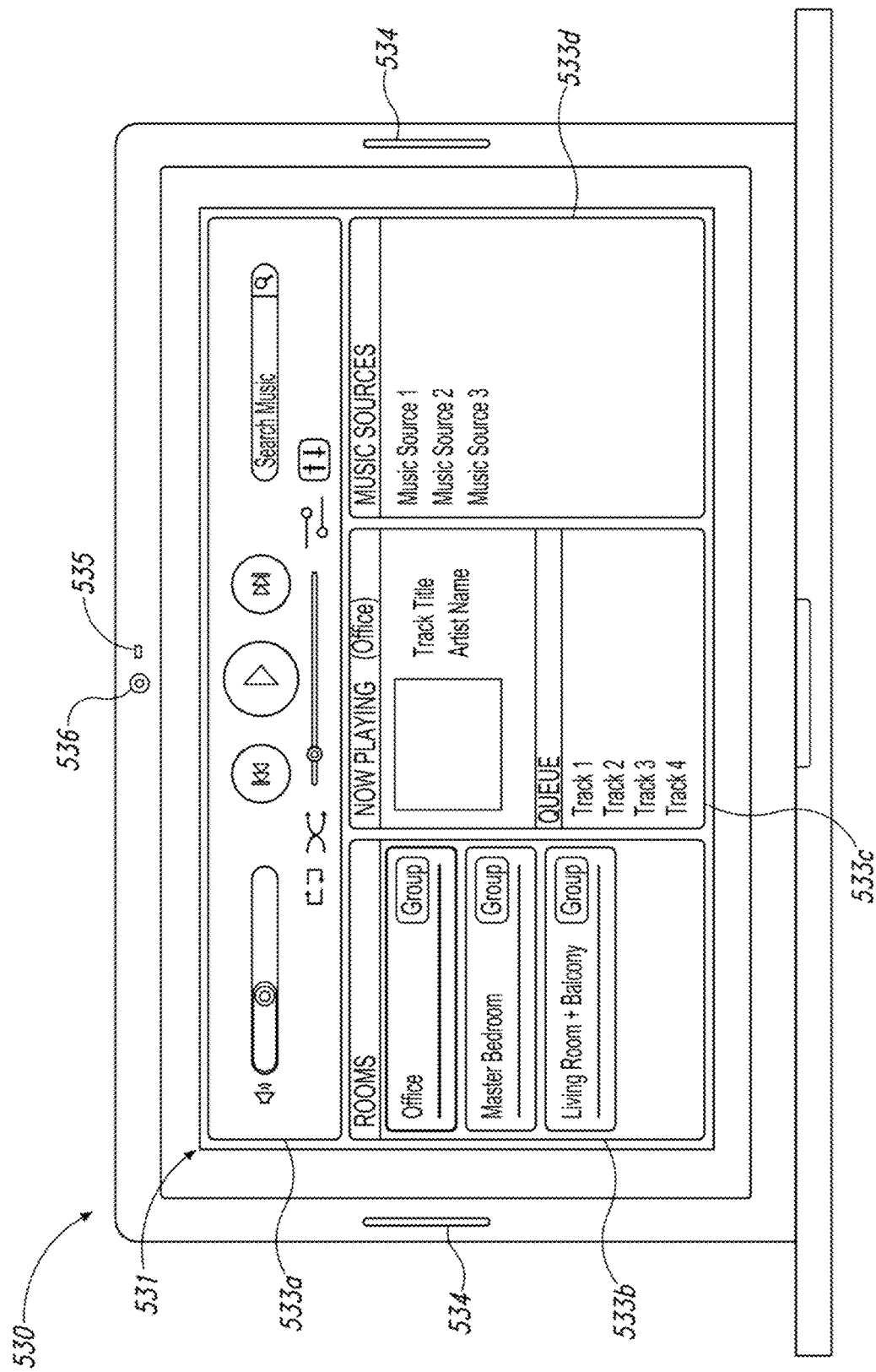
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region includes one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
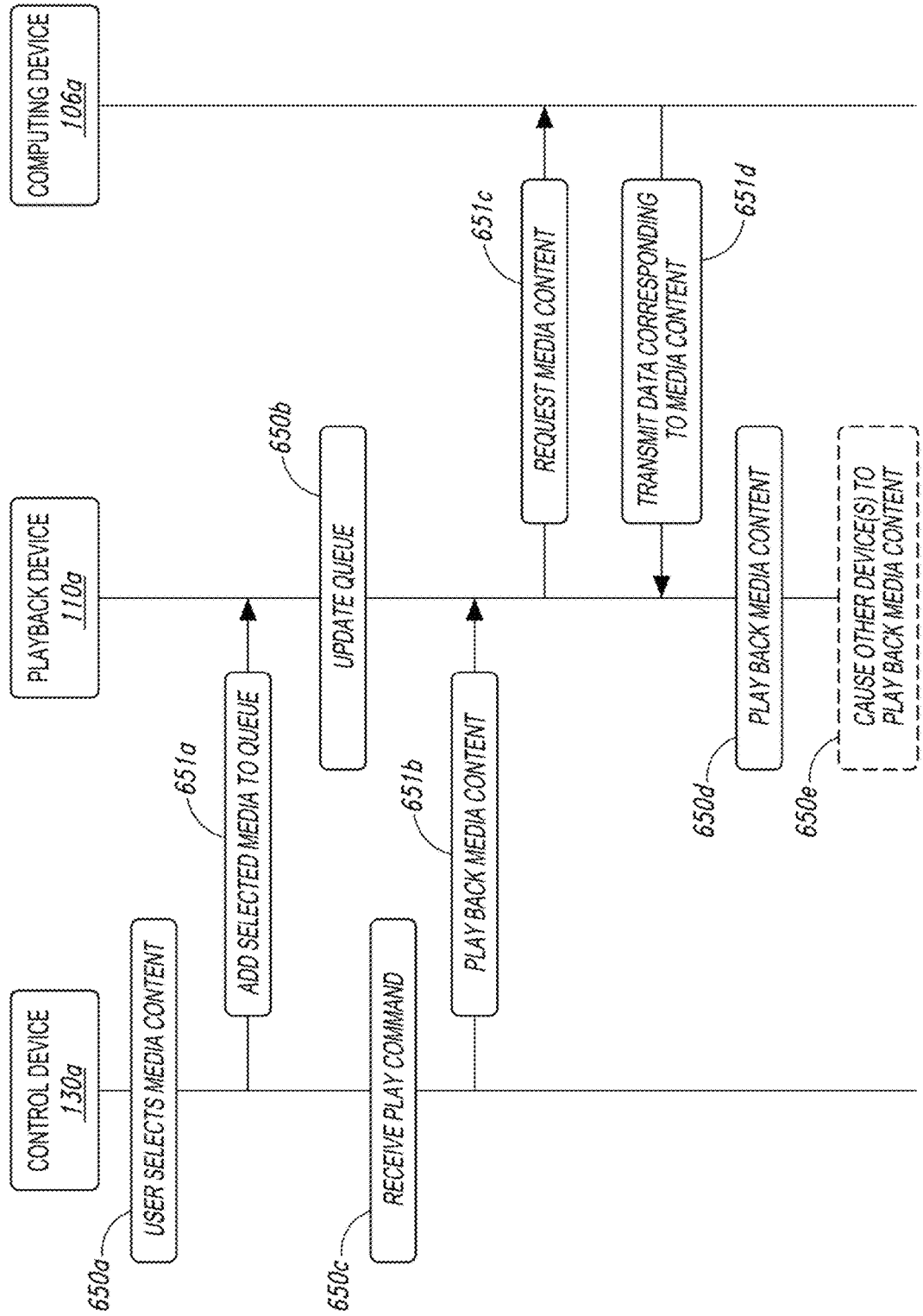
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Synchrony Grouping Techniques

Example synchrony techniques involve a group coordinator providing audio content and timing information to one or more group members to facilitate synchronous playback among the group coordinator and the group members. In some embodiments, at least some aspects of the technical solutions derive from the technical structure and organization of the audio information, playback timing, and clock timing information that the playback devices use to play audio content from audio sources in synchrony with each other, including how different playback devices generate playback timing based on clock timing (local clock timing or remote clock timing) and play audio content based on playback timing (generated locally or remotely) and clock timing (generated locally or remotely). Therefore, to aid in understanding certain aspects of the disclosed technical solutions, certain technical details of the audio information, playback timing, and clock timing information, as well as how playback devices generate and/or use playback timing and clock timing for playing audio content in different configurations, are described below.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices is sometimes referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

In some embodiments, the "sourcing" playback device receives audio content from an audio source in digital form, e.g., as a stream of packets. In some embodiments, individual packets in the stream of packets have a sequence number or other identifier that specifies an ordering of the packets. Packets transmitted over a data packet network (e.g., Ethernet, WiFi, or other packet networks) may arrive out of order, so the sourcing playback device uses the sequence number or other identifier to reassemble the stream of packets in the correct order before performing further packet processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

In some embodiments, the sourcing playback device does not change the sequence number or identifier of the received packets during packet processing. In some embodiments, the sourcing playback device reorders at least a first set packets in a packet stream based on each packet's sequence identifier, extracts audio content from the received packets, reassembles a bitstream of audio content from the received packets, and then repacketizes the reassembled bitstream into a second set of packets, where packets in the second set of packets have sequence numbers that differ from the sequence numbers of the packets in the first set of packets. In some embodiments, individual packets in the second set of packets are a different length (i.e., shorter or longer) than individual packets in the first set of packets. In some embodiments, reassembling a bitstream from the incoming packets and then subsequently repacketizing the reassembled bitstream into a different set of packets facilitates uniform processing and/or transmission of audio content by the sourcing playback device and by other playback devices that receive the audio content from the sourcing playback device. However, for some delay-sensitive audio content, reassembly and repacketization may be undesirable, and therefore, in some embodiments, the sourcing playback device may not perform reassembly and repacketization for some (or all) audio content that it receives before playing the audio content and/or transmitting the audio content to other playback devices.

In some embodiments an audio source provides audio content in digital form to a sourcing playback device, e.g., via a digital line-in interface. In such embodiments, the sourcing playback device packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

In some embodiments an audio source provides audio content in analog form to a sourcing playback device, e.g., via an analog line-in interface. In such embodiments, the sourcing playback device converts the received analog audio into digital audio and packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

After obtaining audio content from an audio source or from another playback device, a playback device in some embodiments one or more of (i) plays the audio content individually, (ii) plays the content in synchrony with one or more additional playback devices, and/or (iii) transmits the audio content to one or more other playback devices.

b. Playback Timing

The playback devices disclosed and described herein use playback timing to play audio content in synchrony with each other. An individual playback device can generate playback timing and/or playback audio content according to playback timing, based on the playback device's configuration in the media playback network. The sourcing playback device that generates the playback timing for audio content also transmits that generated playback timing to all the playback devices that are configured to play the audio content. In some embodiments, the sourcing playback device transmits the playback timing to a multicast network address, and all the other playback devices configured to play the audio content receive the playback timing via that multicast address. In some embodiments, the sourcing playback device alternatively transmits the playback timing to each unicast network address of each other playback device configured to play the audio content, and each of the other playback devices configured to play the audio content receive the playback timing via its unicast address.

In operation, a playback device (or a computing device associated with the playback device) generates the playback timing for audio content based on clock timing (described below), which can be "local" clock timing (i.e., clock timing generated by the sourcing playback device) or "remote" clock timing received from a different playback device (or different computing device).

In some embodiments, the playback timing is generated for individual frames (or packets) of audio content. As described above, in some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play audio content within that individual frame (or packet). In operation, when the playback timing for an individual frame (or packet) is generated, the playback timing for that individual frame (or packet) is a future time relative to a current clock time of a reference clock at the time that the playback timing for that individual frame (or packet) is generated. The reference clock can be a "local" clock at the playback device or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content within an individual frame (or packet) at the playback time specified by the playback timing for that individual frame (or packet), as adjusted to accommodate for clocking differences between the sourcing playback device, the clock timing, and the playback device that is tasked with playing the audio content, as describe in more detail below.

c. Clock Timing

The playback devices disclosed and described herein use clock timing to generate playback timing for audio content and to play the audio content based on the generated playback timing. In some embodiments, the sourcing playback device uses clock timing from a reference clock (e.g., a device clock, a digital-to-audio converter clock, a playback time reference clock, or any other clock) to generate playback timing for audio content that the sourcing playback device receives from an audio source. For an individual playback device, the reference clock can be a "local" clock at the playback device or a "remote" clock at a separate network device, e.g., another playback device, a computing device, or another network device configured to provide clock timing for use by playback devices to generate playback timing and/or playback audio content.

In some embodiments, all of the playback devices tasked with playing particular audio content in synchrony use the same clock timing from the reference clock to play back that particular audio content. In some embodiments, playback devices use the same clock timing to play audio content that was used to generate the playback timing for the audio content.

In operation, the network device that generates the clock timing also transmits the clock timing to all the playback devices in the network that need to use the clock timing for generating playback timing and/or playing back audio content. In some embodiments, the network device that generates the clock timing transmits the clock timing to a multicast network address, and all the other playback devices configured to generate playback timing and/or play audio content receive the clock timing via that multicast address. In some embodiments, the network device alternatively transmits the clock timing to each unicast network address of each other playback device configured to play the audio content, and each of the other playback devices configured to play the audio content receive the clock timing via its unicast address.

d. Generating Playback Timing with Clock Timing from a Local Clock

In some embodiments, a sourcing playback device (i) generates playback timing for audio content based on clock timing from a local clock at the sourcing playback device, and (ii) transmits the generated playback timing to all other playback devices configured to play the audio content. In operation, when generating playback timing for an individual frame (or packet), the "sourcing" playback device adds a "timing advance" to the current clock time of the local clock of the sourcing playback device that the sourcing playback device is using for generating the playback timing.

In some embodiments, the "timing advance" is based on an amount of time that is greater than or equal to the sum of (i) the network transit time required for frames and/or packets comprising audio content transmitted from the sourcing playback device to arrive at all other playback devices that are configured to use the playback timing for playing the audio content in synchrony and (ii) the amount of time required for all the other playback devices configured to use that playback timing for synchronous playback to process received frames/packets from the sourcing playback device for playback.

In some embodiments, the sourcing playback device determines a timing advance by sending one or more test packets to one or more (or perhaps all) of the other playback devices configured to play the audio content that the sourcing device is transmitting, and then receiving test response packets back from those one or more of the other playback devices. In some embodiments, the sourcing playback device and the one or more other playback devices negotiate a timing advance via multiple test and response messages. In some embodiments with more than two additional playback devices, the sourcing playback device determines a timing advance by exchanging test and response messages with all of the playback devices, and then setting a timing advance that is sufficient for the playback device having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined. In other embodiments, the playback device that generates the playback timing can change the timing advance in response to a request from a receiving device indicating that a greater timing advance is required (e.g., because the receiving device is not receiving packets comprising portions of audio content until after other devices have already played the portions of audio content) or a shorter timing advance would be sufficient (e.g., because the receiving device is buffering more packets comprising portions of audio content than necessary to provide consistent, reliable playback).

As described in more detail below, all the playback devices configured to play the audio content in synchrony will use the playback timing and the clock timing to play the audio content in synchrony with each other.

e. Playing Audio Content using Local Playback Timing and Local Clock Timing

In some embodiments, the sourcing playback device is configured to play audio content in synchrony with one or more other playback devices. And if the sourcing playback device is using clock timing from a local clock at the sourcing playback device to generate the playback timing, then the sourcing playback device will play the audio content using locally-generated playback timing and the locally-generated clock timing. In operation, the sourcing playback device plays an individual frame (or packet) comprising portions of the audio content when the local clock that the sourcing playback device used to generate the playback timing reaches the time specified in the playback timing for that individual frame (or packet).

For example, recall that when generating playback timing for an individual frame (or packet), the sourcing playback device adds a "timing advance" to the current clock time of the reference clock used for generating the playback timing. In this instance, the reference clock used for generating the playback timing is a local clock at the sourcing playback device. So, if the timing advance for an individual frame is, for example, 30 milliseconds, then the sourcing playback device plays the portion (e.g., a sample or set of samples) of audio content in an individual frame (or packet) 30 milliseconds after creating the playback timing for that individual frame (or packet).

In this manner, the sourcing playback device plays the audio content using locally-generated playback timing and clock timing from a local reference clock. As described further below, by playing the portion(s) of the audio content of an individual frame and/or packet when the clock time of the local reference clock reaches the playback timing for that individual frame or packet, the sourcing playback device plays that portion(s) of the audio content in that individual frame and/or packet in synchrony with other playback devices.

f. Playing Audio Content using Remote Playback Timing and Remote Clock Timing

Recall that, in some embodiments, the sourcing playback device transmits the audio content and the playback timing for the audio content to one or more other playback devices. And further recall that, in some embodiments, the network device providing the clock timing can be a different device than the sourcing playback device. Playback devices that receive the audio content, the playback timing, and the clock timing from another playback device are configured to playback the audio content using the playback timing from the sourcing playback device (i.e., remote playback timing) and clock timing from a clock at another playback device (i.e., remote clock timing). In this manner, the receiving playback device in this instance plays audio content using remote playback timing and remote clock timing.

To play an individual frame (or packet) of the audio content in synchrony with every other playback device tasked with playing the audio content, the receiving playback device (i) receives the frames (or packets) comprising the portions of the audio content from the sourcing playback device, (ii) receives the playback timing for the audio content from the sourcing playback device (e.g., in the frame and/or packet headers of the frames and/or packets comprising the portions of the audio content or perhaps separately from the frames and/or packets comprising the portions of the audio content), (iii) receives the clock timing from another network device, e.g., another playback device, a computing device, or another network device configured to provide clock timing for use by playback devices to generate playback timing and/or playback audio content, and (iv) plays the portion(s) of the audio content in the individual frame (or packet) when the local clock that the receiving playback device uses for audio content playback reaches the playback time specified in the playback timing for that individual frame (or packet) received from the sourcing playback device, as adjusted by a "timing offset."

In operation, after the receiving playback device receives clock timing from the other network device, the receiving device determines a "timing offset" for the receiving playback device. This "timing offset" comprises (or at least corresponds to) a difference between the "reference" clock at the network device that the network device used to generate the clock timing and a "local" clock at the receiving playback device that the receiving playback device uses to play the audio content. In operation, each playback device that receives the clock timing from another network device calculates its own "timing offset" based on the difference between its local clock and the clock timing, and thus, the "timing offset" that each playback determines is specific to that particular playback device.

In some embodiments, when playing back the audio content, the receiving playback device generates new playback timing (specific to the receiving playback device) for individual frames (or packets) of audio content by adding the previously determined "timing offset" to the playback timing for each frame (or packet) received from the sourcing playback device. With this approach, the receiving playback device converts the playback timing for the audio content received from the sourcing playback device into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the sourcing playback generated the playback timing for those frames (or packets) relative to the clock timing and plays the same frames (or packets) comprising portions of the audio content according to the playback timing and its determined "timing offset," the receiving playback device and the sourcing playback device play the same frames (or packets) comprising the same portions of the audio content in synchrony, i.e., at the same time or at substantially the same time.

Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

V. Example Portable Playback Devices

Figure 7A:
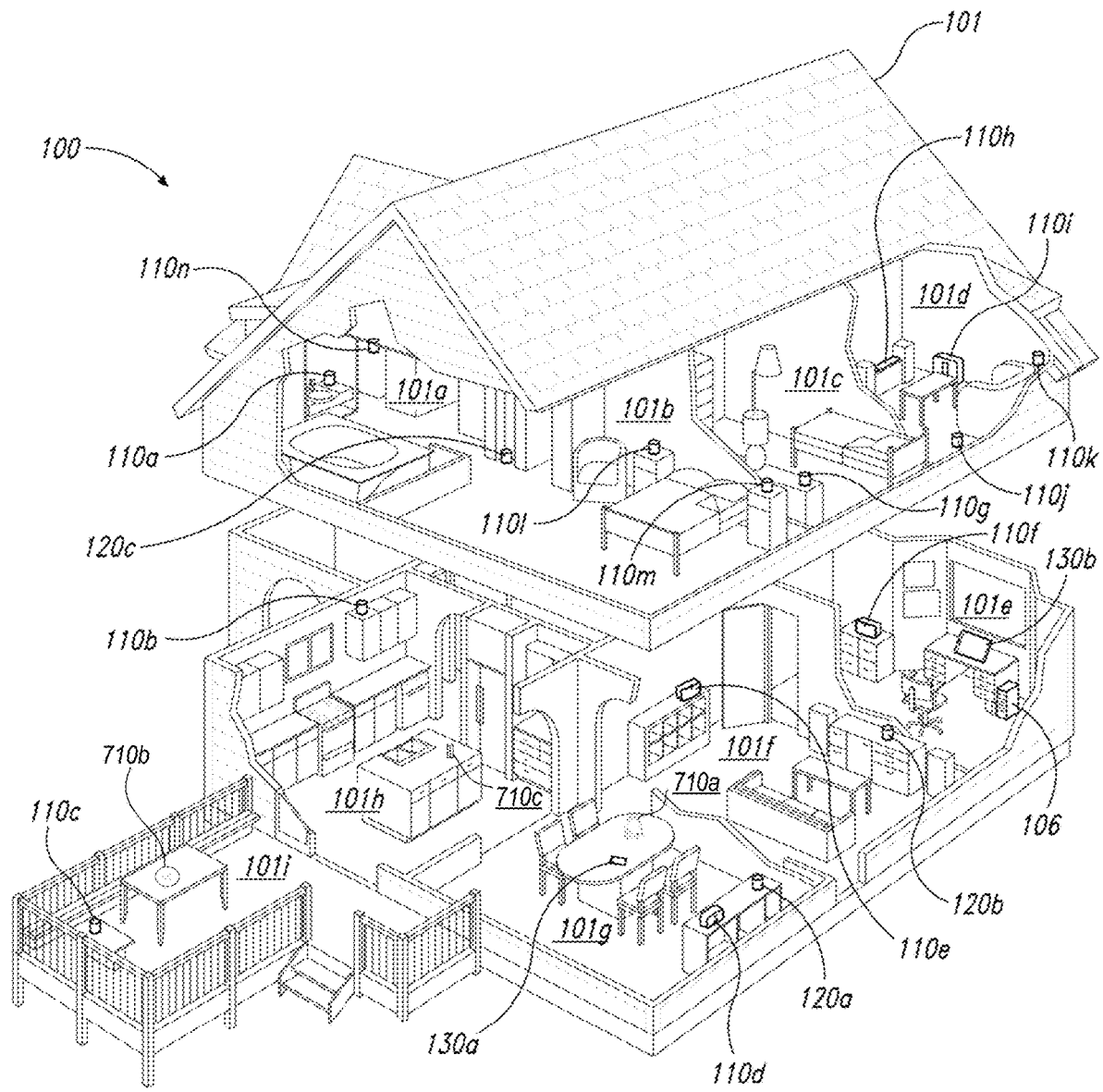
FIG. 7A is a partial cutaway view of an environment having a media playback system configured in accordance with aspects of the disclosed technology.

As noted above, certain playback device implementations may be configured for portable use. These portable implementations include wearable playback devices, such as headphones and earbuds, generally designed for personal listening by one user at a time, and portable devices designed for out loud playback. FIG. 7A is a partial cutaway view of the media playback system 100 with the inclusion of one or more portable playback devices 710 (identified individually as portable playback devices 710a, 710b, and 710c). The portable playback devices 710 are similar to the playback devices 110, but are configured for portable use. While they are shown in the home in FIG. 7A, the portable playback devices 710 are configured to play back audio content while in the home and while "on the go."

Figure 7B:
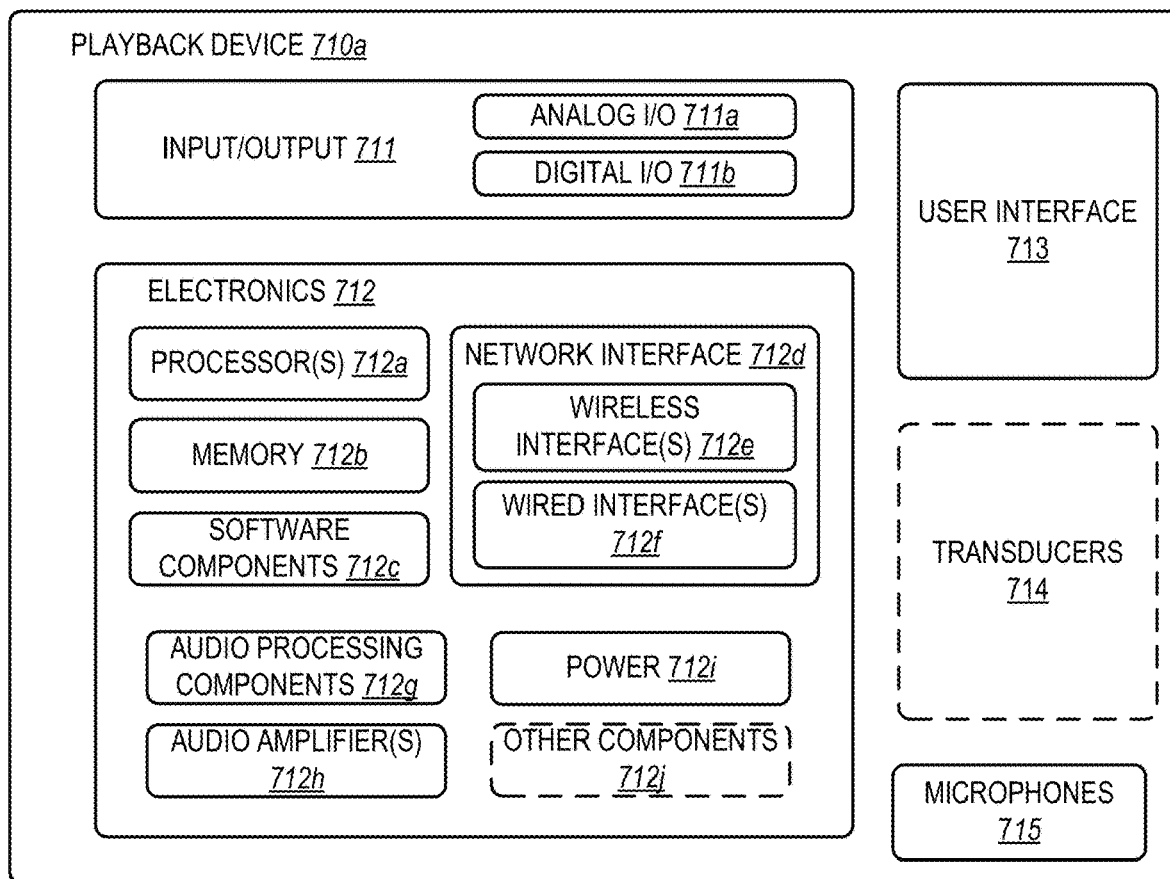
FIG. 7B is a block diagram of a portable playback device configured in accordance with aspects of the disclosed technology.

As shown in the block diagram of FIG. 7B, a portable playback device 710a includes the same or similar components as the playback device 110a. However, to facilitate portable use, the playback device 710a may be implemented in a certain form factor (e.g., headphones or earbuds) and includes one or more batteries in power 712i to provide portable power.

Referring to FIG. 7B, the portable playback device 710a includes an input/output 711, which can include an analog I/O 711a and/or a digital I/O 711b similar to the components of the playback device 110. To facilitate portable usage, the input/output 711 of the portable playback device 710a may include an interface (such as a Bluetooth interface) to facilitate connection to a bridge device (e.g., a mobile device), which the portable playback device 710a may use to stream audio content and otherwise communicate with the bridge device.

The playback device 710a further includes electronics 712, a user interface 713 (e.g., one or more buttons, knobs, dials, touch-sensitive surfaces, displays, touchscreens), and one or more transducers 714 (referred to hereinafter as "the transducers 714"). The electronics 712 is configured to receive audio from an audio source via the input/output 711, one or more of the computing devices 106a-c via the network 104 (FIG. 1B), amplify the received audio, and output the amplified audio for playback via one or more of the transducers 714.

In some embodiments, the playback device 710a optionally includes one or more microphones 715 (e.g., a single microphone, a plurality of microphones, a microphone array) (hereinafter referred to as "the microphones 715"). In some examples, the microphones 715 may include one or more voice microphones to facilitate voice input for telephone calls and the like. In certain embodiments, for example, playback device 710a can operate as an NMD (similar to the NMD 120 of FIG. 1F) configured to receive voice input from a user using the voice microphones and correspondingly perform one or more operations based on the received voice input. In further examples, the microphones 715 may include one or more acoustic noise cancelling (ANC) microphones which, in operation, capture ambient noise in the environment to facilitate cancelling of this ambient noise by the playback device 710a.

In the illustrated embodiment of FIG. 7B, the electronics 712 include one or more processors 712a (referred to hereinafter as "the processors 112a"), memory 712b, software components 712c, a network interface 712d, one or more audio processing components 712g (referred to hereinafter as "the audio components 712g"), one or more audio amplifiers 712h (referred to hereinafter as "the amplifiers 712h"), and power 712i (e.g., one or more power supplies, power cables, power receptacles, batteries, induction coils, Power-over Ethernet (POE) interfaces, and/or other suitable sources of electric power). In some embodiments, the electronics 712 optionally include one or more other components 712j (e.g., one or more sensors, video displays, touchscreens).

The network interface 712d is configured to facilitate a transmission of data between the playback device 710a and one or more other devices on a data network such as, for example, the links 103 and/or the network 104 (FIG. 1B). The network interface 712d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 712d can parse the digital packet data such that the electronics 712 properly receives and processes the data destined for the playback device 110a.

In the illustrated embodiment of FIG. 7B, the network interface 712d includes one or more wireless interfaces 712e (referred to hereinafter as "the wireless interface 712e"). The wireless interface 712e (e.g., a suitable interface comprising one or more antennae) can be configured to wirelessly communicate with one or more other devices (e.g., one or more of the playback devices 110, NMDs 120, control devices 130, other portable playback devices 710, as well as other devices disclosed herein, such as bridge devices) that are communicatively coupled to the network 104 (FIG. 1B) in accordance with a suitable wireless communication protocol (e.g., WiFi, Bluetooth, LTE). In some embodiments, the network interface 712d optionally includes a wired interface 712f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some embodiments, the electronics 712 excludes the network interface 712d altogether and transmits and receives media content and/or other data via another communication path (e.g., the input/output 711).

The audio components 712g are configured to process and/or filter data comprising media content received by the electronics 712 (e.g., via the input/output 711 and/or the network interface 712d) to produce output audio signals. In some embodiments, the audio processing components 712g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 712g can comprise one or more subcomponents of the processors 712a. In some embodiments, the electronics 712 omits the audio processing components 712g. In some aspects, for example, the processors 712a execute instructions stored on the memory 712b to perform audio processing operations to produce the output audio signals.

The amplifiers 712h are configured to receive and amplify the audio output signals produced by the audio processing components 712g and/or the processors 712a. The amplifiers 7712h can comprise electronic devices and/or components configured to amplify audio signals to levels sufficient for driving one or more of the transducers 714. In some embodiments, for example, the amplifiers 712h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 712h comprise a suitable combination of two or more of the foregoing types of power amplifiers. Moreover, in some embodiments, individual ones of the amplifiers 712h correspond to individual ones of the transducers 714. In other embodiments, however, the electronics 712 includes a single one of the amplifiers 712h configured to output amplified audio signals to a plurality of the transducers 714.

The transducers 714 (e.g., one or more speakers and/or speaker drivers) receive the amplified audio signals from the amplifier 712h and render or output the amplified audio signals as sound (e.g., audible sound waves having a frequency between about 20 Hertz (Hz) and 20 kilohertz (kHz)). In some embodiments, the transducers 714 can comprise a single transducer. In other embodiments, however, the transducers 714 comprise a plurality of audio transducers. In some embodiments, the transducers 714 comprise more than one type of transducer. For example, the transducers 714 can include one or more low frequency transducers (e.g., subwoofers, woofers), mid-range frequency transducers (e.g., mid-range transducers, mid-woofers), and one or more high frequency transducers (e.g., one or more tweeters).

Figure 7C:
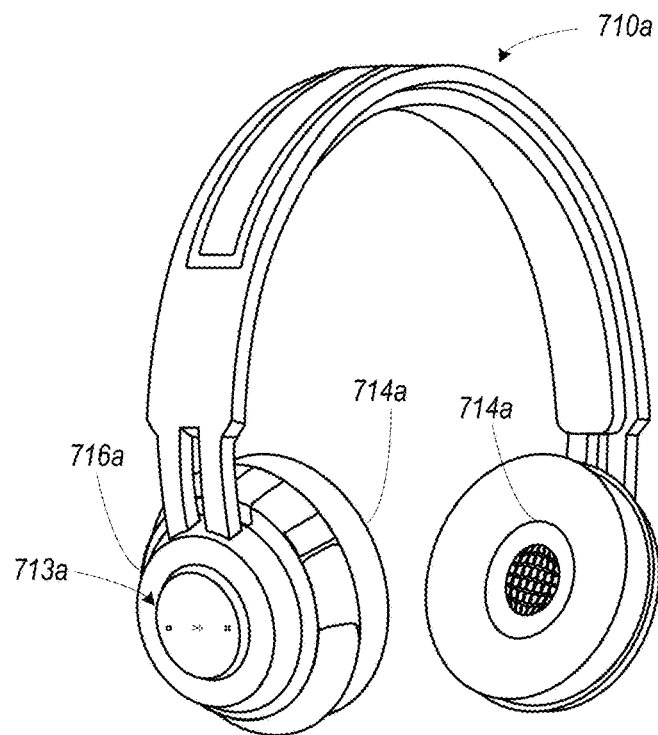
FIG. 7C is a front isometric view of a portable playback device implemented as headphones configured in accordance with aspects of the disclosed technology.

FIG. 7C is a front isometric view of the portable playback device 710a configured in accordance with aspects of the disclosed technology. As shown in FIG. 7C, the portable playback device 710a is implemented as headphones to facilitate more private playback as compared with the out loud playback of the playback device(s) 110. As shown, the portable playback device 710a (also referred to as headphones 710a) includes a housing 716a to support a pair of transducers 714a on or around user's head over the user's ears.

The headphones 710a also include a user interface 713a with a touch-sensitive region to facilitate playback controls such as transport and/or volume controls. The touch-sensitive region of the user interface 713a may support gesture controls. For instance, a swipe forward or backward across the touch-sensitive region may skip forward or backwards, respectively. Other gestures include a touch-and-hold, as well as a touch-and-continued hold, which may correspond to various swapping and grouping functions, as described in further detail below. In some implementations, the user interface 713a may include respective touch-sensitive regions on the exterior of each earcup.

Figure 7D:
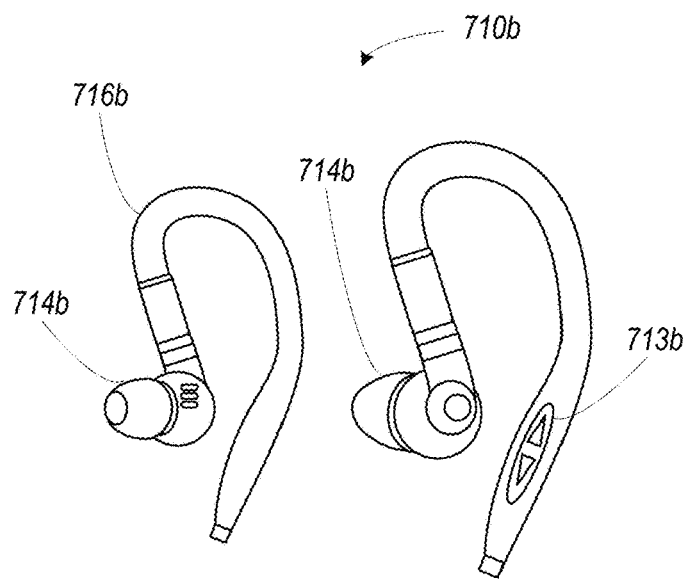
FIG. 7D is a front isometric view of a portable playback device implemented as earbuds configured in accordance with aspects of the disclosed technology.

FIG. 7D is a front isometric view of the portable playback device 710b configured in accordance with aspects of the disclosed technology. As shown in FIG. 7D, the portable playback device 710b is implemented as earbuds to facilitate more private playback as compared with the out loud playback of the playback device(s) 110, similar to the headphones 710a. As shown, the portable playback device 710b (also referred to as earbuds 710b) includes a housing 716b to support a pair of transducers 714b within a user's ears. The earbuds 710b also include a user interface 713b with a touch-sensitive region to facilitate playback controls such as transport and/or volume controls. The earbuds 9710b can be in the form of wired, wireless, or true wireless earbuds.

Figure 7E:
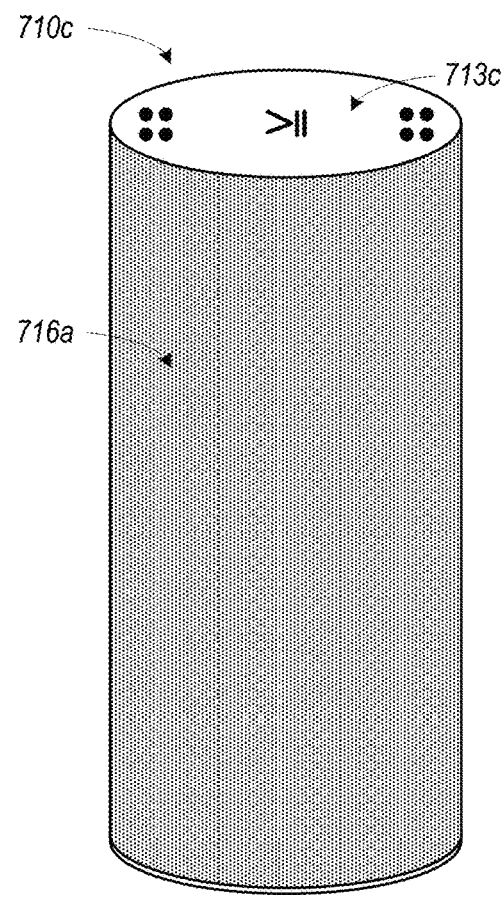
FIG. 7E is a front isometric view of a portable playback device configured in accordance with aspects of the disclosed technology.

FIG. 7E is a front isometric view of the portable playback device 710c. As compared with the headphones 710a and the earbuds 710b, the portable playback device 710c includes one or more larger transducers to facilitate out loud audio content playback. A speaker grill 716a covers the transducers. Relative to the playback device(s) 110, the portable playback device 710c may include less powerful amplifier(s) and/or smaller transducer(s) to balance battery life, sound output capability, and form factor (i.e., size, shape, and weight) of the portable playback device 710c. The portable playback device 710c includes a user interface 713c with a touch-sensitive region to facilitate playback controls such as transport and/or volume controls.

Figure 7F:
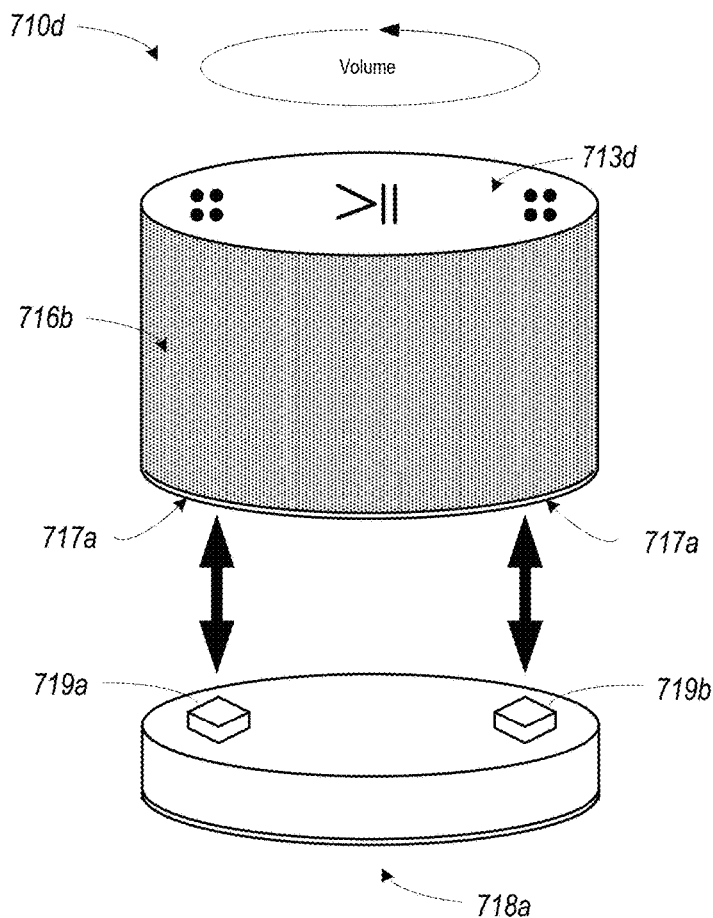
FIG. 7F is a front isometric view of a portable playback device with a device base configured in accordance with aspects of the disclosed technology.

Some portable playback devices 710 are configured to be placed upon a device base 718. To illustrate, FIG. 7F is a front isometric view of the portable playback device 710d, which is configured to be placed upon a device base 718a. Like the portable playback device 710c, as compared with the headphones 710a and the earbuds 710b, the portable playback device 710d includes one or more larger transducers to facilitate out loud audio content playback. A speaker grill 716b covers the transducers. The portable playback device 710c includes a user interface 713d with a touch-sensitive region to facilitate playback controls such as transport and/or volume controls.

The device base 718a includes protrusions 719a and 719b, which align with recesses 717a and 717b on the portable playback device 710c. Such protrusions and recesses may facilitate placing the portable playback device 710c on the device base 718a and may improve stability of the playback device while it is positioned on the device base 718a.

In example implementations, the portable playback device 710c is rotatable about the device base 718a to control volume of the portable playback device 710c. For instance, the portable playback device 710c may rotate with respect to the device base 718a, which may generate a volume control signal in a sensor of the portable playback device 710c and/or device base 718a. In another example, a first portion of the device base 718a is rotatable with respect to a second portion of the device base 718a. Rotation of these two portions generates a volume control signal in a sensor of the device base 718a that controls volume of the portable playback device 710c when the portable playback device 710c is placed upon the device base 718a.

The device base 718a includes a device charging system. When the playback device 710c is placed on device base 718a, the playback device 710c may draw current from the charging system to charge one or more of its batteries. In some examples, the charging system of the device base 718a includes an inductive charging circuit (e.g., a coil that induces a current in a corresponding coil in the playback device 710c that wirelessly charges one or more batteries of the playback device 710c). Alternatively, the charging system of the device base 718a includes conductive terminals by which the playback device 710c may draw current from the device base 718.

Within examples, the device base 718a carries an identifier that distinguishes that device base 718a from at least some other device bases (e.g., other device bases of the media playback system 100, or perhaps other devices bases more broadly). In some implementations, the device base 718a may passively communicate this identifier to the playback device 710c when it is placed upon the device base 718a. For instance, a charging circuit of the device base 718 may include a current or voltage signature (i.e., a pattern) that is unique as compared to other device bases. The playback device 710c may use this unique signature to identify the device base 718. Alternatively, a charging circuit may superimpose a signal onto the current delivered from the device base 718a (e.g., current from the device base 718a may include a higher frequency signal carrying the identifier of the device base 718a). In further examples, the device base 718a includes an RFID tag, QR code, or other identifying component that is read by the playback device 710c when the playback device 710c is placed upon the device base 718a.

In some implementations, the device base(s) 718 of the media playback system 100 are associated with respective zones. Placing a portable playback device 710 on a device base causes the device base to join the associated zone. Additional details regarding device bases can be found, for example, in U.S. Pat. No. 9,544,701 entitled, "Base Properties in a Media Playback System," which is incorporated herein by reference in its entirety.

In some implementations, the device base 718a includes a control system. Example control systems of the device base 718a include one or more processors and memory. The processor(s) may be clock-driven computing components that process input data according to instructions stored in the memory. Example operations include communicating via a communications interface (e.g., a BLUETOOTH® interface) with playback device 710c (e.g., to cause the playback device 710c to join an associated zone via one or more instructions) and causing the charging system to supply current to playback device 710c, among other examples.

Within example implementations, the playback device 710 may operate in one of a first mode and a second mode. Generally, the playback device 710 operates in the first mode while in the physical proximity of the media playback system 100 (e.g., while in the home and connected to the network 104) to facilitate interoperability with the playback devices 110a-n of the media playback system 100 and operates in the second mode while "on the go," but the playback device 710 may also be operable in the second mode while in the physical proximity of the media playback system 100. The portable playback device 710 may switch between modes manually (e.g., via user input to a user interface 713) or automatically (e.g., based on proximity to one or more playback devices 110a-n, connection to the network 104, and/or based on the location of the mobile device).

The playback device 710 may operate in the first mode while connected to a wireless local area network (e.g., the network 104). Through the connection to the wireless local area network, the playback device 710 may stream audio content from one or more audio sources, including local and remote (e.g., cloud) network locations. Further, in the first mode, the portable playback device 710 may interface with other devices of the media playback system 100. For instance, the portable playback device 710 may form synchrony groupings or other arrangements with the playback devices 110a-n and/or other portable playback devices 710 in the first mode. Further, in the first mode, the portable playback device 710 may be controlled by the control device(s) 130 in the same or similar manner as the playback device(s) 110.

The playback device 710 may operate in a second mode when connected via BLUETOOTH (802.15) to a mobile device. In some aspects, in the second mode, the portable device operates similarly to conventional BLUETOOTH speakers or wearable devices. That is, the playback device 710 may pair with a mobile device, such as a smartphone or tablet, and the user may play back the audio output of the mobile device. Similarly, the microphones 715a of the portable playback device 710 may provide audio input to the mobile device. As noted above, this mode can be utilized "on the go" to facilitate playback away from the media playback system 100, for example, outside the range of a home network. Further, this mode can be used in proximity to the media playback system 100, which may facilitate more private use of the portable playback device 710a or provide convenient access to content on the mobile device for playback.

Figure 7G:
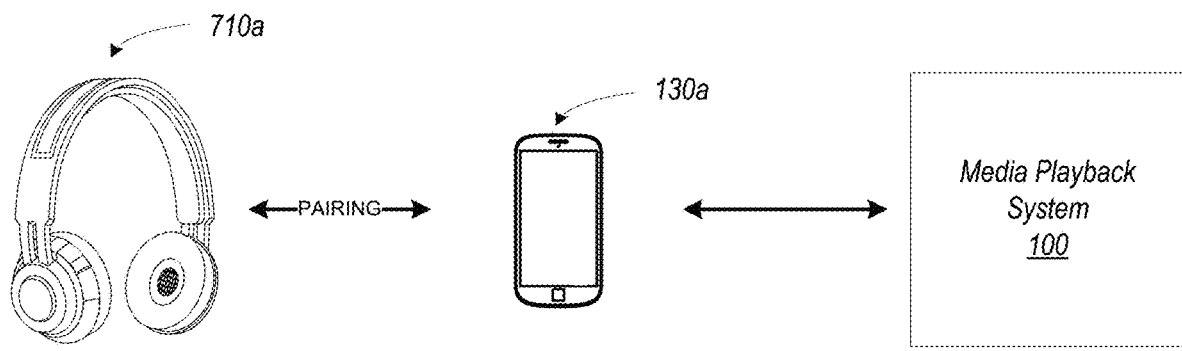
FIG. 7G is a schematic diagram illustrating an example pairing configuration between a portable playback device and a control device.

FIG. 7G illustrates an example pairing arrangement between the headphones 710a and a mobile device configured as a control device 130a. As noted above, a mobile device may become a control device 130 via the installation of control application software, which may further provide bridging features to facilitate the control device 130a operating as an interface between the headphones 710a and the media playback system 100.

The control device 130a may include communications interface(s), processing capabilities, and/or other features that are not necessarily implemented in the portable playback device 710a. By "pairing" the portable playback device 710a to the control device 130a, the portable playback device 710 is able to utilize some of these features. This arrangement may permit the portable playback device 710a to be smaller and more portable, to draw less power, and/or to be less expensive, among other possible benefits.

For instance, in various implementations, the portable playback device 710a may be implemented with or without a communications interface to connect to the Internet while "on the go" (e.g., a cellular data connection). By pairing the portable playback device 710a to the control device 130a via a personal area connection such as Bluetooth® (IEEE 802.15) or a wireless local area network connection (IEEE 802.11), the portable playback device 710a may stream music via an Internet connection of the control device 130a and the pairing connection. In embodiments that include a wireless local area network interface, the portable playback device 710a may connect directly to a wireless local area network (e.g., the network 104 (FIG. 1B)) if available.

Similarly, in various implementations, the portable playback device 710a may be implemented with or without a wireless local area network interface. By pairing the portable playback device 710 to the control device 130a via a personal area connection such as Bluetooth® (IEEE 802.15), the portable playback device 710a may stream music via an Internet connection of the control device 130a and the pairing connection. In this example, the Internet connection of the bridge device 860 may be a wireless local area network having a gateway to the Internet or via a cellular data connection.

In an example implementation, the control device 130a is bonded or defaults to a particular playback device (e.g., playback device 110c), bonded zone of playback device (e.g., playback devices 110l and 110m) or group of playback devices e.g., a "Kitchen+Dining Room" Group). Alternatively, if the home graph hierarchy is utilized, the control device 130a may be bonded to or defaults to joining a particular Set, Room, or Area. Then, in this configuration, control of the bonded playback device(s) 110 via a NMD 120 or a control device 130 also controls the paired portable playback device 710a.

Alternatively, the control device 130a may itself form a zone or Set. For instance, in one example, control device 130a may be configured as a "Anne's Portable" zone or an "Anne's Headphones" Set. Configuring the control device 130a as a zone or Set facilitates control of the paired headphones 710a with the NMD(s) 120 and/or the control device(s) 130 of the media playback system 100.

In an alternative implementation, the portable playback device 710a may independently interface with the media playback system 100 as its own zone or Set. Such an implementation of the portable playback device 710a may include a cellular data connection to facilitate portable streaming (i.e., streaming away from the media playback system 100 and/or the network 104). In this example, the portable playback device 710a may join the media playback system 100 as a zone or Set when connected to the network 104 or otherwise in proximity to the playback device(s) 110.

VI. Example Swap Techniques

As noted above, example techniques described herein relate to transitions (or "swaps") of a playback session between a portable playback device 710 and one or more playback device(s) 110. During a playback session swap, playback of audio content stops at a "source" playback device and starts at a "target" playback device at the same or substantially the same offset within the audio content. For instance, the media playback system 100 may swap the playback session between a "source" portable playback device 710 and the one or more "target" playback device(s) 110. In further examples, the media playback system 100 may swap the playback session between one or more "source" playback device(s) 110 and a "target" portable playback device 710.

To illustrate, a user may begin listening to audio content via the headphones 710a or earbuds 710b while "on the go" and then swap playback of the audio content to one or more playback devices 110a-n to continue listening to the audio content out loud at home. In another example, a user may begin listening to audio content via the headphones 710a or earbuds 710b at home (perhaps so as not to disturb another person in the home) and then swap to one or more playback devices 110a-n to continue listening to the audio content out loud. In a third example, a user may begin listening to audio content out loud via the portable playback device 710c and then swap to one or more one or more playback devices 110a-n, as the target playback device(s) may have greater sound output capabilities (e.g., due to more powerful amplifier(s) and/or larger transducer(s)), be located in a different room, be configured in a synchrony group, or for any other reason.

Similarly, a user may be listening to audio content via one or more playback devices 110a-n and the swap playback of the audio content to the portable playback device 710. For example, a user may be listening to television audio in the den 101d (including playback devices 110h, 110i, 110j, and 110k) and then swap playback to earbuds 710b for more personal listening. As another example, a user may be listening to an Internet radio station in the kitchen 101h (including playback device 110b) and then swap playback to headphones 710a to continue listening on the go. As a third example, a user may be listening to music in the bedroom 101c (including playback device 110g) and swap playback to portable playback device 710c to take the music out to the yard.

A playback device that has an on-going playback session may maintain or have access to playback session data that defines and/or identifies the playback session. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. In example implementations, the offset may be set to a playback position in the audio content of the current playback position to allow time for the target device to start buffering the audio content. Then, the source playback device stops playback of the audio content at the offset and the target playback device starts playback of the audio content at the offset.

The playback session data may further include data representing playback state. Playback state may include a playback state of the session (e.g., playing, paused, or stopped). If the playback session implements a playback queue, the playback session data may include the playback queue state, such as the current playback position within the queue.

The playback queue state may also include a queue version. For example, in a cloud queue embodiment, the cloud queue server and the media playback system 100 may use the queue version to maintain consistency. The queue version may be incremented each time the queue is modified and then shared between the media playback system 100 and cloud queue server to indicate the most recent version of the queue.

Further, the playback session data may also include authorization data, such as one or more keys and/or tokens. Such authorization data may include a token associated with the user account. During a playback session swap, the media playback system 100 may verify that the token is authorized on both the source and target playback devices. The authorization data may further include a token associated with the streaming audio service, which may enable the target playback device to access the audio content at the source. Yet further, the authorization data may include a token associate with the playback session, which enables the target playback device to access the session. Other example authorization data is contemplated as well In some implementations, an input to a playback device triggers a swap. This input may be referred to as a "playback session swap input." Within examples, a playback session swap input may be provided to a user interface on the playback device, such as the user interface 313 on the playback device 320 (FIG. 7D) or the user interface 713a of the headphones 710 (FIG. 7B). Alternatively, the playback session swap input may be provided to a user interface on a control device 130, such as the user interface 430 (FIGS.

4A-4D) when the user interface 430 is controlling a particular playback device or device(s) (e.g., a zone or zone group).

The playback device receiving a playback session swap input may be referred to as the "initiating playback device." Within examples, the initiating playback device is either the source or the target for the swap. When a portable playback device 710 has a playback session on-going (e.g., the portable playback device is actively playing back audio content, or has an active, but paused, playback session) and receives a playback session swap input, the portable playback device 710 may assume that the user wants to "push" the playback session to a nearby playback device 110. Accordingly, the portable playback device 710 is identified as the source of the swap and the nearby playback device 110 is identified as the target.

Figure 8A:
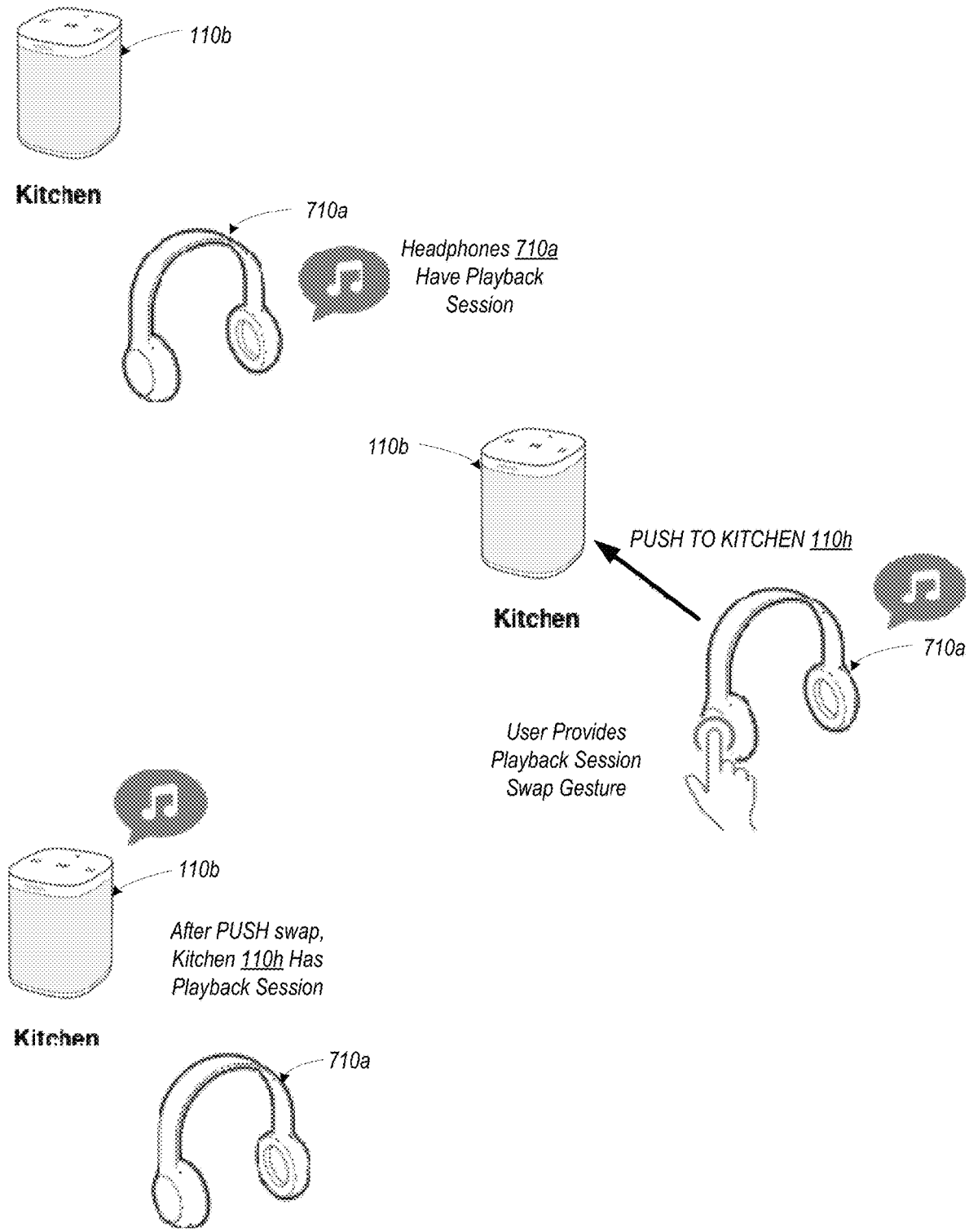
FIG. 8A is a schematic diagram illustrating an example push swap in accordance with aspects of the disclosed technology.

To illustrate, FIG. 8A is a schematic diagram illustrating an example push swap between the headphones 710a (FIG. 7C) and the playback device 110b in the Kitchen 110h zone (FIG. 7A). As shown in FIG. 8A, initially, the headphones 710a have a playback session on-going. Then, the user provides a playback session swap gesture to the headphones 710a. The playback session on the headphones 710a is pushed to the playback device 110b. After the push, the Kitchen 110h zone receives information about the playback session and continues playback of the playback session, which is on-going on the playback device 110b.

Figure 8B:
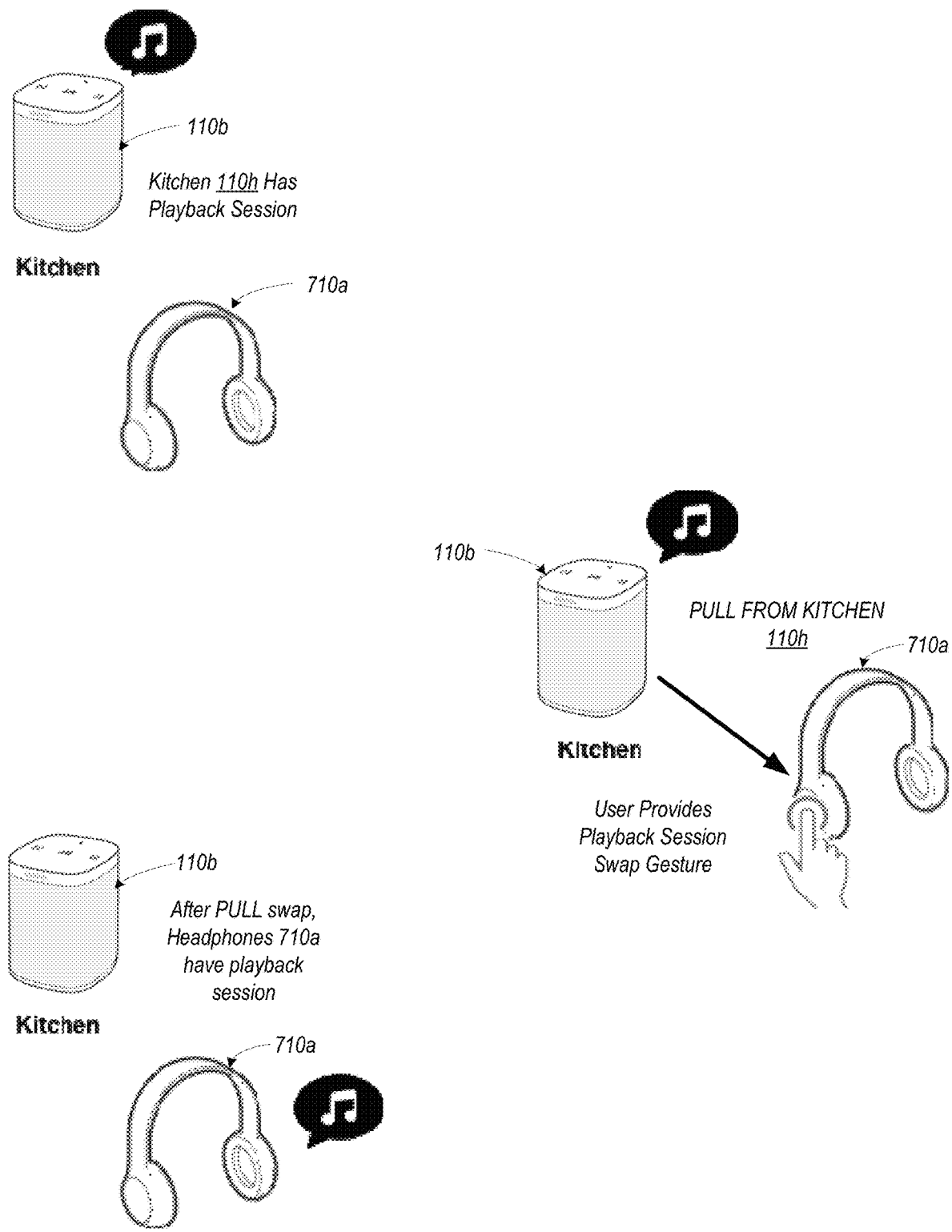
FIG. 8B is a schematic diagram illustrating an example pull swap in accordance with aspects of the disclosed technology.

Conversely, if the portable playback device 710 does not have a playback session on-going and receives a playback session swap input, the portable playback device 710 will assume that the user wants to "pull" a playback session from a nearby playback device 110. Here, the portable playback device 710 is identified as the target of the swap and the nearby playback device 110 is identified as the source. To illustrate, FIG. 8B is a schematic diagram illustrating an example pull swap between the headphones 710a (FIG. 7C) and the playback device 110b in the Kitchen 110h zone (FIG. 7A). As shown in FIG. 8B, initially, the playback device 110b has a playback session on-going. Then, the user provides a playback session swap gesture to the headphones 710a. The playback session on the playback device 110b is pushed to the headphones 710a. After the push, the headphones 710a have the playback session.

Figure 8C:
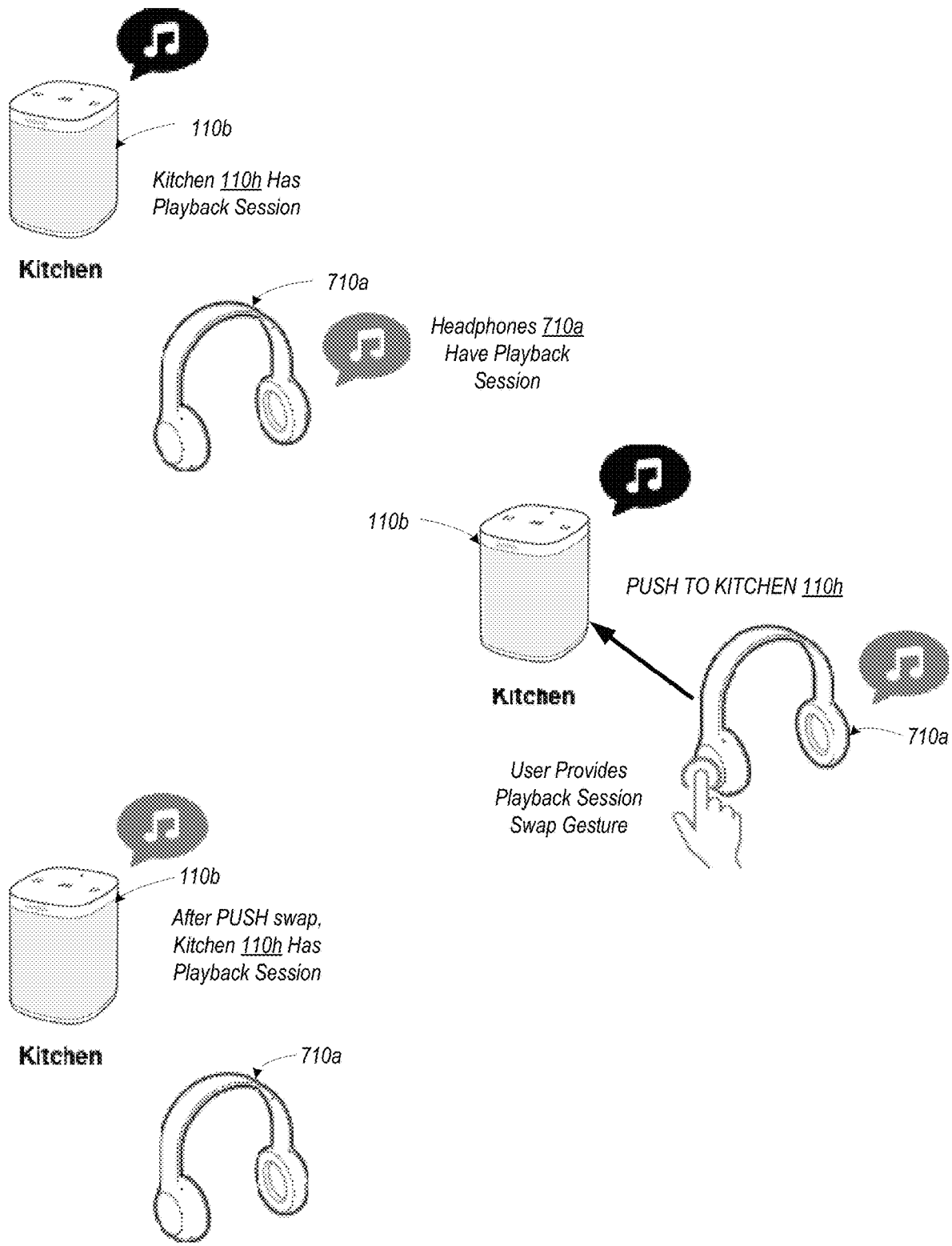
FIG. 8C is a schematic diagram illustrating an example push swap in accordance with aspects of the disclosed technology.

If both the portable playback device 710 and the nearby playback device 110 have on-going playback sessions, it may be unclear whether the user wants to push the playback session on the portable playback device 710 to the nearby playback device 110 or pull the playback session on the nearby playback device 110 to the portable playback device 710. In some implementations the portable playback device 710 may assume that the user would like to "push" the playback session to a nearby playback device 110. To illustrate, FIG. 8C is a schematic diagram illustrating an example push swap between the headphones 710a (FIG. 7C) and the playback device 110b in the Kitchen 110h zone (FIG. 7A). As shown in FIG. 8C, initially, both the headphones 710a and the playback device 110b have a playback session on-going. Then, the user provides a playback session swap gesture to the headphones 710a. The playback session on the headphones 710a is pushed to the playback device 110b. After the push, the Kitchen 110h zone has the playback session from the headphones 710a, which is on-going on the playback device 110b. If the user would instead like to "pull" the playback session on the nearby playback device 110 instead, the user may stop the playback session on the portable playback device 710 first, then provide a playback session swap input to the portable playback device 710. In alternate implementations, the portable playback device 710 may be configured to make the opposite assumption.

In the FIG. 8A-8C examples, the initiating device is the headphones 710a. In other examples, the user may provide a playback session swap input to one of the playback devices 110, such as the playback device 110b. In this scenario, similar assumptions may apply in designating the source and target of the swap. In particular, when the playback device 110b has a playback session on-going and receives a playback session swap input, the playback device 110b may assume that the user wants to "push" the playback session to a nearby portable playback device 710. Conversely, if the playback device 110b does not have a playback session on-going and receives a playback session swap input, the playback device 110b will assume that the user wants to "pull" a playback session from a nearby portable playback device 710.

Within examples, the initiating playback device of a swap may identify the other playback devices in the swap based on proximity to the initiating playback device. That is, the initiating playback device may identify one or more nearby playback devices as targets for a push swap from the initiating playback device or as a source for a pull swap to the initiating playback device. After or based on receiving a playback session swap input, the initiating playback device may identify such nearby playback devices automatically (i.e., without necessarily receiving further user input from the playback session swap input).

Some example techniques for identifying nearby playback devices involve audio-based identification. In exemplary audio-based identification techniques, the initiating playback device requests that swap-eligible playback devices emit an identifiable sound (such as an audio chirp), which can be detected by one or more microphones of the initiating playback device. The initiating playback device may then identify nearby playback devices based on the characteristics of the detected sounds.

Figure 9:
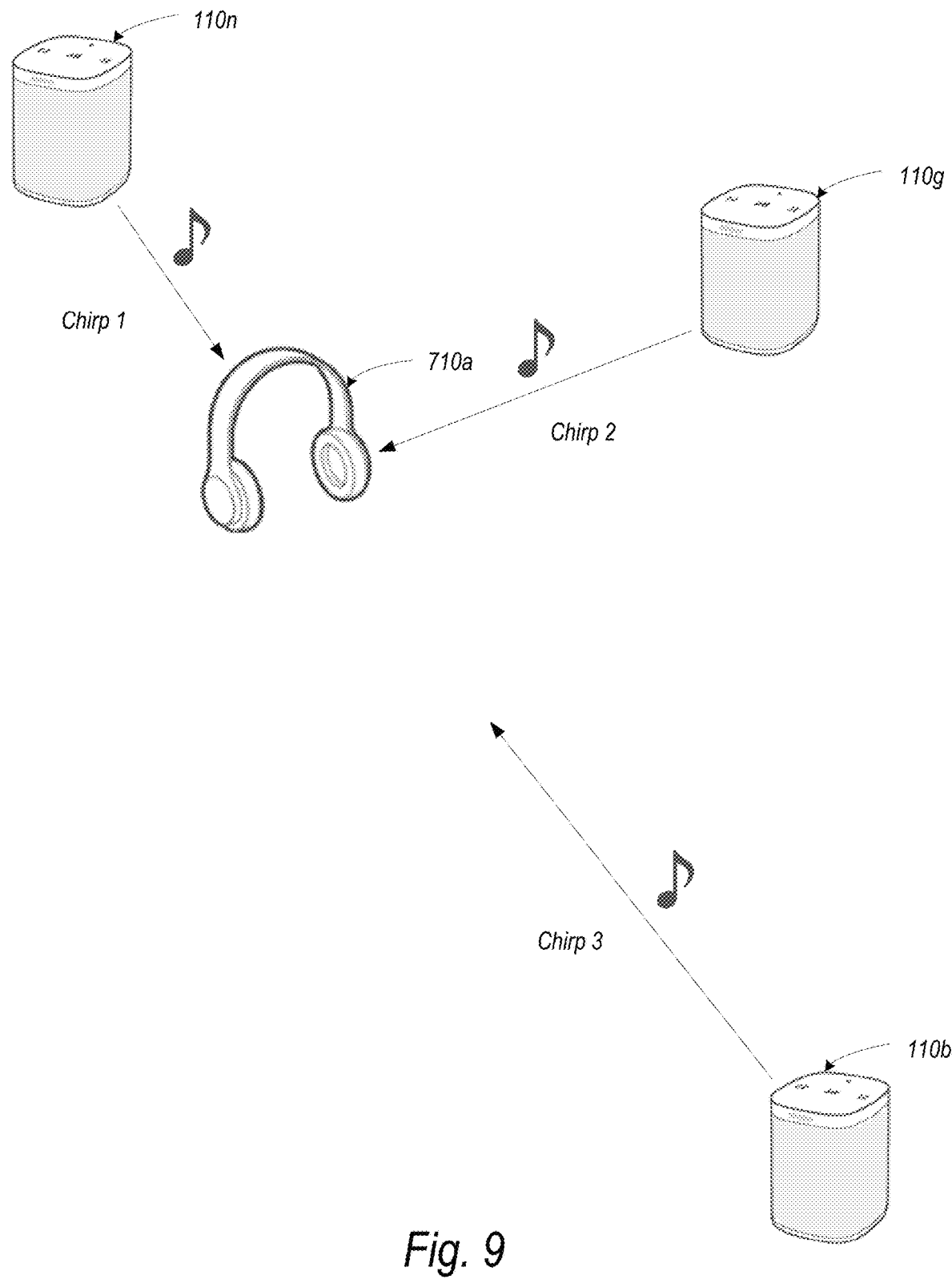
FIG. 9 is a schematic diagram illustrating an example audio-based identification technique in accordance with aspects of the disclosed technology.

To illustrate, FIG. 9 is a schematic diagram illustrating an audio-based identification technique using an audio chirp. An audio chirp includes acoustic characteristics (e.g., one or more tones) that enable identification of the playback device transmitting the audio chirp. In FIG. 9, a user has initiated a swap on a portable playback device 710 (here, the headphones 710a). As noted above, if a playback session is on-going on the headphones 710a, the headphones 710a will assume that the user desires to push the playback session to one or more nearby playback devices. Otherwise, the headphones 710a will assume that the user desires to pull a playback session on one or more nearby playback devices to the headphones 710a.

After or based on receiving a playback session swap input, the headphones 710a may identify swap-eligible playback devices in the media playback system 100. For a push swap, the set of swap-eligible playback devices may include playback devices of a certain type or that are assigned a certain role in the media playback system 100. For instance, other portable playback devices may be configured as ineligible for swap. As another example, only the master in a bonded zone (e.g., a stereo pair or surround sound configuration) may be considered swap-eligible. For a pull swap, the set of swap-eligible playback devices include playback devices that have on-going playback sessions. This set may be further narrowed based on other factors, such as those noted above.

As noted above in section II, the playback devices 110 in the media playback system 100 may maintain or have access to state variables representing the state of the playback devices and other configuration information. This state information is updated periodically or on an event-based basis (e.g., when state changes), such as via subscriptions to certain types of events or statuses (e.g., playback event, grouping event, topology change event, player volume event, group volume event, playback metadata event) and notifications of specific events. The protocol used for the subscriptions may be uPnP based or a proprietary controller protocol or API. Portable playback devices 710, including the headphones 710a and earbuds 719b, may similarly maintain or have access to these state variables and determine the set of swap-eligible playback devices based on the information in the state variables. The state variables may be received from another playback device in the media playback system and/or received from state information stored in a remote computing system in the cloud. In the FIG. 9 example, the headphones 710a have identified the playback device 110b, the playback device 110g, and the playback device 100g as swap-eligible playback devices.

After identifying the swap-eligible playback devices, the headphones 710a, as the initiating playback device in the swap, causes the swap-eligible playback devices to emit respective audio chirps. For example, the headphones 710a may send instructions to the playback device 110b, the playback device 110g, and the playback device 100g to cause these swap-eligible playback devices to emit unique audio chirps. In some examples, the audio chirps may be ultrasonic (e.g., greater than 20 kHz) or near-ultrasonic (e.g., 18-20 kHz), to avoid propagation of the audio chirp outside the proximity of the emitting playback device and/or to avoid user distraction.

Each audio chirp may include data in the form of an encoded identifier. Each encoded identifier may be different and encoded as a set of tones, which is known to the initiating playback device. The audio chirps can be transmitted by the swap-eligible playback devices simultaneously, concurrently, or sequentially or when the particular playback device receives the instruction to transmit the audio chirp. In some examples, a device in the media playback system may provide timing information as to when to transmit the audio chirp for each of the playback devices.

After instructing the swap-eligible playback devices to emit the audio chirps, the initiating playback device in the swap attempts to detect the emitted audio chirps via one or more microphones (e.g., the microphones 715). For instance, the headphones 710a may attempt to detect the emitted audio chirps via one or more voice microphones in the housing of the headphones 710a. Alternatively, the headphones 710a may attempt to detect the emitted audio chirps via one or more ANC microphones in the housing of the headphones 710a. In some instances, particular microphones (ANC or voice) may be selected or tuned to be sensitive to the ultrasonic or near-ultrasonic range such that these microphones are particularly suited to receiving the audio chirp. Other examples are possible as well.

To identify the "nearby" playback device, the initiating playback device may compare the detected audio chirps. For instance, the headphones 710a may compare various metrics such as sound pressure and signal-to-noise ratio of the detected audio chirps to identify the "loudest" audio chirp, which may be assumed to have been emitted by the playback device that is physically nearest to the initiating playback device. In example implementations, the initiating playback device may list or otherwise rank the swap-eligible playback devices by relative signal strength (e.g., SNR) and then select the highest ranked swap-eligible playback device as the source or target for the swap.

As shown in FIG. 9, the headphones 710a detect audio chirps emitted by the playback devices 110n and the playback device 110g, which are in the Bathroom 101a and the Bedroom 101c, respectively. However, the headphones 710a did not detect the audio chirp emitted by the playback device 110b, perhaps because the audio chirp could not propagate to the headphones 710a from the Kitchen 101h, which is on a different floor of the house relative to the other zones. In this example, the playback device 110n is determined to be the nearest playback device, as a comparison of the metrics of the audio chirp emitted by the playback device 110n and the audio chirp emitted by the playback device 110g indicated that the audio chirp emitted by the playback device 110n was "loudest."

To facilitate comparison between the detect audio chirps, the swap-eligible playback devices may emit the audio chirps at the same or substantially the same volume level. In some cases, the instructions to emit the audio chirps include instructions to change to a certain volume level. Since different playback devices have different types of transducers and/or amplifiers, the volume level for each playback device emitting the chirp may vary based on the type of device. Alternatively, the playback devices may be pre-configured to emit audio chirps at the certain volume level.

The playback session swap input may take various forms. For instance, a particular input to user interface 713a of the headphones 710 (FIG. 7B) such as a tap or gesture to the touch-sensitive region (or a portion thereof) may trigger the swap. In further examples, the portable playback device 710 may include a physical button to trigger the swap. Yet further, a pattern of touch-inputs (e.g. short, long, short) or a tracing pattern (e.g., a shape such as a zig-zag or triangle) may trigger a swap. Other types of inputs are contemplated as well.

Figure 10:
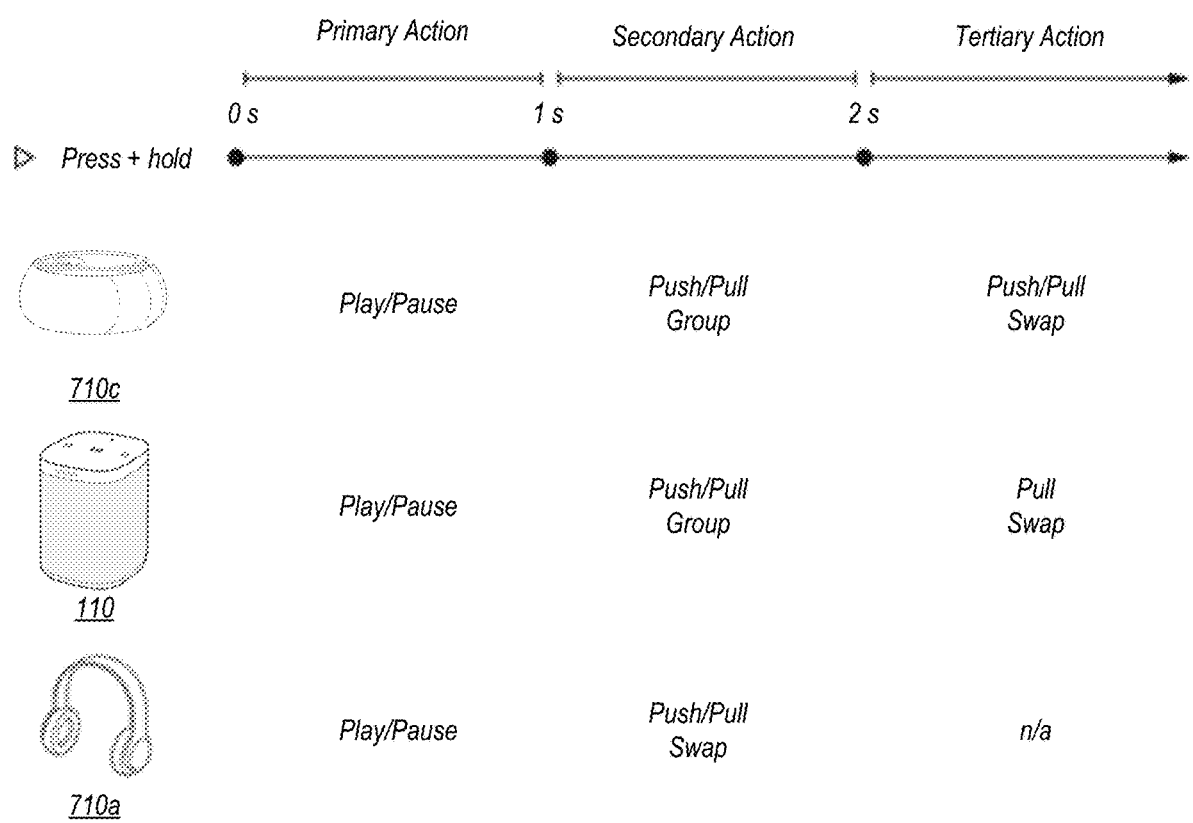
FIG. 10 is a schematic diagram illustrating example control schemes in accordance with aspects of the disclosed technology.

In some particular examples, a touch-and-hold or a continued touch-and-hold to a particular area on the touch-sensitive region (e.g., a play/pause area) triggers a swap. To illustrate, FIG. 10 is a chart illustrating an exemplary control scheme for the portable playback device 710c, the playback device(s) 110, and the headphones 710a. As shown in FIG. 10, a user may provide a press input (a.k.a. touch) to a touch-sensitive region to perform a primary action (i.e., play or pause). If a physical button is available for swap, the user can push and hold the physical button to invoke a swap.

If the user continues to hold the press input (touch-and-hold), a secondary action is performed. For the portable playback device 710c and the playback device(s) 110, the secondary action is to group with nearby playback device(s). That is, the initiating playback device (i.e., the portable playback device 710c or the playback device(s) 110) forms a synchrony group with nearby playback devices. In contrast, for the headphones 710a, the secondary action is to perform a push swap or a pull swap, as described in connection with FIGS. 8A-8C. This configuration allows a user to more quickly access the swap function when using the headphones 710a. Since wearable playback devices are designed for relatively private listening compared with the portable playback device 710c and the playback device(s) 110, the user is less likely to desire to group the headphones for synchronous playback with these types of devices. Other example implementations may vary this control scheme.

If the user continues to further hold the press input (touch-and-continued hold), a tertiary action is performed. For the portable playback device 710c and the playback device(s) 110, the tertiary action is to perform a push swap or a pull swap with nearby playback device(s). For the headphones 710a, no tertiary action is configured. Other example control schemes may configure a tertiary action for the headphones 710a. In some examples, continuing to hold the touch after the last action in the chain may cancel the input.

For a user, this control scheme provides audible feedback for the swap action. When a user provides a playback session swap input to a first playback device, the user will be confident that the first playback device will either be source or target of the swap (depending on whether the first playback device has an on-going playback session) as they have provided the triggering input to the first playback device. However, the user may be less confident that the initiating playback device has correctly identified the user's desired target (for a push swap) or source (for a pull swap). In particular, when using the example audio-based identification techniques described above, the initiating playback device has the potential to identify a different playback device as the source or target than the user intended, perhaps due to unique acoustic characteristics of the environment causing an audio chirp emitted from a further away playback device to appear to be nearest.

By using this control scheme, when providing a press-and-hold input to the portable playback device 710c or the playback device(s) 110, a grouping between the sources and targets of the potential swap (if the user continues to hold) occurs, causing synchronous out-loud playback on the sources and targets of the potential swap. In particular, when the initiating playback device has an on-going playback session, a push-group is performed, which causes the initiating playback device and the nearby playback devices to play back the on-going playback session in synchrony. Conversely, when the initiating playback device does not have an on-going playback session, a pull-group is performed, which causes the initiating playback device and the nearby playback devices to play back an on-going playback session of the nearby playback devices in synchrony. This out-loud synchronous playback provides a preview to the user on the sources and targets of the swap that will occur if the user continues to hold the input. If the "previewed" playback devices in the group are different from the user's desired swap source or target, the user can provide input to cancel the group and/or swap actions.

Further, in some implementations, the control scheme may facilitate a user selecting the desired source or target of a swap by providing additional input. In particular, in some examples, the user may cycle through swap eligible playback devices by providing one or more additional press-and-hold inputs within a threshold period of providing the preceding input. As noted above, the initiating playback device may list the swap eligible playback devices by signal strength. In an example, a second press-and-hold input following the initial press-and-hold input will select the second swap eligible playback devices in the list. Similarly, a third press-and-hold input following the initial press-and-hold input will select the third swap eligible playback devices in the list. Subsequent inputs will continue to cycle down the list (if further swap eligible playback devices are listed).

In some examples, the portable playback device 710c may similarly traverse a list of group eligible playback devices via consecutive touch-and-hold inputs. The group eligible playback devices may be the same as the swap eligible playback devices, and identified using the same or similar audio-based identification techniques. For example, to push/pull group with the nearest playback device 110, a user may provide a first touch-and-hold input to the playback device 710c. To push/pull group with the next nearest playback device 110, a user may provide a second touch-and-hold input to the playback device 710c within a threshold period of time from the first input. Subsequent touch-and-hold inputs may further traverse the ranked list of swap and/or group eligible playback devices in the ranked order of nearest to furthest. After the threshold period of time, the user would need to start the input sequence again to perform the grouping.

If a push-swap gesture is performed on the portable playback device 710c while the portable playback device 710c is already grouped with the nearest playback device 110, instead of performing a push-swap, the portable playback device 710c may be configured to push-ungroup instead.

Figure 11:
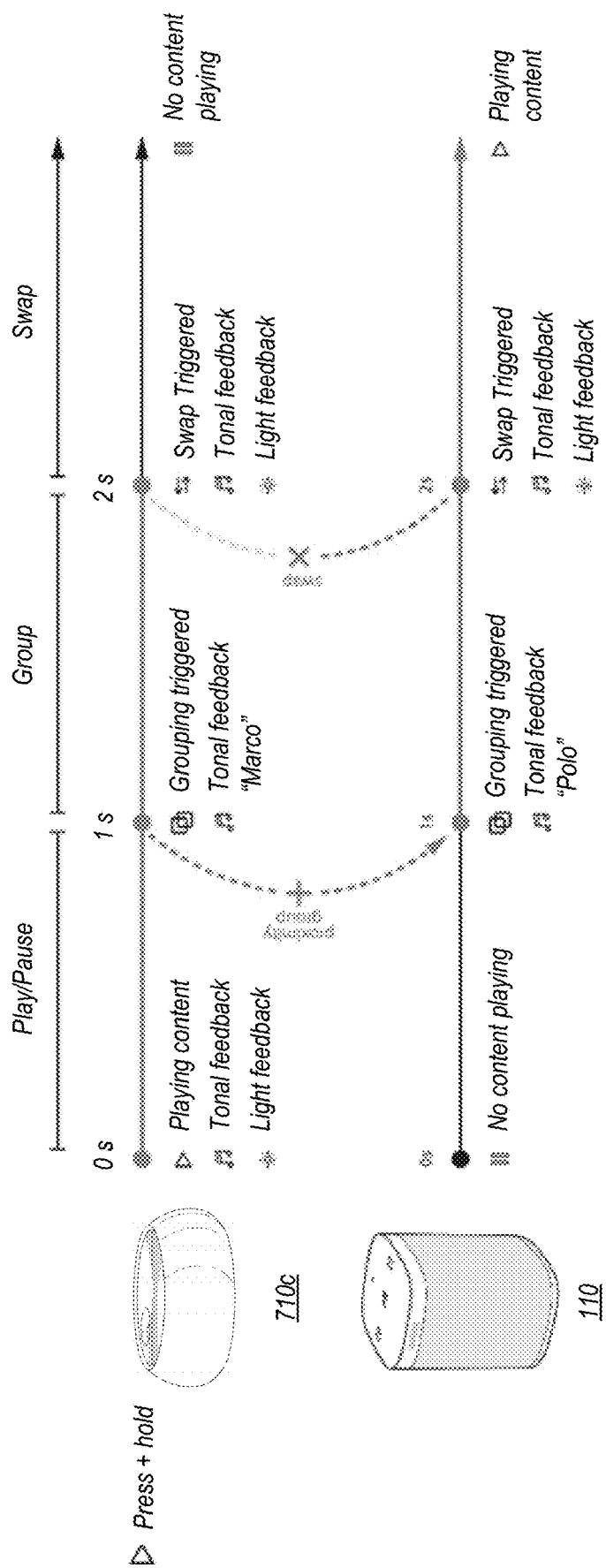
FIG. 11 is a schematic diagram illustrating example feedback techniques in accordance with aspects of the disclosed technology.

To aid a user in understanding the control scheme, the source and/or target playback device(s) may provide feedback, including audio and/or visual feedback. To illustrate, FIG. 11 FIG. 10 is a chart showing an exemplary feedback scheme for the portable playback device 710c and the playback device(s) 110. As shown in FIG. 11, at each stage in the control scheme, in conjunction with the respective action, the initiating playback device (the portable playback device 710c), which is the source in this example, provides audio and/or visual feedback. Further, when performing the group and swap actions, the target playback device also provides audio and/or visual feedback. For instance, when grouping the portable playback device 710c and the playback device(s) 110, each playback device provides respective tonal feedback (denoted in FIG. 11 as two different tones "Marco" and "Polo") and the source playback device provides visual feedback. When swapping the portable playback device 710c and the playback device(s) 110, each playback device provides tonal and visual feedback or only the portable playback device 710c provides tonal and visual feedback.

After identifying the source or target playback devices of a pull or push swap, respectively, the initiating playback device causes the playback session to transition from the source playback device(s) to the target playback devices. In example implementations, a swap involves forming a synchrony group including the source playback device(s) and the target playback devices. Exemplary synchrony grouping is described in greater detail in sections III and IV above. In forming the synchrony group, the target playback device(s) begin to play back audio content in synchrony with the source playback device(s). The source playback device(s) may then be removed from the synchrony group, which completes the swap. The source playback device may be removed or ungrouped from the synchrony group by sending a command to the target device to ungroup from the source playback device.

In another example implementation, in a pull swap, the target device may send a request to the source playback device for playback session information. The playback session information includes playback state information such as current playlist, track, and offset. In yet another example implementation, in a push swap, the initiating device may send a command to start playback and include the playback state information. The target playback device may use the playback state information to continue playing back the playback session without grouping and ungrouping with the source playback device.

Referring back to the example of FIG. 8A, to push the playback session from the headphones 710a to the playback device 110b, the headphones 710a form a synchrony group including the headphones 710a and the playback device 110b, which causes the headphones 710a and the playback device 110b to synchronously play back the playback session. To finish the push swap, the headphones 710a leave the synchrony group.

In the FIG. 8A example, since the playback session begins on the headphones 710a, the headphones 710a may initially operate as sourcing device of the synchrony group. As noted above, the sourcing device, or group coordinator, obtains the audio for the synchrony group. After the headphones 710a leave the synchrony group, the playback device 110b may assume the role of sourcing device.

In some examples, during the swap, to avoid the user being disrupted by audio playback during the swap, playback may be manipulated by the source or target playback device. For instance, the playback session may be paused concurrently with creation of the synchrony group and then resumed after the headphones 710a leave the synchrony group. In other examples, either the headphones 710a or the playback device 110b, or both, may be muted until the swap is completed. In yet another example, the headphones 710a may continue playback for x seconds (e.g., 1, 2, 3 seconds or the like) before pausing to allow for any delays in transitioning the playback session to the target playback device. Other examples are possible as well.

Referring back to the example of FIG. 8B, to pull the playback session from the playback device 110b to the headphones 710a, the headphones 710a form a synchrony group including the headphones 710a and the playback device 110b, which causes the headphones 710a and the playback device 110b to synchronously play back the playback session. To finish the push swap, the playback device 110b leaves the synchrony group.

In the FIG. 8B example, since the playback session begins on the playback device 110b, the playback device 110b may initially operate as sourcing device of the synchrony group. As noted above, the sourcing device, or group coordinator, obtains the audio for the synchrony group. After the playback device 110b leave the synchrony group, the headphones 710a may assume the role of sourcing device.

In alternate embodiments, instead of leaving the synchrony group to complete the swap, the source playback device remains in the synchrony group as the sourcing device. While this would normally cause the source playback device and the target playback devices to play content in synchrony, in these examples, the source playback device is placed into a mute state. Since the source playback device is muted, the playback session appears to have been swapped from the perspective of the user. This may be a true mute that disables or places certain components, such as the audio amplifiers, in a low-power state, which reduces power consumption relative to out loud playback when not in the mute state.

VII. Example Home Theater Swap Techniques

In some examples, a user may desire to transition a playback session from a soundbar-type playback device to a wearable playback device, to enable more private listening of audio from a television or other home theater source. Example soundbar-type playback devices include the playback device 110h (FIGS. 1K and 1J). A soundbar-type playback device is capable of receiving audio via an audio input interface from a television, media player (e.g., set-top box, streaming media playback device, computer), or other home theater source. Further, a soundbar-type playback device may operate as a sourcing device for a bonded zone that includes one or more satellites, which may play back certain channels (e.g., the playback devices 110j and 110k) and/or certain frequency ranges (e.g., the playback device 110i), as shown in FIGS. 1K and 1J illustrating the Den 101d. While some sound-bar playback devices implement a bar-shaped housing to enable multiple audio drivers to be carried linearly along a front surface, a soundbar-type playback device need not necessarily have a bar-shaped housing.

An exemplary sound-bar playback device may be considered to operate in one of two modes for receiving audio content, referred to herein as a home theater mode and a music mode. In the home theater mode, the soundbar-type playback device receives audio from a physically-connected source (e.g., a television) via the audio input interface. When streaming audio via a network interface, the soundbar-type playback device may be considered to be in the music mode. Notably, the streamed audio is not necessarily music, but may be other types of streamed audio content, such as podcasts or news programs. When streaming audio content in the music mode, the soundbar-type playback device may perform a swap in the same or similar manner as described in section VI.

While in the home theater mode, to perform a swap, the soundbar-type playback device may enter another mode, referred to herein as a "home theater swap mode," or simply "swap mode." When performing a swap action with a wearable playback device using the swap mode, the wearable playback device effectively becomes a satellite of the soundbar-type playback device. In the swap mode, the soundbar-type playback device functions as the source device if playing back audio from the audio input interface in the home theater mode. The wearable playback device then functions as the target playback device to receive and play back the audio from the audio input interface. Conversely, if the wearable playback device is already playing back the audio from the audio input interface in the swap mode, the soundbar-type playback device functions as the target playback device.

Figure 12A:
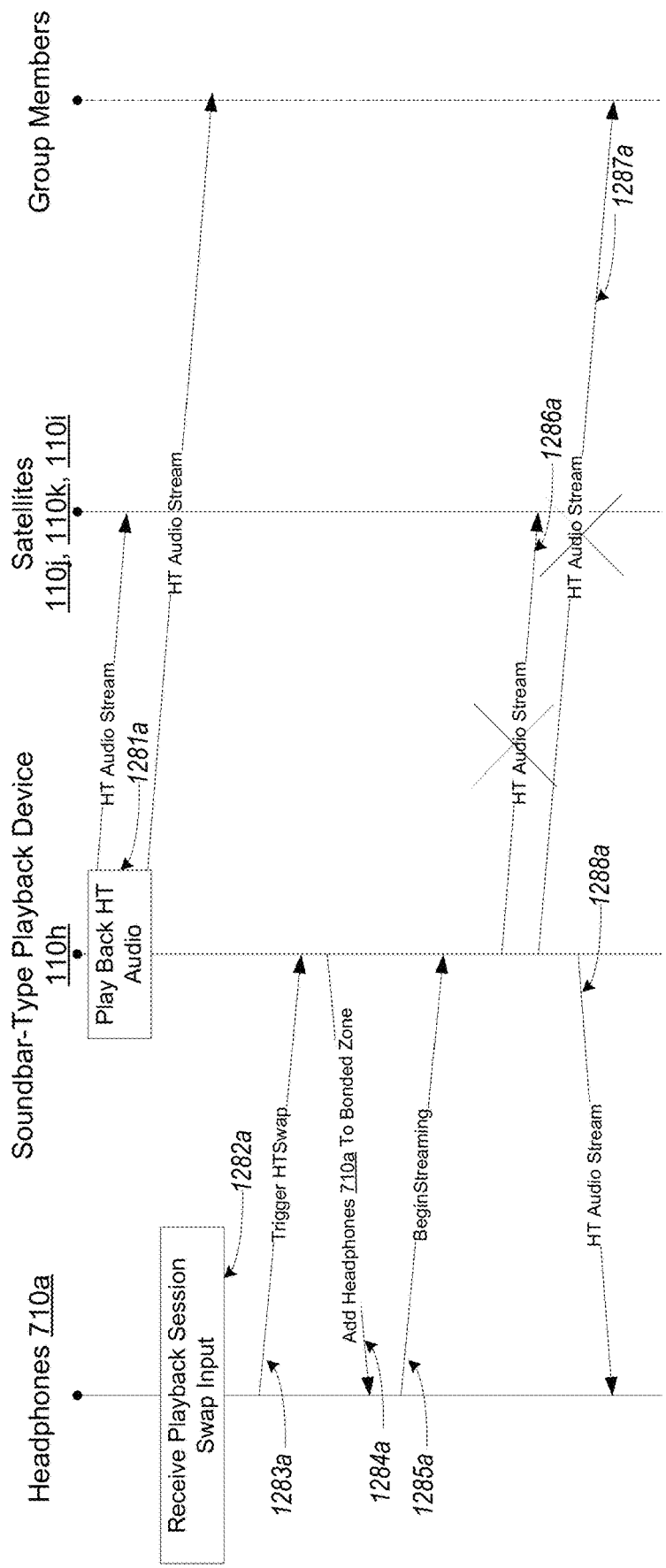
FIGS. 12A and 12B are example messaging diagrams to illustrating example playback session swap techniques.

In some cases, the wearable playback device initiates the swap mode. FIG. 12A is an example message flow diagram showing instructions exchanged between the headphones 710a, a soundbar-type playback device 110h, one or more satellites in a bonded zone (the Den 101d) with the soundbar-type playback device 110h (illustrated as the playback devices 110j, 110k, and 110i, as shown in FIG. 1K), and one or more group members (if the bonded zone is in a zone group with any additional zones) in an example swap mode initiated by the headphones 710a.

Before entering the swap mode, at 1281a, the soundbar-type playback device 110h is playing back audio from an audio input interface in a home theater mode. As the sourcing device of the bonded zone that includes the satellites, in the home theater mode, the soundbar-type playback device 110h distributes audio to the satellites according to their roles in the bonded zone. Further, if the Den 101d is in a zone group with one or more other zones, the soundbar-type playback device 110h distributes full-range audio content to the group members of the zone group as the sourcing device of the zone group.

At 1282b, the headphones 710a receive a playback session swap input, which may be a touch-and-hold input, among other examples as described in connection with section VI. In this example, the headphones then identify the soundbar-type playback device 110h as the source for the swap (e.g., based on determining that the soundbar-type playback device 110h is the physically nearest playback device using an audio-based identification technique).

Then, at 1283a, the headphones 710a send data to the soundbar-type playback device 110h representing instructions to transition to the swap mode, which are received by the soundbar-type playback device 110h. The headphones 710a and the soundbar-type playback device 110h may send and receive the data representing the instructions via respective 802.11-compatible network interfaces. The headphones 710a may send this data based on receiving the playback session swap input.

Based on receiving the data representing the instructions to enter the swap mode, the soundbar-type playback device 110h transitions from the home theater mode to the swap mode. More particularly, at 1284a, the soundbar-type playback device 110h adds the headphones 710a to a bonded zone, which may be the same bonded zone as the Den 101d or a new bonded zone.

In some examples, in the home theater mode, the soundbar-type playback device 110h and the satellites operate as nodes in a mesh network. As described above in connection with FIG. 1B, in some implementations, the network(s) 104 may include a dedicated communication network implemented as a mesh network. In the home theater mode, the soundbar-type playback device 110h distributes playback timing information and audio to the satellites using the mesh network.

To facilitate adding headphones 710a to the bonded zone, the soundbar-type playback device 110h transitions its 802.11-compatible network interface from operating as a node in a mesh network to operating as an access point. The access point forms a first wireless local area network (LAN) in a first wireless frequency band (e.g., the 5 Ghz band). The soundbar-type playback device 110h then sends, via the 802.11-compatible network interface to the first wearable playback device, data representing a service set identifier (SSID) of the first wireless LAN and credentials for the first wireless LAN, which allows the headphones 710a to connect to the first wireless LAN. After the first wearable playback device connects to the first wireless LAN formed by the soundbar-type playback device, the soundbar-type playback device 110h forms a bonded zone that includes the soundbar-type playback device 110h and the headphones 710a. This may be considered to be the same bonded zone as the Den 101d or a new bonded zone. At 1285a, after connecting to the first wireless LAN, the headphones 710a send a message to the soundbar-type playback device 110h to start streaming the HT audio stream.

Further, in some examples, while in the swap mode, the headphones 710b effectively becomes a satellite of the soundbar-type playback device 110h. As such, the soundbar-type playback device 110h "parks" the satellite playback devices 110j, 110k, and 110i on a second wireless LAN in a second wireless frequency band (e.g., the 2.4 Ghz band) because the satellite playback devices 110j, 110k, and 110i will not be playing back audio. Parking the satellites on the second LAN allows the satellites to remain contactable (e.g., to eventually re-form the bonded zone when transitioning back to the home theater mode) and to receive updates on the state of the media playback system 100 (e.g., state variable events). The soundbar-type playback device 110h may form this second wireless LAN using its 802.11-compatible network interface.

At 1286a, the soundbar-type playback device 110h stops streaming the HT audio stream to the satellites (e.g., 110j, 110k, and 110i). This may be performed as part of or in connection with parking the satellite playback devices 110j, 110k, and 110i on a second wireless LAN. Similarly, at 1287a, the soundbar-type playback device 110h may stop streaming the HT audio stream to the group members, if any. Forming a new bonded zone at 1284a may remove the soundbar-type playback device 110h from any existing zone group, which causes the group members to stop receiving the HT audio stream.

At 1288a, the soundbar-type playback device 110h streams the HT audio stream to the headphones 710a for playback. In connection with the headphones 710a receiving the stream and playing back the audio, the soundbar-type playback device 110h mutes to complete the swap. When muted, the soundbar-type playback device 110h may continue to process audio data for playback synchronously with the headphones 710a. The HT audio stream may include data representing playback timing information for the bonded zone and the audio. In some examples, the audio is multi-channel audio such as a surround sound track. In such examples, the soundbar-type playback device 110h may down-mix the surround sound audio track to an audio track with fewer channels, such as stereo audio track. The surround sound audio track can be down-mixed to contain the same number of channels supported by the wearable device or the portable playback device.

While in the swap mode, the soundbar-type playback device 110h may detect an event representing a trigger to transition from operating in the swap mode to operating in the home theater mode. Such an event may include receiving, from the headphones 710a, data representing instructions to transition to the home theater mode (e.g., to end the swap mode), which the headphones 710a may send after receiving a playback session swap input while in the swap mode. As another example, the soundbar-type playback device 110h may detect that the headphones 710a have disconnected from the first wireless LAN (and are such no longer operating as a satellite) or been paused for x amount of time. Based on detecting such as event, the soundbar-type playback device 110h may transition to the home theater mode.

Transition to the home theater mode from the swap mode may involve the soundbar-type playback device 110h transitioning its 802.11-compatible network interface from operating as the access point to operating as the node in the mesh network. Further, the soundbar-type playback device 110h may cause the satellite playback devices to connect to the mesh network. Yet further, the soundbar-type playback device 110h may re-form the bonded zone that includes the soundbar-type playback device 110h and the satellite playback devices 110j, 110k, and 110i.

Yet further, while in the swap mode, additional wearable playback devices may connect to the soundbar-type playback device 110h as satellites. This may allow, for example, two partners to listen to television audio using individual wearable devices in the Den 101h without waking up sleeping children in the adjacent Bedroom 101c. A user may cause a second wearable playback device (e.g., the earbuds 710b) to join the swap mode by providing a playback session swap input (e.g., a touch-and-hold) to the second wearable device, which causes the second wearable playback device to send data representing instructions to transition to the swap mode to the soundbar-type playback device 110h. The soundbar-type playback device 110h then joins the second wearable device using the techniques shown in FIG. 12A.

Figure 12B:
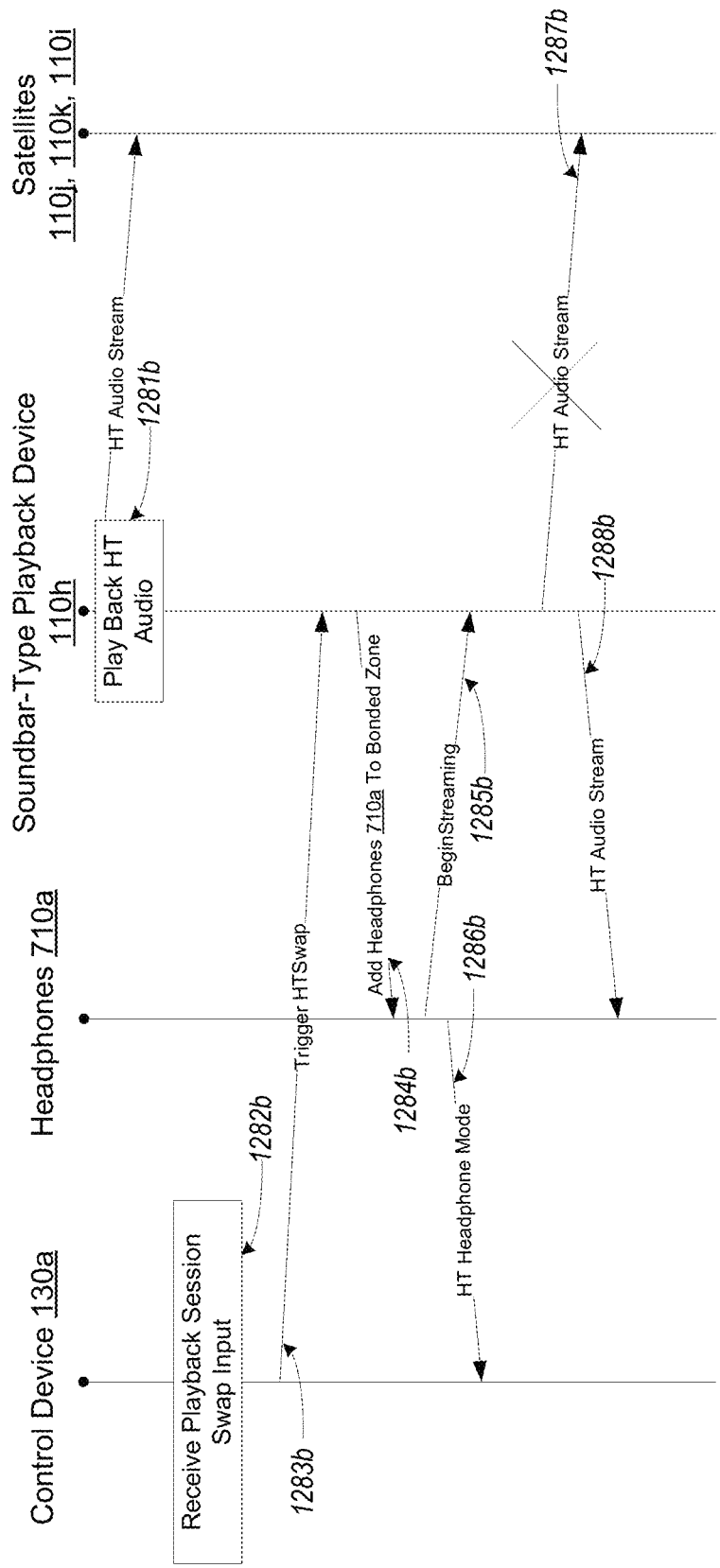
Figure 13A:
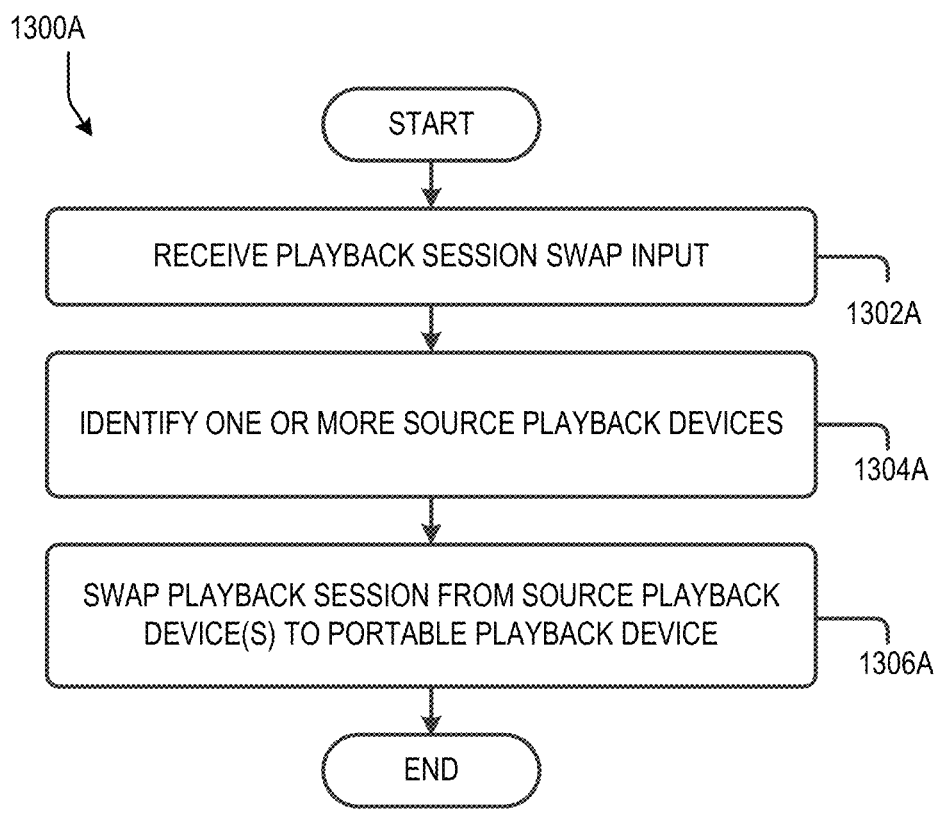
FIG. 13A is a method flow diagram illustrating an example swap pull technique in accordance with aspects of the disclosed technology.
Figure 13B:
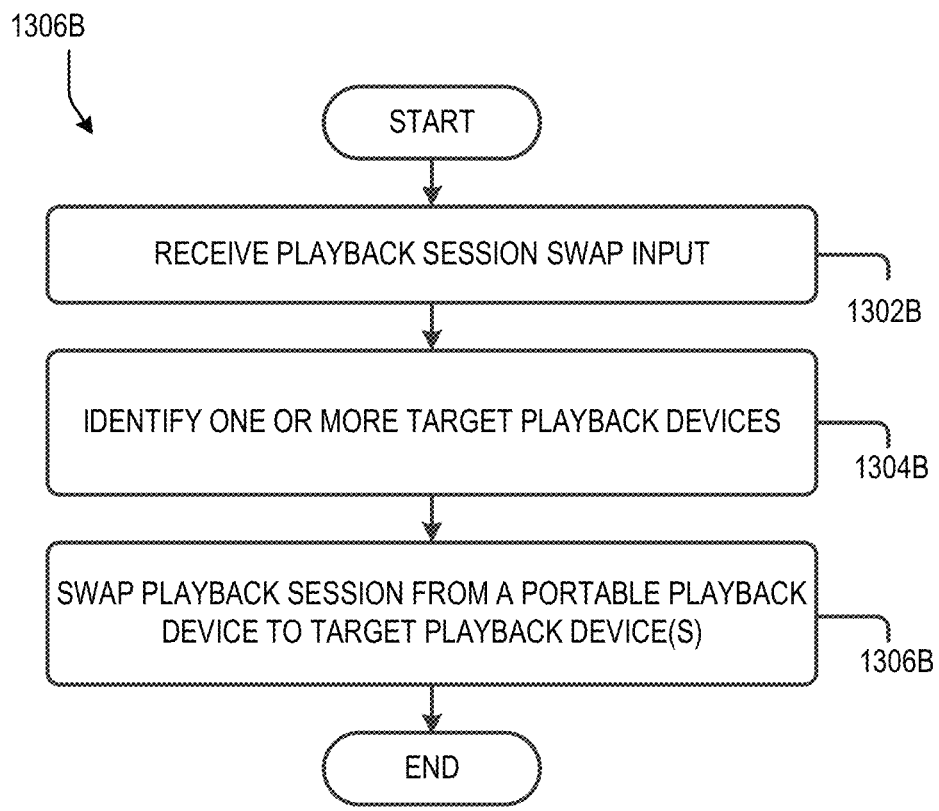
FIG. 13B is a method flow diagram illustrating an example swap push technique in accordance with aspects of the disclosed technology.

In some cases, a control device initiates the swap mode. FIG. 12B is an example message flow diagram showing instructions exchanged between the control device 130a, the headphones 710a, a soundbar-type playback device 110h, and one or more satellites in a bonded zone (the Den 101d) with the soundbar-type playback device 110h in an example swap mode initiated by the control device 130a.

Before entering the swap mode, at 1281*b*, the soundbar-type playback device 110*h* is playing back audio from an audio input interface in a home theater mode. As the sourcing device of the bonded zone that includes the satellites, in the home theater mode, the soundbar-type playback device 110*h* is a master device that distributes audio to the satellites according to their roles in the bonded zone. Further, if the Den 101*d* is in a zone group with one or more other zones, the soundbar-type playback device 110*h* distributes full-range audio content to the group members of the zone group as the sourcing device of the zone group.

At 1282*b*, the control device 130*a*, receive a playback session swap input. The control device 130 may receive a playback session swap input via a user interface, such as the user interface 430. More particularly, a particular user interface 430 may control the headphones 430*a*, and may include one or more controls that when selected, correspond to the playback session swap input.

Then, at 1283*b*, the control device 130*a* sends a swap command to the headphones, and the headphones send instructions to the soundbar-type playback device to transition to the swap mode. Alternatively, the control device 130*a* send data to the soundbar-type playback device 110*h* representing instructions to transition to the swap mode, which are received by the soundbar-type playback device 110*h*. The control device 130*a* and the soundbar-type playback device 110*h* may send and receive the data representing the instructions via respective 802.11-compatible network interfaces. The control device 130*a* may send this data based on receiving the playback session swap input.

Based on receiving the data representing the instructions to enter the swap mode, the soundbar-type playback device 110*h* transitions from the home theater mode to the swap mode. More particularly, at 1284*b*, the soundbar-type playback device 110*h* adds the headphones 710*a* to a bonded zone, which may be the same bonded zone as the Den 101*d* (e.g., identified as "Den" or a new bonded zone (e.g., identified as "Den+Ben's Headphones").

Similar to the FIG. 12A example, in some examples, in the home theater mode, the soundbar-type playback device 110*h* and the satellites operate as nodes in a mesh network. To facilitate adding headphones 710*a* to the bonded zone, the soundbar-type playback device 110*h* transitions its 802.11-compatible network interface from operating as a node in a mesh network to operating as an access point. The access point forms a first wireless local area network (LAN) in a first wireless frequency band (e.g., the 5 Ghz band). The soundbar-type playback device 110*h* then sends, via the 802.11-compatible network interface to the first wearable playback device, data representing a service set identifier (SSID) of the first wireless LAN and (ii) credentials for the first wireless LAN, which allows the headphones 710*a* to connect to the first wireless LAN.

After the first wearable playback device connects to the first wireless LAN formed by the soundbar-type playback device, the soundbar-type playback device 110*h* forms a bonded zone that includes the soundbar-type playback device 110*h* and the headphones 710*a*. This may be considered to be the same bonded zone as the Den 101*d* or a new bonded zone. At 1285*b*, after connecting to the first wireless LAN, the headphones 710*a* send a message to the soundbar-type playback device 110*h* to start streaming the HT audio stream. At 1286*c*, the control device receives data indicating that the headphones 710*a* are ready to receive audio from the soundbar-type playback device 110*h*.

Further, in some examples, while in the swap mode, the headphones 710*b* effectively become a satellite of the soundbar-type playback device 110*h*. As such, since the headphones 710*b* are using the first wireless LAN on the first wireless band, the soundbar-type playback device 110*h* "parks" the satellite playback devices 110*j*, 110*k*, and 110*i* on a second wireless LAN in a second wireless frequency band (e.g., the 2.4 Ghz band). Parking the satellites on the second LAN allows the satellites to remain contactable (e.g., to eventually re-form the bonded zone when transitioning back to the home theater mode) and receive updates on the state of the media playback system 100 (e.g., state variable events). The soundbar-type playback device 110*h* may form this second wireless LAN using its 802.11-compatible network interface.

At 1287*b*, the soundbar-type playback device 110*h* stops streaming the HT audio stream to the satellites. This may be performed as part of or in connection with parking the satellite playback devices 110*j*, 110*k*, and 110*i* on a second wireless LAN.

At 1288*b*, the soundbar-type playback device 110*h* streams the HT audio stream to the headphones 710*a* for playback. In connection with the headphones 710*a* receiving the stream and playing back the audio, the soundbar-type playback device 110*h* mutes to complete the swap. The HT audio stream may include data representing playback timing information for the bonded zone and the audio. In some examples, the audio is multi-channel audio such as a surround sound track. In such examples, the soundbar-type playback device 110*h* may down-mix the surround sound audio track to an audio track with fewer channels, such as stereo audio track.

VIII. Example Swap Methods

Methods 1300A, 1300B, 1400, and 1500 shown in FIGS. 13A, 13B, 14, and 15 present an example swap techniques, according to example embodiments described herein. These example technique can be implemented within an operating environment including, for example, the media playback system 100 of FIG. 7A, one or more of the playback device 110*a-n*, one or more of the NMDs 130, one or more of the control devices 130, or one or more of the portable playback devices 710, as well as other devices described herein and/or other suitable devices. Further, operations illustrated by way of example as being performed by a media playback system can be performed by any suitable device, such as a playback device or a control device of a media playback system. Methods 1300A, 1300B, 1400, and 1500 may include one or more operations, functions, or actions as illustrated by one or more of blocks shown in FIGS. 13A, 13B, 14, and 15. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Example Method to Pull Swap

Method 1300A illustrates an example pull swap technique. A portable playback device, such as a the headphones 710a, the earbuds 710b, or the portable playback device 710c, may perform the pull swap technique to pull audio content in a playback session on a playback device 110 to the portable playback device.

At block 1302A, the method 1300A includes receiving a playback session swap input. For instance, the portable playback device 710 may receive data representing a first playback session swap input. As described in connection with section VI, when the portable playback device 710 is not presently playing audio content, a playback session swap input may initiate a pull swap between the portable playback device 710 and one or more source playback device(s). In some examples, the portable playback device 710 receives the playback session swap input via a user interface. For instance, as discussed in connection with FIG. 10, the headphones 710a may receive a touch-and-hold input. Alternatively, the portable playback device 710c may receive a continued touch-and-hold input. In further examples, a control device may receive the playback session swap input and instruct a particular wearable or portable playback device to initiate the playback session swap.

At block 1304A, the method 1300A includes identifying one or more source playback devices within a media playback system. For instance, the portable playback device 710 may identify one or more eligible playback devices 110 as source playback devices. Eligible source playback devices for a pull swap include playback devices 110 that that are connected to a first wireless LAN (e.g., the network 104 in FIG. 1B) and also playing back audio content in a playback session. As discussed in section VI, the set of eligible source playback devices may be filtered using various other factors, such as playback device type or role.

In some examples, the portable playback device 710 identifies the one or more source playback devices via an audio-based identification technique, as described in sections VI. In such examples, identifying the one or more source playback devices may include identifying a set of swap-eligible playback devices in the media playback system and then causing the set of swap-eligible playback devices to emit respective audio chirps that identify the emitting swap-eligible playback devices. The portable playback device 710 may then detect, via one or more microphones, the audio chirps emitted by one or more swap-eligible playback devices and select the one or more source playback devices from among the one or more swap-eligible playback devices based on the audio chirp from the one or more source playback devices indicating that the one or more source playback devices are physically nearest to the portable playback device 710 among the one or more swap-eligible playback devices. Selecting the one or more source playback devices may include comparing one or more respective metrics of the detected audio chirps emitted by one or more swap-eligible playback devices to determine that the one or more source playback devices are physically nearest to the portable playback device 710 among the one or more swap-eligible playback devices.

At block 1306A, the method 1300A includes swapping a playback session from the source playback devices to the portable playback device. For example, the portable playback device 710 may transition the playback session from the determined one or more source playback devices to the portable playback device 710. Transitioning the playback session may include forming a first synchrony group including the portable playback device 710 and the one or more source playback devices. Forming the first synchrony group causes the portable playback device 710 to start playing the particular audio content of the playback session.

Transitioning the playback session may further include causing playback of the particular audio content on the one or more source playback devices to stop. In some examples, playback of the particular audio content on the one or more source playback devices is stopped by the one or more source playback devices leaving the first synchrony group. Alternatively, playback of the particular audio content on the one or more source playback devices is stopped by muting the one or more source playback devices. Other examples are possible as well.

b. Example Method to Push Swap

Method 1300B illustrates an example push swap technique. A portable playback device, such as the headphones 710a, the earbuds 710b, or the portable playback device 710c, may perform the push swap technique to push audio content in a playback session on the portable playback device to a nearby playback device 110.

At block 1302B, the method 1300B includes receiving a playback session swap input. For instance, the portable playback device 710 may receive data representing a first playback session swap input. As described in connection with section VI, when the portable playback device 710 is presently playing audio content, a playback session swap input may initiate a push swap between the portable playback device 710 and one or more target playback device(s). In some examples, the portable playback device 710 receives the playback session swap input via a user interface. For instance, as discussed in connection with FIG. 10, the headphones 710a may receive a touch-and-hold input. Alternatively, the portable playback device 710c may receive a continued touch-and-hold input. In further examples, a control device may receive the playback session swap input and instruct a particular wearable or portable playback device to initiate the playback session swap.

At block 1304B, the method 1300B includes identifying one or more source playback devices within a media playback system. For instance, the portable playback device 710 may identify one or more eligible playback devices 110 as target playback devices. Eligible target playback devices for a pull swap include playback devices 110 that that are connected to a first wireless LAN (e.g., the network 104 in FIG. 1B) and also playing back audio content in a playback session. As discussed in section VI, the set of eligible target playback devices may be filtered using various other factors, such as playback device type or role.

In some examples, the portable playback device 710 identifies the one or more target playback devices via an audio-based identification technique, as described in sections VI. In such examples, identifying the one or more target playback devices may include identifying a set of swap-eligible playback devices in the media playback system and then causing the set of swap-eligible playback devices to emit respective audio chirps that identify the emitting swap-eligible playback devices. The portable playback device 710 may then detect, via one or more microphones, the audio chirps emitted by one or more swap-eligible playback devices and select the one or more target playback devices from among the one or more swap-eligible playback devices based on the audio chirp from the one or more source playback devices indicating that the one or more target playback devices are physically nearest to the portable playback device 710 among the one or more swap-eligible playback devices. Selecting the one or more target playback devices may include comparing one or more respective metrics of the detected audio chirps emitted by one or more swap-eligible playback devices to determine that the one or more target playback devices are physically nearest to the portable playback device 710 among the one or more swap-eligible playback devices. The comparison can be performed by any of the devices in the media playback system and/or a remote computing system.

At block 1306B, the method 1300B includes swapping a playback session from the portable playback device to the one or more target playback devices. For example, the portable playback device 710 may transition its playback session to the one or more target playback devices. Transitioning the playback session may include forming a first synchrony group including the portable playback device 710 and the one or more target playback devices. Forming the first synchrony group causes the one or more target playback devices to start playing the particular audio content of the playback session.

Transitioning the playback session may further include causing playback of the particular audio content on the portable playback device 710 to stop. In some examples, playback of the particular audio content on the one or more source playback devices is stopped by removing the portable playback device 710 from the first synchrony group. Other examples are possible as well.

c. Example Home Theater Swap Method

Method 1400 illustrates an example home theater swap technique. A soundbar-type playback device may perform the home theater swap technique to cause a wearable playback device or portable playback device to play back audio received by the soundbar-type playback device and transmitted to the swap target device.

At block 1402, the method 1400 includes playing back audio while in a home theater mode. For instance, a soundbar-type playback device may play back audio while in a home theater mode. In some examples, the soundbar-type playback device is a master device of a first synchrony group. For instance, an example soundbar-type is the playback device 110h, which may operate as the sourcing device of the Den 101d bonded zone. This bonded zone includes the playback devices 110j and 110k and/or the playback device 110i, as illustrated in FIGS. 1K and 1J.

At block 1404, the method 1400 includes receiving instructions to transition to a swap mode. For instance, as illustrated in FIG. 12A, the playback device 110h may receive data representing instructions to transition to a swap mode from a wearable playback device, such as the headphones 710a. As another example, as illustrated in FIG. 12B, the playback device 110h may receive data representing instructions to transition to a swap mode from a control device 130.

At block 1406, the method 1400 includes transitioning from the home theater mode to the swap mode. The soundbar-type playback device may transition from the home theater mode to the swap mode based on receiving the data representing the instructions to enter the swap mode.

As described in connection with FIGS. 12A and 12B, transitioning from the home theater mode to the swap mode may include various steps. For instance, to facilitate the wearable playback device connecting to the playback device 110h as a satellite, the playback device 110h may transition its 802.11-compatible network interface from operating as a node in a mesh network to operating as an access point that forms a first wireless local area network (LAN) in a first wireless frequency band. Further, the playback device 110h may send, via the 802.11-compatible network interface to the wearable playback device, data representing a service set identifier (SSID) of the first wireless LAN and credentials for the first wireless LAN, which the wearable playback device may use to connect to the first wireless LAN.

Transitioning from the home theater mode to the swap mode may further include forming a second synchrony group that includes the soundbar-type playback device and the wearable playback device. For instance, the playback device 110h and the headphones 710a may form a second bonded zone after the headphones 710a connect to the first wireless LAN. After forming the second bonded zone, the playback device 110h may operate as a sourcing device for the second bonded zone. In this role, the playback device 110h sends, to the headphones 710a, data representing playback timing information for the second synchrony group and the audio. The headphones 710a play back the audio according to the timing information, as described in section IV. After forming the second synchrony group, the playback device 110h mutes playback of the audio while the headphones 710a play back the audio.

Transitioning from the home theater mode to the swap mode may further include parking one or more satellite playback device in a second wireless LAN. For instance, the playback device 110h may cause the playback devices 110j and 110k and/or the playback device 110i to connect to a second wireless LAN in a second wireless frequency band and leave the first synchrony group.

In further examples, the soundbar-type playback device may add one or more additional wearable playback devices to the swap mode concurrently with a first wearable playback device. For example, while in the swap mode, the playback device 110h may receive, from a second wearable playback device such as the earbuds 710b or another instance of the headphones 710a, data representing instructions to transition to the swap mode. Based on receiving the data representing the instructions to enter the swap mode, the playback device 110h causes the second wearable playback device to join the second synchrony group.

Causing the second wearable playback device to join the second synchrony group may include sending, to the second wearable playback device, data representing the SSID of the first wireless LAN and credentials for the first wireless LAN. For instance, after the second wearable playback device connects to the first wireless LAN formed by the playback device 110h, the playback device 110h receives an indication from the second playback device that the second playback device is ready for playback and adds the second wearable playback device to the second synchrony group that includes the playback device 110h and the headphones 710b. Then, the playback device 110h sends, to the second wearable playback device, data representing the playback timing information for the second synchrony group and the audio. The second wearable playback device plays back the audio in synchrony with the first wearable playback device based on the playback timing information, as described in connection with section VI.

d. Example Swap Method

Method 1500 illustrates another example swap method.

At block 1502, the method 1500 includes detecting a swap trigger. A swap trigger may initiate a playback session swap between one or more source playback device(s) and one or more target playback device(s). In various implementations, a source playback device or a target playback device detects the swap trigger and initiates the playback session swap. Alternatively, another associated device, such as the control device 130 or the bridge device 860, detects the trigger and initiates the playback session swap.

As described herein, some example swap triggers involve detecting user actions, such as user inputs. For instance, a source playback device (e.g., the portable playback device 710) may detect a particular input representing a swap command and initiate a playback session swap based on detecting the particular input. As another example, the control device 130 may detect a particular input representing a swap command and initiate a playback session swap based on detecting the particular input. Other examples are contemplated as well.

Other example swap triggers are based on proximity. For instance, some example swap triggers involve detecting proximity between a source playback device (or a paired device, such as a control device 130a) and a target playback device. Further example swap triggers include detecting proximity of a source playback device (or a paired device, such as a control device 130a) to a particular location, such as the home location of the media playback system 100. Other example swap triggers are described throughout, and other suitable swap triggers are contemplated as well.

At block 1504, the method 1500 includes determining one or more source playback device(s) and one or more target playback device(s). As described above, example implementations involve swapping playback between one or more portable playback devices 710 and one or more playback devices 110. The portable playback device(s) 710 may operate as the source playback device(s) or target playback device(s), depending on context. The playback device(s) 110 may likewise participate in playback session swap as the source playback device(s) or the target playback device(s).

Within examples, a source playback device is determined based on context. For instance, if the playback device 710 detects a particular input representing a swap command, the playback device 710 may initiate a playback session swap as the source playback device based on detecting this particular input. In another example, if the control device 130 detects a particular input representing a command to swap playback from the playback device 110, the control device 130 may initiate a playback session swap with the playback device 110 as the source playback device or may send data indicating the command to the playback device 110 to cause the playback device 110 to initiate a playback session swap as the source playback device.

In further examples, the context is based on proximity. For instance, if the portable playback device 710 detects proximity of one or more potential target playback devices 110, the portable playback device 710 may initiate a playback session swap with the portable playback device 710 as the source playback device. As another example, if a paired control device 130 or bridge device 860 detect proximity of one or more potential target playback devices 110 and the paired portable playback device 710 is playing back audio content, the paired control device 130 or bridge device 860 may initiate a playback session swap with the paired portable playback device 710 as the source playback device or may send data indicating the proximate playback device(s) 110 to the paired portable playback device 710 to cause the paired portable playback device 710 to initiate a playback session swap as the source playback device.

As described above in section V, in some examples, the one or more target devices are determined based on a pre-defined swap pair with the source playback devices. For instance, as illustrated in FIG. 11A, the Kitchen 101h is designated as a pre-defined swap pair with the headphones 710a. As described above, swap pairs can be configured and/or re-configured via the control device 130, or other suitable devices.

Alternatively, as described above in section V, the one or more target devices are determined based on proximity with the source playback devices. Proximity between the source playback device(s) and one or more target devices may be determined using any suitable proximity detection technique including the proximity detection techniques described above in section V. Further, as described above, "proximity" may be defined at one or more ranges, such as a location (e.g., home), zone, area, or individual device.

Yet further, in other examples, the one or more target devices are determined based on context. For instance, one or more playback devices may detect a particular input indicating a command designating the one or more playback devices as target playback devices. In further examples, the one or more target playback devices are determined based on an association between the target playback devices and a device base. For instance, if the device base 718a is associated with the kitchen 101h, placement of the portable playback device 710c on the device base 718a may trigger a playback session swap between the portable playback device 710c and the playback device 110b.

When a first playback device 110 is determined as a source or target based on context, one or more additional playback devices 110 may be determined based on a synchrony grouping between the first playback device 110 and the one or more additional playback devices 110. For instance, if the playback device 110l in the master bedroom 101b is determined as a target device, the playback device 110m is also determined as a source playback device based on the bonded pair configuration of the playback device 110m and the playback device 110l. In another example, if a Kitchen+Dining Room Zone group is configured and the playback device 110d in the Dining Room receives a swap input, the playback device 110b is determined as a source playback device as well. This facilitates a session swap from all playback devices 110 participating in the playback session.

At block 1506, the method 1500 includes swapping the playback session from the one or more source playback device(s) to the one or more target playback device(s). Within examples, the method 1500 may implement any suitable technique to swap the playback session, such as the example messaging, cloud queue, and grouping techniques described in section V. Other examples are contemplated as well.

IX. Example Bridge Device

Figure 16A:
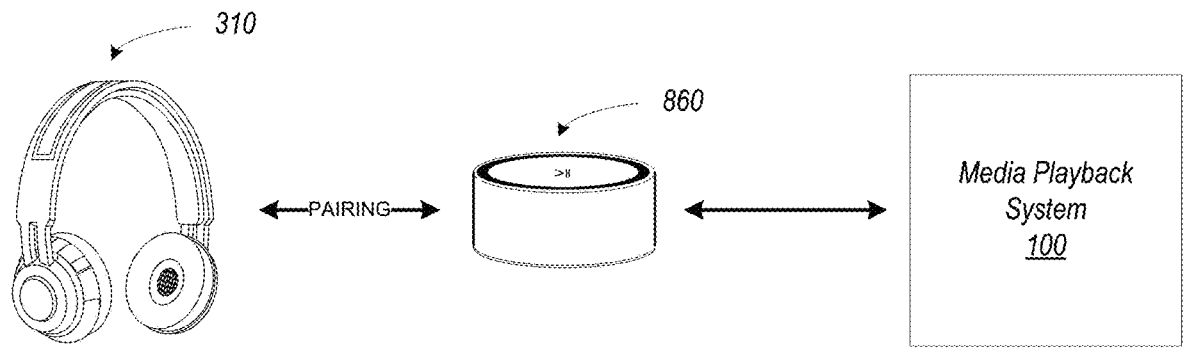
FIG. 16A is a schematic diagram illustrating an example pairing configuration between a portable playback device and a bridge device.

In some example implementations, portable playback devices, such as the headphones 710a, the earbuds 710b, or the portable playback device 710c, may interface with the media playback system 100 via a bridge device 860. FIG. 16A illustrates an example pairing arrangement between the headphones 710a and a bridge device 860a. In contrast to a general purpose smartphone or tablet which includes bridging features when configured as the control device 130, the bridge device 860a is configured with hardware and software to interface a portable playback device 710a with the media playback system 100. The bridge device 860a may also include other features to support or enhance the media playback system 100.

Like the control device 130a, the bridge device 860a may include communications interface(s), processing capabilities, and/or other features that are not necessarily implemented in the portable playback device 710a. When "the portable playback device 710a is "paired" with the bridge device 860a, the portable playback device 710a is able to utilize some of these features. This arrangement may permit the portable playback device 710a to be smaller and more portable, to draw less power, and/or to be less expensive, among other possible benefits. For instance, similar to the control device 130a, the bridge device 860a may include additional communications interfaces as compared with the portable playback device 710a. For instance, the headphones 710a may utilize a cellular data connection of the bridge device 860a to connect to the Internet. As another example, the headphones 710a may utilize a wireless network interface of the bridge device 860a to connect to the playback device(s) 110 via network 104 or to connect to the Internet.

In a further example, the portable playback device 710 may be paired with both a mobile device (e.g., a smartphone or tablet, possible implementing a control device 130 via installation of controller application software) and a bridge device 860. In such an implementation, the portable playback device 710a may stream audio content from the mobile device via a first network interface (e.g., a Bluetooth® network interface) and connect to the bridging device 860 via a second network interface (e.g., a wireless local area network interface). In this arrangement, the mobile device provides a connection to the Internet to facilitate audio streaming and the bridging device 860 functions as an interface to the media playback system 100.

In an example implementation, the bridging device 860a is bonded to a particular playback device (e.g., playback device 110c), bonded zone of playback device (e.g., playback devices 110l and 110m) or group of playback devices e.g., a "Kitchen+Dining Room" Group). Alternatively, if the home graph hierarchy is utilized, the bridging device 860a may be bonded to a particular Set, Room, or Area. Then, control of the playback device(s) 110 that are bonded to the bridging device 860a via a NMD 120 or a control device 130 also controls the paired portable playback device 710a.

Alternatively, the bridge device 860a may itself form a zone or Set. For instance, in one example, the bridge device 860a may be configured as a "Ben's Headphones" zone or "Ben's Headphones" Set. Configuring the bridge device 860a facilitates control of the paired headphones 710a with the NMD(s) 120 and/or the control device(s) 130 of the media playback system 100.

Figure 16B:
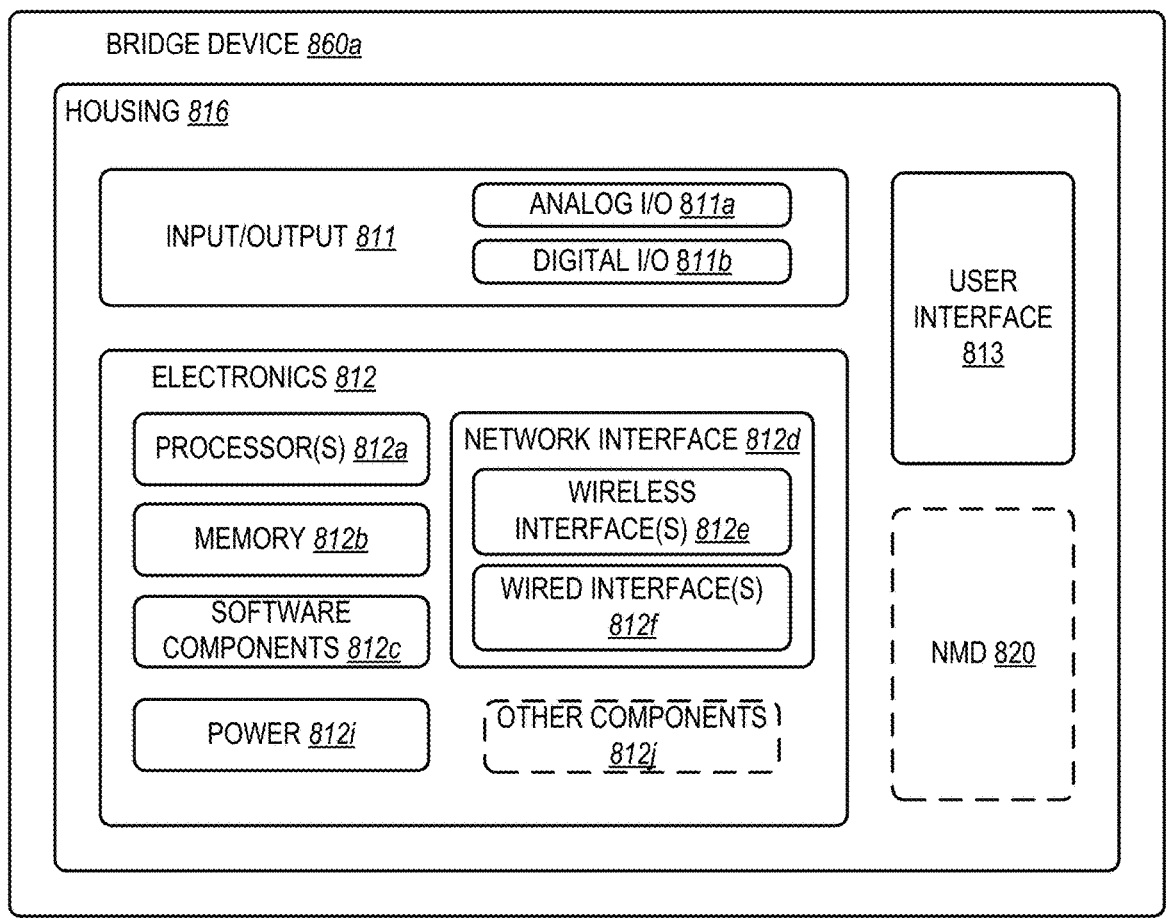
FIG. 16B is a block diagram of a bridge device configured in accordance with aspects of the disclosed technology.

FIG. 16B is a block diagram of a bridge device 860a comprising an input/output 811. The input/output 811 can include an analog I/O 811a (e.g., one or more wires, cables, and/or other suitable communication links configured to carry analog signals) and/or a digital I/O 811b. The bridge device 860a further includes electronics 812 and a user interface 813 (e.g., one or more buttons, knobs, dials, touch-sensitive surfaces, displays, touchscreens). The bridge device 860a may optionally implement a NMD 820 and include one or more microphones 815 (e.g., a single microphone, a plurality of microphones, a microphone array) (hereinafter referred to as "the microphones 815") to facilitate voice input.

In the illustrated embodiment of FIG. 16B, the electronics 812 includes one or more processors 812a (referred to hereinafter as "the processors 812a"), memory 812b, software components 812c, a network interface 812d, and power 812i. In some embodiments, the electronics 112 optionally include one or more other components 812j (e.g., one or more sensors, video displays, touchscreens).

In some examples, the electronics 812 includes one or more audio processing components 812g (referred to hereinafter as "the audio components 812g"), one or more audio amplifiers 812h (referred to hereinafter as "the amplifiers 812h"), and one or more transducers 814 to facilitate voice responses from the NMD 820. However, audio playback is not the intended purpose of the bridging device and so the audio playback capabilities are generally very limited compared with the playback devices 110 and the portable playback devices 710.

The processors 812a can comprise clock-driven computing component(s) configured to process data, and the memory 812b can comprise a computer-readable medium (e.g., a tangible, non-transitory computer-readable medium, data storage loaded with one or more of the software components 812c) configured to store instructions for performing various operations and/or functions. The processors 812a are configured to execute the instructions stored on the memory 112b to perform one or more of the operations. The operations can include, for example, pairing with a particular portable playback device 710 and related functions.

The network interface 812d is configured to facilitate a transmission of data between the bridging device 860a and one or more other devices on a data network such as, for example, the links 103 and/or the network 104 (FIG. 1B). In the illustrated embodiment of FIG. 16B, the network interface 812d includes one or more wireless interfaces 812e (referred to hereinafter as "the wireless interface 812e"). The wireless interface 812e (e.g., a suitable interface comprising one or more antennae) can be configured to wirelessly communicate with one or more other devices (e.g., one or more of the playback devices 110, NMDs 120, control devices 130, and/or portable playback devices 710) that are communicatively coupled to the network 104 (FIG. 1B) in accordance with a suitable wireless communication protocol (e.g., WiFi, Bluetooth, LTE). In some examples, the wireless interface 812e forms an ad-hoc network with a paired portable playback device 710. In some embodiments, the network interface 812d optionally includes a wired interface 812f (e.g., an interface or receptacle configured to receive a network cable such as an Ethernet, a USB-A, USB-C, and/or Thunderbolt cable) configured to communicate over a wired connection with other devices in accordance with a suitable wired communication protocol.

Figure 16C:
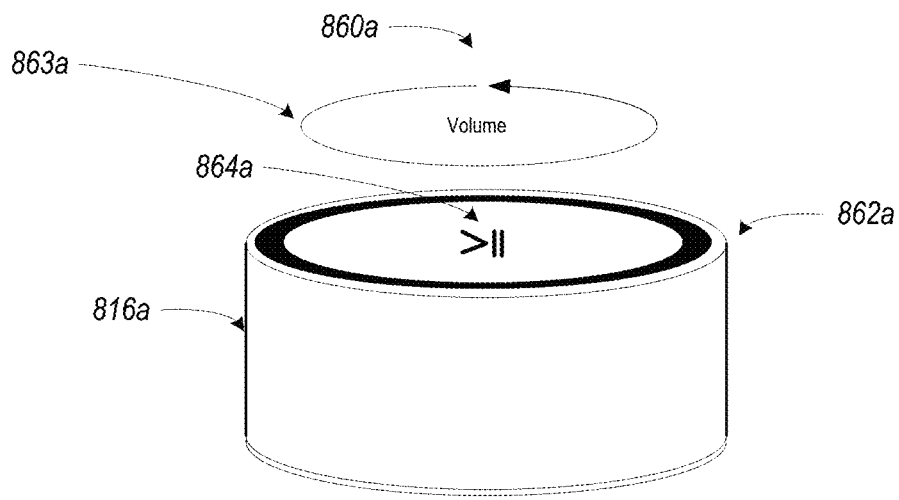
FIG. 16C is a front isometric view of a bridge device configured in accordance with aspects of the disclosed technology.

FIG. 16C is a front isometric view of the bridge device 860a configured in accordance with aspects of the disclosed technology as a command device 862a of the media playback system 100. To configure the bridge device 860a as the command device 862a, the user interface 813a of the bridge device 860a includes playback controls. Example playback controls include transport (e.g., play/pause, skip forward/backward) and volume controls, among other examples. Similar to the control device 130, input to these playback controls are translated into playback commands via the software components 812c and transmitted to one or more playback devices 110 and/or 710 to control playback via the network interface 812d.

In example implementations, the command device, as compared with the control device(s) 130, is configured to control only paired and/or bonded playback devices, rather than the playback devices 110a-n of the media playback system 100 generally. For instance, in the FIG. 16A example in which the bridge device 860a is paired with the portable playback device 710a, playback commands issued on the command device 862a are carried out on the portable playback device 710a. Further, when the bridge device 860a is bonded with one or more playback devices 110, playback commands issued on the command device 862a are also carried out on the bonded playback devices 110.

The user interface 813a of the bridge device 860a includes a dial 863a to facilitate volume control of paired playback device(s) 710 and/or bonded playback device(s) 110. In this example, the dial 863a is formed by a first portion of the housing 816a rotating about a base of the housing 816a, as illustrated in FIG. 16C. Clockwise and counter-clockwise rotations of the dial 863a correspond to upward and downward volume adjustments.

Figure 16D:
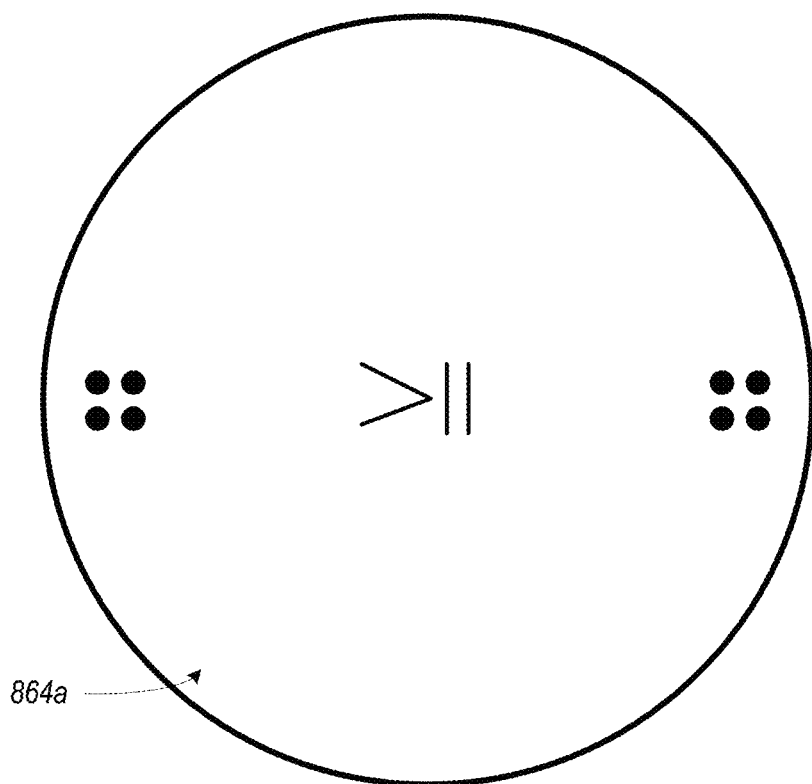
FIG. 16D is a view of a touch-sensitive region implemented in a bridge device configured in accordance with aspects of the disclosed technology.

The user interface 813a of the bridge device 860a also includes a touch-sensitive region 864a to facilitate transport control of paired playback device(s) 710 and/or bonded playback device(s) 110, as shown in FIG. 16D. The touch-sensitive region 864a is formed on the top surface of the housing 816a, as shown in FIG. 16C. The touch-sensitive region 864a may be implemented as a capacitive or resistive touch-sensitive region, among other examples. In this example, a touch-input to the center of the touch-sensitive region 864a is interpreted as a play/pause toggle. The touch-sensitive region 864a may also interpret certain inputs as skip forward and backward. For instance, touch-inputs to the right and left sides of the touch-sensitive region 864a may be interpreted as a skip forward and skip backward, respectively. Alternatively, a left-to-right swipe gesture on the touch-sensitive region 864a may be interpreted as a skip forward while a right-to-left swipe gesture is interpreted as a skip forward.

In certain implementations, the user interface 813a of the bridge device 813a is intentionally limited to a certain subset of playback commands as compared with the "full-featured" control supported by the control device(s) 130. As illustrated in FIGS. 16C and 16D, such a subset may include volume control and transport control (and perhaps only certain transport controls). Such a simplified, minimalist user interface may enhance the user experience of the paired playback device(s) 710 or bonded playback device(s) 110 by reducing distraction, among other possible benefits.

In embodiments of the command device 862a that exclude library and/or search controls to select audio content for playback, initiating playback via the command device 862a may start a particular audio container. The particular audio container may be pre-configured by the user via the control device 130 or selected automatically by the media playback system. Example audio containers include playlist, Internet radio stations, albums, and podcasts.

Figure 16E:
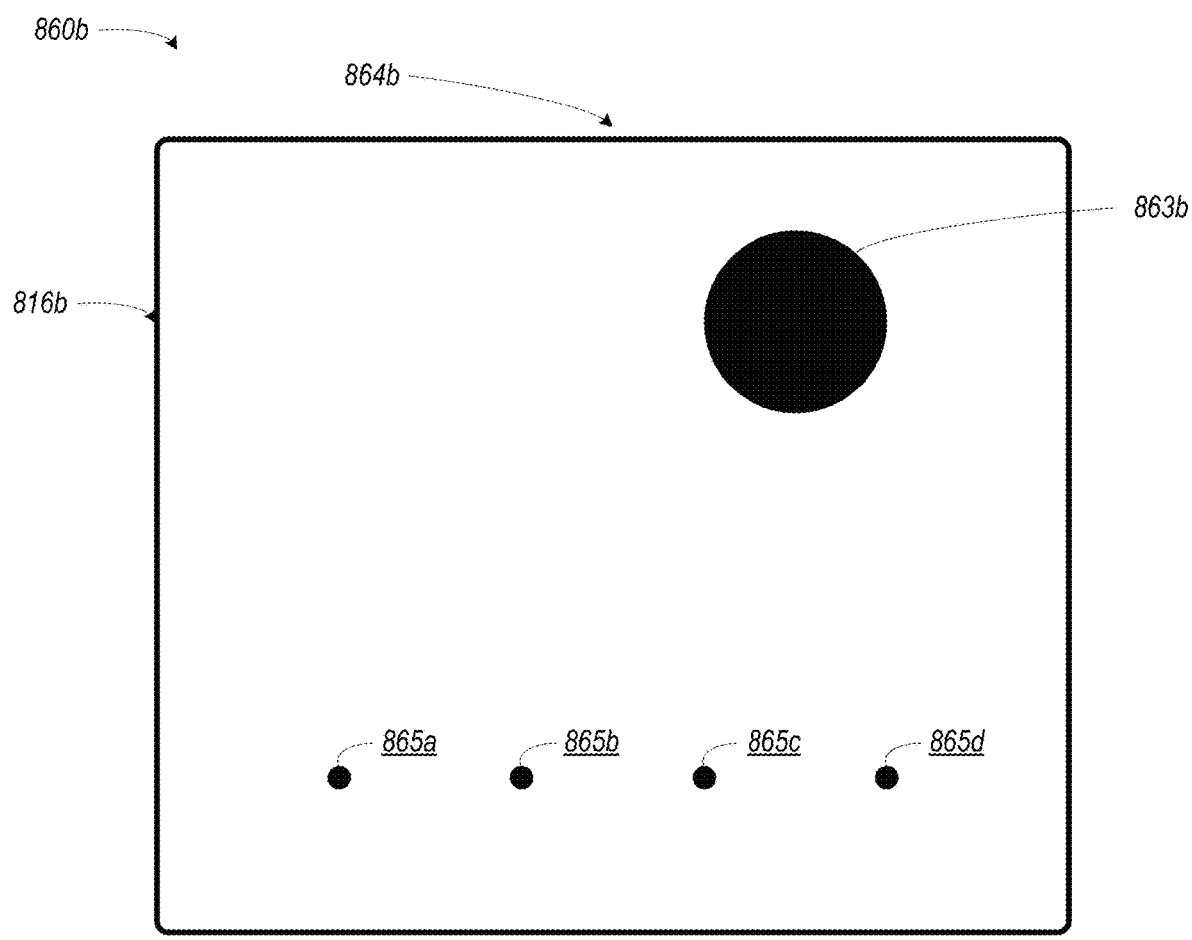
FIG. 16E is a front view of a bridge device configured in accordance with aspects of the disclosed technology.

FIG. 16E is a front view of an example bridge device 860b. In contrast to the circular housing 816a of the bridge device 860a, the housing 816b of the bridge device 860b is more rectangular. A user interface 813b of the bridge device 860b includes a dial 863b on the front surface of the housing 816b, a touch-sensitive region 864b on the top surface of the housing 816b, as well as buttons 865a-d on the front surface of the housing 816b. Like the dial 863a, the dial 863b facilitates volume control of portable playback devices 710 paired to the bridge device 860b and/or playback devices 110 bonded to the bridge device 860b. Furthermore, the touch-sensitive region 864b facilitates transport control of paired portable playback devices 710 and/or bonded playback devices 110 in a similar manner to the touch-sensitive region 864a.

The buttons 865a-d correspond to respective audio containers. The particular audio containers may be pre-configured by the user via the control device 130 or selected automatically by the media playback system (e.g., based on user designated favorites or listening frequency). Selection of a particular button 865 causes the paired playback device 710 and/or bonded playback devices 110 to initiate playback of the corresponding container, similar to how a radio preset tunes a radio to a corresponding radio station.

For instance, selection of the button 865a causes the bridge device 860b to send one or more instructions to the paired playback device 710 to play back the audio container corresponding to the button 865a. The one or more instructions may include a URI indicating the location of the audio container at a computing device 106 (e.g., a content server of a streaming audio service). The paired playback device 710 then streams the audio container from the computing device 106 and plays back that audio container.

In some implementations, the bridge device 860 may include a graphical display. In such examples, the user interface 813 of the bridge device 860 may include a graphical user interface displayed on the touch-sensitive graphical display. In some examples, the graphical display is touch-sensitive to facilitate touch input to the graphical user interface. Yet, the graphical user interface may have limited playback controls as compared with the control devices 430 and 530, which may reduce distraction caused by the presence of the graphical display, among other possible benefits.

Figure 17A:
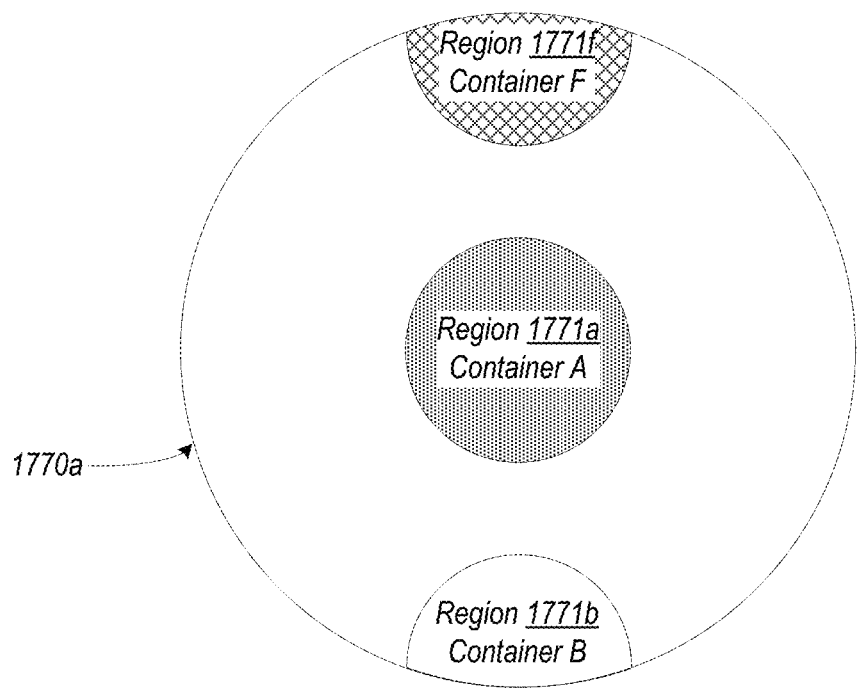
FIGS. 17A, 17B, 17C, 17D, 17E, and 17F are schematic diagrams of a bridge device user interface in various stages of operation in accordance with aspects of the disclosed technology.

To illustrate, FIG. 17A presents a first user interface display 1770a configured for display on a bridge device having a circular touch-sensitive graphical display. For instance, an example implementation of the bridge device 860a may implement the touch-sensitive region 864a as a circular touch-sensitive graphical display. Other shapes and arrangements of touch-sensitive graphical displays are contemplated as well.

The first user interface display 1770a includes a plurality of regions 1771a-f, which are similar to the buttons 865a-d (FIG. 8F). In the first user interface display 1770a, the regions 1770a-g are selectable via touch input to the respective region. Each region 1771 corresponds to a respective audio container. The particular audio containers may be pre-configured by the user via the control device 130 or selected automatically by the media playback system (e.g., based on user designated favorites or listening frequency). Example audio containers include Internet radio stations, playlists, albums, podcasts, as well as other streaming audio content. Selection of a particular button 865 causes the paired playback device 710 and/or bonded playback devices 110 to initiate playback of the corresponding container.

Figure 17B:
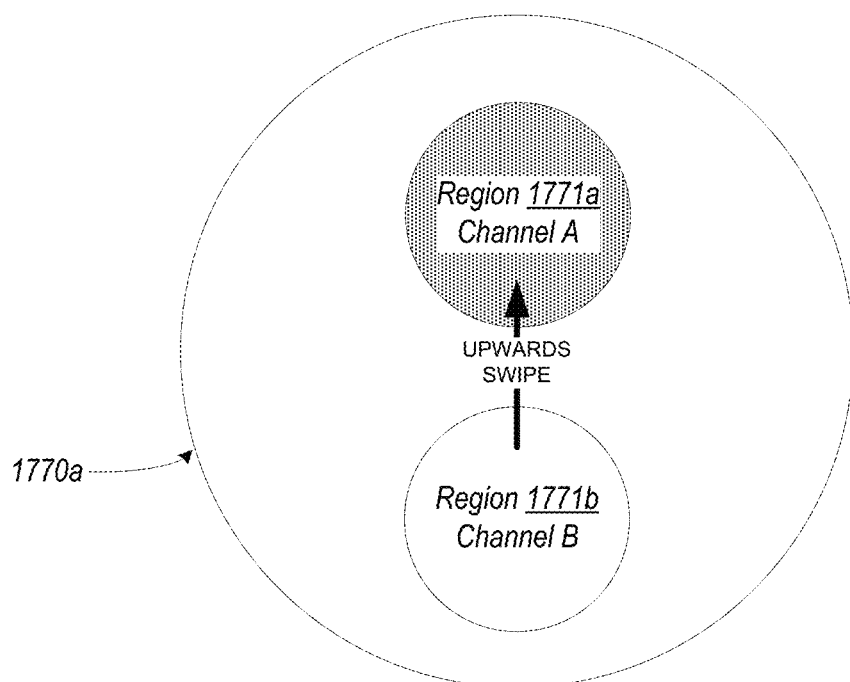
Figure 17C:
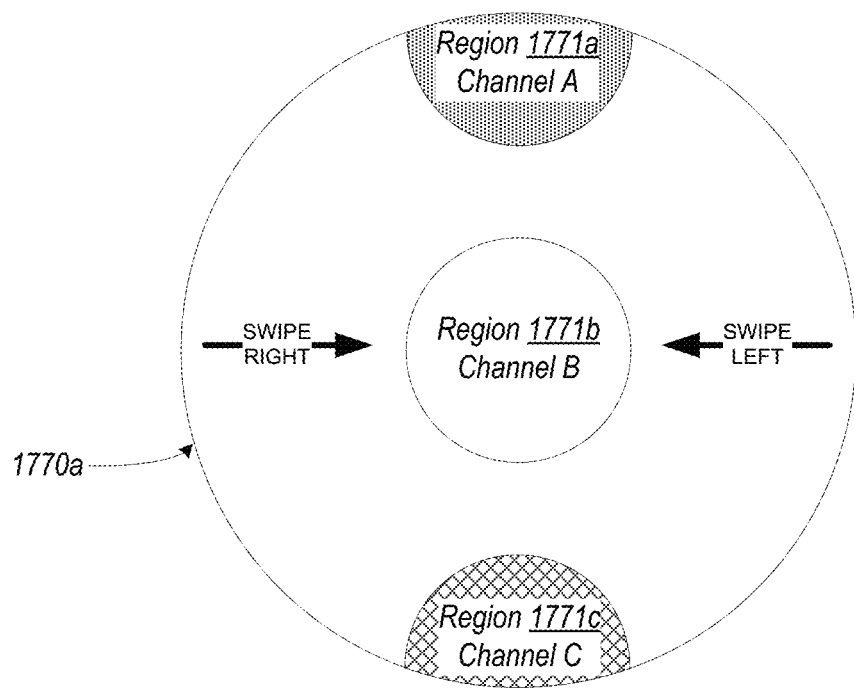

Presently, by way of illustration, region 1770a is shown in a central position in the first user interface display 1770a. Regions 1771b and 1771f are partially shown at bottom and top positions, respectively, in the first user interface display 1770a. By scrolling the first user interface display 1770a upwards or downwards using upwards or downwards swipe gestures, respectively, regions 1771b or 1771f can be fully displayed and the regions 1771c-e can be displayed as well in round robin fashion. To illustrate, FIG. 17B illustrates an upwards swipe causing the region 1771b to move towards the central position. FIG. 17C illustrates the region 1771b in the central position after the upwards swipe of FIG. 17B. As shown in FIG. 17C, regions 1771*a* and 1771*c* are partially displayed when region 1771*b* is in the central position.

When a particular region 1771 (e.g., region 1771*a*) is selected, the bridge device 860 causes the paired playback device(s) 710 and/or bonded playback device(s) 110 to initiate playback of the corresponding container. When the region 1771*a* is selected again while the container is playing back, the bridge device 860 causes the paired playback device(s) 710 and/or bonded playback device(s) 110 to stop playback of the corresponding container. In this manner, the regions 1771 function as a play/pause button.

Other transport controls may be implemented by the graphical user interface. For instance, as illustrated in FIG. 17C, swipe gestures in the first user interface display 1770*a* correlate to skip forward and skip backward. In particular, a swipe left may cause a skip forward while a swipe right causes a skip backward.

Figure 17D:
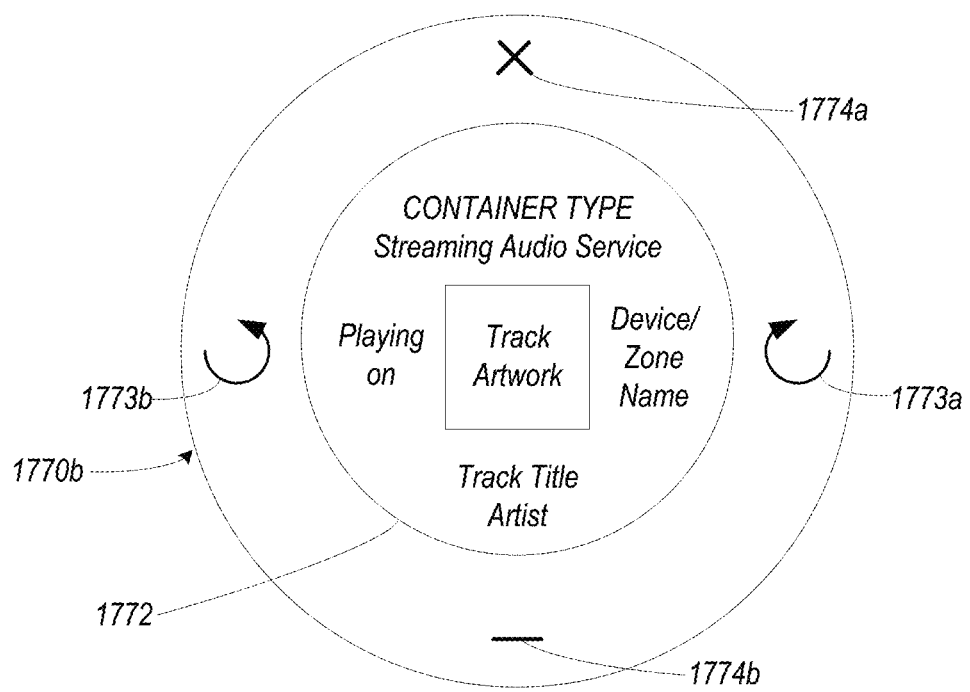

FIG. 17D presents a second user interface display 1770*b*, which may be displayed based on selection of region 1771*a*. The second user interface display 1770*b* includes a region 1772 that includes a graphical representation of audio content playing back on the paired playback devices 710 and/or bonded playback devices 110, as well as media content information corresponding to the audio content. For instance, if the selected audio container is playing an audio track, metadata corresponding to the audio track is displayed in region 1772.

The second user interface display 1770*b* may also include one or more transport controls. To illustrate, the second user interface display 1770*b* includes a jump forward control 1773*a* and a jump backward control 1773*b*. In various implementations, the second user interface display 1770*b* may include other transport controls as well. For instance, swipe gestures in the second user interface display 1770*b* may correlate to skip forward and skip backward, similar to the first user interface display 1770*a*.

The second user interface display 1770*b* may further include navigational controls. By way of example, the second user interface display 1770*b* includes navigational controls 1774*a* and 1774*b*. Navigational control 1774*a* causes the bridge device 860 to display the first user interface display 1770*a*. Navigational control 1774*b* causes the bridge device 860 to display a third user interface display 1770*c* including a queue.

Figure 17E:
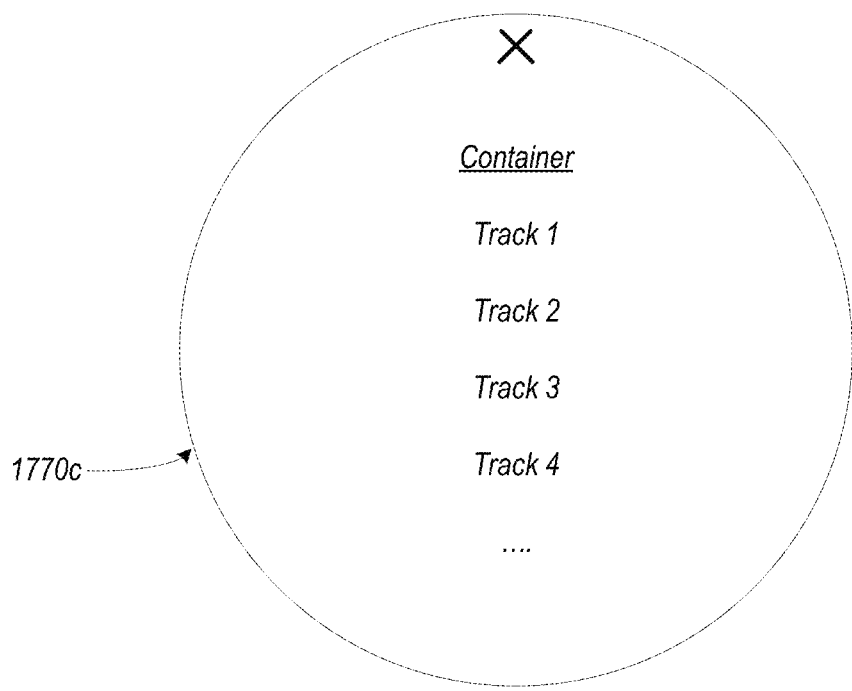

To illustrate, FIG. 17E presents a third user interface display 1770*c*, which may be displayed based on selection of navigational control 1774*b*. As shown, the third user interface display 1770*c* includes an interface to browse within the audio container. Selecting an individual audio track or other media item within the audio container causes playback of that media item. For instance, if the selected audio container is a playlist, the third user interface display 1770*c* lists the audio tracks of the playlist. As another example, if the selected audio container is a podcast, the third user interface display 1770*c* may display other audio content available within that container (e.g., episodes of a podcast).

Figure 17F:
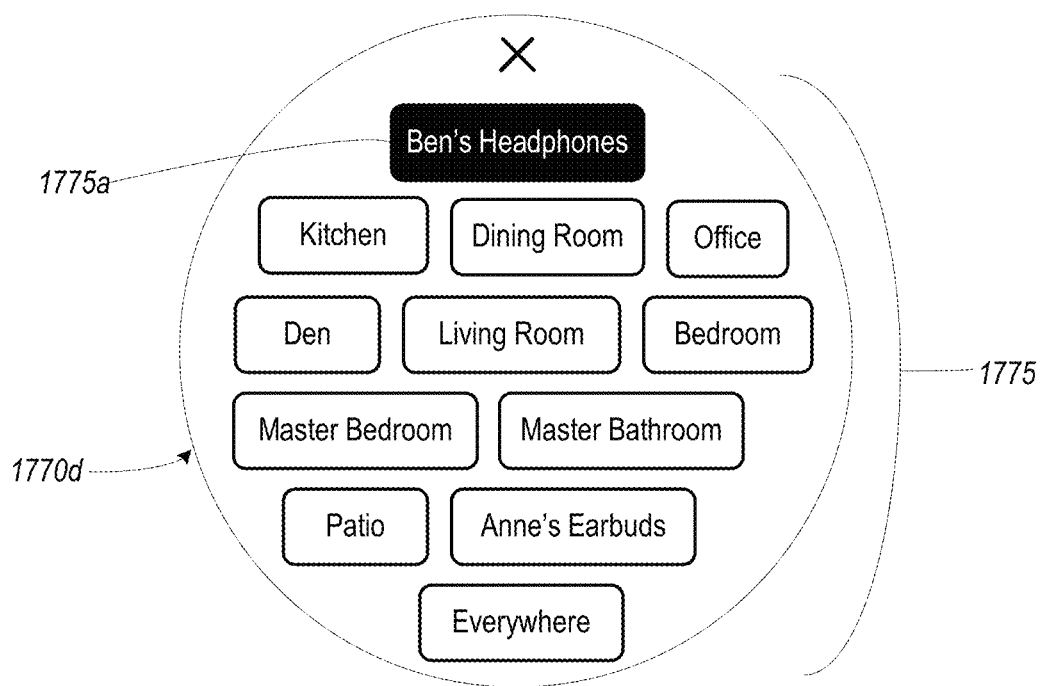

In some implementations, the graphical user interface facilitates selecting portable playback device(s) 710 to pair with the bridge device 860 and/or playback device(s) 110 to bond with the command device 862. To illustrate, FIG. 17F presents a fourth user interface display 1770*d* with a plurality of toggle controls 1775 corresponding to respective portable playback devices 710 and zones. Toggling a toggle control 1775 pairs or bonds the corresponding portable playback device(s) 710 or playback device(s) 110 with the bridge device. As shown, the toggle control 1775*a* corresponding to the headphones 710*a* is toggled on such that the headphones 710*a* are paired with the bridge device 860.

Selection of multiple zone names causes a zone group to be formed between the zones (if not already formed) and the bridge device 860 to be paired with the zone group (and thereby control all playback devices 110 in the zone group). Selection of the "Everywhere" toggle places the media playback system 100 into party mode (in which all playback devices 110 play music synchronously) and pairs the bridge device 860 with all playback devices 110 in the media playback system 100.

Figure 18A:
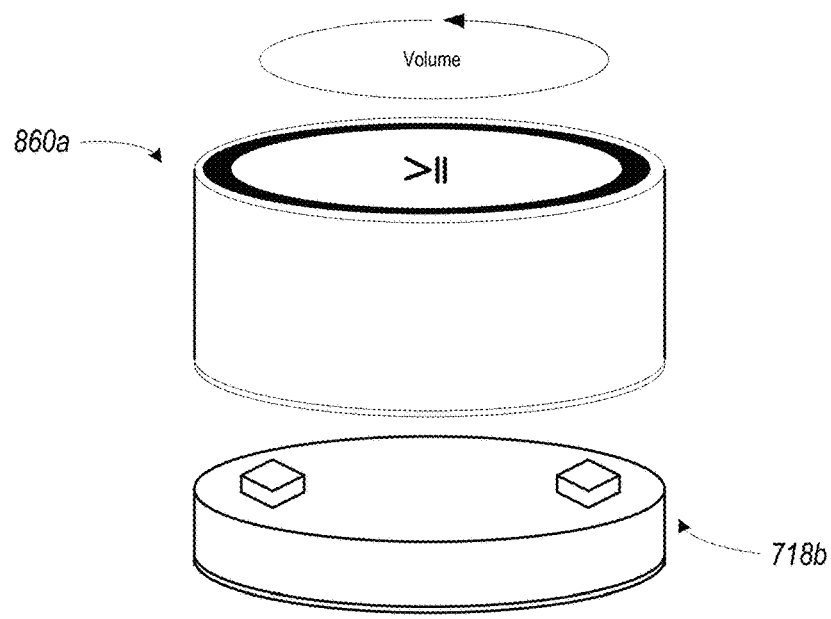
FIG. 18A is a view of an example arrangement between a bridge device and a device base.

Within example embodiments, the bridge device 860 charges one or more batteries via placement on the device base 718. FIG. 18A illustrates placement of the bridge device 860*a* on a device base 718*b*. The bridge device 860*a* may interact with the device base 718*b* in the same or similar manner as the portable playback device 710*c*. For instance, if the device base 718*b* is associated with a zone of the media playback system 100, placement of the bridge device 860*a* on the device base 718*b* causes the bridge device 860*a* (and paired portable device(s) 710) to join the associated zone.

In example implementations, the bridge device 860*a* is rotatable about the device base 718*b* to control volume of the portable playback device 710 paired to the bridge device 860*a*. In some implementations, rotation of the bridge device 860*a* about the device base 718*b* also controls volume of playback device(s) 110 bonded to the bridge device 860*a*. Similar to the bridge device 718*a*, the bridge device 860*a* may rotate with respect to the device base 718*b*, which may generate a volume control signal in a sensor of the bridge device 860*a* and/or device base 718*b*. In another example, a first portion of the device base 718*b* is rotatable with respect to a second portion of the device base 718*b*. Rotation of these two portions generates a volume control signal in a sensor of the device base 718*b* that controls volume of the paired playback device 710 when the bridge device 860*a* is placed upon the device base 718*b*.

Figure 18B:
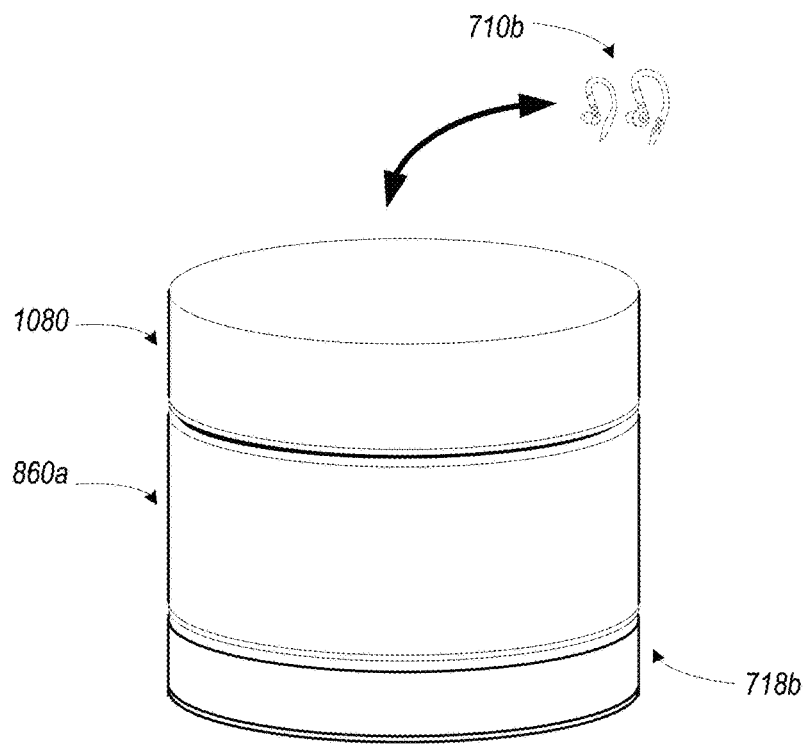
FIG. 18B is a view of an example arrangement between a portable playback device, a bridge device and a device base.

The bridge device(s) 860 of the media playback system 100 may also have other features that support the portable device(s) 710 of the media playback system. For instance, the bridge device(s) 860 may support charging the portable device 170. To illustrate, FIG. 18B illustrates an example stacking arrangement that includes the device base 718*b* charging the bridge device 860*a*, and the bridge device 860*a* charging the earbuds 710*b* via a charging case 1080. Similar to the device base 718, the bridge device 860*a* may charge the earbuds 710*b* via inductive charging or via conductive terminals. In some implementations, the device base 718*b* may directly charge the earbuds 710*b* via placement of the charging case 1080 on the device base 718*b*. Other form factors of the charging case 1080 may be used to charge other form factors of the portable playback devices 710 (e.g., the headphones 710*a*).

Figure 18C:
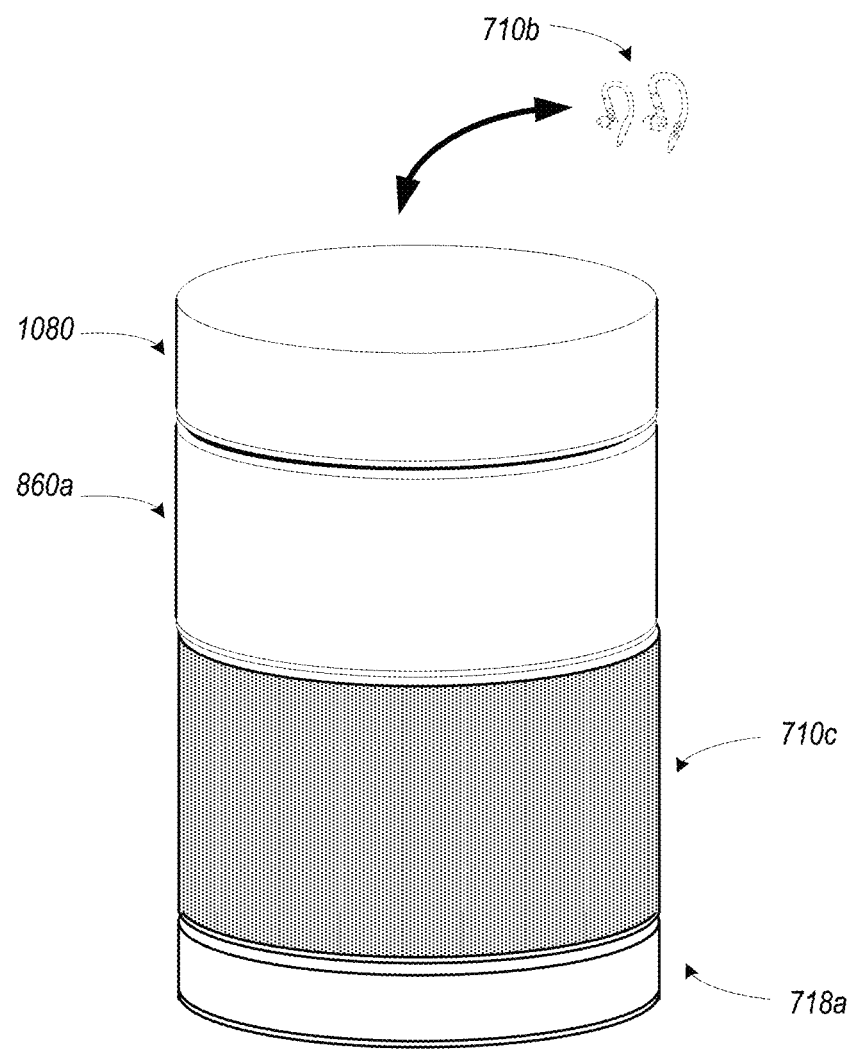
FIG. 18C is a view of an example arrangement between a first portable playback device, a bridge device, a second portable playback device, and a device base.

FIG. 18C illustrates another example stacking arrangement to facilitate device charging. In this example, the device base 718*a* charges the portable playback device 710*c*. The portable playback device 710*c* charges the bridge device 860*a*. The bridge device 860*a* charges the earbuds 710*b* via a charging case 1080. In this arrangement, only the device base 718*a* requires external power to charge the various stacked devices.

X. Additional Swap Examples

In some examples, the source and target of a swap are pre-defined. In a pre-defined swap pair, the source is the playback device 710 or the one or more playback devices 110 that are playing audio content and the target is the other playback device that is not playing back audio content. Playback swapping between the source and targeted playback devices is performed when a swap trigger action such as a button press or other user input is detected.

In some implementations, an input to the source device of a swap pair triggers a swap. For instance, a particular input to user interface 713a of the headphones 710 (FIG. 7B) such as a tap or gesture to the touch-sensitive region (or a portion thereof) may trigger the swap. In further examples, the portable playback device 710 may include a physical button to trigger the swap. Yet further, a pattern of touch-inputs (e.g. short, long, short) or a tracing pattern (e.g., a shape such as a zig-zag or triangle) may trigger a swap. Other types of inputs are contemplated as well.

Additionally or alternatively, an input to the target device triggers a swap. For instance, a particular input to user interface 113 of the playback device 110a (FIG. 1C) may trigger the swap. In further examples, the playback device(s) 110 may include a physical button to trigger the swap. Manipulating the button (e.g., by selecting, touching, sliding, etc.) triggers the swap. Other types of inputs are contemplated as well.

Figure 19A:
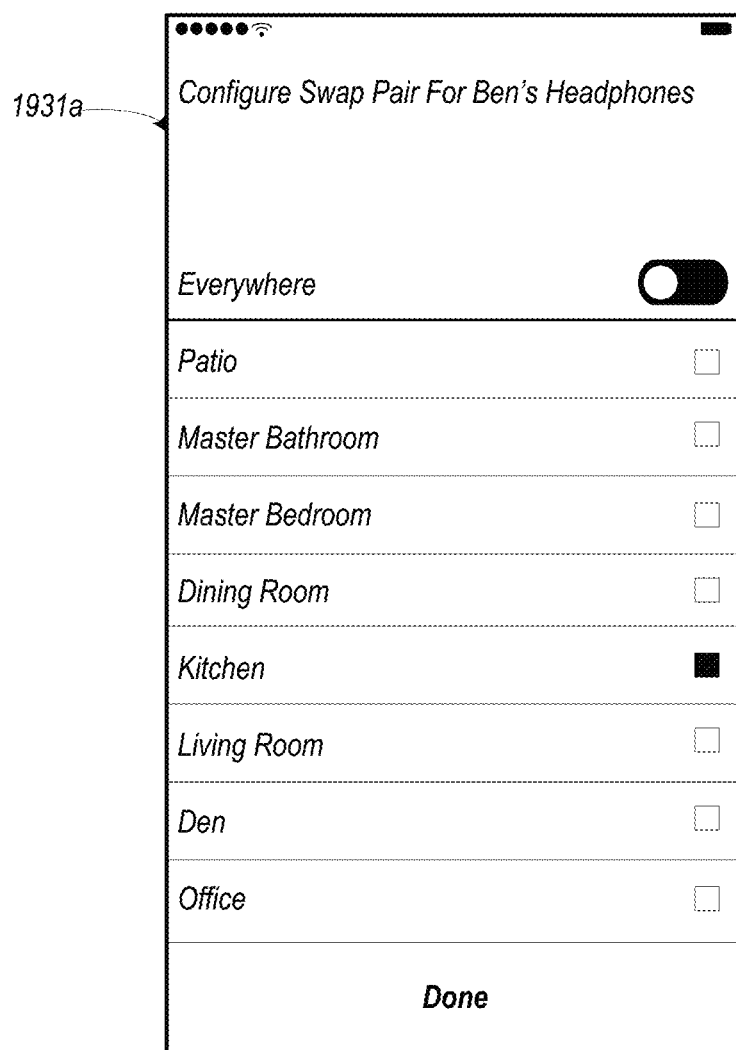
FIGS. 19A, 19B, and 19C are schematic diagrams of a control device user interface in various stages of operation in accordance with aspects of the disclosed technology.

Within examples, a user interface, such as the user interface 133 of the control device 130a, or the user interface 813 of the bridge device 860a, may facilitate defining a pre-defined swap pair. To illustrate, FIG. 19A presents a first user interface display 1931a to facilitate defining a swap pair for the headphones 710a ("Ben's Headphones"). The first user interface display 1931a is configured for display on the control device 430 by way of example but may be adapted to be displayed on other example devices disclosed herein. The control device 430 may display the first user interface display 1931a during a set-up procedure for the headphones 710a. Further, the user may display the first user interface 1931a via a settings user interface display, among other examples.

As shown, the first user interface display 1931a includes graphical indications of the zones (i.e, zone names) within the media playback system 100 and a toggle control corresponding to each zone. Toggling a toggle control configures the corresponding zone as a swap pair with the headphones 710a. In this example, the kitchen 101h is defined as a swap pair with the headphones 710c. While toggle controls are shown by way of example, other types of controls may be used in alternative implementations. Example user interfaces may include functionally similar user interface displays to define swap pairs for other portable playback devices 710 of the media playback system 100 (e.g., the earbuds 710b and/or the portable playback device 710c). Pre-defined swap pairs may be stored in data storage of the control device(s) 130, the playback device(s) and/or the portable playback devices 710, perhaps as one or more state variables shared among these devices.

Alternatively, if the home graph hierarchy is implemented, a similar user interface display may include graphical indications of the Sets, Rooms and/or Areas of the Home Graph configured in the media playback system 100. This user interface display may include toggle controls or other similar controls corresponding to each Set, Room and/or Area. In this example, toggling a toggle control configures the corresponding Set, Room and/or Area as a swap pair with the headphones 710a.

Figure 19B:
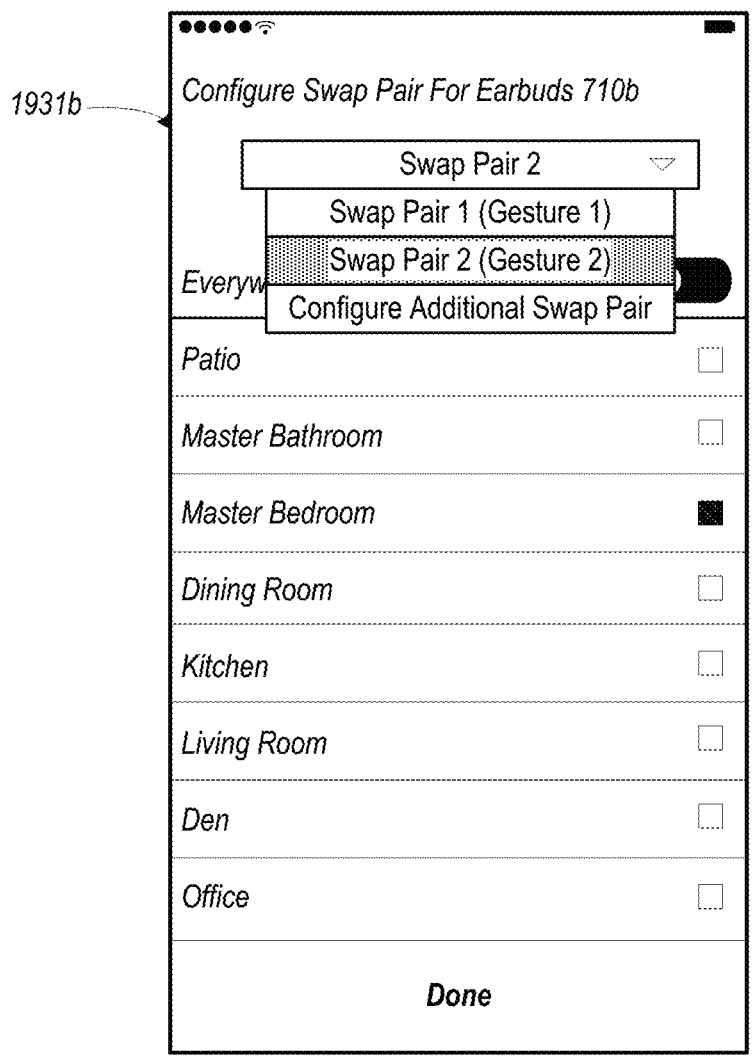

In some implementations, the media playback system 100 may define two or more swap pairs for a portable playback device. To illustrate, FIG. 19B presents a second user interface display 1931b to facilitate defining multiple swap pairs for the earbuds 710b. As shown, each pre-defined swap pair corresponds to a different input (e.g., a different gesture). Providing an input corresponding to a particular pre-defined swap pair triggers a swap for that swap pair.

Figure 19C:
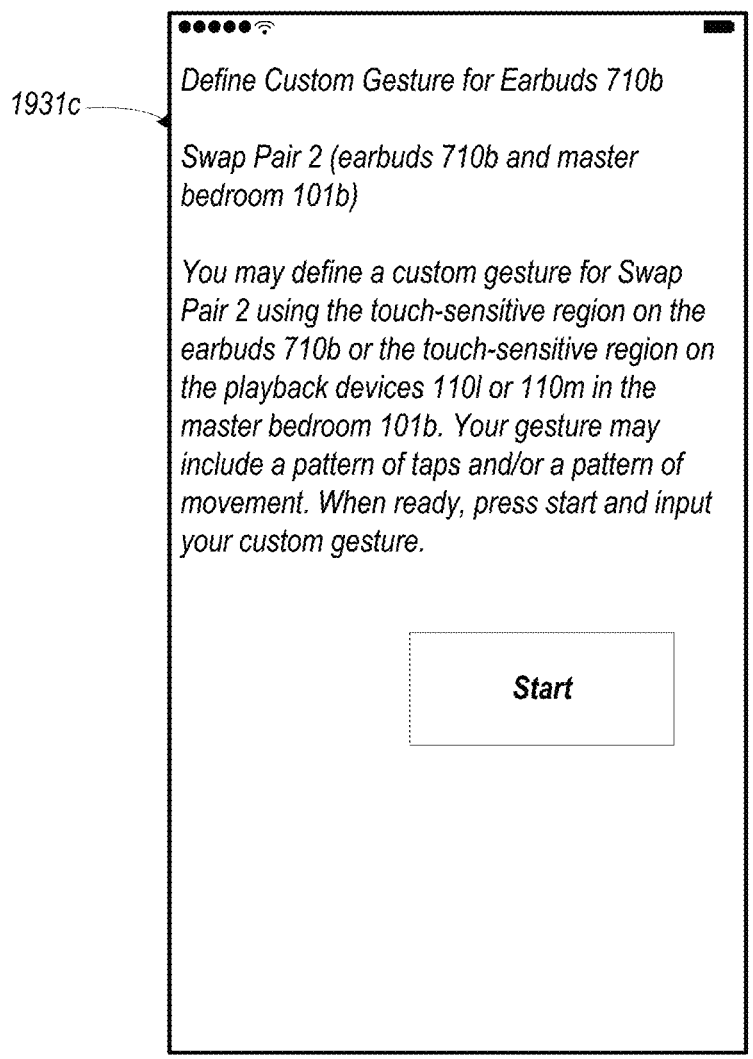

A user may define custom inputs corresponding to the pre-defined swap pairs. To illustrate, FIG. 19C presents a third user interface display 1931c to facilitate defining a custom gesture. As shown, the third user interface display 1931c includes a prompt to provide a custom gesture. After pressing start, the earbuds 710b and the playback devices 110l and 110m in the swap pair monitor their respective user interfaces 713b and 113 to detect the custom input and then store the custom input in data storage.

In further examples, placement of a portable playback device 710 upon a charging base triggers a swap. For instance, placement of the portable playback device 710c upon the device base 718a (FIG. 7F) may trigger a swap. In some implementations, the swap target is pre-defined for the portable playback device 710c.

Alternatively, the device base 718a may be bonded with one or more particular zones. Then, placement of the portable playback device 710c upon the device base 718a triggers a swap to the one or more particular zones. Additional details regarding bonding zones to a device base can be found, for example, in U.S. Pat. No. 9,544,701 entitled, "Base Properties in a Media Playback System," which, as noted above, is incorporated herein by reference in its entirety.

In further examples, an input to a user interface of the device base 718a may trigger the swap. Example inputs include a button press (or other manipulation) or a touch-input to a touch-sensitive region, similar to the example inputs described above. For instance, a particular gesture may be interpreted by the device base 718a as a swap trigger.

In further examples, an input to the user interface 113 of the NMD 120a triggers a swap. For instance, a user may speak a voice input as "swap to kitchen." As described above in connection with FIGS. 3A-3D, a user may activate a voice assistance service to process voice input with an activation word or a button press (e.g., push-to-talk). This voice input includes a first command indicating the action ("swap"), and a second command indicating the target playback device for the action ("kitchen"). Here, as described above in connection with FIGS. 3A-3D, the voice input is transmitted to the voice assistance service and processed. In some cases, the instructions corresponding to the processed voice commands are transmitted back to the source playback device or target playback device to cause the playback session swap to be performed. Alternatively, instructions corresponding to the processed voice commands are transferred to a server to cause the playback session swap to be performed, as described in further detail below in connection with FIGS. 12B and 12C. Following the swap, the NMD 120a may audibly confirm the swap with a voice response, such as "<audio content name> is now playing in the kitchen."

In some cases, both the source playback device and the target playback device are playing audio content when a swap trigger is detected. In such examples, respective playback sessions of the source playback device and the target playback device may be swapped, such that the source playback device begins playing back audio content previously playing on the target and the target begins playing back audio content previously playing on the source. Alternatively, the playback session of the source playback device is swapped to the target playback device and playback is stopped on the target.

Within example implementations, the source playback device may facilitate a swap by sending playback session data to the target device. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. In example implementations, the offset may be set to a playback position in the audio content of the current playback position to allow time for the target device to start buffering the audio content. Then, the source playback device stops playback of the audio content at the offset and the target playback device starts playback of the audio content at the offset.

The playback session data may further include one or more identifiers corresponding to the playback session. For instance, the playback session data may include a session identifier that distinguishes the playback sessions from other playback sessions. The playback session data may also include an application identifier identifying the media playback system controller application software controlling the playback session. In addition, the playback session data may include a streaming audio service identifier identifying the streaming audio service hosting the audio content at the source, as well as an audio item identifier (e.g., a unique identifier used by the streaming audio service to identify the audio content). As another example, a household identifier may be included in the playback session data to distinguish the media playback system 100 from other media playback systems. As a further example, a group identifier may identify the device(s) in a zone, bonded zone, or zone group.

The playback session data may further include data representing playback state. Playback state may include a playback state of the session (e.g., playing, paused, or stopped). If the playback session implements a playback queue, the playback session data may include the playback queue state, such as the current playback position within the queue.

The playback queue state may also include a queue version. For example, in a cloud queue embodiment, the cloud queue server and the media playback system 100 may use the queue version to maintain consistency. The queue version may be incremented each time the queue is modified and then shared between the media playback system 100 and cloud queue server to indicate the most recent version of the queue.

Further, the playback session data may also include authorization data, such as one or more keys and/or tokens. Such authorization data may include a token associated with the user account. During a playback session swap, the media playback system 100 may verify that the token is authorized on both the source and target playback devices. The authorization data may further include a token associated with the streaming audio service, which may enable the target playback device to access the audio content at the source. Yet further, the authorization data may include a token associate with the playback session, which enables the target playback device to access the session. Other example authorization data is contemplated as well.

Figure 20A:
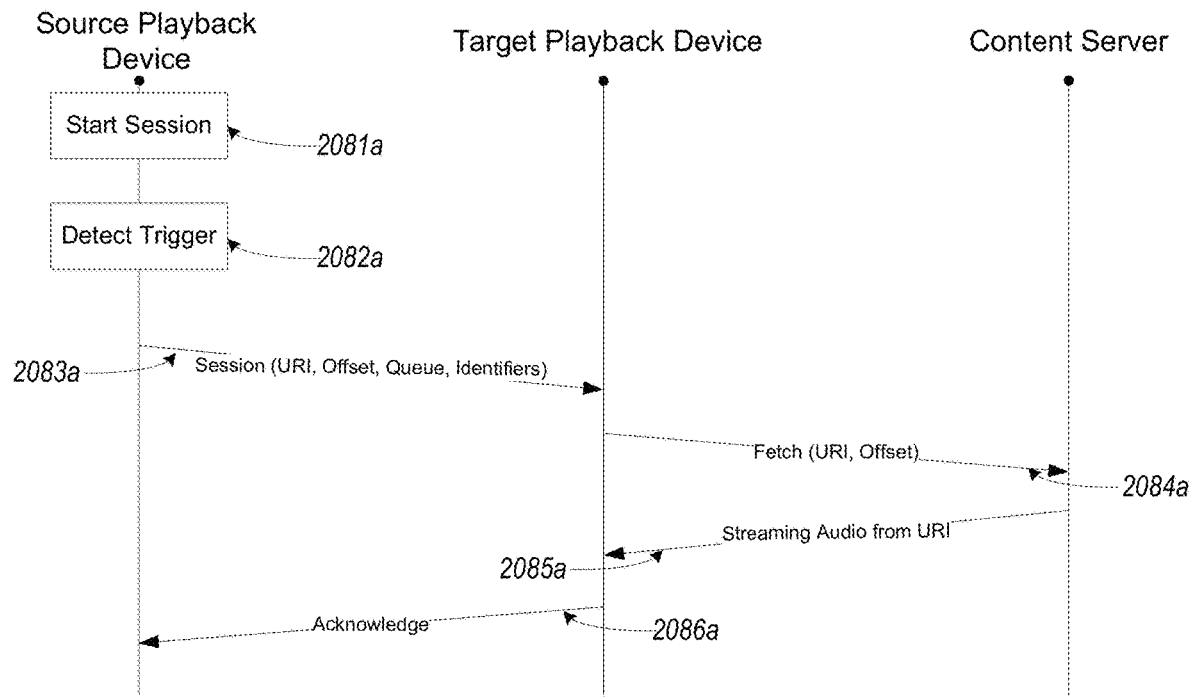
FIGS. 20A, 20B, and 20C are example messaging diagrams to illustrating example playback session swap techniques.

To illustrate, FIG. 20A is an example message flow diagram showing instructions exchanged between the source playback device, the target playback device, and a content server during an example swap of a playback session. Such messages are representative and may include additional or fewer messages. In some implementations, rather than the messages being sent from a portable playback device 710 (as a source or target playback device), the messages are sent from a paired control device 130a (FIG. 7G) or paired bridge device 860a (FIG. 16A).

At 2081a, the source playback device starts a playback session. The playback session may be initiated on the source playback device, the control device 130, or the bridge device 860, among other examples. In some cases, the playback session may include one or more additional playback devices playing back in synchrony with the source playback device as part of a group.

At 2082a, the source playback device detects the swap trigger, such as any of the example swap triggers described above, among other examples. In some cases, another device (e.g., the target playback device, the control device 130, the device base 718, or the bridge device 860) detects the swap trigger and transmits data indicating that a swap trigger was detected to the source playback device.

At 2083a, the source playback device sends playback session data to the target playback device. As shown by way of example, the playback session data includes data representing URI indicating a source of the currently playing audio content in the session (e.g., the currently playing audio track). The playback session data also includes data representing an offset in the audio content indicating a position in the audio content to start playback. In addition, if the source playback device is playing back audio content from a queue, the playback session data may further include data representing the queue, which may include URIs corresponding to respective media items in the queue, as well as an order of the queued media items. Further, the playback session data includes one or more identifiers, as described above.

At 2084a, the target playback device sends a fetch message to the content server to request a stream of the audio content from the content server. The fetch message may include a URI indicating the source of the audio content at the content server. The fetch message may further include an offset. The fetch message may include other data as well, such as one or more identifiers and/or authorization data.

Based on this fetch message, at 2085a, the content server streams the audio content to the target playback device for playback. The content service may begin the stream at the offset in the audio content. The target playback device then begins playing back the audio content at the offset in the audio content.

At 2086a, the target playback device sends an acknowledge message to the source playback device after receiving the playback session data. In example implementations, the source playback device might not stop the playback session until receiving the acknowledge message from the target playback device. The acknowledgement message may indicate that the swap was successful.

Other example implementations utilize a cloud queue to facilitate the playback session swap. In contrast to a queue in data storage of the playback devices 110 (i.e., a local queue), a cloud queue for a playback session is maintained in the cloud on a computing device 106. In this implementation, rather than controlling the playback devices 110a-n locally via the networks 104, the control device 130a controls the playback devices 110a-n via the computing device 106 by manipulating the cloud queue on the computing device 106. The computing device 106 synchronizes the cloud queue (or a portion thereof) with the playback device(s) 110 participating in the playback session.

Figure 20B:
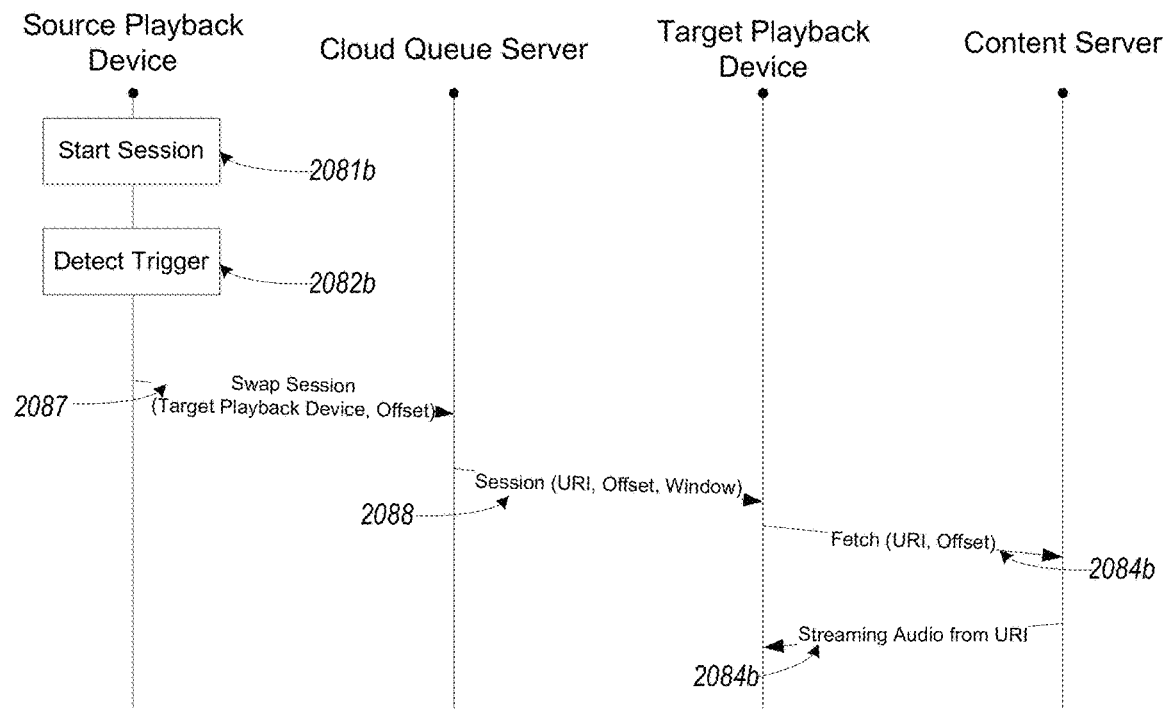

To illustrate, FIG. 20B is an example message flow diagram showing instructions exchanged between the source playback device, a cloud queue server, the target playback device, and a content server during an example swap of a playback session. Such messages are representative and may include additional or fewer messages. In some implementations, rather than the messages being sent from a portable playback device 710 (as a source or target playback device), the messages are sent from a paired control device 130a (FIG. 7G) or paired bridge device 860a (FIG. 16A).

At 2081b, the source playback device starts a playback session. The playback session may be initiated on the source playback device, the control device 130, or the bridge device 860, among other examples. In some cases, the playback session may include one or more additional playback devices playing back in synchrony with the source playback device as part of a group.

At 2082b, the source playback device detects the swap trigger, such as any of the example swap triggers described above, among other examples. In some cases, another device (e.g., the target playback device, the control device 130, the device base 718, or the bridge device 860) detects the swap trigger and transmits data indicating that a swap trigger was detected to the source playback device.

At 2087, the source playback device sends a swap session message to the cloud queue server that includes playback session data. The swap session message may indicate the target playback device via one or more identifiers. In some examples, such as with a pre-defined swap pair, the cloud queue server may maintain the pre-defined swap pairs for the media playback system 100. The swap session message may also include data representing an offset in the audio content indicating a position in the audio content to start playback. Within examples, the cloud queue server may also track play position in the playback session and may use the position in the swap session message to verify play position. Yet further, the swap session message may include a household identifier identifying the media playback system 100 (so as to distinguish from other media playback systems in other households) as well as one or more player identifiers to identify the source and/or target playback devices.

Based on receiving the swap session message, the cloud queue server re-targets the session from the source device to the target device. For instance, the cloud queue server may use a household identifier in the playback session data to identify cloud queues of the media playback system 100 and then use the group identifier (or a queue identifier) to identify the cloud queue utilized in the playback session. The cloud queue server may swap this session to the target playback devices altering the cloud queue data to associate the cloud queue with the target playback device. Alternatively, the cloud queue server may mirror the cloud queue of the source device with a cloud queue of the target playback device, then set the playback state of this cloud queue to match the playback state indicated in the playback session data.

For instance, at 2088, the cloud queue server sends playback session data to the target playback device. The playback session data includes data representing URI indicating a source of the currently playing audio content in the session (e.g., the currently playing audio track). The playback session data also includes data representing an offset in the audio content indicating a position in the audio content to start playback. In addition, if the source playback device is playing back audio content from a cloud queue with multiple audio, the playback session data may further include data representing a window from the cloud queue. The window may indicate media items subsequent to the currently playing audio content as well as possibly media items before the currently playing audio content. The target playback device may queue this window in a local queue to facilitate further playback of the cloud queue in the transferred session At 2084b, the target playback device sends a fetch message to the content server to request a stream of the audio content from the content server. Based on this fetch message, at 2085b, the content server streams the audio content to the target playback device for playback. The target playback device then begins playing back the audio content at the offset in the audio content.

Figure 20C:
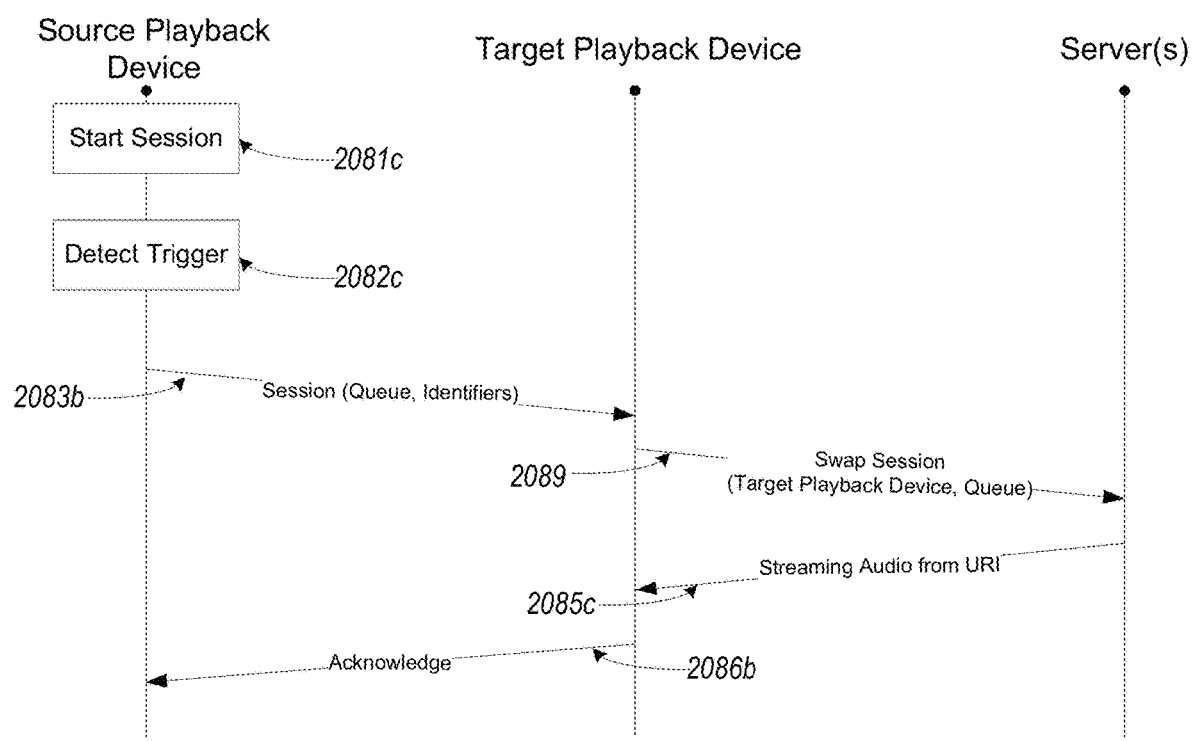

FIG. 20C is an example message flow diagram showing instructions exchanged between the source playback device, the target playback device, and one or more servers (e.g., the cloud queue server and/or the content server, which may be implemented by one or more cloud servers) during another example swap of a playback session. Such messages are representative and may include additional or fewer messages. In some implementations, rather than the messages being sent from a portable playback device 710 (as a source or target playback device), the messages are sent from a paired control device 130a (FIG. 7G) or paired bridge device 860a (FIG. 16A).

At 2081c, the source playback device starts a playback session. The playback session may be initiated on the source playback device, the control device 130, or the bridge device 860, among other examples. In some cases, the playback session may include one or more additional playback devices playing back in synchrony with the source playback device as part of a group.

At 2082c, the source playback device detects the swap trigger, such as any of the example swap triggers described above, among other examples. In some cases, another device (e.g., the target playback device, the control device 130, the device base 718, or the bridge device 860) detects the swap trigger and transmits data indicating that a swap trigger was detected to the source playback device.

At 2083b, the source playback device sends playback session data to the target playback device. The playback session data includes one or more identifier, such as a playback session identifier and a queue identifier. The playback session data may also include a URI indicating the source of the audio content, as well as an offset within that content.

At 2089, the target playback device sends a swap session request to the one or more servers. In a cloud queue implementation, the swap session request may be in the form of a load queue request indicating instructions to load the current cloud queue state of the cloud queue being played back by the source playback device onto the target playback device. To facilitate such requests, the swap session request includes one or more identifiers corresponding to the playback session (e.g., a household identifier, a playback device identifier of the target device, a queue identifier, a playback session identifier).

Upon receiving the swap session request, the one or more servers facilitate streaming the audio content to the target playback device. For instance, the one or more servers (the content server) may create a new session on the target playback device, such as by instructing a cloud queue server to create a new session on the target playback device. This request may include the household identifier, application identifier, and user account, as well as other identifiers. The playback session data may be used to mirror the playback session on the source playback device in the new session on the target playback device.

At 2085c, the content server streams the audio content to the target playback device for playback. The content service may begin the stream at the offset in the audio content. The target playback device then begins playing back the audio content at the offset in the audio content.

At 2086*b*, the target playback device sends an acknowledge message to the source playback device after receiving the playback session data. In example implementations, the source playback device might not stop the playback session until receiving the acknowledge message from the target playback device. The acknowledgement message may indicate that the swap was successful.

In further examples, the source and target playback devices perform a swap by forming a synchrony group. As noted above, example playback device(s) 110 and/or playback device(s) 710 may dynamically form and de-form synchrony groups. As noted above, additional details regarding audio playback synchronization among playback devices and/or zones can be found, for example, in U.S. Pat. No. 8,234,395 entitled, "System and method for synchronizing operations among a plurality of independently clocked digital data processing devices," which has been incorporated herein by reference in its entirety.

In some implementations, the source playback device forms a synchrony group with the target playback device and then mutes its output. When the synchrony group is formed, the target playback device begins playing back the audio content of a given session in synchrony with the source device. To complete the "swap," the source device is muted. From the user's perspective, the playback session appears swapped even though both the source and target playback devices are participating in the session. This mute can be a hidden (e.g., system) mute that is different from a mute command via a user interface. A hidden mute may be performed by lowering the volume or setting the volume to zero on the source device while displaying on the user interface that the source device is unmuted and playback is paused.

To swap playback back to the source playback device, the target playback device is removed from the synchrony group. A possible advantage of this implementation is that the session can be swapped back to the source device with relatively no delay, as the audio content does not need to re-buffer. Another possible advantage of this implementation is that the source playback device maintains control of the audio stream.

In further examples, detecting proximity between the source playback device and the target playback device triggers a swap. For instance, detecting that a source playback device and a target playback device of a pre-defined swap pair are in proximity may initiate a swap of a playback session between the source playback device and the target playback device. In some implementations, the source and target playback devices of a swap are defined by proximity of the source playback device to the target playback device. Example proximity detection may be implemented at one or more ranges, such as proximity to the media playback system 100 (i.e., the home or some other known location), proximity to a zone, or proximity to a playback device.

For instance, in some implementations, proximity of the portable playback device 710 to the media playback system 100 initiates a playback session swap with one or more target playback devices 110 within the home. In an example, upon a user returning home with the portable playback device 710, the paired control device 130*a* (FIG. 7G), or the paired bridge device 860 (FIG. 16A), proximity of the portable playback device 710 to the media playback system 100 is detected via a sensor or wireless communications interface of the portable playback device 710, the paired control device 130*a* (FIG. 7G), or the paired bridge device 860 (FIG. 16A). This proximity detection initiates a playback session swap between the portable playback device 710 and one or more target playback devices 110 within the home.

To illustrate, in example implementations, the paired control device 130*a* (FIG. 7G) detects a wireless signal that indicates proximity of the portable playback device 710 to the playback devices 110. For instance, the paired control device 130*a* (FIG. 7G) may detect (e.g., connect to) an 802.11 network (e.g., the network 104) within the home via the network interfaces 132*d*. Since the playback devices 110*a-n* are connected to the network 104, detection of this network indicates that the paired control device 130*a* (and by proxy, the paired portable playback device 710) is in proximity to the home. Other example wireless signals include near-field communication (NFC) and 802.15 (Bluetooth®, Bluetooth® Low Energy) signals which may be transmitted by the playback devices 110*a-n* within the home. In other examples, the paired bridge device 860 (FIG. 16A) may detect such signals or the portable playback device 710 may detect the signals directly via their respective network interface(s).

Alternatively, the paired control device 130*a* (FIG. 7G) detects proximity to the playback devices 110*a-n* via one or more sensors. For instance, the paired control device 130*a* may include a GPS sensor and compare current GPS coordinates to stored GPS coordinates of the home (or other known location of the playback devices 110*a-n*) to determine whether the paired control device 130*a* is in proximity to this stored location. In further examples, the paired control device 130*a* may detect proximity by using a microphone to detect ultrasonic tones (or other signals) emitted by one or more of the playback devices 110*a-n*. Alternatively, the paired control device 130*a* may utilize a camera to detect known objects or signals within the home. Other examples are possible as well.

Figure 21A:
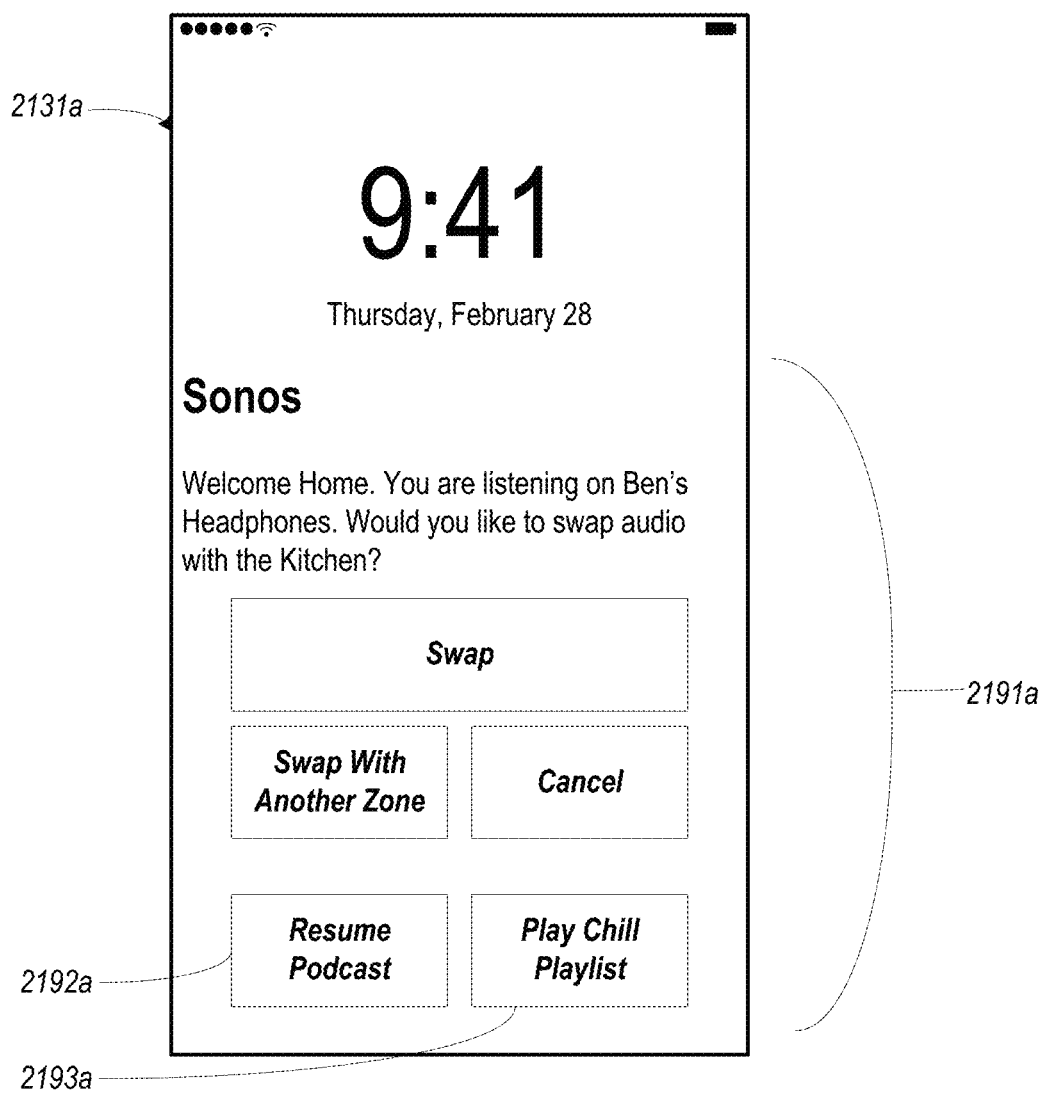
FIGS. 21A, 21B, and 21C are schematic diagrams of a control device user interface in various stages of operation in accordance with aspects of the disclosed technology.

In some examples, prior to performing a playback session swap based on proximity, verification is required from the user. In some examples, verification is implemented via an input to a user interface on the source portable playback device 710 (or a paired control device 130 or bridge device 860*a*). For instance, verification may be implemented via a push notification (or other prompt, such as a widget) displayed on the paired control device 130*a*. To illustrate, FIG. 21A presents a first user interface display 2131*a* that includes an example push notification 2191*a*. The paired control device 130*a* may display the first user interface display 2131*a* based on detecting proximity to the playback device(s) 110*a-n*.

As shown in FIG. 21A, the push notification 2191*a* of the first user interface display 2131*a* includes multiple selectable controls. A first selectable control ("Swap") causes the paired control device 130*a* to perform a playback session swap between the headphones 710*a* ("Ben's Headphones") with the kitchen 101*h*, which may be a pre-defined swap pair (FIG. 11A) or the nearest playback device 110, among other examples. A second selectable control ("Cancel") cancels the proximity-based swap.

Also shown in FIG. 21A are selectable controls 2192*a* and 2193*b*. Rather than transferring an in-progress playback session, selectable control 2192*a* causes the kitchen 101*h* to continue a stopped playback session (e.g., playback of a podcast). In example implementations, selectable control 2192*a* may represent the last-stopped playback session on the portable playback device 710*a*, the last-stopped playback session in the kitchen 101*h*, or the last stopped playback session in the media playbacks system 100, among other examples. Alternatively, the push notification 2191a may include multiple selectable controls 2192 to select different last-stopped playback sessions.

Selectable control 2193a causes the kitchen 101h to start a new playback session that includes playback of a given playlist. In various implementations, example push notifications 2191 may include selectable control 2193 to start new playback sessions with various types of audio containers corresponding to the user. For instance, respective selectable controls 2193 may start new playback sessions with favorite playlists, radio stations, podcasts, albums, or artists, among other examples, similar to the buttons 865 (FIG. 16E) and/or the regions 1771 (FIG. 17A).

Figure 21B:
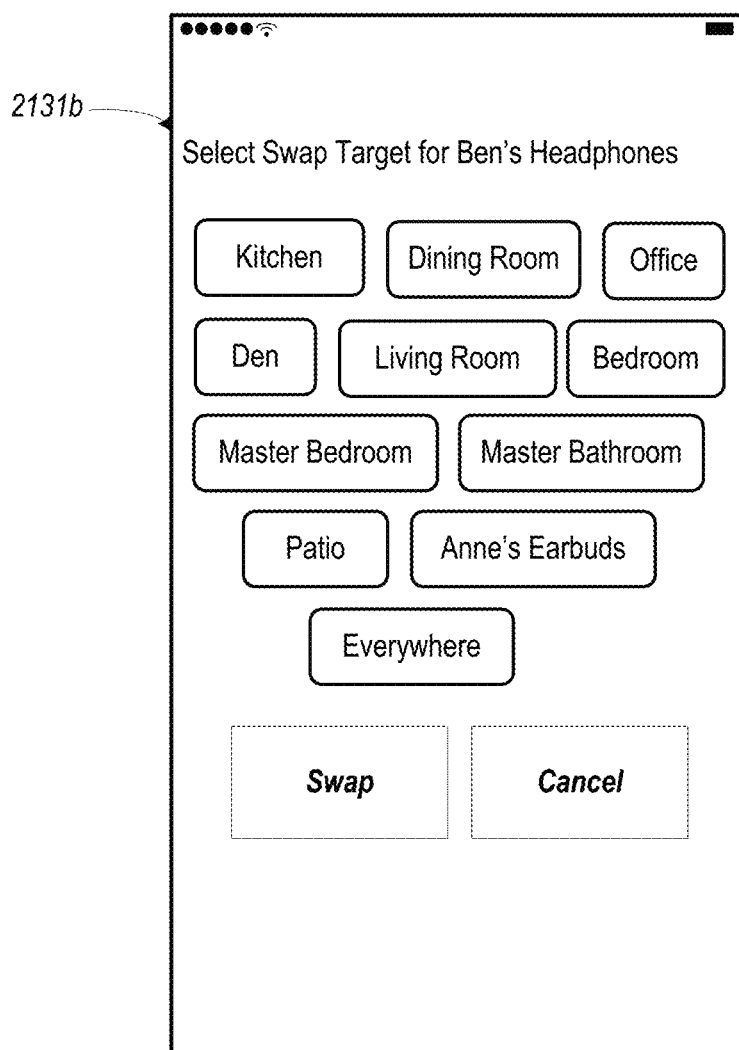

As further shown in FIG. 21A, a third selectable control of the push notification 2191a causes display of a user interface display to select a different swap target. To illustrate, FIG. 21B presents a second user interface display 2131b to facilitate selecting a swap target. The user interface display 2131b includes a plurality of toggle controls corresponding to respective zones of the media playback system 100 to facilitate selecting one or more target playback devices 110n.

In some implementations, proximity of the portable playback device 710 to a zone initiates a playback session swap with the playback device(s) 110 within that zone. Detecting that the portable playback device 710 is in proximity to a given zone may involve detecting a signal (e.g., wireless, ultrasonic) emitted by the playback devices within that zone. In some implementations, detecting signals emitted by other smart devices within the zone may indicate proximity.

For example, the paired control device 130a may determine a profile corresponding to one or more zones. For instance, while in the kitchen 101h, the paired control device 130a may detect a signal emitted by the playback device 110b, as well as other smart devices (e.g., a smart oven, a smart fridge, a smart power outlet) and save these signals as markers for the kitchen 101h in a profile corresponding to the kitchen 101h. Further, the paired control device 130a may combine this signal data with other sensor data (such as altitude) captured while in the kitchen 101h. The markers in a given profile may also be weighted (e.g., signals of a playback device in a given zone may be weighted more heavily than other smart devices within that zone).

Given stored profiles for multiple zones in the media playback system 100, to detect whether the portable playback device 710 is in proximity to a given zone, the paired control device 130a may compare current signals and/or sensor data to the stored profile(s) corresponding to the zones. For instance, the paired control device 130a may determine the closest match to the current signals and/or sensor data by comparing how many markers in each profile are present in the current signals and/or sensor data. The paired control device 130a may also threshold the markers by determining proximity to a particular zone when a pre-determined number (or percentage) of markers in the stored profile of the particular zone are also present in the current signals and/or sensor data. While these operations are described by example as being performed by the paired control device 130a, other devices such as the portable playback device 710 and/or the bridge device 860 may also determine the profile and/or detect proximity using the stored profiles.

Additional techniques to facilitate determining zone proximity can be found, for example, in U.S. Patent App. Pub. No. 2016/0062606 A1 entitled, "Zone Recognition," which is incorporated herein by reference in its entirety.

Figure 21C:
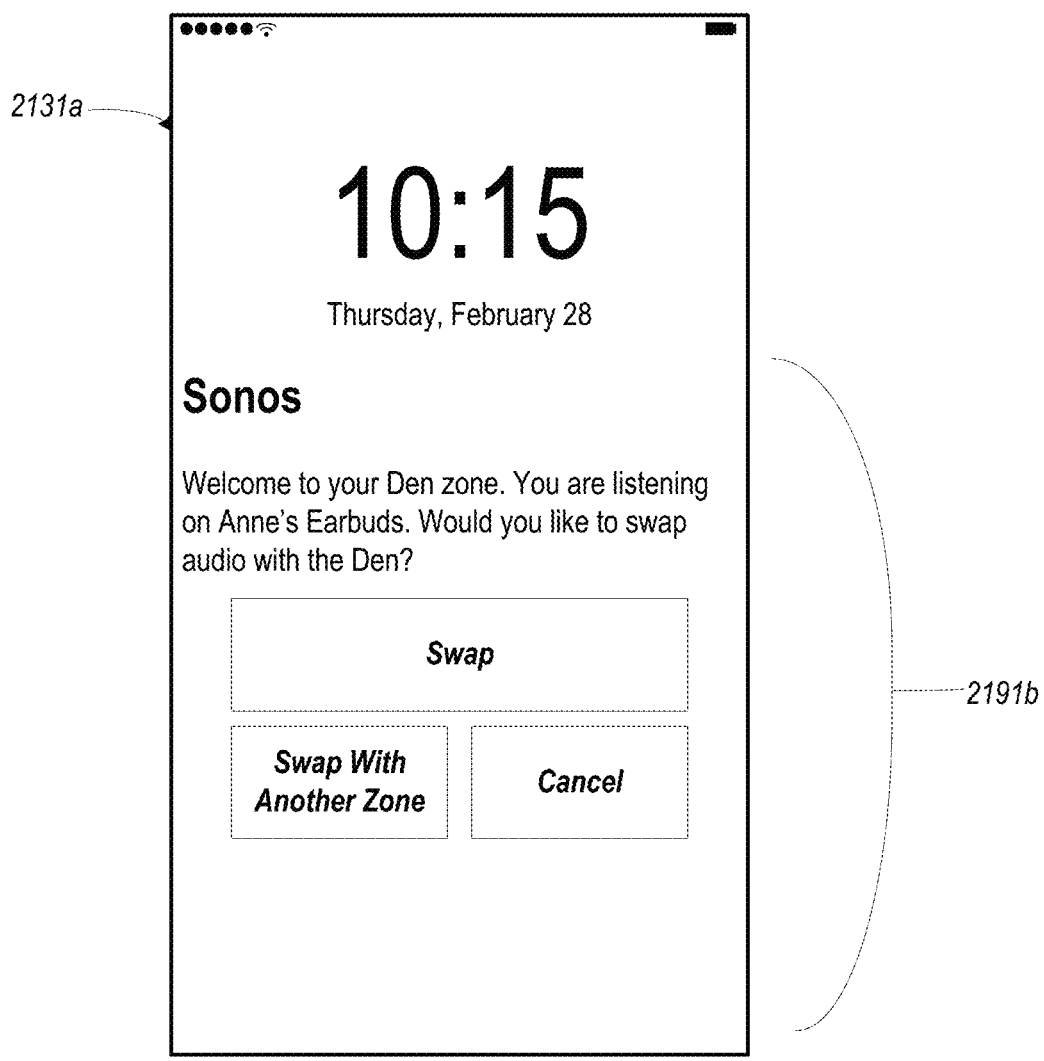

Similar to proximity to the home, prior to performing a playback session swap to a zone based on proximity, the media playback system 100 may request verification that the user intends a swap to be performed. To illustrate, FIG. 21C presents a third user interface display 2131c that includes an example push notification 2191b. The paired control device 130a may display the third user interface display 2131c based on detecting proximity to the Den 101d.

In further examples, proximity to a given zone is determined via a user input to a playback device of that zone. For instance, a particular user input to the playback device 710 (or paired control device 130a or bridge device 860a) may initiate a playback session swap with the playback device 710 as the source playback device. Then, a user input to a given playback device 110 selects that playback device (or associated zone) as the target playback device(s). The source and target playback devices may be configured to perform a swap on the condition that the second input is detected within a pre-determined period of time (e.g., 5 seconds) following the first input, so as to indicate proximity between the source and target playback devices.

Figure 22A:
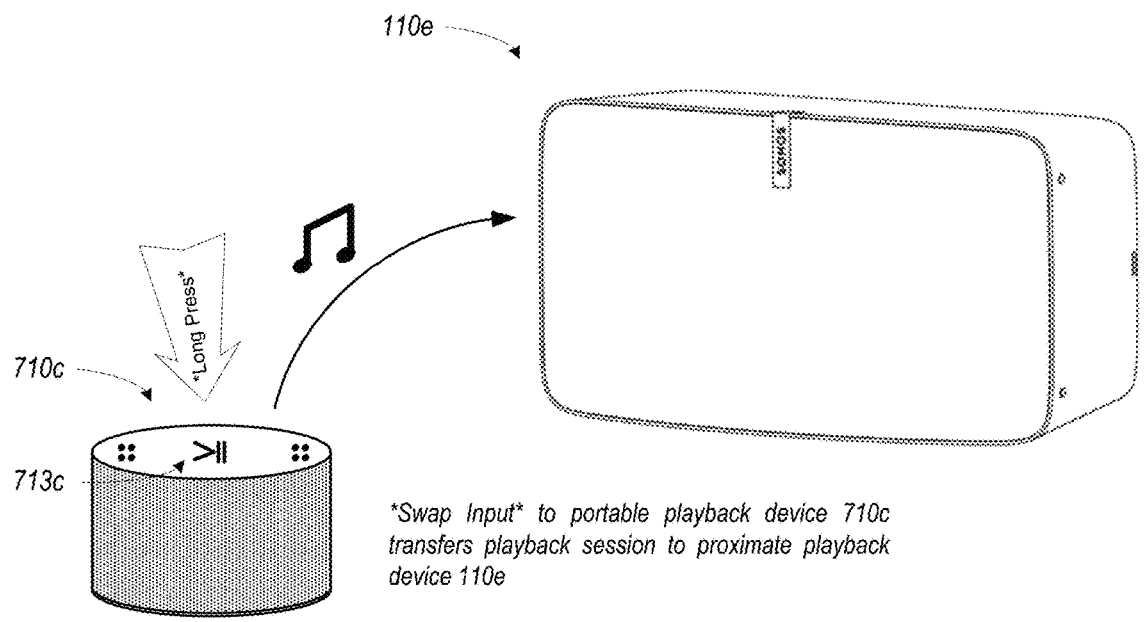
FIGS. 22A, 22B, 22C, and 22D are diagrams illustrating example proximity-based playback session swaps.
Figure 22B:
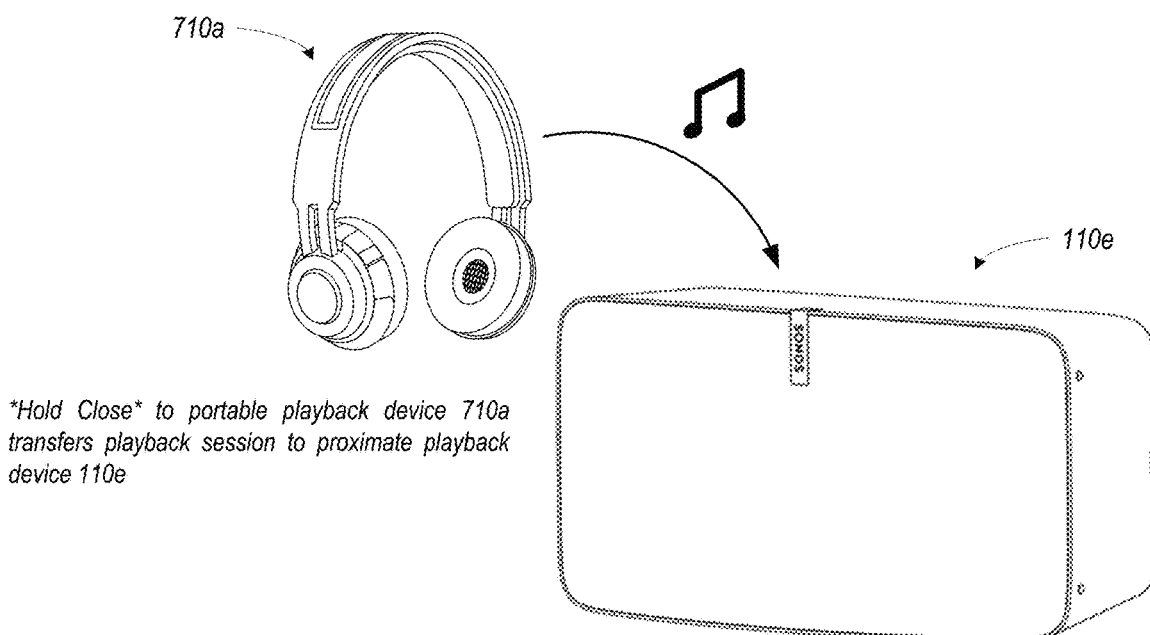

In further examples, another trigger, such as a button press, initiates playback session swap to target playback devices with proximity to a source playback device. To illustrate, FIG. 22A illustrates an example playback session swap between the portable playback device 710c and the playback device 110e, which is in proximity to the portable playback device 710c. As shown, a particular swap input (e.g., a long press to the user interface 713c) triggers a playback session swap. In this example, the source playback device (i.e., the portable playback device 710c) is identified via the particular swap input. The target playback device (i.e., the playback device 110e) is identified via proximity detection by the portable playback device.

As another example, FIG. 14B illustrates an example playback session swap between the headphones 710a and the playback device 110e, which is in proximity to the portable playback device 710a. As shown, a hold-close action triggers a playback session swap. In this example, the source playback device (i.e., the headphones 710a) and the target playback device (i.e., the playback device 110e) are both identified by the hold-close action, which causes a near-field communication exchange between the headphones 710a and the playback device 110e. Since near-field communication has a limited range (e.g., 4 cm), the near-field communication exchange indicates proximity between the headphones 710a and the playback device 110e.

Figure 22C:
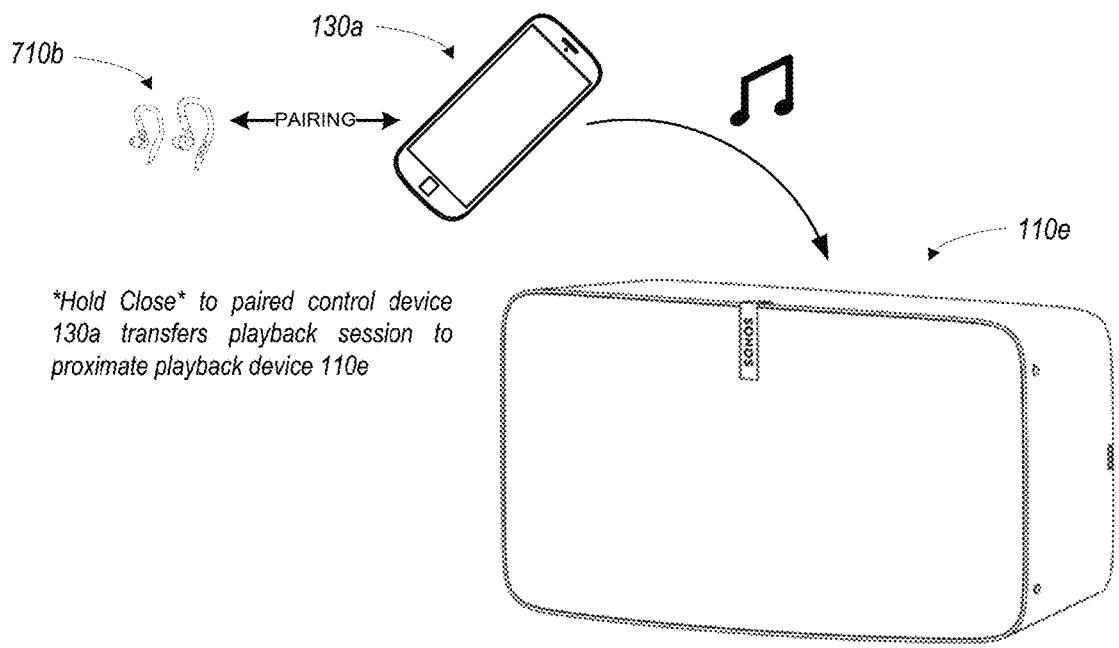

As a further example, FIG. 22C illustrates an example playback session swap between the earbuds 710b and the playback device 110e. In this example, a hold close action by the control device 130a (paired to the earbuds 710b) triggers a playback session swap. In this example, the source playback device (i.e., the earbuds 710b) and the target playback device (i.e., the playback device 110e) are both identified by the hold-close action, which causes a near-field communication exchange between the paired control device 130a and the playback device 110e.

Figure 22D:
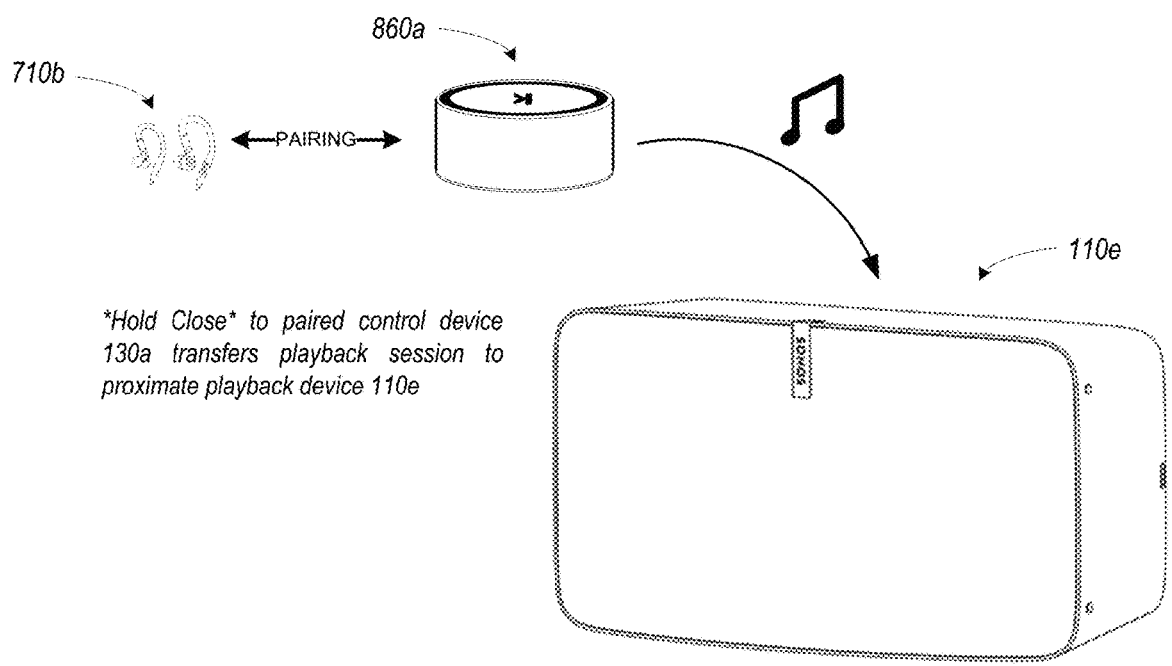

In another example, FIG. 22D illustrates another example playback session swap between the earbuds 710b and the playback device 110e. In this example, a hold close action by the bridge device 860a (paired to the earbuds 710b) triggers a playback session swap. In this example, the source playback device (i.e., the earbuds 710b) and the target playback device (i.e., the playback device 110e) are both identified by the hold-close action, which causes a near-field communication exchange between the paired bridge device 860a and the playback device 110e.

In some instances, the target playback device(s) are members of a synchrony group such as a bonded zone (e.g., a stereo pair such as the master bedroom 101b or a surround sound configuration such as the den 101d) or a zone group (e.g., a "Kitchen+Dining Room" zone group). As noted above, example synchrony techniques involve a group coordinator providing audio content and timing information to one or more group members to facilitate synchronous playback among the group coordinator and the group members. In such examples, a target playback device might be a group coordinator (that provides audio content and timing information to the group members) or a group member (that receives audio content and timing information from the group coordinator).

In example implementations, when a group coordinator is designated as the target playback device, the group coordinator may, as a result of the synchrony group arrangement, automatically "take along" group members during a playback session swap by providing the group members audio content and timing information corresponding to the swapped playback session. That is, since the group members receive the audio content and timing information from the group coordinator, when the group coordinator starts playing back the swapped playback session, the group members start playing back the swapped playback session as well.

Generally, when initiating a playback session swap via a GUI of the control device 130a or VUI of the NMD 120a, the bonded zone or zone group is targeted as a whole by reference to the name of the bonded zone, the zone group, or a member zone. In a local implementation, the control device 130a or the NMD 120a may transmit one or more messages to the group coordinator indicating the playback session swap, which then performs the swap. In a cloud implementation, the control device 130a or the NMD 120a may transmit one or more messages to the cloud queue server indicating the playback session swap to cause the cloud queue server to perform the swap or to relay instructions to the group coordinator to perform the playback session swap.

In other cases, a group member is targeted for a swap (e.g., by providing input indicating a swap command to the user interface of the group member). In a local implementation, the group coordinator can transmit one or more messages indicating the swap command to the group coordinator, which then performs the playback session swap. In a cloud implementation, the group member may transmit one or more messages to the cloud queue server indicating the playback session swap to cause the cloud queue server to perform the swap or to relay instructions to the group coordinator to perform the playback session swap. Alternatively, the group member may transmit one or more messages to the group coordinator indicating the playback session swap, which cause the group coordinator to transmit a playback session swap request to the cloud server.

XI. Additional Portable Playback Device Examples

Figure 23A:
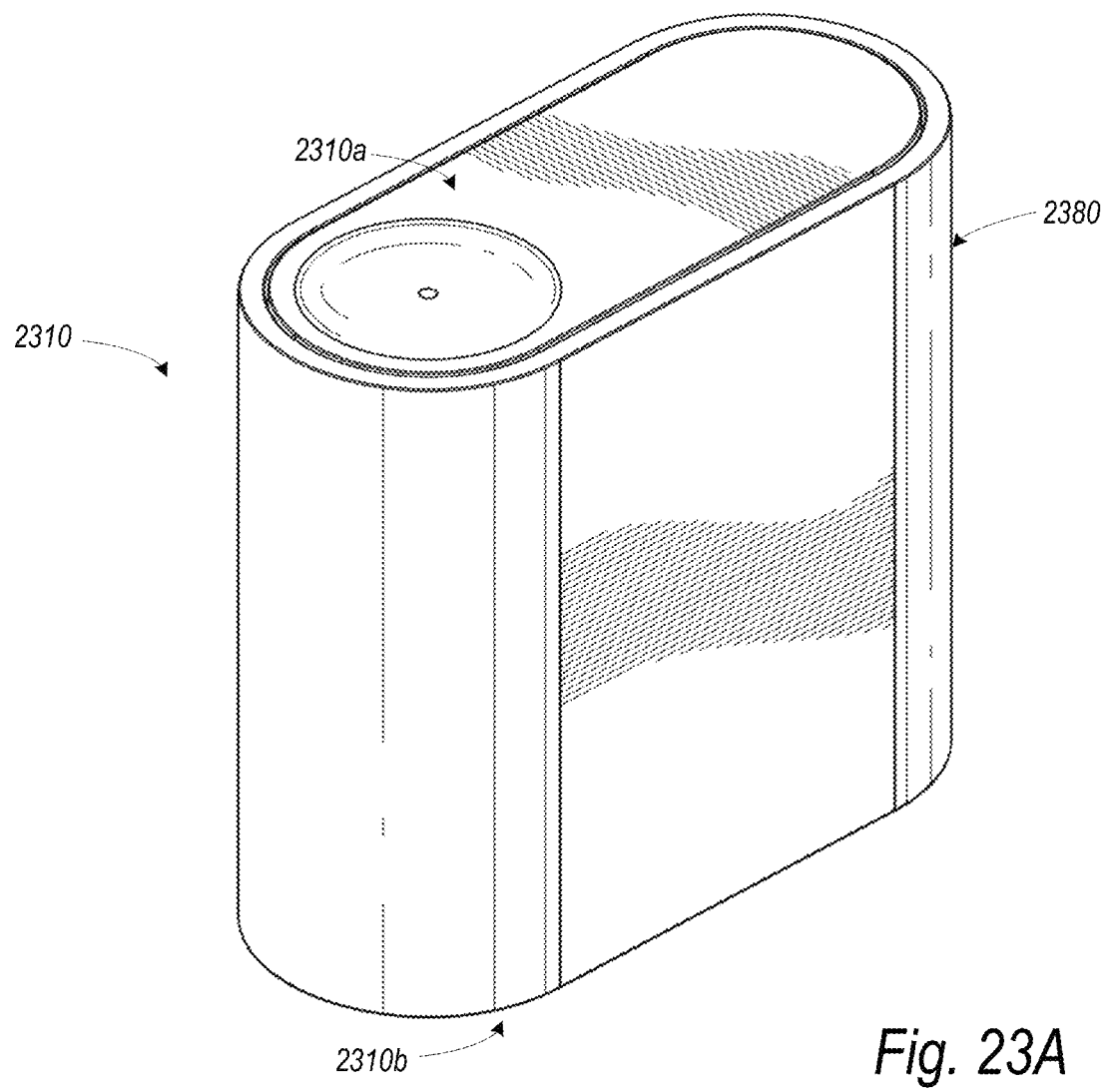
FIG. 23A is a front isometric view of earbuds configured in accordance with aspects of the disclosed technology.

FIG. 23A is a front isometric view of earbuds 2310 including an earbud 2310a and an earbud 2310b configured in accordance with aspects of the disclosed technology. As shown, the earbuds 2300 are carried in a charging case 2380.

Figure 23B:
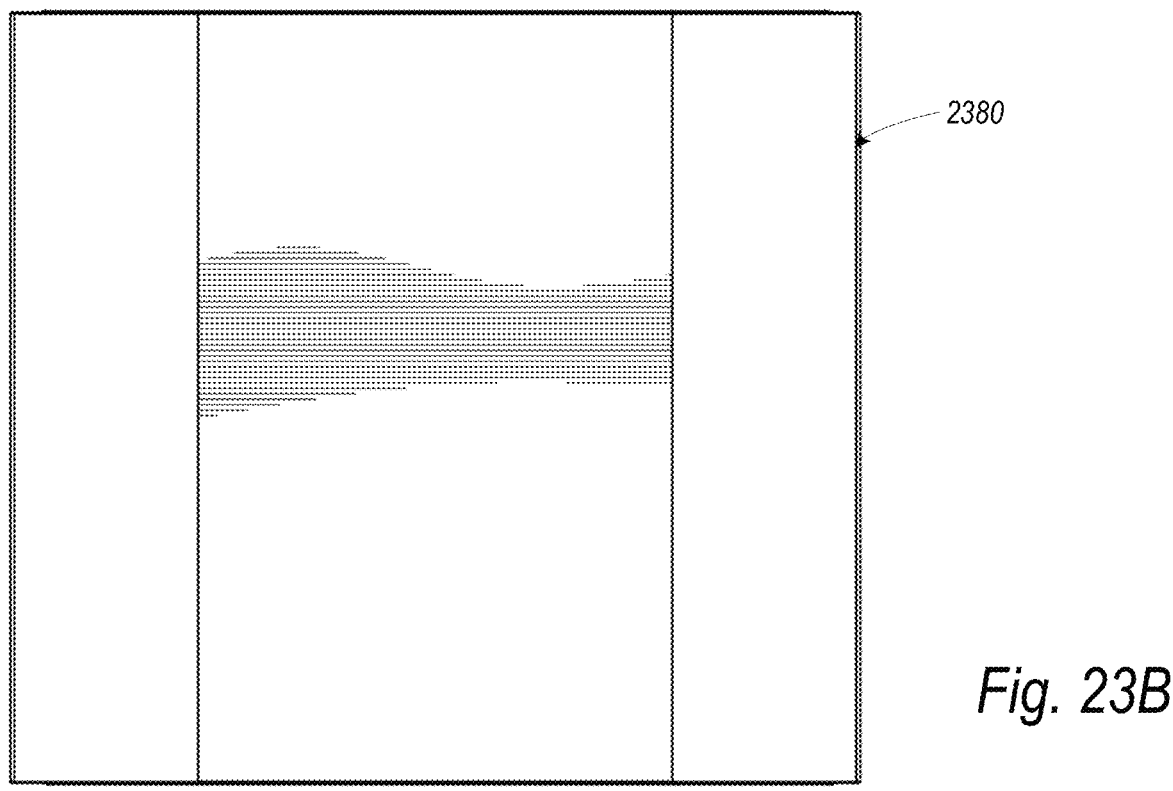
FIG. 23B is a bottom view of a charging case configured in accordance with aspects of the disclosed technology.
Figure 23C:
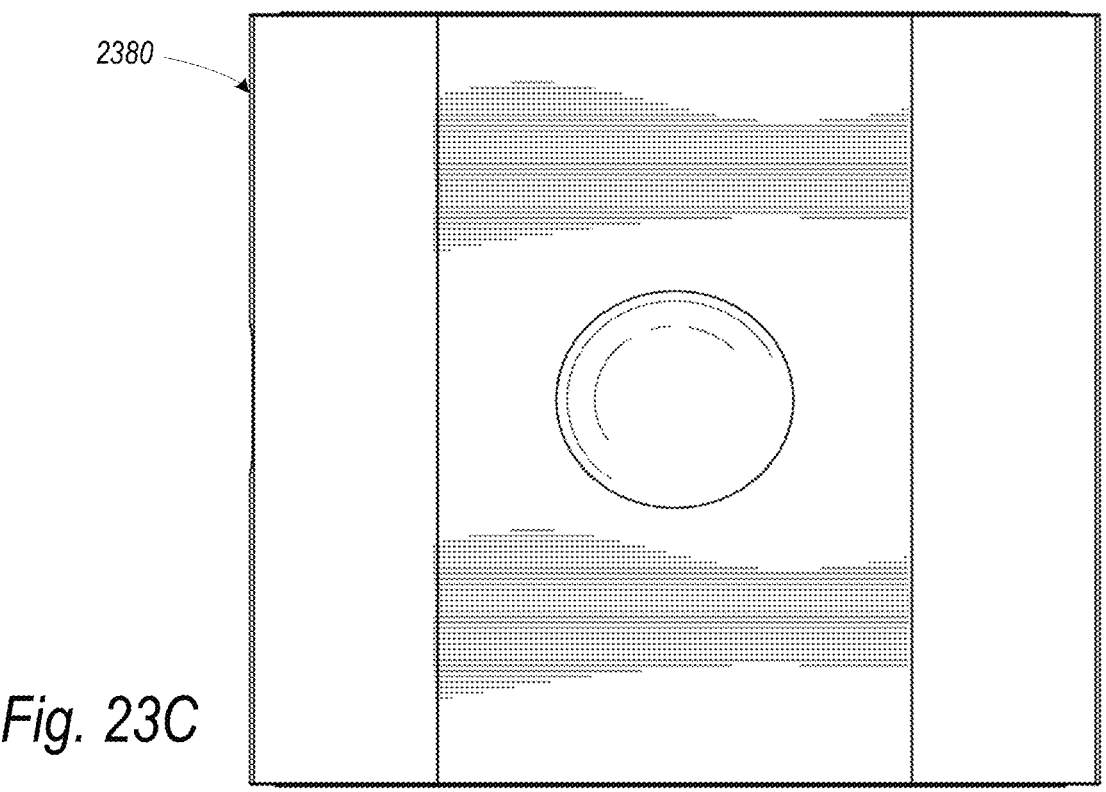
FIG. 23C is a top view of the charging case.
Figure 23D:
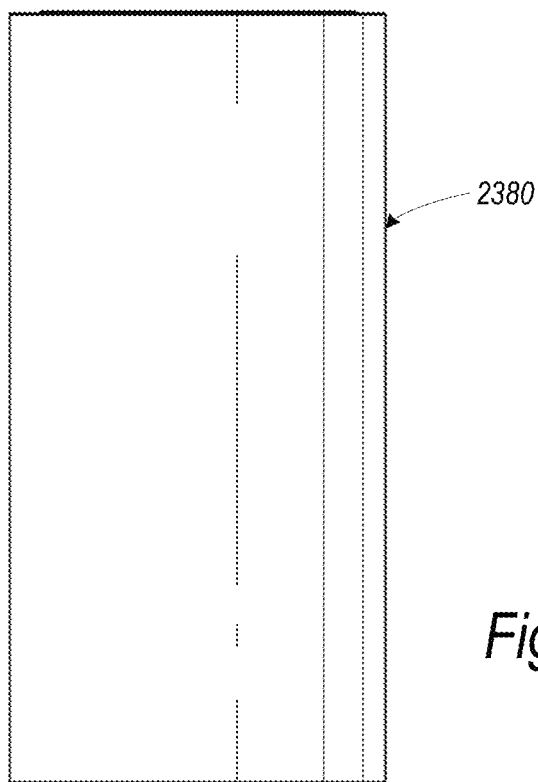
FIG. 23D is a first side view of the charging case.
Figure 23E:
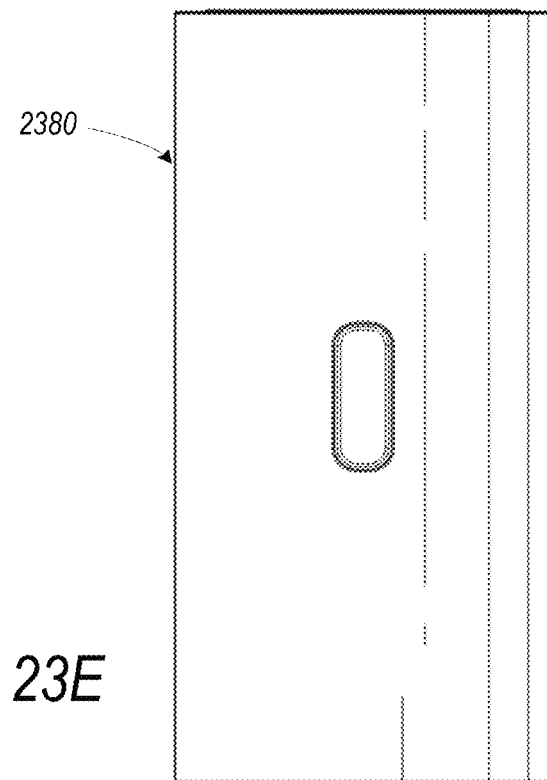
FIG. 23E is a second side view of the charging case.
Figure 23F:
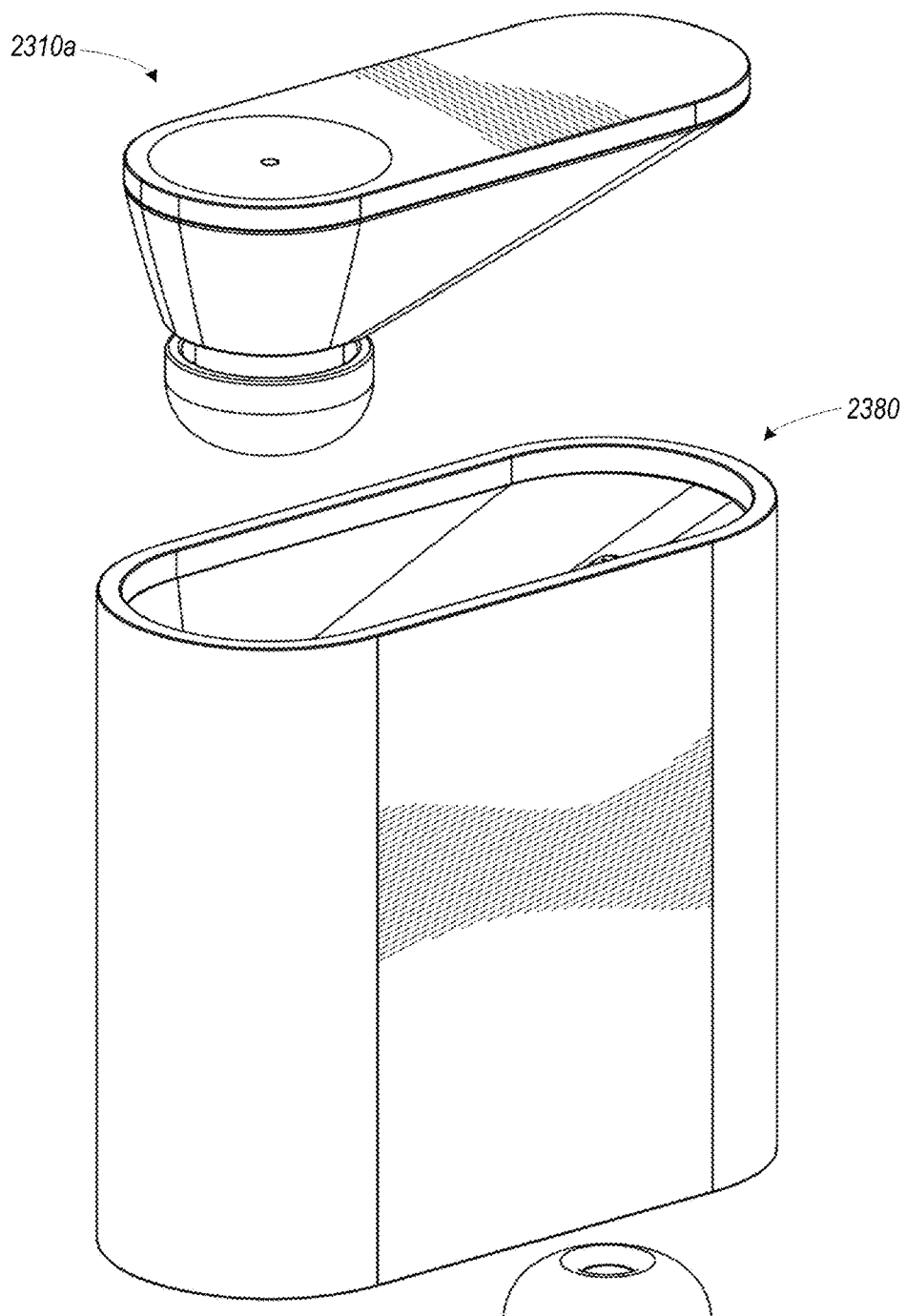
FIG. 23F is a front isometric view of earbuds illustrating exemplary arrangement with the charging case.
Figure 23F:
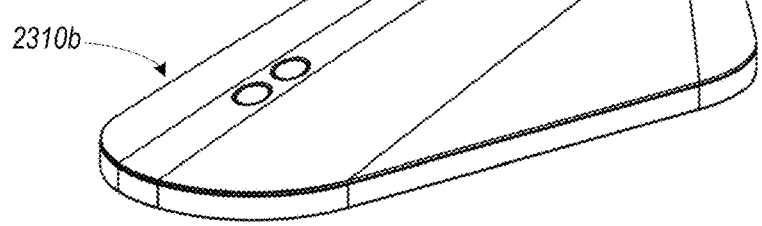
Figure 23G:
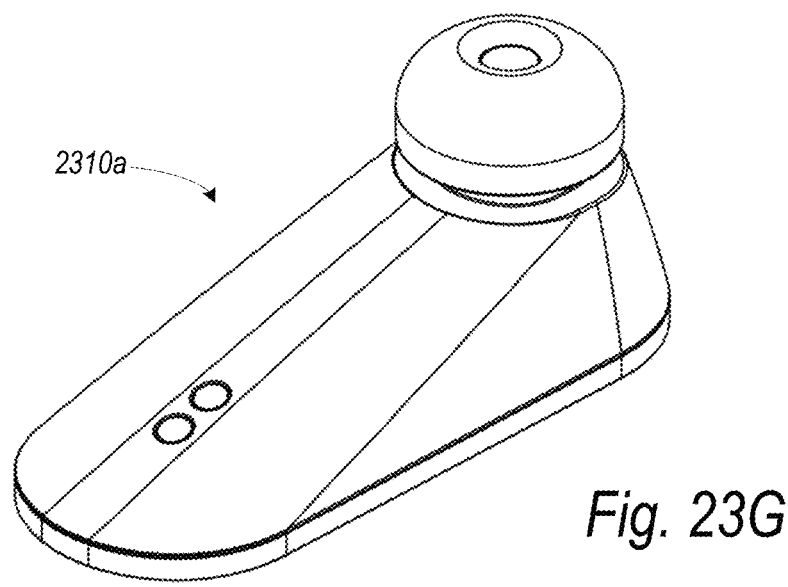
FIG. 23G is an isometric view of the earbud.
Figure 23H:
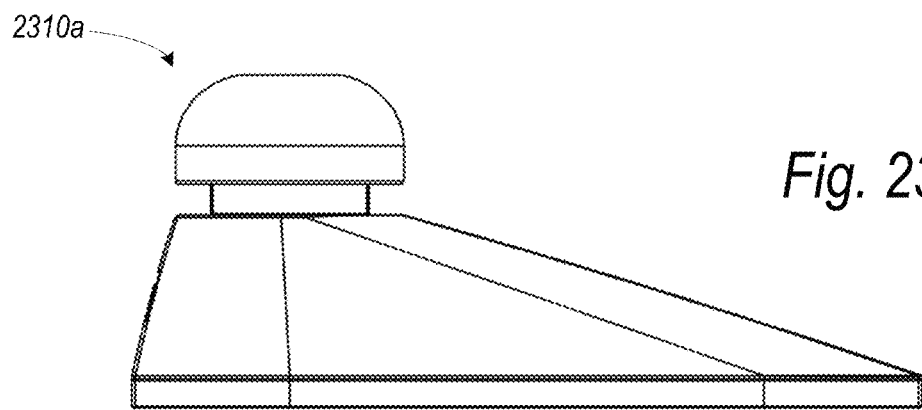
FIG. 23H is a first side view of the earbud.
Figure 23I:
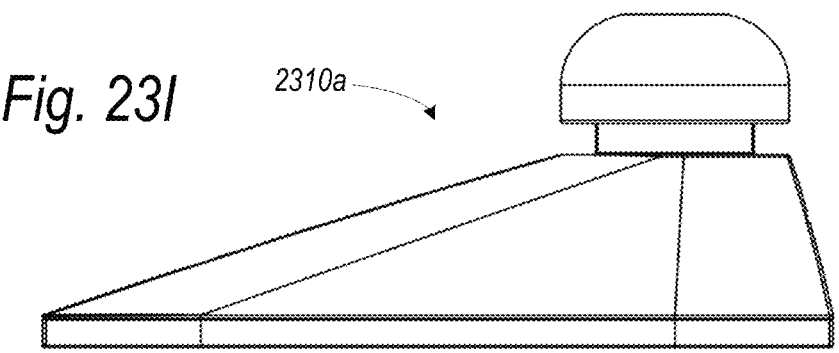
FIG. 23I is a second side view of the earbud.
Figure 23J:
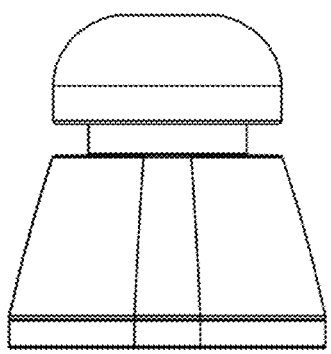
FIG. 23J is a third side view of the earbud.
Figure 23K:
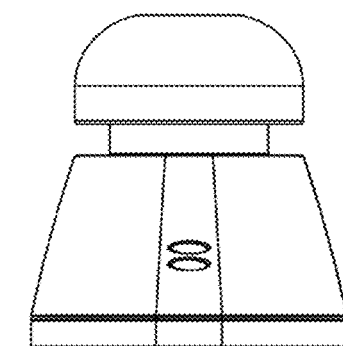
FIG. 23K is a fourth side view of the earbud.
Figure 23L:
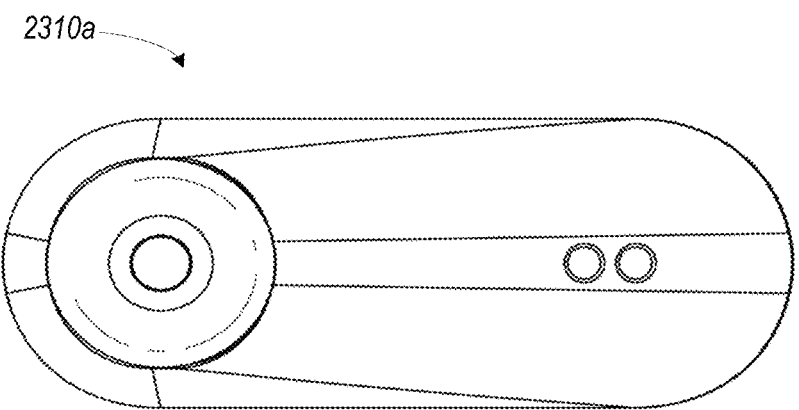
FIG. 23L is a fifth side view of the earbud.
Figure 23M:
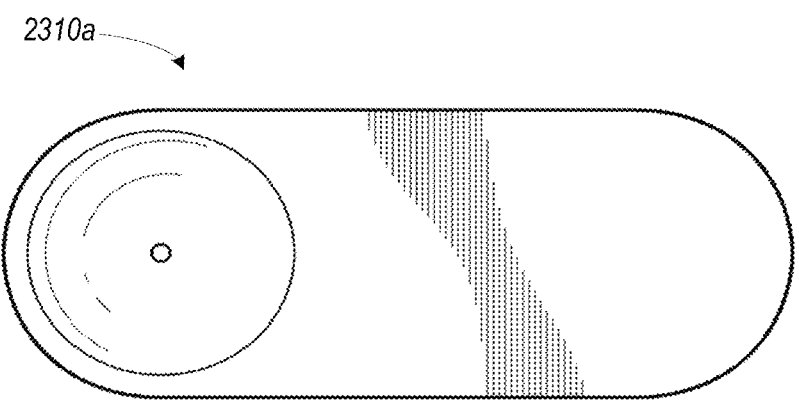
FIG. 23M is a sixth side view of the earbud.
Figure 24A:
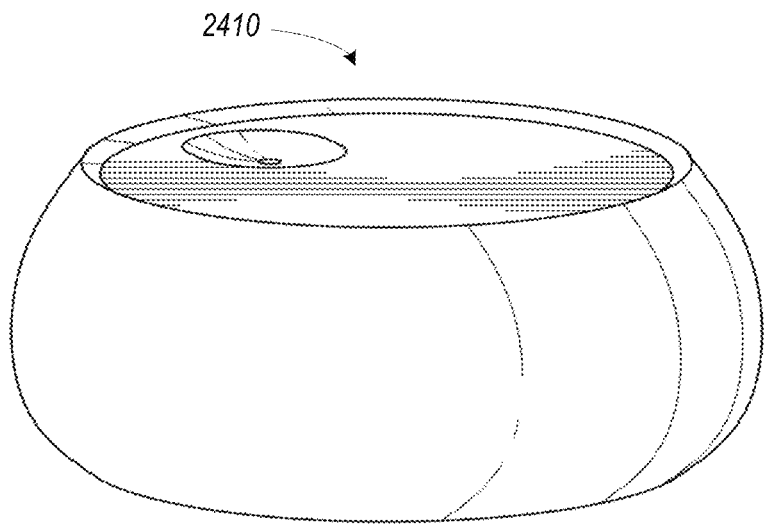
FIG. 24A is a front isometric view of a portable playback device implemented as a handheld speaker configured in accordance with aspects of the disclosed technology.
Figure 24B:
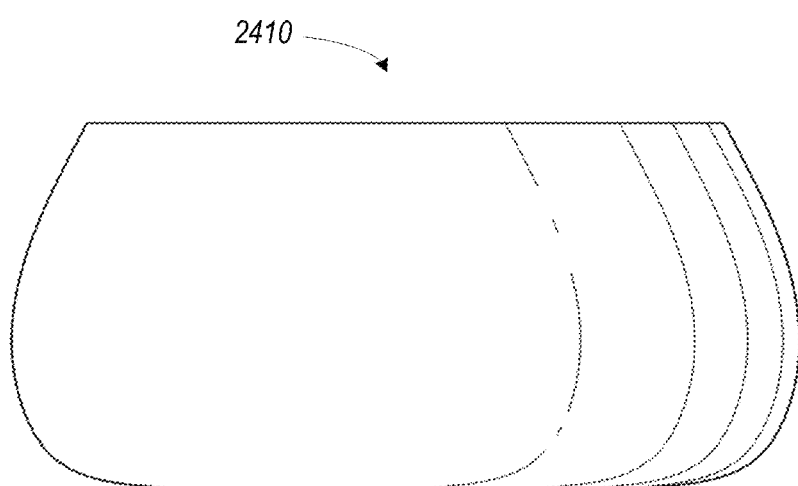
FIG. 24B is a side view of the portable playback device.
Figure 24C:
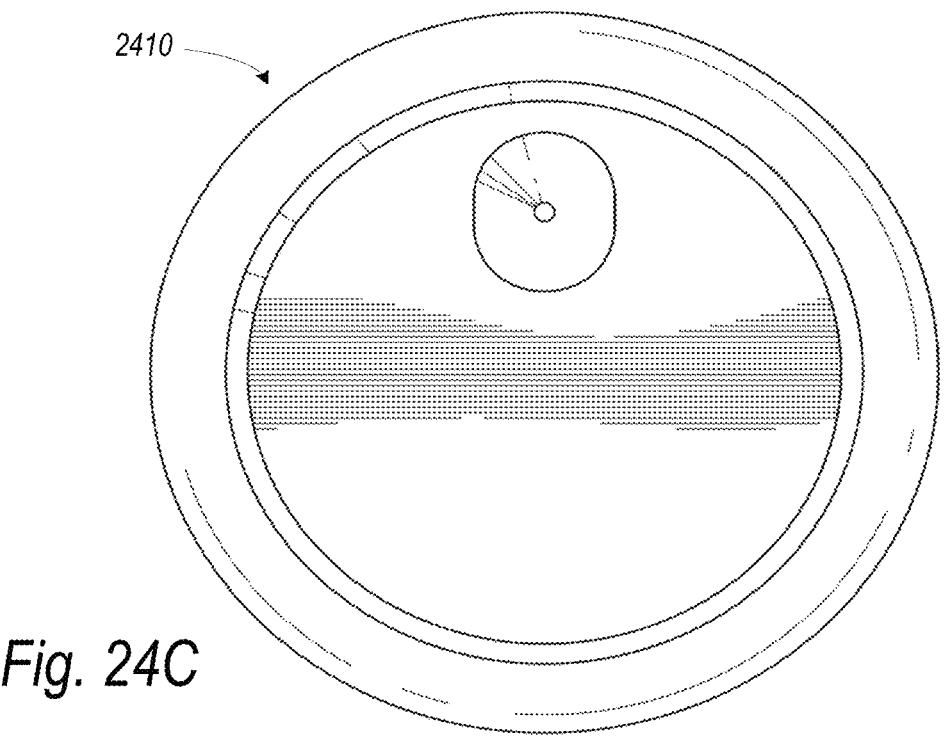
FIG. 24C is a top view of the portable playback device.
Figure 24D:
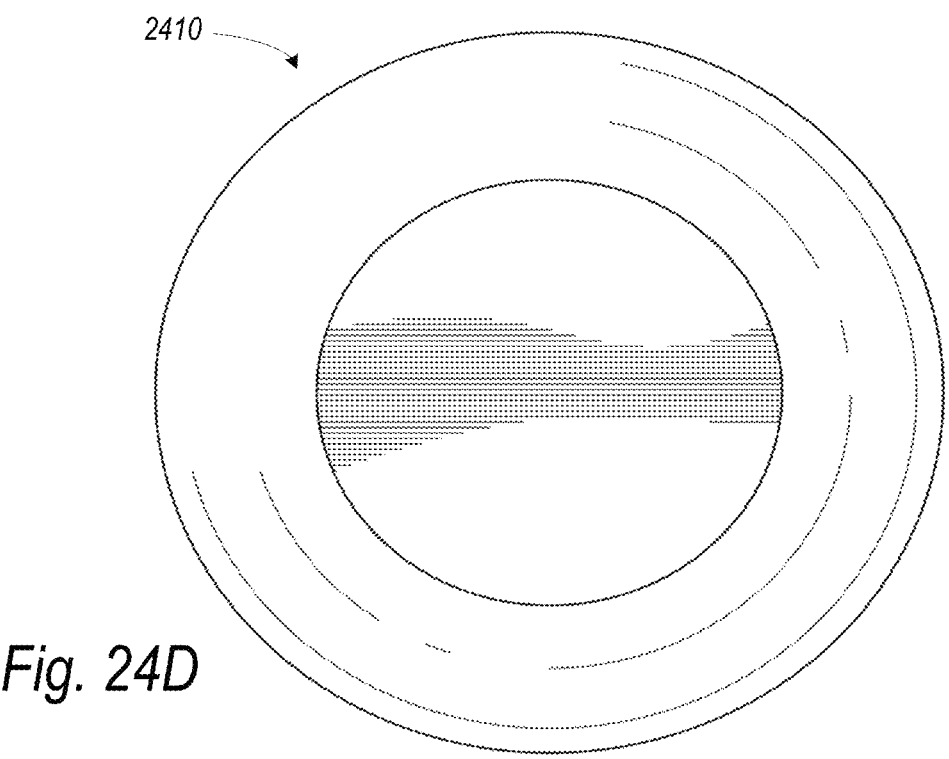
FIG. 24D is a bottom view of the portable playback device.
Figure 24E:
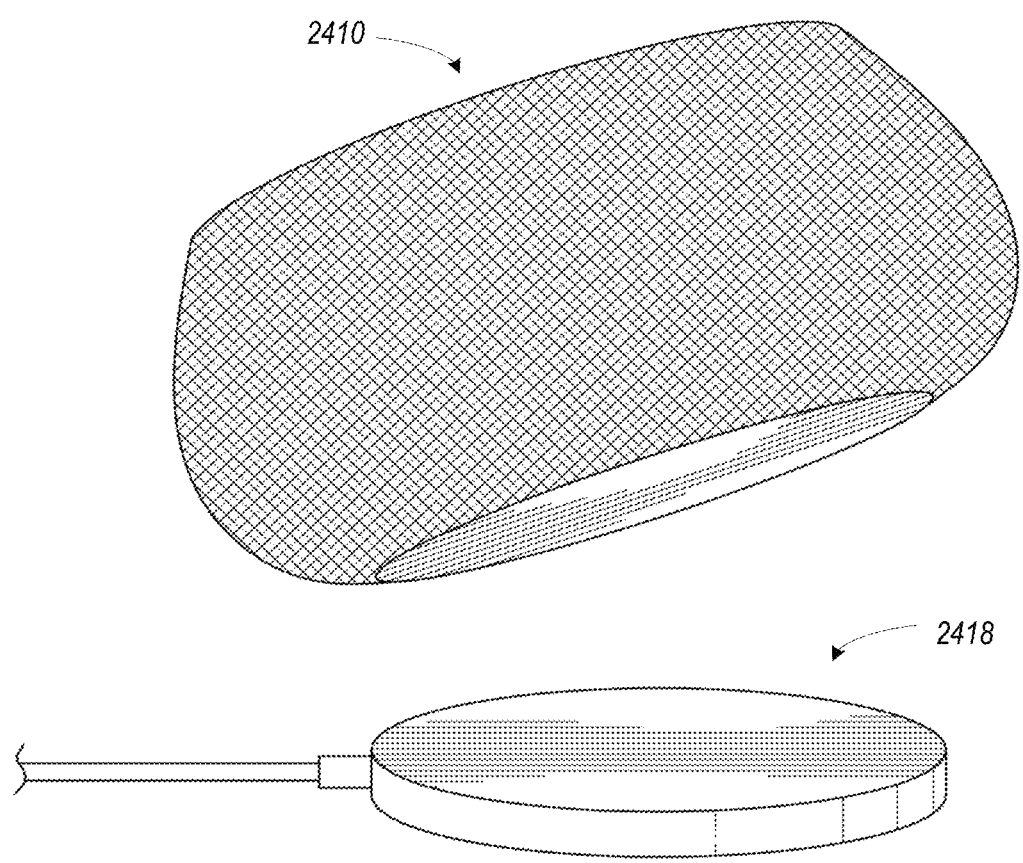
FIG. 24E is a front isometric view of the portable playback device illustrating exemplary arrangement with a device base.
Figure 24F:
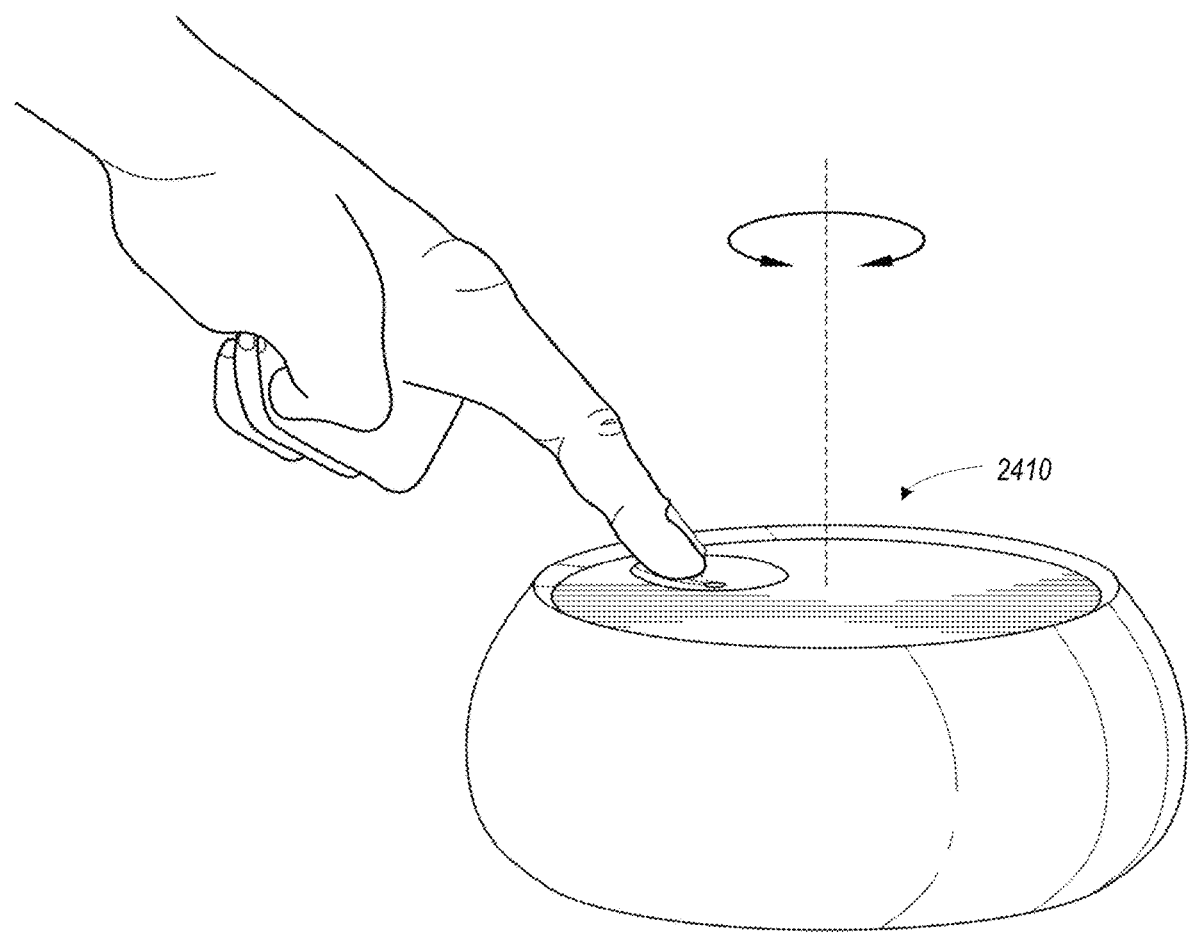
FIG. 24F is a front isometric view of the portable playback device illustrating exemplary user inputs to the portable playback device.

FIG. 23B is a bottom view of the charging case 2380.
FIG. 23C is a top view of the charging case 2380.
FIG. 23D is a first side view of the charging case 2380.
FIG. 23E is a second side view of the charging case 2380.
FIG. 23F is a front isometric view of the earbud 2310a and the earbud 2310b illustrating exemplary arrangement with the charging case 2380.
FIG. 23F is an isometric view of the earbud 2310a.
FIG. 23H is a first side view of the earbud 2310a.
FIG. 23I is a second side view of the earbud 2310a.
FIG. 23J is a third side view of the earbud 2310a.
FIG. 23K is a fourth side view of the earbud 2310a.
FIG. 23L is a fifth side view of the earbud 2310a.
FIG. 23M is a sixth side view of the earbud 2310a.
FIG. 24A is a front isometric view of a portable playback device 2410 implemented as a handheld speaker configured in accordance with aspects of the disclosed technology.
FIG. 24B is a side view of the portable playback device 2410.
FIG. 24C is a top view of the portable playback device 2410.
FIG. 24D is a bottom view of the portable playback device 2410.
FIG. 24E is a front isometric view of the portable playback device 2410 illustrating exemplary arrangement with a device base 2418.
FIG. 24F is a front isometric view of the portable playback device 2410 illustrating exemplary user inputs to the portable playback device 2410.
FIG. 25A is a front view of headphones 2510 configured in accordance with aspects of the disclosed technology.
FIG. 25B is a first side view of the headphones 2510.
FIG. 25C is a second side view of the headphones 2510.
FIG. 26A is a front view of headphones 2610 configured in accordance with aspects of the disclosed technology.
FIG. 26B is a first side view of the headphones 2610.
FIG. 26C is a second side view of the headphones 2610.

XII. Identifying Presence of Nearby Playback Devices Using Audio Signals

Some example techniques for identifying the presence of nearby playback devices involve audio-based identification. In exemplary audio-based identification techniques, the initiating playback device requests that swap-eligible playback devices emit an identifiable sound audio signal (such as an audio chirp), which can be detected by one or more microphones of the initiating playback device. The initiating playback device may then identify nearby playback devices based on the characteristics of the detected audio signal(s). In certain examples, the initiating playback device is known as a receiving device, and may be, for example, a portable playback device.

Figure 27:
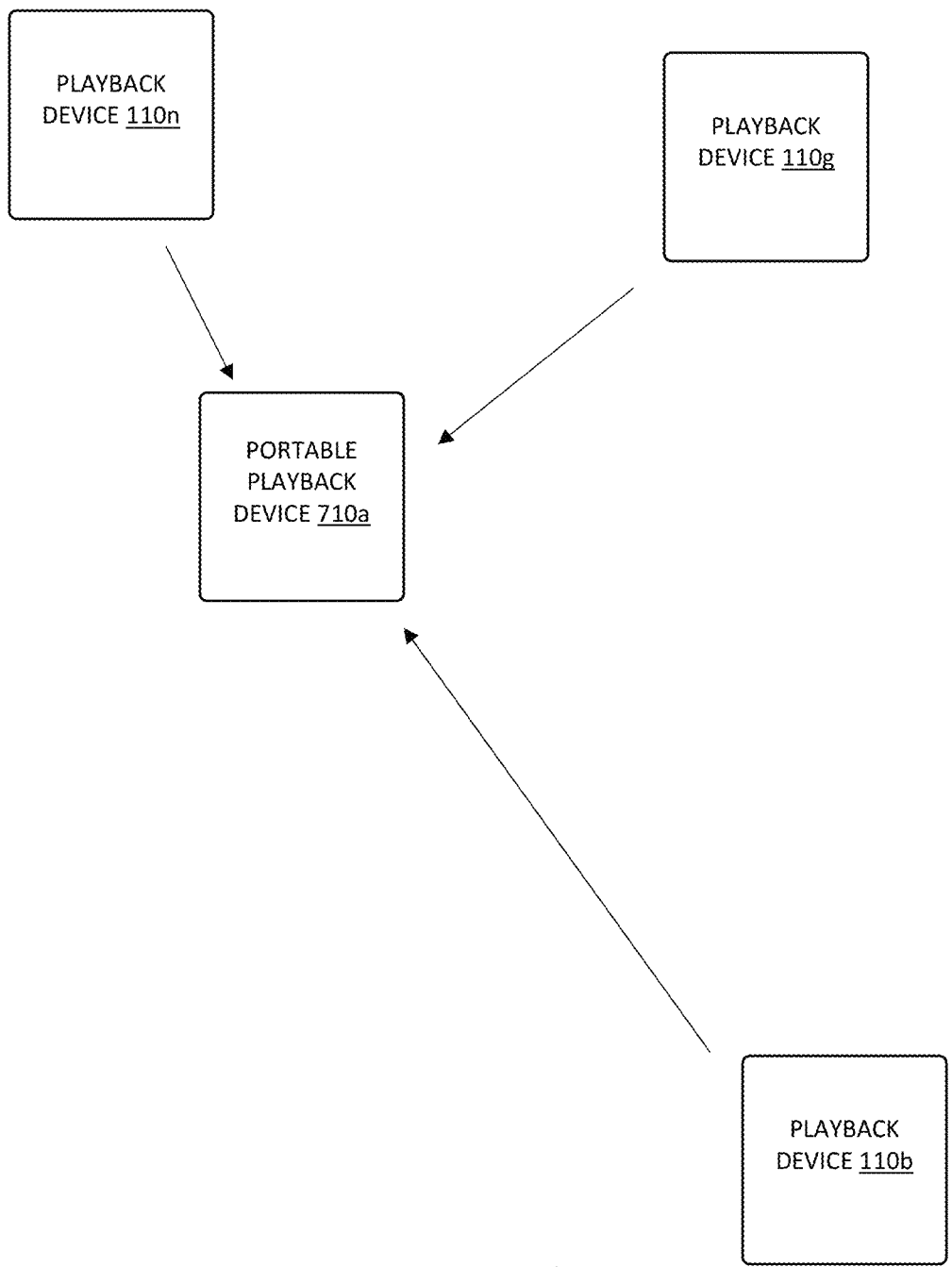
FIG. 27 is a schematic diagram illustrating an example audio-based identification technique in accordance with aspects of the disclosed technology.

To illustrate, FIG. 27 is a schematic diagram illustrating an audio-based identification technique using audio signals, such as audio chirps. An audio signal can be represented by a time-frequency representation, having identifiable acoustic characteristics or patterns (such as one or more tones of particular frequencies or symbols) over time. The audio signal may be an identifier or a code for the playback device playing the audio signal.

Each tone or symbol can be in the form of a pulse where the tone has a duration, envelope length, and a guard interval. The duration of a particular tone can be the time between the beginning and end of the pulse (e.g., 5-15 milliseconds), and the envelope length can be the length of time that pulse takes to reach maximum magnitude from zero (e.g., 1-10 milliseconds). The guard interval (i.e. an interval of time) is a period of silence between each tone or before the following tone (e.g., 10-50 milliseconds, such as between about 30-50 milliseconds).

In some instances, the identifier of the playback device may be mapped to a pseudorandom code in a code division multiple access (CDMA) modulation scheme. In another example, at least part of the reference audio signals are generated via an algorithm, such as a pseudorandom algorithm. The reference audio signals may be based on Gold codes, Walsh/Hadamard codes, etc. In one example, the reference audio signals are generated using a linear-feedback shift register. In other examples, at least part of the reference audio signals are manually generated. The reference audio signals may be configured to have low or minimal cross-correlation with other reference audio signals. Hamming correlation may be used to compare reference audio signals to determine their similarity or cross-correlation, in certain examples.

To enable identification of the transmitting playback device, the time-frequency representation of an audio signal can be unique to each playback device transmitting the audio signal. In the example of FIG. 27, a user has initiated a swap on a portable playback device 710 (headphones 710a in this example). From hereafter, the portable playback device 710a is referred to as a receiving device 710a because it subsequently receives/detects audio signals, as will be further described. In some instances, the initiating device and the receiving device are the same device.

As noted above, if a playback session is on-going on the receiving device 710a when the playback session swap input is received, the receiving device 710a will assume that the user desires to push the playback session to one or more nearby playback devices (such as the nearest playback device). Otherwise, the receiving device 710a will assume that the user desires to pull a playback session from one or more nearby playback devices (such as the nearest playback device) to the receiving device 710a. The receiving device 710a may be configured to operate on other assumptions in alternative examples.

After or based on receiving a playback session swap input (such as a button press on the receiving device 710a), the receiving device 710a may identify swap-eligible playback devices in the media playback system 100. For a push swap, the set of swap-eligible playback devices may include playback devices of a certain type or that are assigned a certain role in the media playback system 100. To illustrate, other portable playback devices may be configured as ineligible for swap. As another example, only the master in a bonded zone (e.g., a stereo pair or surround sound configuration) may be considered swap eligible. For a pull swap, the set of swap-eligible playback devices include playback devices that have on-going playback sessions. This set may be further narrowed based on other factors, such as those noted above.

As noted above, the playback devices 110 in the media playback system 100 may maintain or have access to state variables representing the state of the playback devices and other configuration information. This state information is updated periodically or on an event-based basis (e.g., when state changes), such as via subscriptions to certain types of events or statuses (e.g., playback event, grouping event, topology change event, player volume event, group volume event, playback metadata event) and notifications of specific events. The protocol used for the subscriptions may be uPnP based, a proprietary event notification protocol, or an API.

Portable playback devices 710, including the receiving device 710a and earbuds 719b, may similarly maintain or have access to these state variables and determine the set of swap-eligible playback devices based on the information in the state variables. The state variables may be received from another playback device in the media playback system and/or received from state information stored in a remote computing system in the cloud. In FIG. 27 example, the receiving device 710a has identified the playback device 110b, the playback device 110g, and the playback device 100n as swap-eligible playback devices.

After identifying the swap-eligible playback devices, the receiving device 710a, causes the swap-eligible playback devices to emit respective audio signals. For example, the receiving device 710a may send commands to the playback device 110b, the playback device 110g, and the playback device 100n to cause these playback devices to emit audio signals. In some examples, swap-eligible playback devices are not identified, and instead all devices within the playback system receive a command to output a respective audio signal.

In some examples, the audio signals may be ultrasonic (e.g., greater than 20 kHz) or near-ultrasonic (e.g., 18-20 kHz). Audio signals in such frequencies may avoid propagation of the audio signal outside the proximity of the emitting playback device. Further, such signals may also avoid user distraction.

Each audio signal may include data in the form of an encoded identifier. Each encoded identifier may be different and encoded as a set of tones, which is known to the receiving device 710a. The audio signals can be transmitted by the swap-eligible playback devices simultaneously, concurrently, sequentially or when the particular playback device receives the command/instruction to transmit the audio signal. In some examples, a device in the media playback system may provide timing information as to when to transmit the audio signal for each of the playback devices and/or a duration of the audio signal.

After instructing the swap-eligible playback devices to emit the audio signal, the receiving device 710a attempts to detect the emitted audio signals via one or more microphones (e.g., the microphones 715). For instance, the receiving device 710a may attempt to detect the emitted audio signals via one or more voice microphones in the housing of the receiving device 710a. Alternatively, the receiving device 710a may attempt to detect the emitted audio signals via one or more ANC microphones in the housing of the receiving device 710a. In some instances, particular microphones (ANC or voice) may be selected or tuned to be sensitive to the ultrasonic or near-ultrasonic range such that these microphones are particularly suited to receiving the audio signals. Other examples are possible as well, such as a dedicated microphone selected or tuned to receiving the audio signals.

To identify the closest/nearest playback device, the receiving device 710a may compare the detected audio signals. For instance, the receiving device 710a may compare various metrics such as sound pressure levels and/or signal-to-noise ratios of the detected audio signals to identify the "loudest" audio signal (e.g., based on detected sound pressure level), which may be assumed to have been emitted by the playback device that is physically nearest to the receiving device 710a. In example implementations, the receiving device 710a may list or otherwise rank the swap-eligible playback devices by relative signal strength (e.g., SNR) and then select the highest ranked swap-eligible playback device as the source or target for the swap.

To facilitate comparison between the detected audio signals, the swap-eligible playback devices may emit the audio signals at the same or substantially the same volume level. In some cases, the instructions to emit the audio signals include instructions to change to a certain volume level (e.g., decibel, volume level setting). Since different playback devices have different types of transducers and/or amplifiers, the volume level for each playback device emitting the signal may vary based on the type of device. Alternatively, the playback devices may be pre-configured to emit audio signals at the certain volume level taking into account these differences.

The playback session swap input may take various forms. For instance, a particular input to user interface 713 a of the headphones 710 (FIG. 7B) such as a tap or gesture to the touch sensitive region (or a portion thereof) may trigger the swap. In further examples, the portable playback device 710 may include a physical button to trigger the swap. Yet further, a pattern of touch-inputs (e.g. short, long, short) or a tracing pattern (e.g., a shape such as a zig-zag or triangle) may trigger a swap. Other types of inputs are contemplated as well.

The process of identifying the closest/nearest playback device will now be described in more detail. As mentioned above, the swap-eligible playback devices output respective audio signals which can be used to identify the playback device. These audio signals correspond to respective reference audio signals, where each reference audio signal is associated with a playback device. These audio signals may be unique to each playback device in existence, or may be unique to each playback device within a playback system. Each reference audio signal can be represented by a time-frequency representation.

Figure 28B:
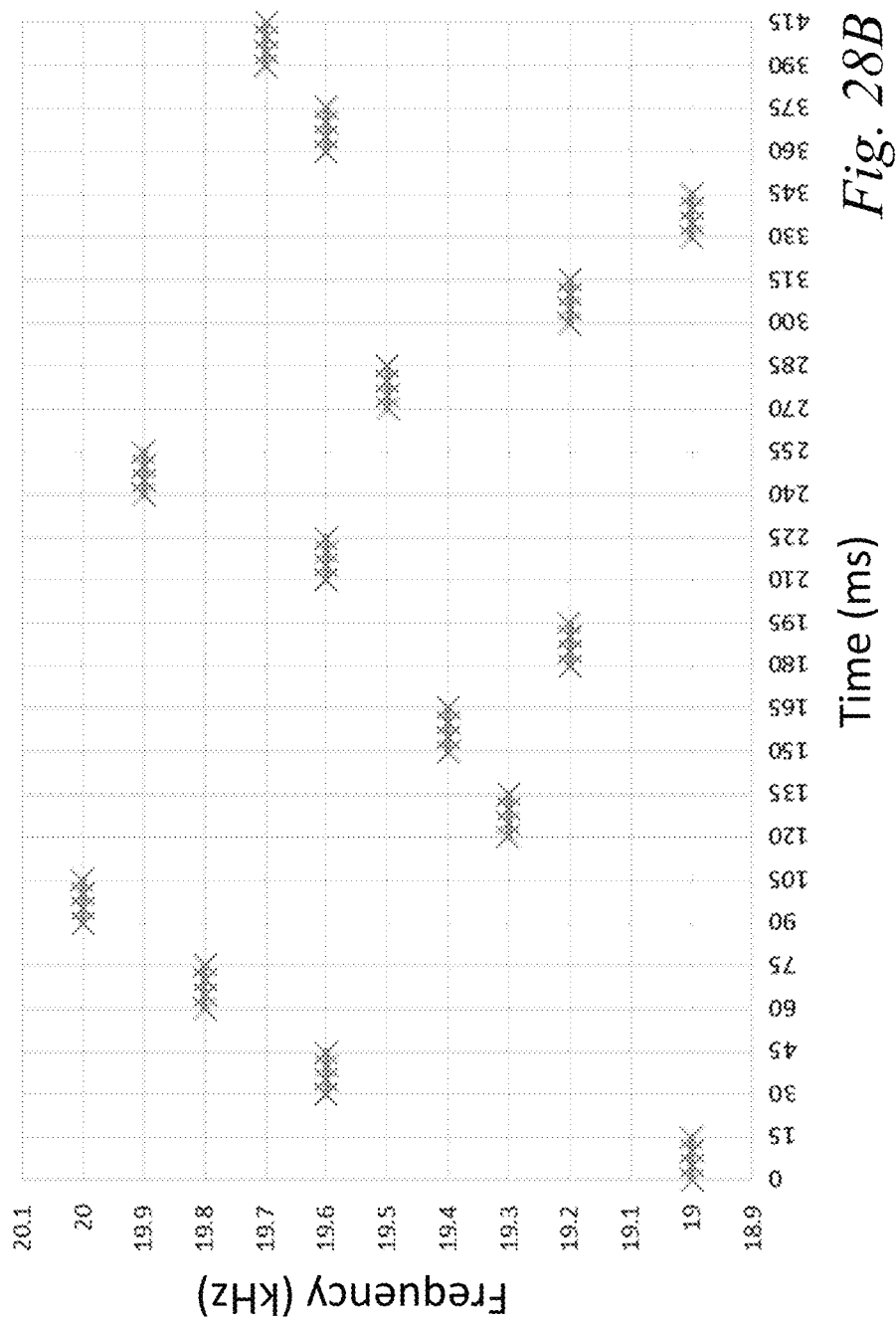
FIG. 28B is an example time-frequency representation of a second reference audio signal in accordance with aspects of the disclosed technology.
Figure 28C:
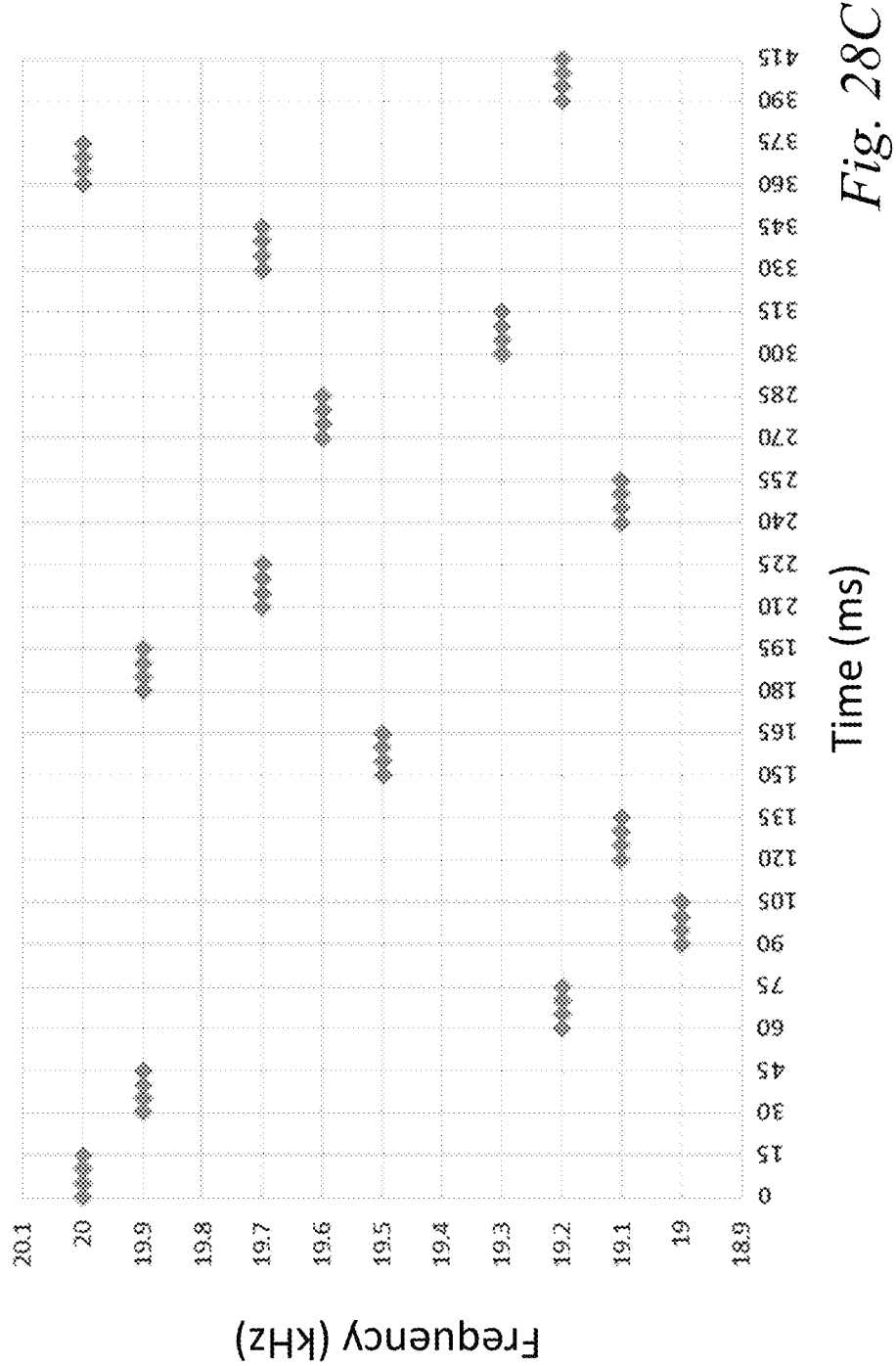
FIG. 28C is an example time-frequency representation of a third reference audio signal in accordance with aspects of the disclosed technology.

FIG. 28A depicts a first time-frequency representation associated with a first reference audio signal. The first reference audio signal may be output by a first playback device, such as playback device 110n in FIG. 27. FIG. 28B depicts a second time-frequency representation associated with a second reference audio signal. The second reference audio signal may be output by a second playback device, such as playback device 110g in FIG. 27. FIG. 28C depicts a third time-frequency representation associated with a third reference audio signal. The third reference audio signal may be output by a third playback device, such as playback device 110b in FIG. 27.

As can be seen in each of FIGS. 28A, 28B and 28C, a time-frequency representation indicates how the constituent frequencies of an audio signal vary over time. The time-frequency representation is therefore a view of an audio signal represented over both time and frequency. The reference audio signals differ for each playback device, and can therefore be used to identify the transmitting playback device.

As shown, each reference audio signal comprises a plurality of tones, where each tone has a predefined frequency. Referring to FIG. 28A, the example reference audio signal has 14 tones, each with a frequency between 19.0 kHz and 20 kHz. In this particular example, between 0 ms and 15 ms, the first playback device 110n would output an audio signal having a frequency of 19.1 kHz and between 30 ms and 45 ms the first playback device 110n would output an audio signal having a frequency of 19.4 kHz. The first tone output by the first playback device 110n therefore has a frequency of 19.1 kHz, an initiation time of 0 ms after the start of the reference audio signal, and a duration of 15 ms. The second tone output by the first playback device 110n has a frequency of 19.4 kHz, an initiation time of 30 ms after the start of the reference audio signal, and a duration of 15 ms.

Similarly, referring to FIG. 28B, between 0 ms and 15 ms, the second playback device 110g would output an audio signal having a frequency of 19.0 kHz and between 30 ms and 45 ms the second playback device 110g would output an audio signal having a frequency of 19.6 kHz. The first tone output by the second playback device 110g therefore has a frequency of 19.0 kHz, an initiation time of 0 ms after the start of the reference audio signal, and a duration of 15 ms. The second tone output by the second playback device 110g has a frequency of 19.6 kHz, an initiation time of 30 ms after the start of the reference audio signal, and a duration of 15 ms.

Similarly, referring to FIG. 28C, between 0 ms and 15 ms, the third playback device 110b would output an audio signal having a frequency of 20.0 kHz and between 30 ms and 45 ms the third playback device 110b would output an audio signal having a frequency of 19.9 kHz. The first tone output by the third playback device 110b therefore has a frequency of 20.0 kHz, an initiation time of 0 ms after the start of the reference audio signal, and a duration of 15 ms. The second tone output by the third playback device 110b therefore has a frequency of 19.9 kHz, an initiation time of 30 ms after the start of the reference audio signal, and a duration of 15 ms.

As shown in FIGS. 28A-28C, each reference audio signal comprises a plurality of tones, where each tone has a predefined frequency, duration and initiation time. The initiation time is the output time of a tone relative to the start of the audio signal. In these examples, the entire reference audio signals have a duration of 415 ms and each of the plurality of tones has a duration of 15 ms. In other examples, the reference audio signals may have a different duration, such as between about 400 ms and about 800 ms. Similarly, in other examples, the tones may have a duration of between about 10 ms and about 20 ms.

In addition, the plurality of tones are spaced apart in time by an interval of time. Preferably the interval of time is between about 10 ms and about 50 ms. In the examples of FIGS. 28A-28C, each tone is spaced apart by an interval of 15 ms. Thus, there is a pause or gap of 15 ms between successive tones. Having an interval between each tone can reduce interference from reverb and/or echo from previously transmitted tones. In the examples of FIGS. 28A-28C, the intervals are the same between each tone (i.e. all are 15 ms), but in other examples, the intervals may be irregular. For example, within a reference audio signal, at least one interval of time may differ to at least another interval of time. This can add to the orthogonality of the reference audio signal.

Within each reference audio signal, the frequencies of each tone are selected from a predefined set of frequencies. For example, as shown in FIGS. 28A-28C, the frequency of each tone is be selected from the following set of frequencies: 19.0 kHz, 19.1 kHz, 19.2 kHz, 19.3 kHz, 19.4 kHz, 19.5 kHz, 19.6 kHz, 19.7 kHz, 19.8 kHz, 19.9 kHz, 20.0 kHz. In other examples, each frequency within the predefined set of frequencies is between about 18 kHz and about 20 kHz. In this example, the frequency difference between each frequency within the predefined set of frequencies is 100 Hz.

The frequency difference should ideally be greater than about 50 Hz to account for the Doppler shift of the tones in case a user is moving the receiving device 710a towards or away from the playback devices 110n, 110g, 110b. In an example, a tone having a frequency of 20 kHz would be Doppler shifted by ±43 Hz if the receiving device 710a is being moved with a typical walking velocity of 0.75 m/s. Thus, referring to FIG. 28A as an example, the tone of 20.0 kHz may be detected with a frequency of 20.0±43 Hz, as shown by the error bar. Accordingly, in this example, tones should be spaced at a minimum of 86 Hz (such as 100 Hz) to remove ambiguity during detection.

As another example, a tone having a frequency of 20 kHz would be Doppler shifted by ±60 Hz if the receiving device 710a is being moved with a typical walking velocity of 1 m/s. Accordingly, to account for walking speeds of 1 m/s, tones should be spaced at a minimum of 120 Hz (such as 150 Hz) to remove ambiguity during detection. Accordingly, at walking speeds of around 1 m/s, a frequency difference of 100 Hz would not be adequate to allow accurate detection of tone frequencies. A tone of 19.9 kHz may be incorrectly detected as a tone of 20.0 kHz if Doppler shifted by 120 Hz, for example. As such, it is preferred that the frequency difference between each frequency within the predefined set of frequencies is greater than about 150 kHz.

Assuming that all three playback devices 110n, 110g, 110b are located in the same room, and they output respective reference audio signals, the resulting audio signals may combine into a single audio signal that is a superposition of all three reference audio signals. However, if the third playback device 110b, for example, is located in a different room to the first and second playback devices 110n, 110g, then its reference audio signal may not be detected and the audio signal may be a superposition of only the first and second reference audio signals output by the first and second playback devices 110n, 110g respectively.

As the three playback devices 110n, 110g, 110b output their respective reference audio signals, the (possibly combined) audio signal can be detected by the receiving device 710a to determine which playback devices are in the vicinity of the receiving device 710a.

Figure 29:
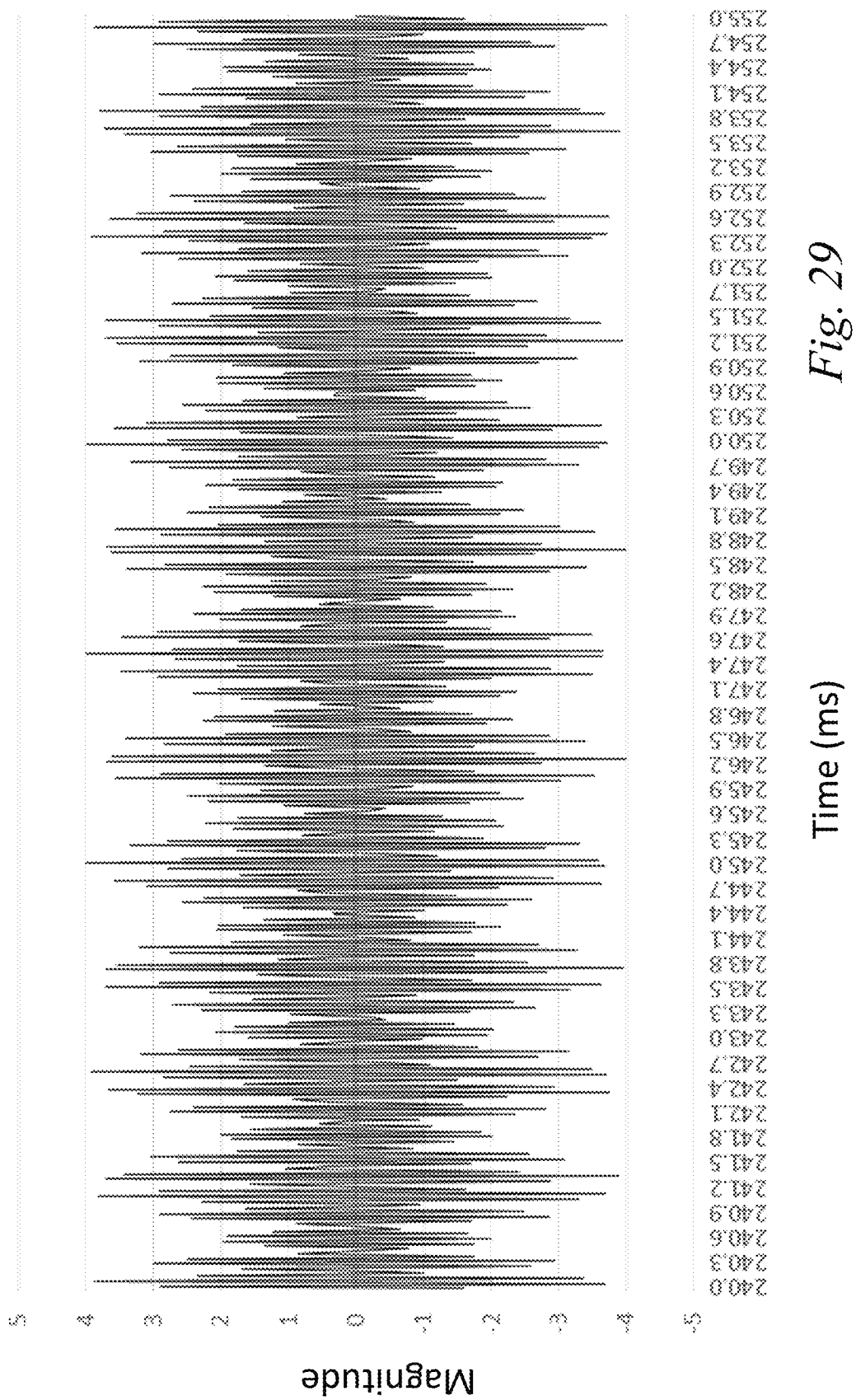
FIG. 29 is a portion of a detected audio signal in accordance with aspects of the disclosed technology.

FIG. 29 depicts a portion of an audio signal detected by the receiving device 710a during a particular time period. In this example, the audio signal is a portion of the audio signal received between 240 ms and 255 ms after the audio signal is first detected. Accordingly, the "complete" audio signal detected by the receiving device 710a would comprise a plurality of portions similar to this example portion. Each portion of the audio signal is associated with a detection time and has a particular duration. In FIG. 29, the portion of the audio signal has a detection time of 240 ms and a duration of 15 ms.

Figure 30:
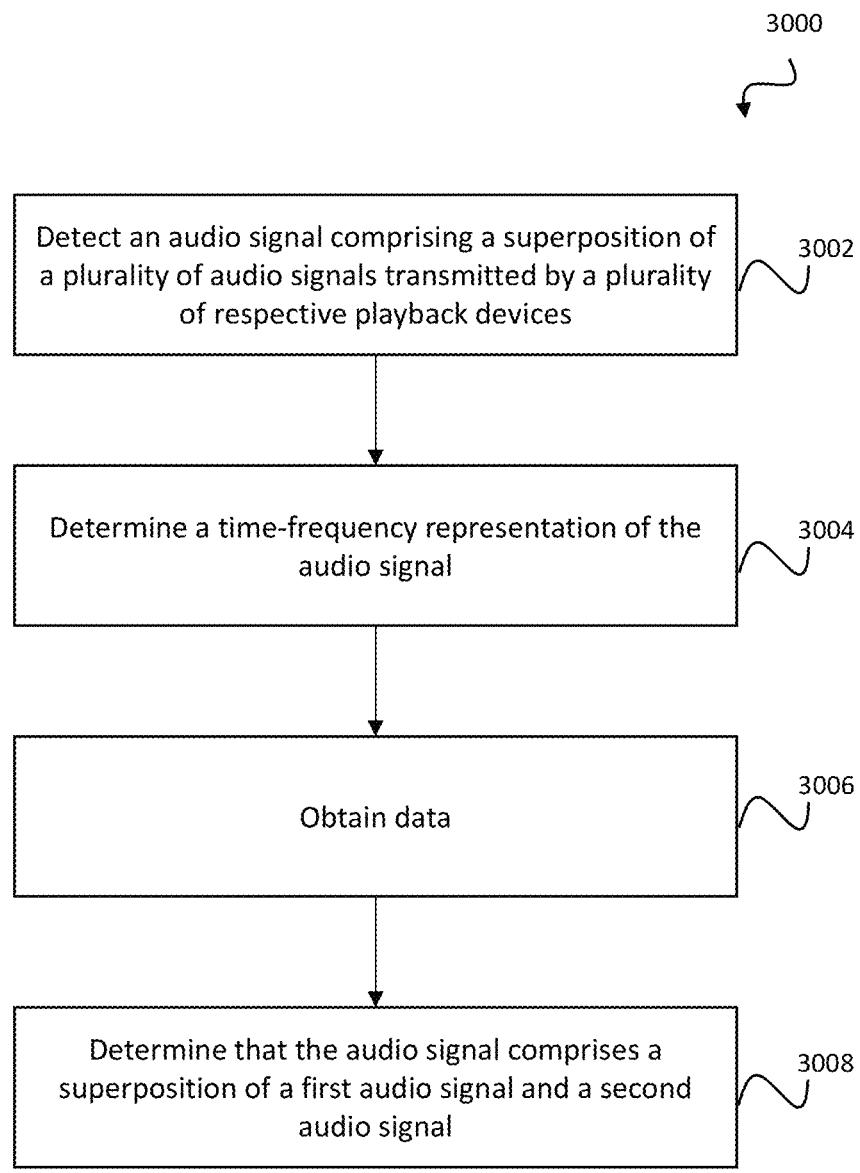
FIG. 30 is a flow diagram of a method in accordance with aspects of the disclosed technology.

FIG. 30 is a flow chart of a method 3000 for analyzing an audio signal that is a superposition of a plurality of audio signals transmitted by a plurality of respective playback devices. The method may, for example, be at least partially performed by the receiving device 710a. Some method steps may be performed by one or more other devices, such as a controller device or a playback device or a remote server, for example.

At block 3002, the method comprises detecting, by the receiving device 710a, an audio signal comprising a superposition of a plurality of audio signals transmitted by a plurality of respective playback devices. For example, a microphone of the receiving device 710a may detect the audio signal depicted in FIG. 29 as well as one or more other portions of the audio signal. The duration of time that the receiving device listens for the plurality of audio signals can be based on the total duration of time it takes to transmit one audio signal one or more times. For example, if the total duration for an audio signal is 700 ms and the audio signal is transmitted twice, the listening duration (or listening window) may be at 1400 ms. The audio signals may be transmitted with increasing volume levels (e.g., decibel) for the second and subsequent times.

After the complete audio signal has been detected, it can be analyzed by the receiving device 710a itself or another device, to determine or extract a time-frequency representation of the complete audio signal. Accordingly, at block 3004, the method comprises determining a time-frequency representation of the audio signal. Since the audio signal could be a superposition of an unknown number of reference audio signals, the time-frequency representation of the audio signal may comprise a plurality of reference time-frequency representations.

Figure 31:
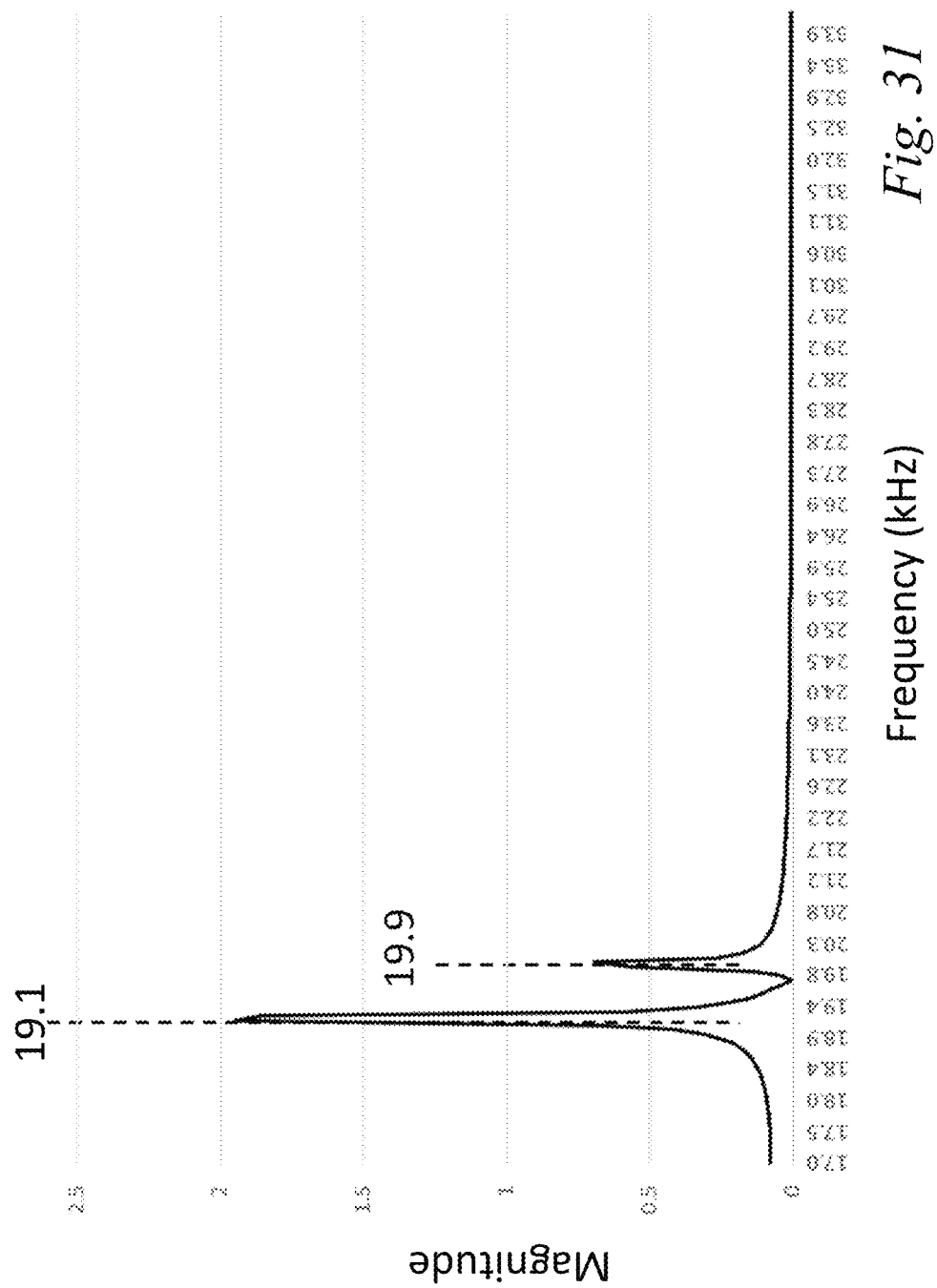
FIG. 31 is a representation of a Fourier transform of the signal of FIG. 11 in accordance with aspects of the disclosed technology.

In one example, determining a time-frequency representation of the audio signal involves performing Fourier transforms on portions of the audio signal. A Fourier transform of a time-varying signal (such as the portion of the audio signal depicted in FIG. 29) decomposes the signal into its constituent frequencies, thereby identifying the constituent frequencies within the audio signal. For example, performing a Fourier transform of the audio signal of FIG. 29 identifies that this portion of the detected audio signal has two constituent frequencies, as shown in FIG. 31. FIG. 31 therefore depicts the output of the Fourier transform of the portion of the audio signal in FIG. 29. In this example, the audio signal has two constituent frequencies, with a first frequency of 19.1 kHz and a second frequency of 19.9 kHz.

In the same way, Fourier transforms can be performed for all portions of the detected audio signal to identify the constituent frequencies as a function of time. This allows a time-frequency representation of the detected audio signal to be determined. In some examples, a constituent frequency may be determined to be present within the audio signal if the magnitude of the Fourier transform output (within a particular frequency bin) is greater than a predetermined threshold.

In another example, the audio signal is analyzed as the audio signal is received by the receiving device 710a in the form of input samples using a rolling time-frequency window. A short-time Fourier transform (STFT) can be performed on successive portions of the input samples with overlap between the successive portions. The duration of the time-frequency window can be based on the total amount of time to transmit the audio signal. For example, if the total amount of time to transmit each audio signal is 800 ms, the window duration could be 600 ms. There can be overlap in the samples processed by performing STFT at time 600 ms for a first block of samples and 1100 ms for a second block of samples. The samples in the two blocks would have a 100 ms overlap between them.

Figure 32:
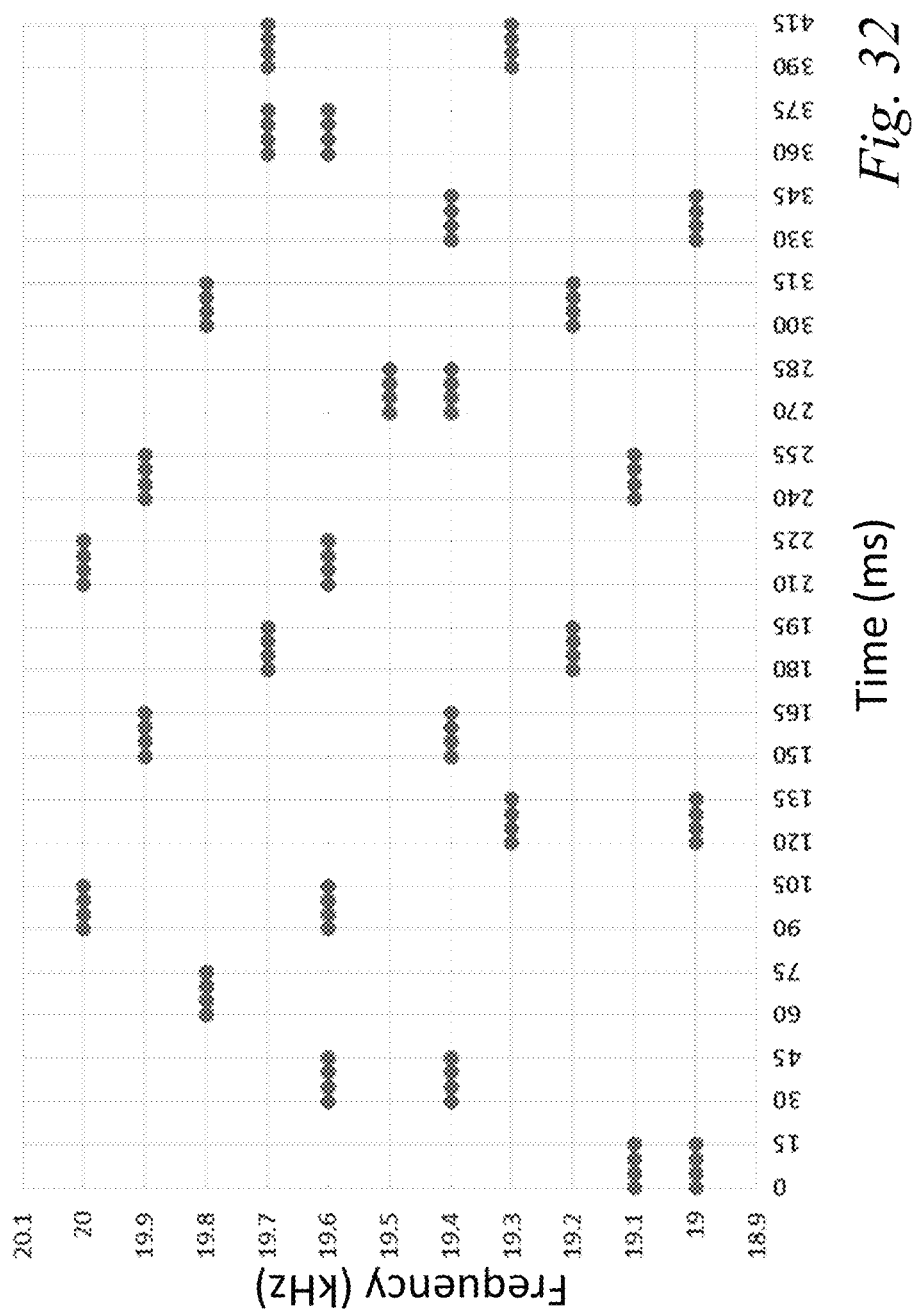
FIG. 32 is an example time-frequency representation of a detected audio signal in accordance with aspects of the disclosed technology.

FIG. 32 depicts an example time-frequency representation of a detected audio signal. Within examples, a signal of a constituent frequency is determined to be present if the magnitude of the Fourier Transform at that frequency (or within a particular frequency bin) is above a predetermined threshold. In this particular example, each portion of the detected audio signal contains two constituent frequencies, but in other examples each portion may contain any number of constituent frequencies, including zero constituent frequencies. FIG. 32 shows two constituent frequencies of 19.1 kHz and 19.9 kHz between 240 ms and 255 ms, so the Fourier Transform of FIG. 31 corresponds to the portion to the time-frequency representation from 240-255 ms in FIG. 32.

As mentioned, the time-frequency representation of the detected audio signal (shown in FIG. 32) may comprise a plurality of reference time-frequency representations. It therefore needs to be determined which of the reference time-frequency representations are present in the time-frequency representation of the detected audio signal. For example, it needs to be determined whether the first, second and/or third time-frequency representations depicted in FIGS. 28A, 28B, 28C are present in the time-frequency representation of the detected audio signal of FIG. 32. This analysis can be performed by reference to data that associates the playback devices with their respective reference audio signals, where each reference audio signal has a reference time-frequency representation.

Accordingly, the method 3000 further comprises at block 3006, obtaining data associating playback devices with respective reference audio signals. This data may be stored in memory of the receiving device, remote server, and/or other playback device, and may be stored within a database or a lookup table, among other examples. The data may associate a plurality of reference audio signals with respective playback devices. For example, the data may associate each playback device within the playback system with a respective reference audio signal. Block 3006 may be performed by the same device that performs block 3004.

Once the data has been obtained, the method 3000 further comprises determining which of the plurality of reference audio signals are present within the detected audio signal. In a particular example, the method 3000 therefore comprises, in block 3008, determining that the audio signal comprises a superposition of a first audio signal transmitted by a first playback device and a second audio signal transmitted by a second playback device. This determination is based on the data obtained in block 3006 and the time-frequency representation of the audio signal determined in block 3004.

For example, the database can indicate that the first playback device is associated with the reference time-frequency representation depicted in FIG. 28A. In particular, the database may indicate that the reference time-frequency representation for the first playback device includes 14 tones and specify the frequency and duration of each tone. In addition to or instead of the frequency and duration of each of the tones, the database can identify the frequency offsets between each of the tone. For example, in FIG. 28A, the first tone is at 19.1 kHz and the second tone is at 19.4 kHz resulting in an offset of 0.3 kHz. The offsets may be used in addition to or instead of the frequencies for each tone to identify the transmitting playback device. Identification via offsets may be less susceptible to misidentification because of the Doppler effect, which impacts the frequency of the tones received at the receiving device.

In some examples, it may be assumed that the plurality of reference time-frequency representations are synchronized in time, so that there is no temporal offset between the plurality of reference time-frequency representations within the time-frequency representation of the detected audio signal. This would occur, for example, when the respective reference audio signals are output by the playback devices 110n, 110g, 110b at substantially the same time. However, in other examples, the respective reference audio signals may be output by the playback devices 110n, 110g, 110b at different times. This means that the time-frequency representation of the detected audio signal may comprise a plurality of reference time-frequency representations which are offset from each other in time. Accordingly, in some examples, the analysis to determine which reference time-frequency representations are present in the time-frequency representation of the detected audio signal takes into consideration this temporal offset.

In this particular example, the analysis determines that the first and second time-frequency representations are present in the time-frequency representation of FIG. 32. The detected audio signal therefore comprises a superposition of the first reference audio signal transmitted by the first playback device 110n and the second reference audio signal transmitted by the second playback device 110g.

Figure 33:
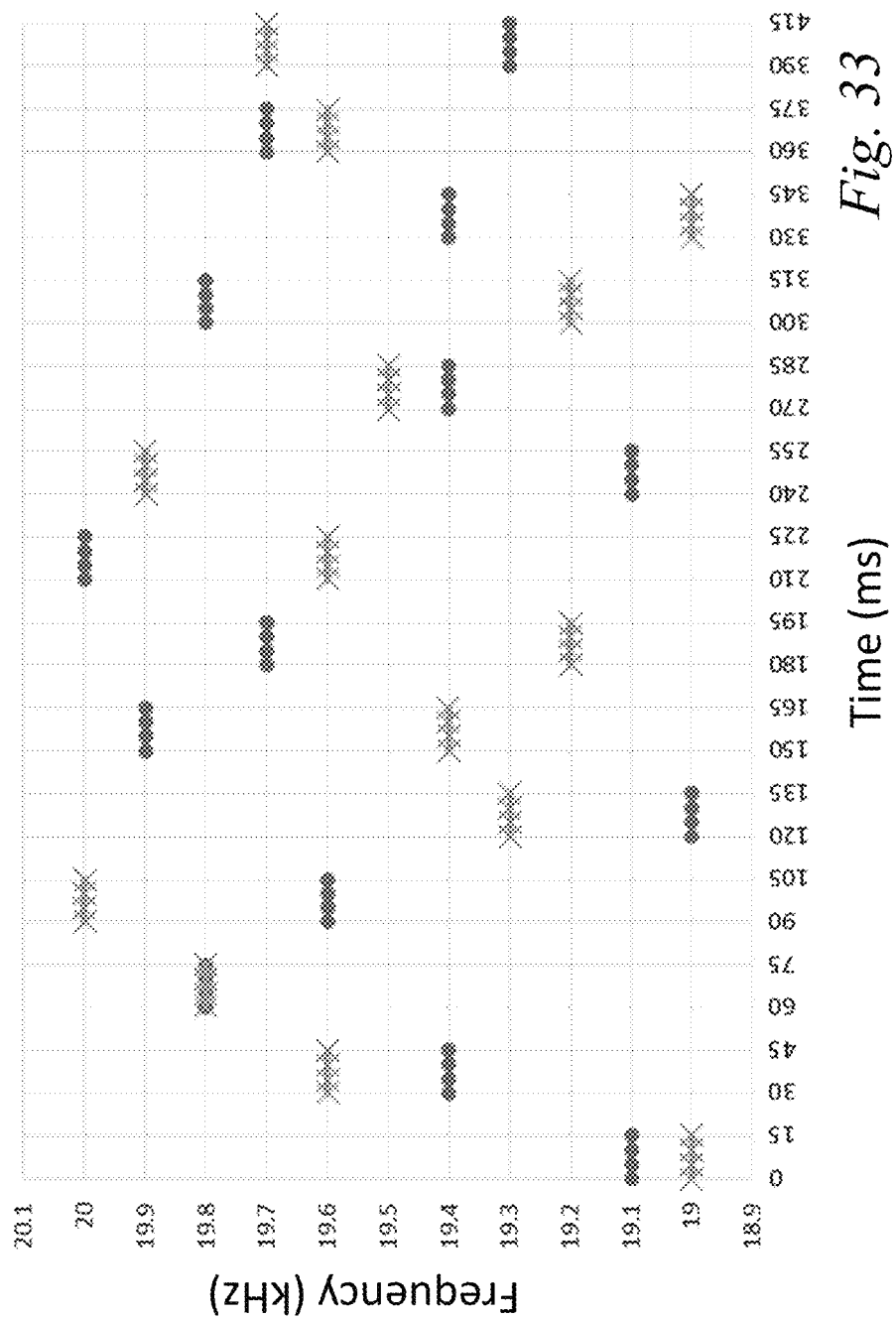
FIG. 33 is another example time-frequency representation of a detected audio signal in accordance with aspects of the disclosed technology.

FIG. 33 depicts the first time-frequency representation of FIG. 28A overlaid with the second time-frequency representation of FIG. 28B. This resultant time-frequency representation corresponds to the time-frequency representation of FIG. 32. Furthermore, it can be determined that the audio signal detected by the receiving device does not contain the third reference audio signal transmitted by the third playback device 110b, possibly because the third playback device 110b is located in a different room to the receiving device 710a.

In some examples, it is determined that a particular reference time-frequency representation is present in the time-frequency representation of the detected signal only when all of the tones within the reference time-frequency representation are present in the time-frequency representation of the detected signal. In other examples, it may be determined that a particular reference time-frequency representation is present when a threshold quantity of the tones within the reference time-frequency representation are present. For example, it may be determined that the particular reference time-frequency representation is present within the time-frequency representation of the detected signal when greater than 80% or greater than 90% of the tones are present/matched within the time-frequency representation of the detected signal. Use of such a threshold accounts for analysis error and noise whereby certain tones may not be detected or mischaracterized.

After it has been determined which reference audio signals are present in the detected audio signal, it may be determined which of the playback devices is located nearest to the receiving device. In one example, this is achieved by determining a magnitude associated with each detected audio signal. For example, a first magnitude associated with the first reference audio signal transmitted by the first playback device 110n is determined, and a second magnitude associated with the second reference audio signal transmitted by the second playback device 110g is determined.

After this, the first and second magnitudes are compared to determine which is greatest. For example, if it is determined that the first magnitude is greater than the second magnitude it may be determined that the first playback device 110n is arranged closer than the second playback device 110g to the receiving device 710a. The magnitudes associated with each audio signal may be directly proportional to the sound pressure level of the audio signal. Thus, it may be assumed that the "loudest" audio signal (i.e. the audio signal with the highest magnitude) is located closest to the receiving device 710a.

In a particular example, the magnitudes are determined based on the Fourier transform(s) of the audio signal. For example, referring again to FIG. 31, the Fourier transform of a portion of the detected audio signal identifies two components, where a first component/tone (with a frequency of 19.1 kHz) is associated with the first reference audio signal output by the first playback device 110n, and a second component/tone (with a frequency of 19.9 kHz) is associated with the second reference audio signal output by the second playback device 110g. In this example, the magnitude of the first component associated with first reference audio signal is approximately 3 times greater than the magnitude of the second component associated with the second reference audio signal. Thus, for this portion of the detected audio signal, the magnitude of associated with the first reference audio signal is greater than the magnitude associated with the second reference audio signal. It may therefore be assumed that the first playback device 110n (which output the first reference audio signal) is closer than the second playback device 110g (which output the second reference audio signals).

Thus, in some examples, the magnitudes associated with the reference audio signals are determined from a single portion of the detected audio signal. However, in other examples, the magnitudes are average magnitudes based on a plurality of portions of the detected audio signal. For example, in the same way as described above, a plurality of magnitudes associated with each reference audio signal may be determined from a plurality of portions of the detected audio signal, and the magnitude may be the average of these.

In a particular example, the magnitude associated with each reference signal is a magnitude at a particular frequency to account for frequency variations of the magnitude. Thus, it may be more accurate to compare magnitudes of different signals at the same frequency.

After it has been determined which playback device is nearest, a playback session swap may occur between the nearest playback device and the receiving device 710a. In one example, the first playback device 110n is playing back audio content in a playback session, and is determined to be arranged nearest to the receiving device 710a. Accordingly, the playback session may transition from the first playback device 110n to the receiving device 710a, such that the receiving device 710a begins to play back the audio content. In another example, the receiving device 710a is playing back audio content in a playback session, and it is determined that the first playback device 110n is arranged nearest to the receiving device 710a. Accordingly, the playback session may transition from the receiving device 710a to the first playback device 110n, such that the first playback device 110n begins to play back the audio content.

Figure 34:
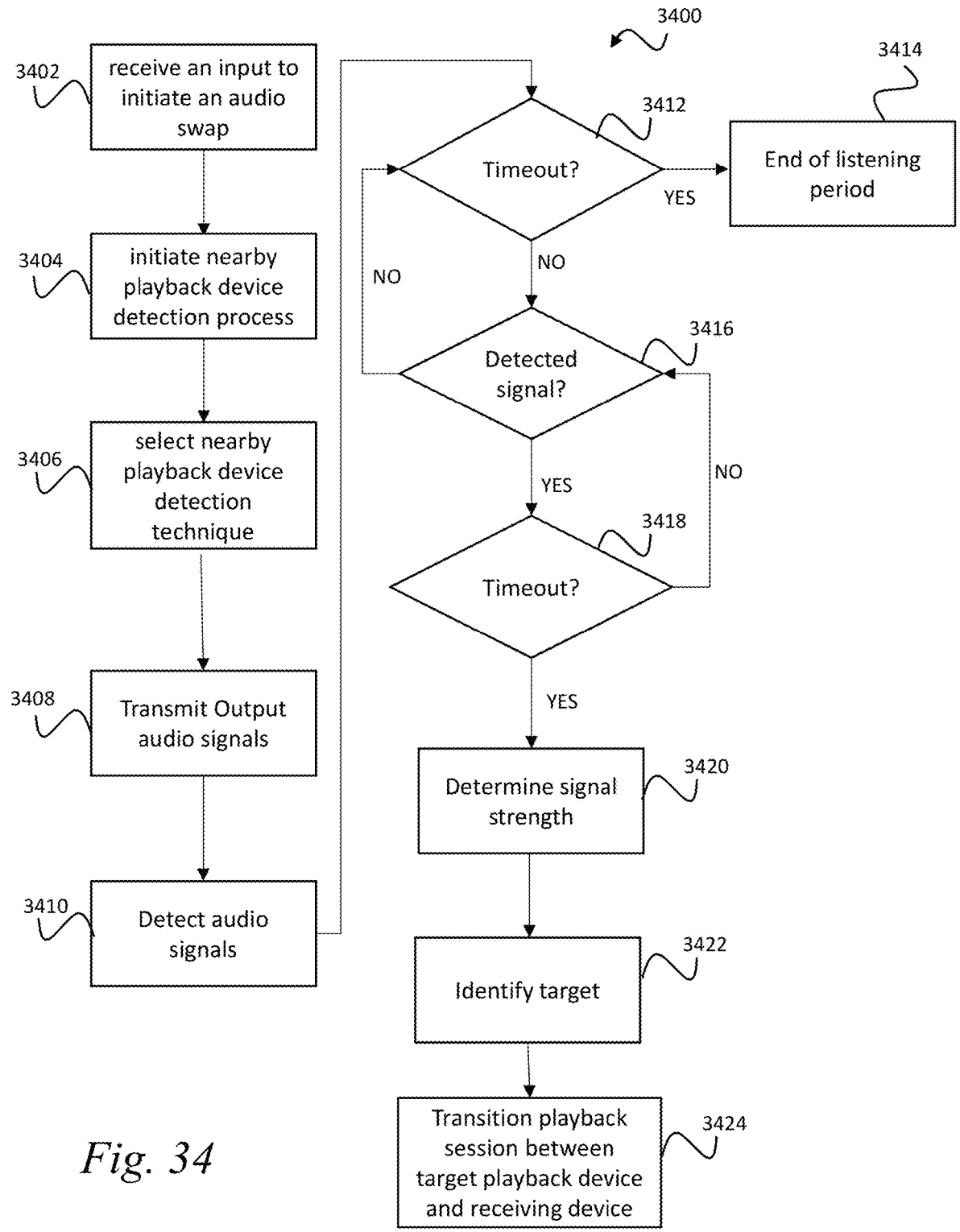
FIG. 34 is another example flow diagram of a method in accordance with aspects of the disclosed technology.

FIG. 34 depicts a flow diagram for a method 3400 for performing presence detection of nearby playback devices. At block 3402, the receiving device (e.g., portable playback device 710a) receives an input to initiate an audio swap. The input to initiate the audio swap may be a swap command received via an interface of the receiving device 710a (e.g., buttons, capacitive touch surface), determination of a state corresponding to detection of a predicted swap command corresponding to an input indicating a user's intent to provide a command to the receiving device, or a command received by the receiving device from a controller device over a network connection (e.g., Wi-Fi, Bluetooth, wired communication, local area network, wide area network).

The predicted swap command can be any type of user interaction with a control interface of the receiving device that may or might not result in the user providing a control command to the receiving device. For example, the swap gesture may be a press and hold of a button for two seconds on the playback device, and in response to detecting that the user has touched the button for 50 ms (e.g., an amount of time less than necessary to trigger a control command) and prior to completion of the swap gesture, the receiving device may proceed to block 3404 and initiate presence detection of nearby playback devices. As yet another example, the receiving device may contain a movement sensor (e.g., accelerometer) and in response to detecting movement of the receiving device, the receiving device may predict a swap command is being inputted and proceed to block 3404.

In some instances, the receiving device and a nearby playback device may both contain movement sensors, and in response to determining movement of both devices within a recent time period (e.g., 15 seconds, 30 seconds) corresponding to a physical interaction between the receiving device and a nearby playback device (e.g., bumping or tapping the receiver playback device and a nearby playback device against each other), the receiving device may proceed directly to block 922d and identify the nearby playback device as the swap target. In some instances, the tapping of playback devices against each other may be detected acoustically using microphones on both the receiving device and the nearby playback device. For example, if there was a peak in noise detected at both devices within a recent time period, a tap may have occurred. In some instances, the receiving device may consider the physical interaction a predicted swap command and wait for a swap command before proceeding to block 3422.

In some instances, the availability of the predicted swap command may depend on whether a network connection (e.g., Bluetooth, Wi-Fi, wired network, wireless network, local area network, wide area network) is available to communicate with swap-capable playback devices. For example, the receiving device may communicate with the swap-capable playback devices over Wi-Fi, and the predicted swap command feature may be enabled after or while the receiving device is connected to Wi-Fi.

As yet another example, upon connecting to a wireless network, the receiving device may determine that there are other playback devices on the same wireless network and enable the predicted swap command feature. The receiving device may determine that other playback devices are on the same wireless network based on state information of the media playback system received from another playback device or from a server.

In another example, one or more conditions may be required before enabling the predicted swap command feature such as connection to the same wireless network as other playback devices and determination that at least one other playback device is a swap-capable playback device. The state information may identify swap-capable playback devices.

At block 3404, the receiving device initiates presence detection of nearby playback devices, and at block 3406, the receiving device selects one or more nearby playback device presence detection techniques to use. The presence detection techniques include using an audio signal, wireless signal pattern analysis, Bluetooth beacon (e.g., Bluetooth low energy), ultrawideband (UWB) localization or other proximity or presence detection techniques. An example of determining nearby playback devices using wireless signal pattern analysis is described in U.S. patent application Ser. No. 16/775,212, filed on Jan. 28, 2020 and titled "Systems and Methods for Playback Device Management," which is incorporated by reference herein.

The selection of the presence detection techniques can be based on which technique is supported by the most devices in the media playback system, which technique results in the fastest determination of a nearby playback device, and/or which technique is the most reliable or accurate. One or more techniques for nearby device detection may be used sequentially, simultaneously, or concurrently. For example, if a first technique fails to detect nearby playback devices or encounters an error condition, then a second technique may be used.

At block 3406, the receiving device selects audio chirp for the nearby playback device presence detection technique. At block 3408, the receiving device sends a command to begin the audio chirp device detection technique. The command may be a command(s) that is broadcasted, multicasted, or transmitted individually to all devices in media playback system, among other examples. The command to begin the audio chirp may include parameters such as an identifier of the player receiving the command, code to be used by the player for the audio chirp, and/or an audio chirp time duration (e.g., seconds, minutes, etc.).

In some examples, the code to be used by the player for the audio chirp may be predetermined or assigned based on a code book and/or based on the number of devices in the media playback system. The available codes to use can be based on the number of devices such that when there are less devices in the media playback system the codes may be spaced further apart in the frequency spectrum to reduce interference and/or potential for collisions of audio signals between multiple playback devices.

At block 3408, the playback devices 110b, 110g, 110n may receive a command from the portable playback device 710a to begin transmitting reference audio signals containing their respective plurality of tones. The command may be received via a wired or wireless connection, server(s), local area network, and/or wide area network. At block 3410, the receiving device (such as the portable playback device 710a or controller), may begin listening for audio signals. The receiving device may listen for reference audio signals for a predetermined listening period which may be a length of time sufficient to allow the plurality of reference audio signals to be transmitted more than once. For example, if the playback devices transmit a reference audio signal three times, the listening period may be set for three times the total duration of one reference audio signal with an added buffer time to allow for variances in initiation of the audio signal transmission.

At block 3412, the receiving device determines whether it has listened for full duration of the listening period. Block 3412 may be performed at intervals that are less than the full duration of the listening period. If the receiving device determines it has listened for the full duration of the listening period, then the receiving device may proceed to block 3414 and end detection for audio signals. The method may proceed to block 3414 when no reference audio signals have been detected during the listening period. If the receiving device determines that it has not yet listened for the full duration of the listening period, then the receiving device may proceed to block 3416 to determine whether any time-frequency representations or portions thereof have been decoded or detected.

In some instances, the method 3400 may proceed to block 3414 if a particular playback device encounters error(s) in the process of transmitting an audio chirp. If a particular playback device encounters error(s) in the process of transmitting an audio chirp, the method 900 may return to block 906 and select a different presence detection technique. The playback device encountering the error may send a message to the portable playback device indicating an error occurred. The error message may include the identifier of the particular playback device. In some instances, the method 3400 may proceed to block 3422 if the portable playback device has identified a target device for the swap and sends a command to one or more playback device(s) to end the nearby device presence detection process.

If at block 3416 no reference audio signals have been decoded or detected, then the receiving device returns to block 3412. If at block 3416 the receiving device has detected one or more time-frequency representations, then the receiving device may proceed to block 3418 and determine whether it has listened for the full duration of the listening period. If at block 3418 the receiving device has not listened for the full duration of the listening period, then the receiving device returns to block 3416 to determine whether any additional time-frequency representations have been decoded. If at block 3418 the receiving device has listened for the listening period, then the receiving device may proceed to block 3420.

At block 3420, the receiving device may detect the signal strength of each detected reference audio signal and sort the detected playback devices according to signal strength. The order may be in descending order of signal strength or ascending order. Alternatively, the receiving device may determine in block 3420 which playback device is associated with the "strongest" audio signal. At block 3422, the receiving device may determine that the detection of nearby playback devices is complete and identify the playback device with the strongest signal strength (i.e. the nearest playback device) as the target for the playback session swap.

At block 3424, the playback session is transitioned between the receiving device and the target playback device for the playback session swap.

XIII. Conclusion

The above discussions relating to portable playback devices, playback devices, control devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example 1: A method comprising: while a first playback device is playing back audio content during a playback session, detecting a playback session swap trigger corresponding to the playback session; determining (a) one or more source playback devices, the one or more source playback devices comprising the first playback device and (b) one or more target playback devices comprising a second playback device; and based on the playback session swap trigger, transitioning the playback session from the determined one or more source playback devices to the one or more target playback devices.

Example 2: The method of example 1, wherein transitioning the playback session from the determined one or more source playback devices to the one or more target playback devices comprises: forming a synchrony group that includes the first playback device and the second playback device such that the first playback device and the second playback device play back the audio content in synchrony; and muting the first playback device.

Example 3: The method of example 1 or 2, wherein transitioning the playback session form the determined one or more source playback devices to the one or more target playback devices comprises: transmitting, to a cloud queue server, instructions to transfer the playback session from the first playback device to the second playback device, wherein the cloud queue server transfers the playback session to the second playback device based on the instructions.

Example 4: The method of any preceding example, wherein transitioning the playback session from the determined one or more source playback devices to the one or more target playback devices comprises: transmitting, to the second playback device, data representing (i) an uniform resource identifier (URI) indicating a source of the audio content and (ii) an offset within the audio content, wherein the second playback device streams the audio content from the source of the audio content and plays back the audio content beginning at the offset, and wherein the first playback device stops playing back the audio content at the offset.

Example 5: The method of any preceding example, wherein the first playback device comprises: at least one processor; data storage; one or more amplifiers; one or more transducers; one or more batteries configured to drive the one or more amplifiers and the one or more transducers; and one or more housings carrying the at least one processor, the data storage, the one or more amplifiers, the one or more transducers, and the one or more batteries, wherein the one or more housings are formed into at least one of (a) headphones or (b) earbuds.

Example 6: The method of any preceding example, wherein the first playback device is paired, via a first type of wireless connection, to a control device, and wherein the first playback device is connected to the second playback device via the first type of wireless connection and a second type of wireless connection between the control device and the second playback device.

Example 7: The method of any preceding example, wherein detecting the playback session swap trigger comprises: detecting, via a user interface of the control device, input representing a command to swap the playback session.

Example 8: The method of any preceding example, wherein detecting the input representing the command to swap the playback session comprises: detecting a touch-and-hold input to a touch-sensitive region on the first playback device, wherein a touch input performs a first action that is not a swap.

Example 9: The method of any preceding example, wherein detecting the input representing the command to swap the playback session comprises: detecting a touch-and-continued hold input to a touch-sensitive region on the first playback device, wherein a touch input performs a first action and a touch-and-hold performs a group action, and wherein the first action is not a swap.

Example 10: The method of one of examples 1-5, wherein the first playback device is paired, via a first type of wireless connection, to a bridge device, and wherein the first playback device is connected to the second playback device via the first type of wireless connection and a second type of wireless connection between the bridge device and the second playback device.

Example 11: The method of example 10, wherein detecting the playback session swap trigger comprises: detecting, via a user interface of the bridge device, input representing a command to swap the playback session.

Example 12: The method of example 10 or 11, wherein the bridge device comprises a circular housing, and wherein the method further comprises: detecting a rotation of the circular housing; and adjusting a playback volume of the first playback device in proportion to the rotation.

Example 13: The method of one of examples 1-12, wherein the first playback device comprises: at least one processor; data storage; one or more amplifiers; one or more transducers; one or more batteries configured to drive the one or more amplifiers and the one or more transducers; and a housing carrying the at least one processor, the data storage, the one or more amplifiers, the one or more transducers, and the one or more batteries, wherein the housing is formed into a handheld speaker.

Example 14: The method of example 13, wherein detecting the playback session swap trigger comprises: detecting that the housing is placed into a device base.

Example 15: The method of any preceding example, wherein the second playback device excludes a battery and draws current from wall power.

Example 16: The method of any preceding example, wherein the detecting the playback session swap trigger comprises: detecting proximity of the second playback device to the first playback device.

Example 17: The method of any preceding example, wherein determining the one or more target playback devices comprises: detecting proximity of the second playback device to the first playback device.

Example 18: The method of any preceding example, wherein the one or more target playback devices further comprise a third playback device, and wherein determining the one or more target playback devices comprises: determining that the third playback device is configured into a synchrony group with the second playback device.

Example 19: A system configured to perform the method of any of examples 1-18.

Example 20: A device configured to perform the method of any of examples 1-18.

Example 21: A tangible, non-transitory computer-readable media having stored therein instructions executable by one or more processors to perform the method of any of examples 1-18.

Example 22: A portable playback device comprising: at least one processor; a network interface; one or more amplifiers; one or more transducers; one or more batteries configured to drive the one or more amplifiers and the one or more transducers; and one or more housings formed into (a) earbuds or (b) headphones, the one or more housings carrying the at least one processor, the network interface, the one or more amplifiers, the one or more transducers, and the one or more batteries, and data storage having stored therein instructions executable by one or more processors to perform the method of any of examples 1-18.

Example 23: A method involving a wearable device, the method comprising: receiving data representing a first playback session swap input; based on receiving the data representing the first playback session swap input, identifying one or more source playback devices within a media playback system that are (a) connected to a first wireless local area network (LAN) and (b) playing back particular audio content in a playback session, wherein the wearable playback device is connected to the first wireless LAN via a 802.11-compatible network interface; and transitioning the playback session from the determined one or more source playback devices to the wearable playback device, wherein transitioning the playback session comprises (i) forming a first synchrony group including the wearable playback device and the one or more source playback devices, wherein forming the first synchrony group causes the wearable playback device to start playing the particular audio content of the playback session, and (ii) causing playback of the particular audio content on the one or more source playback devices to stop.

Example 24: The method of example 23, wherein identifying the one or more source playback devices comprises: identifying a set of swap-eligible playback devices in the media playback system; causing the set of swap-eligible playback devices to emit respective audio chirps that identify the emitting swap-eligible playback devices; detecting, via one or more microphones, the audio chirps emitted by one or more swap-eligible playback devices; and selecting the one or more source playback devices from among the one or more swap-eligible playback devices based on the audio chirp from the one or more source playback devices indicating that the one or more source playback devices are physically nearest to the wearable playback device among the one or more swap-eligible playback devices.

Example 25: The method of example 24, wherein the one or more microphones comprise one or more acoustic noise cancelling microphones carried on one or more exterior surfaces of the one or more wearable housings, and wherein detecting the audio chirps emitted by one or more swap-eligible playback devices comprises: detecting the audio chirps emitted by one or more swap-eligible playback devices via the one or more acoustic noise cancelling microphones.

Example 26: The method of any preceding example 23-25, wherein selecting the one or more source playback devices from among the one or more swap-eligible playback devices comprises: comparing one or more respective metrics of the detected audio chirps emitted by one or more swap-eligible playback devices to determine that the one or more source playback devices are physically nearest to the wearable playback device among the one or more swap-eligible playback devices.

Example 27: The method of any preceding example 23-26, further comprising: while playing back audio content in the transitioned playback session, receiving data representing a second playback session swap input; based on the second playback session swap input, identifying one or more target playback devices within the media playback system that are connected to the first wireless LAN; and transitioning the playback session from the determined one or more target playback devices to the wearable playback device, wherein transitioning the playback session comprises (i) forming a second synchrony group including the wearable playback device and the one or more target playback devices, wherein forming the second synchrony group causes the one or more target playback devices to start playing the particular audio content of the playback session, and (ii) removing the wearable playback device from the second synchrony group.

Example 28: The method of any preceding example 23-27, wherein one or more wearable housings of the wearable playback device comprise a touch-sensitive region, and wherein receiving the data representing the playback session swap input comprises receiving input data representing a touch-and-hold input on the touch-sensitive region.

Example 29: The method of any preceding example 23-28, wherein receiving the data representing the playback session swap input comprises receiving, via the 802.11-compatible network interface from a controller application on a mobile device, data representing instructions to perform a playback session swap.

Example 30: The method of any preceding example 23-29, wherein causing playback of the particular audio content on the one or more source playback devices to stop comprises: after forming the synchrony group including the wearable playback device and one or more source devices, causing the one or more source devices to be removed from the synchrony group.

Example 31: The method of any preceding example 23-30, wherein the one or more source devices comprises a master playback device configured to play back multi-channel audio, and wherein transitioning the playback session comprises: sending, via the 802.11-compatible network interface to the master playback device, data representing instructions to enter a swap mode; sending, via the 802.11-compatible network interface to the master playback device, data representing instructions to enter a swap mode; disconnecting from the first wireless LAN and connecting to the second wireless LAN via the 802.11-compatible network interface; and while connected to the second wireless LAN, receiving, via the 802.11-compatible network interface, data representing (i) playback timing information for the first synchrony group and (ii) the multi-channel audio.

Example 32: The method of any preceding example 23-31, wherein the wearable playback device comprises: one or more network interfaces, wherein the one or more network interfaces comprises an 802.11-compatible network interface; one or more transducers; one or more amplifiers configured to drive the one or more transducers; one or more batteries; one or more processors; one or more wearable housings, the one or more wearable housings carrying the one or more network interfaces, the one or more transducers, the one or more amplifiers, the one or more batteries, the one or more processors, and data storage having instructions stored thereon that are executable by the one or more processors to cause the wearable playback device to perform the method of any preceding example 23-31.

Example 33: The method of example 32, wherein one or more wearable housings of the wearable playback device are formed into one of (a) headphones or (b) one or more earbuds.

Example 34: A system configured to perform the method of any of examples 23-32.

Example 35: A device configured to perform the method of any of example 23-32.

Example 36: A tangible, non-transitory computer-readable media having stored therein instructions executable by one or more processors to perform the method of any of examples 23-32.

Example 37: A method involving a wearable device, the method comprising: receiving data representing a first playback session swap input; based on receiving the data representing the first playback session swap input, identifying one or more source playback devices within a media playback system that are (a) connected to a first wireless local area network (LAN) and (b) playing back particular audio content in a playback session, wherein the wearable playback device is connected to the first wireless LAN via the 802.11-compatible network interface; and transitioning the playback session from the determined one or more source playback devices to the wearable playback device, wherein transitioning the playback session comprises (i) forming a first synchrony group including the wearable playback device and the one or more source playback devices, wherein forming the first synchrony group causes the wearable playback device to start playing the particular audio content of the playback session, and (ii) causing playback of the particular audio content on the one or more source playback devices to stop.

Example 38: The method of example 37, wherein identifying the one or more source playback devices comprises: identifying a set of swap-eligible playback devices in the media playback system; causing the set of swap-eligible playback devices to emit respective audio chirps that identify the emitting swap-eligible playback devices; detecting, via the one or more microphones, the audio chirps emitted by one or more swap-eligible playback devices; and selecting the one or more source playback devices from among the one or more swap-eligible playback devices based on the audio chirp from the one or more source playback devices indicating that the one or more source playback devices are physically nearest to the wearable playback device among the one or more swap-eligible playback devices.

Example 39: The method of example 38: wherein the one or more microphones comprise one or more acoustic noise cancelling microphones carried on one or more exterior surfaces of the one or more wearable housings, and wherein detecting the audio chirps emitted by one or more swap-eligible playback devices comprises: detecting the audio chirps emitted by one or more swap-eligible playback devices via the one or more acoustic noise cancelling microphones.

Example 40: The method of any preceding example 37-39, wherein selecting the one or more source playback devices from among the one or more swap-eligible playback devices comprises: comparing one or more respective metrics of the detected audio chirps emitted by one or more swap-eligible playback devices to determine that the one or more source playback devices are physically nearest to the wearable playback device among the one or more swap-eligible playback devices.

Example 41: The method of any preceding example 37-40, further comprising: while playing back audio content in the transitioned playback session, receiving data representing a second playback session swap input; based on the second playback session swap input, identifying one or more target playback devices within the media playback system that are connected to the first wireless LAN; and transitioning the playback session from the determined one or more target playback devices to the wearable playback device, wherein transitioning the playback session comprises (i) forming a second synchrony group including the wearable playback device and the one or more target playback devices, wherein forming the second synchrony group causes the one or more target playback devices to start playing the particular audio content of the playback session, and (ii) removing the wearable playback device from the second synchrony group.

Example 42: The method of any preceding example 37-41, wherein one or more wearable housings of the wearable playback device comprise a touch-sensitive region, and wherein receiving the data representing the playback session swap input comprises receiving input data representing a touch-and-hold input on the touch-sensitive region.

Example 43: The method of any preceding example 37-42, wherein receiving the data representing the playback session swap input comprises receiving, via the 802.11-compatible network interface from a controller application on a mobile device, data representing instructions to perform a playback session swap.

Example 44: The method of any preceding example 37-43, wherein causing playback of the particular audio content on the one or more source playback devices to stop comprises: after forming the synchrony group including the wearable playback device and one or more source devices, causing the one or more source devices to be removed from the synchrony group.

Example 45: The method of any preceding example 37-44, wherein the one or more source devices comprises a master playback device configured to play back multi-channel audio, and wherein transitioning the playback session comprises: sending, via the 802.11-compatible network interface to the master playback device, data representing instructions to enter a swap mode; receiving, via the 802.11-compatible network interface to the master playback device, data representing (i) a service set identifier (SSID) of a second wireless LAN, the second wireless LAN formed by the master playback device and (ii) credentials for the second wireless LAN; disconnecting from the first wireless LAN and connecting to the second wireless LAN via the 802.11-compatible network interface; and while connected to the second wireless LAN, receiving, via the 802.11-compatible network interface, data representing (i) playback timing information for the first synchrony group and (ii) the multi-channel audio.

Example 45: The method of any preceding example 37-44, wherein the wearable playback device comprises: one or more network interfaces, wherein the one or more network interfaces comprises an 802.11-compatible network interface; one or more transducers; one or more amplifiers configured to drive the one or more transducers; one or more batteries; one or more processors; one or more wearable housings, the one or more wearable housings carrying the one or more network interfaces, the one or more transducers, the one or more amplifiers, the one or more batteries, the one or more processors, and data storage having instructions stored thereon that are executable by the one or more processors to cause the wearable playback device to perform the method of any preceding example 37-44.

Example 46: The method of example 45, wherein one or more wearable housings of the wearable playback device are formed into one of (a) headphones or (b) one or more earbuds.

Example 47: A system configured to perform the method of any of examples 37-46.

Example 48: A device configured to perform the method of any of examples 37-46.

Example 49: A tangible, non-transitory computer-readable media having stored therein instructions executable by one or more processors to perform the method of any of examples 37-46.

Example 50: A method involving a first playback device and a second playback device, the method comprising: while in a home theater mode, playing back audio received via the audio input interface, wherein the first playback device is a master device of a first synchrony group; while in the home theater mode, receiving, via an 802.11-compatible network interface from the second playback device, data representing instructions to transition to a swap mode; based on receiving the data representing the instructions to enter the swap mode with the second playback device, transitioning from the home theater mode to the swap mode with the second playback device, wherein transitioning from the home theater mode to the swap mode comprises: transitioning the 802.11-compatible network interface from operating as a node in a mesh network to operating as an access point that forms a first wireless local area network (LAN) in a first wireless frequency band; sending, via the 802.11-compatible network interface to the second playback device, data representing (i) a service set identifier (SSID) of the first wireless LAN and (ii) credentials for the first wireless LAN; after connecting to the first wireless LAN formed by the first playback device, forming a second synchrony group that includes the first playback device and the second playback device; receiving, via an 802.11-compatible network interface to the second playback device, data representing (i) playback timing information for the second synchrony group and (ii) the audio, wherein the second playback device plays back the audio; and after joining the second synchrony group, playing back the audio in synchrony with the first playback device, wherein the first playback device mutes playback of the audio while the second playback device plays back the audio.

Example 51: The method of example 50, wherein the first synchrony group includes the first playback device and one or more satellite playback devices, wherein the audio comprises multi-channel audio, and wherein playing back the multi-channel audio comprises sending, via the 802.11-compatible network interface to the one or more satellite playback devices, data representing (i) playback timing information for the first synchrony group and (ii) respective channels of the multi-channel audio, and wherein transitioning from the home theater mode to the swap mode further comprises: causing the one or more satellite playback devices to (i) connect to a second wireless LAN in a second wireless frequency band and (ii) leave the first synchrony group.

Example 52: The method of example 51, further comprising: detecting an event representing a trigger to transition from operating in the swap mode to operating in the home theater mode; after detecting the event, transitioning from the swap mode to the home theater mode, wherein transitioning from the swap mode to the home theater mode comprises: causing the one or more satellite playback devices to connect to the mesh network; transitioning the 802.11-compatible network interface from operating as the access point to operating as the node in the mesh network; and re-forming the first synchrony group that includes the first playback device and the one or more satellite playback devices; operating in the home theater mode, sending, via the 802.11-compatible network interface to the one or more satellite playback devices, data representing (i) playback timing information for the first synchrony group and (ii) respective channels of the multi-channel audio; and playing back the one or more channels of the multi-channel audio in synchrony with the one or more satellite playback devices playing back the respective channels of the multi-channel audio.

Example 53: The method of example 52, wherein detecting the event comprises detecting that the first wireless playback device has disconnected from the first wireless LAN.

Example 54: The method of any preceding example 50-53, wherein the audio received via the audio input interface comprises a surround sound audio track, and wherein the functions further comprise down-mixing the surround sound audio track to a stereo audio track, and wherein sending the data representing the audio comprises sending data representing the stereo audio track to the second playback device.

Example 55: The method of any preceding example 50-54, further comprising: while in the swap mode, receiving, via the 802.11-compatible network interface from a third playback device, data representing instructions to transition to the swap mode; based on receiving, from the third playback device, the data representing the instructions to enter the swap mode, causing the third playback device to join the second synchrony group, wherein causing the third playback device to join the second synchrony group comprises: sending, via the 802.11-compatible network interface to the third playback device, data representing (i) the SSD of the first wireless LAN and (ii) credentials for the first wireless LAN; after the third playback device connects to the first wireless LAN formed by the first playback device, adding the third playback device to the second synchrony group that includes the first playback device and the second playback device; and sending, via the 802.11-compatible network interface to the third playback device, data representing (i) the playback timing information for the second synchrony group and (ii) the audio, wherein the third playback device plays back the audio in synchrony with the second playback device.

Example 56: The method of any preceding example 50-55, further comprising: while in a music mode, playing back audio content received via the one or more network interfaces; while playing back the audio content in the music mode, receiving, via the 802.11-compatible network interface from the second playback device, data representing instructions to form a third synchrony group with the second playback device; forming the third synchrony group with the second playback device, wherein forming the third synchrony group with the second playback device configures the first playback device to play back the audio content in synchrony with the second playback device; and after forming the third synchrony group with the second playback device, leaving the third synchrony group, wherein the second playback device is the master device of the third synchrony group.

Example 57: The method of example 56, further comprising: receiving data representing a playback session swap trigger; based on receiving the data representing the playback session swap trigger, identifying one or more source playback devices within a media playback system that playing back particular audio content in a playback session, wherein identifying the one or more source devices comprises: identifying a set of swap-eligible playback devices in the media playback system, the set including the first playback device; causing the set of swap-eligible playback devices to emit respective audio chirps that identify the emitting swap-eligible playback devices; detecting, via the one or more microphones, the audio chirps emitted by one or more swap-eligible playback devices from the set of swap-eligible playback devices, the one or more swap-eligible playback devices including the first playback device; and selecting the first playback device as the one or more source playback devices from among the one or more swap-eligible playback devices based on the audio chirp from the first playback device indicating that the first playback device is physically nearest to the second playback device among the one or more swap-eligible playback devices.

Example 58: The method of example 56, further comprising: while in the music mode and before receiving the data representing instructions to form the third synchrony group with the second playback device, receiving, via the 802.11-compatible network interface from the second playback device, data representing instructions to emit a particular audio chirp; and based on receiving the data representing instructions to emit a particular audio chirp, emitting the particular audio chirp via the one or more transducers.

Example 59: The method of any preceding example 50-58, wherein the second playback device comprises one or more housings, and wherein the one or more housings are formed into one of (a) headphones or (b) a set of earbuds.

Example 60: The method of any preceding example 50-59, wherein the first playback device comprises: an audio input interface; one or more network interfaces, wherein the one or more network interfaces comprises an 802.11-compatible network interface; one or more transducers; one or more amplifiers configured to drive the one or more amplifiers; and a housing carrying the an audio input interface, the one or more network interfaces, the one or more transducers, the one or more amplifiers, the one or more processors, and data storage having instructions stored thereon that are executable by the one or more processors to cause the soundbar-type playback device to perform the method of any preceding example 50-59.

Example 61: The method of any preceding example 50-60, wherein the second playback device comprises: one or more network interfaces, wherein the one or more network interfaces comprises an 802.11-compatible network interface; one or more transducers; one or more amplifiers configured to drive the one or more transducers; one or more batteries; one or more processors; a housing carrying the one or more network interfaces, the one or more transducers, the one or more amplifiers, the one or more batteries, the one or more processors, and data storage having instructions stored thereon that are executable by the one or more processors to cause the wearable playback device to perform the method of any preceding example 50-60.

Example 62: A system configured to perform the method of any of examples 50-61.

Example 64: A device configured to perform the method of any of examples 50-61.

Example 65: A tangible, non-transitory computer-readable media having stored therein instructions executable by one or more processors to perform the method of any of examples 50-61.

Example 66: A receiving device, comprising: a microphone configured to receive an audio signal comprising a superposition of a plurality of audio signals transmitted by a plurality of respective playback devices; one or more processors; and a non-transitory, computer-readable medium storing instructions that, when executed by the one or more processors, instruct the receiving device to: determine a time-frequency representation of the audio signal received by the microphone; obtain data associating playback devices with respective reference audio signals, each reference audio signal having a predefined time-frequency representation; based on the time-frequency representation of the audio signal and the data, determine that the audio signal comprises a superposition of a first audio signal transmitted by a first playback device and a second audio signal transmitted by a second playback device; based on the audio signal, determine a first magnitude associated with the first audio signal and a second magnitude associated with the second audio signal; determine that the first magnitude is greater than the second magnitude; determine that the first playback device is arranged in closer proximity than the second playback device to the receiving device; and transition a playback session between the receiving device and the first playback device.

Example 67: A receiving device according to Example 66, wherein the first playback device is playing back audio content in the playback session and wherein instructing the receiving device to transition the playback session between the receiving device and the first playback device comprises instructing the receiving device to: transition the playback session from the first playback device to the receiving device, such that the receiving device plays back the audio content.

Example 68: A receiving device according to Example 66, wherein the receiving device is playing back audio content in the playback session and wherein instructing the receiving device to transition the playback session between the receiving device and the first playback device comprises instructing the receiving device to: transition the playback session from the receiving device to the first playback device, such that the first playback device plays back the audio content.

Example 69: A receiving device according to Example 66, wherein each reference audio signal comprises a plurality of tones, wherein each of the plurality of tones has a predefined frequency and initiation time.

Example 70: A receiving device according to Example 69, wherein at least some of the plurality of tones are spaced apart in time by an interval of time.

Example 71: A receiving device according to Example 69, wherein the predefined frequencies are selected from a predefined set of frequencies and wherein a frequency difference between each frequency within the predefined set of frequencies is greater than about 50 Hz.

Example 72: A receiving device according to Example 66, further comprising a network interface configured to transmit, to the plurality of playback devices, a command to cause the plurality of playback devices to output respective reference audio signals concurrently.

Example 73: A method, comprising: detecting, during a time period by a receiving device, an audio signal comprising a superposition of a plurality of audio signals transmitted by a plurality of respective playback devices; determining a time-frequency representation of the audio signal; obtaining data associating playback devices with respective reference audio signals, each reference audio signal having a predefined time-frequency representation; and based on the time-frequency representation of the audio signal and the data, determining that the audio signal comprises a superposition of a first audio signal transmitted by a first playback device and a second audio signal transmitted by a second playback device.

Example 74: A method according to Example 73, further comprising: based on the audio signal, determining a first magnitude associated with the first audio signal and a second magnitude associated with the second audio signal; determining that the first magnitude is greater than the second magnitude; and determining that the first playback device is arranged closer than the second playback device to the receiving device.

Example 75: A method according to Example 74, wherein the first playback device is playing back audio content in a playback session, and the method further comprises transitioning the playback session from the first playback device to the receiving device, such that the receiving device plays back the audio content.

Example 76: A method according to Example 73, wherein determining the time-frequency representation of the audio signal comprises: decomposing a first portion of the audio signal into constituent frequencies, wherein the first portion of the audio signal is received during a first portion of the time period; decomposing a second portion of the audio signal into constituent frequencies, wherein the second portion of the audio signal is received during a second portion of the time period.

Example 77: A method according to Example 73, wherein each reference audio signal comprises a plurality of tones, wherein each of the plurality of tones has a predefined frequency and initiation time.

Example 78: A method according to Example 77, wherein at least some of the plurality of tones are spaced apart in time by an interval of time.

Example 79: A method according to Example 78, wherein the interval of time is between about 10 ms and about 50 ms.

Example 80: A method according to Example 79, wherein a first interval of time within the reference audio signal differs to at least another interval of time within the reference audio signal.

Example 81: A method according to Example 73, wherein the predefined frequencies are selected from a predefined set of frequencies and wherein a frequency difference between each frequency within the predefined set of frequencies is greater than about 50 Hz.

Example 82: A method according to Example 73, wherein the predefined frequencies are selected from a predefined set of frequencies, and wherein each frequency within the predefined set of frequencies is greater than about 18 kHz.

Example 83: A method according to Example 73, wherein each of the plurality of tones has a duration of between about 10 ms and about 20 ms.

Example 84: A method according to Example 73, wherein each reference audio signal has a duration of between about 400 ms and about 800 ms.

Example 85: A method according to Example 73, further comprising causing the plurality of playback devices to output respective reference audio signals.

We claim:

1. A portable playback device comprising:
one or more microphones;
one or more batteries;
one or more processors;
a non-transitory, computer-readable medium storing instructions that, when executed by the one or more processors, cause the portable playback device to perform functions comprising:
receiving an indication to perform presence detection of one or more playback devices;
transmitting one or more messages instructing the one or more playback devices to transmit respective audio signals for presence detection;
after transmitting the one or more messages, receiving, via a first microphone, a first audio signal;
determining a time-frequency representation of the first audio signal;
based on the time-frequency representation of the first audio signal and data indicating respective reference audio signals, determining that the first audio signal comprises a superposition of a second audio signal transmitted by a first playback device and a third audio signal transmitted by a second playback device;
based on the first audio signal, determining a first magnitude associated with the second audio signal and a second magnitude associated with the third audio signal;
based on determining that the first magnitude is greater than the second magnitude, determining that the first playback device is arranged in closer proximity than the second playback device to the portable playback device; and
transitioning a playback session between the portable playback device and the first playback device.

2. The portable playback device of claim 1, wherein receiving the indication to perform presence detection of one or more playback devices comprises:
receiving data representing a first playback session swap input; and
wherein transmitting the one or more messages instructing the one or more playback devices to transmit respective audio signals for presence detection comprises:
based on receiving the data representing the first playback session swap input, transmitting the one or more messages instructing the one or more playback devices to transmit the respective audio signals for presence detection.

3. The portable playback device of claim 1, wherein receiving the indication to perform presence detection of one or more playback devices comprises:
detecting a user interaction with the portable playback device; and
based on the user interaction, determining a predicted swap command state, and
wherein transmitting one or more messages instructing one or more playback devices to transmit respective audio signals for presence detection comprises:
based on determining the predicted swap command state, transmitting the one or more messages instructing the one or more playback devices to transmit the respective audio signals for presence detection.

4. The portable playback device of claim 3, wherein detecting the user interaction with the portable playback device comprises:
determining that an interaction has occurred on a control interface of the portable playback device.

5. The portable playback device of claim 1, wherein the functions further comprise:
determining available presence detection techniques of the one or more playback devices; and
based on the available presence detection techniques, selecting an audio chirp technique as a presence detection technique.

6. The portable playback device of claim 1, wherein the functions further comprise:
connecting to a network;
after connecting to the network, receiving state information of the one or more playback devices connected to the network; and
based on the state information, determining that the first playback device and the second playback device are swap-capable playback devices.

7. The portable playback device of claim 1, wherein transmitting the one or more messages instructing the one or more playback devices to transmit respective audio signals for presence detection comprises:
transmitting a message to all of the one or more playback devices to transmit respective audio signals for presence detection.

8. A non-transitory, computer-readable medium storing instructions that, when executed by one or more processors, cause a portable playback device to perform functions comprising:
receiving an indication to perform presence detection of one or more playback devices;
transmitting one or more messages instructing the one or more playback devices to transmit respective audio signals for presence detection;
after transmitting the one or more messages, receiving, via a first microphone, a first audio signal;
determining a time-frequency representation of the first audio signal;
based on the time-frequency representation of the first audio signal and data indicating respective reference audio signals, determining that the first audio signal comprises a superposition of a second audio signal transmitted by a first playback device and a third audio signal transmitted by a second playback device;
based on the first audio signal, determining a first magnitude associated with the second audio signal and a second magnitude associated with the third audio signal;
based on determining that the first magnitude is greater than the second magnitude, determining that the first playback device is arranged in closer proximity than the second playback device to the portable playback device; and
transitioning a playback session between the portable playback device and the first playback device.

9. The non-transitory, computer-readable medium of claim 8, wherein receiving the indication to perform presence detection of one or more playback devices comprises:
receiving data representing a first playback session swap input; and
wherein transmitting the one or more messages instructing one or more playback devices to transmit respective audio signals for presence detection comprises:
based on receiving the data representing the first playback session swap input, transmitting the one or more messages instructing the one or more playback devices to transmit the respective audio signals for presence detection.

10. The non-transitory, computer-readable medium of claim 8, wherein receiving an indication to perform presence detection of one or more playback devices comprises:
detecting a user interaction with the portable playback device; and
based on the user interaction, determining a predicted swap command state, and wherein transmitting one or more messages instructing one or more playback devices to transmit respective audio signals for presence detection comprises:
based on determining the predicted swap command state, transmitting the one or more messages instructing the one or more playback devices to transmit the respective audio signals for presence detection.

11. The non-transitory, computer-readable medium of claim 10, wherein detecting the user interaction with the portable playback device comprises:
determining that an interaction has occurred on a control interface of the portable playback device.

12. The non-transitory, computer-readable medium of claim 8, wherein the functions further comprise:
determining available presence detection techniques of the one or more playback devices; and
based on the available presence detection techniques, selecting an audio chirp technique as a presence detection technique.

13. The non-transitory, computer-readable medium of claim 8, wherein the functions further comprise:
connecting to a network;
after connecting to the network, receiving state information of the one or more playback devices connected to the network; and
based on the state information, determining that the first playback device and the second playback device are swap-capable playback devices.

14. The non-transitory, computer-readable medium of claim 8, wherein transmitting one or more messages instructing the one or more playback devices to transmit respective audio signals for presence detection comprises:
transmitting a message to all of the one or more playback devices to transmit respective audio signals for presence detection.

15. A media playback system, comprising:
a portable playback device;
a first playback device;
a second playback device;
one or more non-transitory, computer-readable media storing instructions that when executed by one or more processors cause the media playback system to perform functions comprising:
receiving, via the portable playback device, an indication to perform presence detection of one or more playback devices;
transmitting, via the portable playback device, one or more messages instructing the one or more playback devices to transmit respective audio signals for presence detection;
transmitting, via the first playback device, a first audio signal;
transmitting, via the second playback device, a second audio signal;
after transmitting the one or more messages, receiving, via the portable playback device, a third audio signal comprising the first audio signal and the second audio signal;
determining, via the portable playback device, a time-frequency representation of the third audio signal;
based on the time-frequency representation of the third audio signal and data indicating respective reference audio signals, determining, via the portable playback device, that the third audio signal comprises a superposition of the first audio signal transmitted by the first playback device and the second audio signal transmitted by the second playback device;

based on the third audio signal, determining, via the portable playback device, a first magnitude associated with the first audio signal and a second magnitude associated with the second audio signal;

based on determining that the first magnitude is greater than the second magnitude, determining, via the portable playback device, that the first playback device is arranged in closer proximity than the second playback device to the portable playback device; and transitioning, via the portable playback device, a playback session between the portable playback device and the first playback device.

16. The media playback system of claim 15, wherein receiving, via the portable playback device, the indication to perform presence detection of one or more playback devices comprises:

receiving data representing a first playback session swap input; and wherein transmitting, via the portable playback device, one or more messages instructing one or more playback devices to transmit respective audio signals for presence detection comprises:

based on receiving the data representing the first playback session swap input, transmitting the one or more messages instructing the one or more playback devices to transmit the respective audio signals for presence detection.

17. The media playback system of claim 15, wherein receiving, via the portable playback device, an indication to perform presence detection of one or more playback devices comprises:

detecting a user interaction with the portable playback device; and based on the user interaction, determining a predicted swap command state, and wherein transmitting, via the portable playback device, one or more messages instructing one or more playback devices to transmit respective audio signals for presence detection comprises:

based on determining the predicted swap command state, transmitting the one or more messages instructing the one or more playback devices to transmit the respective audio signals for presence detection.

18. The media playback system of claim 17, wherein detecting, via the portable playback device, the user interaction with the portable playback device comprises:

determining that an interaction has occurred on a control interface of the portable playback device.

19. The media playback system of claim 15, wherein the functions further comprise:

determining, via the portable playback device, available presence detection techniques of the one or more playback devices; and based on the available presence detection techniques, selecting, via the portable playback device, an audio chirp technique as a presence detection technique.

20. The media playback system of claim 15, wherein the first audio signal and the second audio signal are in a frequency range of 18-20 kHz.

* * * * *